US009450771B2

(12) United States Patent
Browning et al.

(10) Patent No.: US 9,450,771 B2
(45) Date of Patent: Sep. 20, 2016

(54) DETERMINING INFORMATION INTER-RELATIONSHIPS FROM DISTRIBUTED GROUP DISCUSSIONS

(71) Applicant: Blab, Inc., Seattle, WA (US)

(72) Inventors: Randolph Browning, Mercer Island, WA (US); Stefan Nicholas Papp, Seattle, WA (US); Bernhard G. Zimmermann, Seattle, WA (US); Benjamin Ralph Bressler, Sammamish, WA (US)

(73) Assignee: Blab, Inc., Seattle, WA (US)

( * ) Notice: Subject to any disclaimer, the term of this patent is extended or adjusted under 35 U.S.C. 154(b) by 174 days.

(21) Appl. No.: 14/523,746

(22) Filed: Oct. 24, 2014

(65) Prior Publication Data

US 2015/0142888 A1 May 21, 2015

Related U.S. Application Data

(60) Provisional application No. 61/948,388, filed on Mar. 5, 2014, provisional application No. 61/906,827, filed on Nov. 20, 2013.

(51) Int. Cl.

| | |
|---|---|
| ***H04L 12/18*** | (2006.01) |
| ***H04L 29/08*** | (2006.01) |
| ***H04L 12/26*** | (2006.01) |
| *G06F 17/27* | (2006.01) |
| *G06Q 50/00* | (2012.01) |
| *G06Q 10/10* | (2012.01) |
| *G06N 5/02* | (2006.01) |

(Continued)

(52) U.S. Cl.

CPC ......... *H04L 12/1831* (2013.01); *H04L 43/045* (2013.01); *H04L 67/18* (2013.01); *H04L 67/22* (2013.01); *G06F 17/2785* (2013.01); *G06N 5/02* (2013.01); *G06N 5/046* (2013.01); *G06Q 10/10* (2013.01); *G06Q 30/02* (2013.01); *G06Q 50/01* (2013.01)

(58) Field of Classification Search

None

See application file for complete search history.

(56) References Cited

U.S. PATENT DOCUMENTS

| | | | |
|---|---|---|---|
| 7,844,484 | B2 | 11/2010 | Arnett et al. |
| 8,176,046 | B2 | 5/2012 | Druzgalski et al. |

(Continued)

OTHER PUBLICATIONS

Mathioudakis, M., et al., "TwitterMonitor: Trend Detection over the Twitter Stream," 2010, Proceedings of the 2010 International Conference on Management of Data, pp. 1155-1157.

*Primary Examiner* — Greg C Bengzon

(74) *Attorney, Agent, or Firm* — Seed IP Law Group PLLC

(57) ABSTRACT

Techniques are described for analyzing user-supplied information and/or predicting future aspects of additional information that will be supplied by users. The analyzed information may include distributed group discussions involving numerous users, occurring via user comments and other content items supplied to social networking site(s) and/or other sources. Analysis of user-supplied information may, for example, include determining particular topics and/or categories of interest during one or more time periods and quantifying corresponding amounts of user interest; determining trends for, relevant terms and attributes for, and inter-relationships between the topics and categories; predicting future amounts of user interest in the topics and categories; tracking user interactions with information about the topics and/or categories; and taking further actions based on the analyzed and/or predicted information.

44 Claims, 52 Drawing Sheets
(11 of 52 Drawing Sheet(s) Filed in Color)

(51) Int. Cl.
*G06Q 30/02* (2012.01)
*G06N 5/04* (2006.01)

(56) References Cited

U.S. PATENT DOCUMENTS 8,261,193 B1 9/2012 Alur et al.
8,285,598 B2 10/2012 Mesaros
8,290,973 B2 10/2012 Flake et al.
8,312,056 B1 11/2012 Peng et al.
8,321,792 B1 11/2012 Alur et al.
8,364,171 B2 1/2013 Busch
8,380,607 B2 2/2013 Bollen et al.
8,392,230 B2 3/2013 Stibel et al.
8,429,170 B2 4/2013 Ittiachen
8,452,772 B1 5/2013 Carpio et al.
8,762,302 B1 * 6/2014 Spivack ................. G06N 5/046 706/12
2004/0249700 A1 12/2004 Gross
2007/0124432 A1 5/2007 Holtzman et al.
2007/0208614 A1 9/2007 Arnett et al.
2008/0033587 A1 2/2008 Kurita et al.
2008/0215607 A1 9/2008 Kaushansky et al.
2009/0048904 A1 * 2/2009 Newton ............. G06Q 30/0201 705/7.29
2009/0089131 A1 4/2009 Moukas et al.
2009/0119173 A1 5/2009 Parsons et al.
2009/0125397 A1 5/2009 Gomaa et al.
2009/0204478 A1 8/2009 Kaib et al.
2009/0319518 A1 12/2009 Koudas et al.
2010/0030648 A1 2/2010 Manolescu et al.
2010/0030773 A1 2/2010 Patterson
2010/0042612 A1 2/2010 Gomaa
2010/0070485 A1 3/2010 Parsons et al.
2010/0094849 A1 4/2010 Rose et al.
2010/0100537 A1 4/2010 Druzgalski et al.
2010/0121707 A1 5/2010 Goeldi
2010/0121849 A1 5/2010 Goeldi
2010/0153107 A1 6/2010 Kawai
2010/0164957 A1 * 7/2010 Lindsay ................. G06Q 10/10 345/440
2010/0228777 A1 * 9/2010 Imig ................. G06F 17/30699 707/772
2010/0257117 A1 10/2010 Shvadron et al.
2010/0280985 A1 * 11/2010 Duchon ................. G06Q 10/10 706/52
2010/0299692 A1 11/2010 Rao et al.
2010/0325107 A1 12/2010 Kenton et al.
2010/0332475 A1 * 12/2010 Birdwell ........... G06F 17/30333 707/737
2011/0035211 A1 2/2011 Eden
2011/0078167 A1 * 3/2011 Sundaresan ......... G06F 17/2785 707/765
2011/0106584 A1 * 5/2011 Borthwick ............. G06Q 30/02 705/7.31
2011/0302006 A1 12/2011 Avner et al.
2011/0307312 A1 12/2011 Goeldi
2011/0307340 A1 12/2011 Benmbarek
2011/0307397 A1 12/2011 Benmbarek
2011/0313842 A1 12/2011 Avner et al.
2011/0314007 A1 12/2011 Dassa et al.
2012/0011158 A1 1/2012 Avner et al.
2012/0016948 A1 1/2012 Sinha
2012/0030018 A1 2/2012 Passmore et al.
2012/0036080 A1 2/2012 Singer et al.
2012/0143694 A1 6/2012 Zargahi et al.
2012/0150645 A1 6/2012 Mandyam et al.
2012/0166278 A1 6/2012 MacGregor et al.
2012/0239489 A1 9/2012 Peretti et al.
2012/0265755 A1 10/2012 McNally et al.
2012/0290950 A1 11/2012 Rapaport et al.
2012/0323908 A1 12/2012 Herbert, Jr. et al.
2013/0024398 A1 1/2013 Shah
2013/0035795 A1 2/2013 Pfeiffer et al.
2013/0036107 A1 2/2013 Benyamin et al.
2013/0046760 A1 * 2/2013 Evans .................... G06Q 50/01 707/728
2013/0086068 A1 * 4/2013 Davids .............. G06F 17/30002 707/737
2013/0151525 A1 * 6/2013 Ankan ................ G06F 17/2785 707/737
2013/0204779 A1 8/2013 Marinakis et al.
2013/0232263 A1 * 9/2013 Kelly ...................... H04L 43/10 709/224
2013/0238356 A1 9/2013 Torii et al.
2013/0298084 A1 11/2013 Spivack et al.
2013/0325953 A1 * 12/2013 Jin ......................... G06Q 50/01 709/204
2014/0040387 A1 * 2/2014 Spivack .................. H04L 51/32 709/206
2014/0068457 A1 * 3/2014 Lindsay ................. G06Q 10/10 715/751
2014/0149418 A1 * 5/2014 Qin ........................ G06Q 10/00 707/740
2014/0258198 A1 * 9/2014 Spivack ................. G06N 5/046 706/21
2014/0297403 A1 * 10/2014 Parsons ............. G06F 17/30864 705/14.49
2015/0032492 A1 * 1/2015 Ting ....................... G06Q 50/01 705/7.14
2015/0046151 A1 * 2/2015 Lane ................... G06F 17/2785 704/9
2015/0081725 A1 * 3/2015 Ogawa .............. G06F 17/30595 707/754
2015/0089399 A1 * 3/2015 Megill ............... G06Q 30/0203 715/753
2015/0089409 A1 * 3/2015 Asseily .................. G06Q 10/10 715/765
2016/0134579 A1 * 5/2016 Buddenbaum .......... H04L 51/32 709/206
2016/0134580 A1 * 5/2016 Castera ................... H04L 51/32 715/752

* cited by examiner

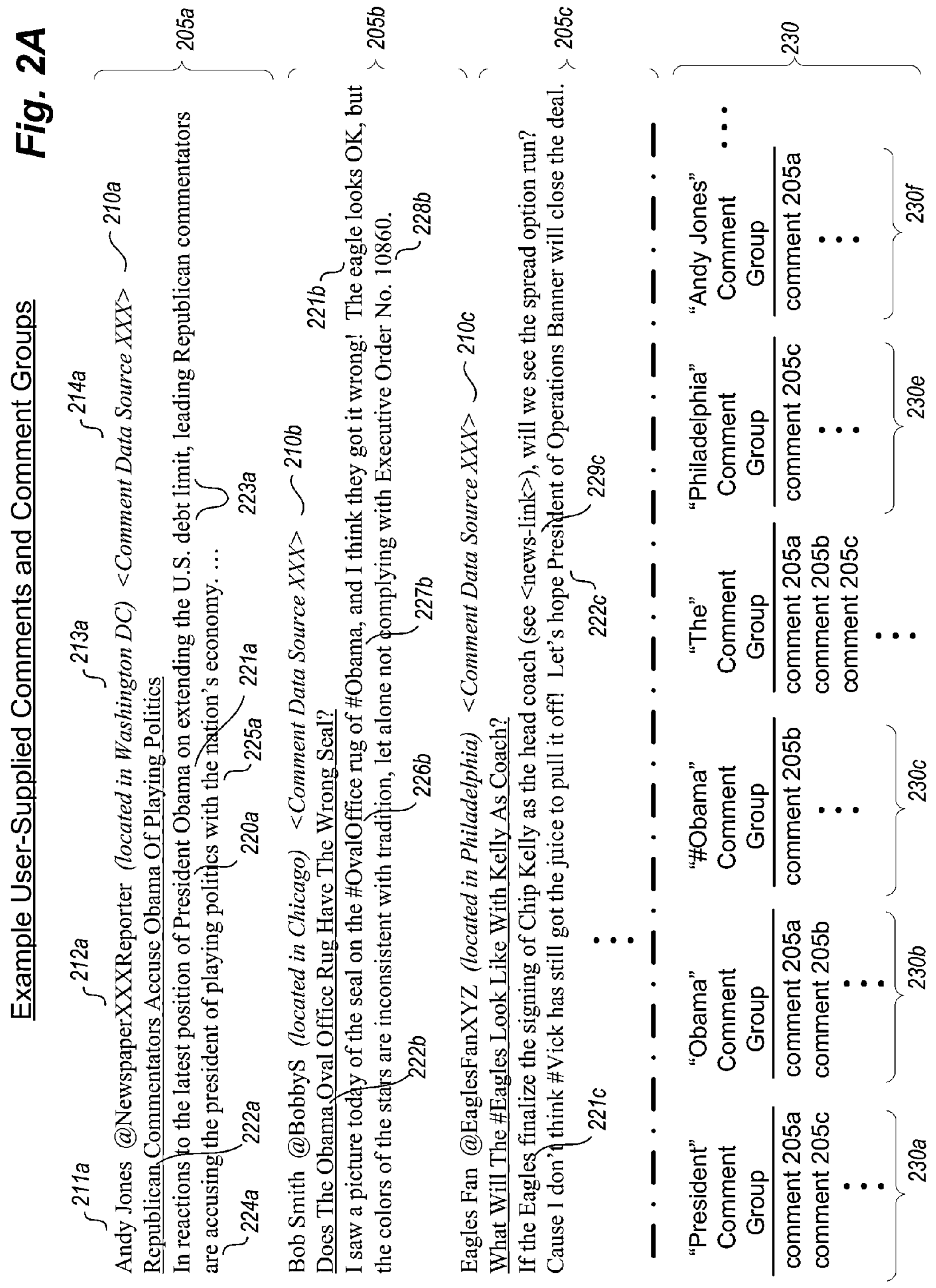
Example User-Supplied Comments and Comment Groups
Fig. 2A
Andy Jones @NewspaperXXXReporter (located in Washington DC) <Comment Data Source XXX>
Republican Commentators Accuse Obama Of Playing Politics
In reactions to the latest position of President Obama on extending the U.S. debt limit, leading Republican commentators are accusing the president of playing politics with the nation's economy. ...
Bob Smith @BobbyS (located in Chicago) <Comment Data Source XXX>
Does The Obama Oval Office Rug Have The Wrong Seal?
I saw a picture today of the seal on the #OvalOffice rug of #Obama, and I think they got it wrong! The eagle looks OK, but the colors of the stars are inconsistent with tradition, let alone not complying with Executive Order No. 10860.
Eagles Fan @EaglesFanXYZ (located in Philadelphia) <Comment Data Source XXX>
What Will The #Eagles Look Like With Kelly As Coach?
If the Eagles finalize the signing of Chip Kelly as the head coach (see <news-link>), will we see the spread option run? Cause I don't think #Vick has still got the juice to pull it off! Let's hope President of Operations Banner will close the deal.
"President" Comment Group
comment 205a
comment 205c
"Obama" Comment Group
comment 205a
comment 205b
"#Obama" Comment Group
comment 205b
"The" Comment Group
comment 205a
comment 205b
comment 205c
"Philadelphia" Comment Group
comment 205c
"Andy Jones" Comment Group
comment 205a
205a
205b
205c
210a
210b
210c
211a
212a
213a
214a
220a
221a
221b
221c
222a
222b
222c
223a
224a
225a
226b
227b
228b
229c
230
230a
230b
230c
230e
230f

Example Supplemental Comments and Comment Groups

Andy Jones    *<Comment Data Source YYY>*   — 240a
(241a)      (244a)
Thanks to everyone for the comments on my Twitter post about #Obama and the U.S. debt limit! I plan to solve the Euro problems next ...

⋮

} 245a

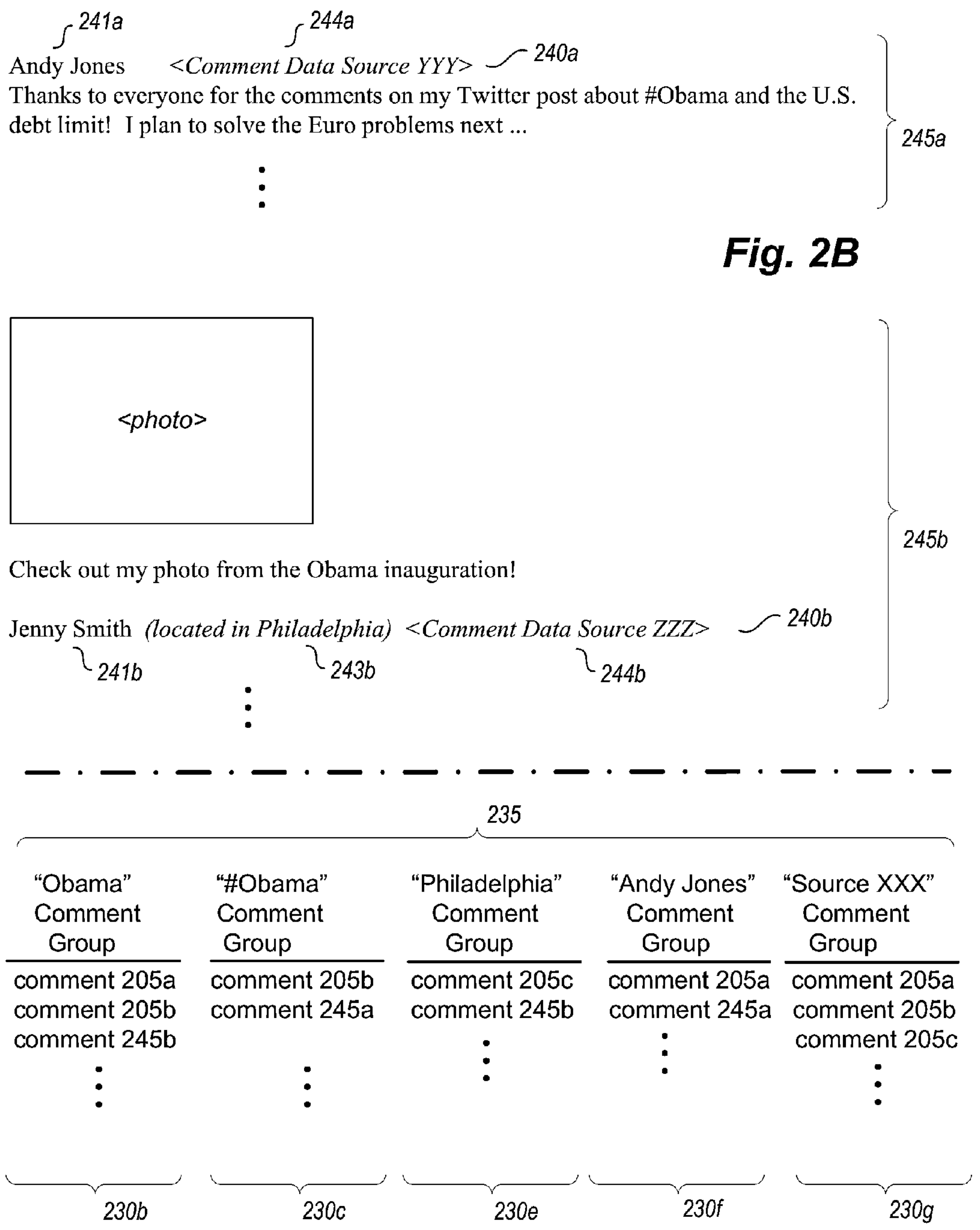

Fig. 2B

<photo>

Check out my photo from the Obama inauguration!

Jenny Smith   *(located in Philadelphia)*   *<Comment Data Source ZZZ>*   — 240b
(241b)     (243b)       (244b)

⋮

} 245b

---

235

| "Obama" Comment Group | "#Obama" Comment Group | "Philadelphia" Comment Group | "Andy Jones" Comment Group | "Source XXX" Comment Group |
|---|---|---|---|---|
| comment 205a<br>comment 205b<br>comment 245b<br>⋮ | comment 205b<br>comment 245a<br>⋮ | comment 205c<br>comment 245b<br>⋮ | comment 205a<br>comment 245a<br>⋮ | comment 205a<br>comment 205b<br>comment 205c<br>⋮ |
| 230b | 230c | 230e | 230f | 230g |

Example Category Information

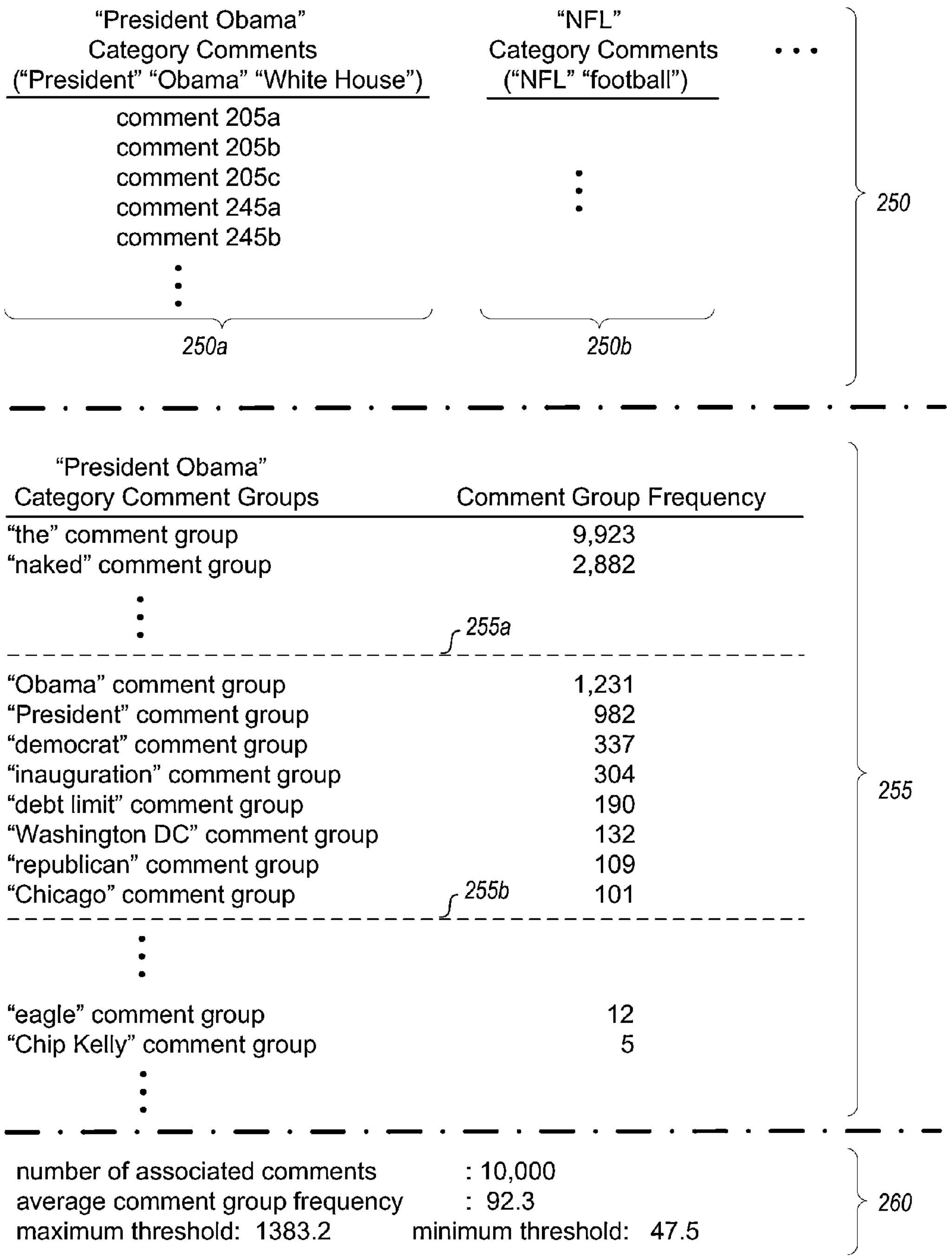

Fig. 2C

"President Obama"
Category Comments
("President" "Obama" "White House")

comment 205a
comment 205b
comment 205c
comment 245a
comment 245b
⋮

250a

"NFL"
Category Comments
("NFL" "football")

⋮

250b

⎫
⎬ 250
⎭

---

| "President Obama" Category Comment Groups | Comment Group Frequency |
|---|---|
| "the" comment group | 9,923 |
| "naked" comment group | 2,882 |
| ⋮ | ⋮ |
| *255a* | |
| "Obama" comment group | 1,231 |
| "President" comment group | 982 |
| "democrat" comment group | 337 |
| "inauguration" comment group | 304 |
| "debt limit" comment group | 190 |
| "Washington DC" comment group | 132 |
| "republican" comment group | 109 |
| "Chicago" comment group  *255b* | 101 |
| ⋮ | |
| "eagle" comment group | 12 |
| "Chip Kelly" comment group | 5 |
| ⋮ | |

⎫
⎬ 255
⎭ number of associated comments : 10,000
average comment group frequency : 92.3
maximum threshold: 1383.2    minimum threshold: 47.5

⎫
⎬ 260
⎭

Example Prediction Template Generation

Example Quantification Information For Example Comment Group

1000

| | | 1003a total # of content items | 1003b # at loc 1 | 1003c # at loc 2 | | 1003d # from source 1 | 1003e # from source 2 | | 1003f # from author 1 | 1003g # from author 2 | | 1003h sentiment (1 to 3) | 1003i most influential author | |
|---|---|---|---|---|---|---|---|---|---|---|---|---|---|---|
| 1001a | time period N | 4783 | 235 | 42 | ... | 2345 | 423 | ... | 23 | 4 | ... | 3 | user 1 | ... |
| 1001b | time period N+1 | 5792 | 239 | 83 | | 2388 | 827 | | 23 | 8 | | 3 | user 1 | |
| 1001c | time period N+2 | 6795 | 227 | 233 | | 2268 | 1673 | | 22 | 16 | | 3 | user 1 | |
| 1001d | time period N+3 | 7799 | 207 | 255 | | 2077 | 2123 | | 19 | 21 | | 2 | user 1 | |
| 1001e | time period N+4 | 8033 | 149 | 233 | | 1523 | 1987 | | 15 | 20 | | 2 | user 2 | |
| 1001f | time period N+5 | 7802 | 94 | 211 | | 927 | 1973 | | 9 | 19 | | 1 | user 3 | |
| | | ⋮ | | | | | | | | | | | | |

*Fig. 2F*

Example Encoded Summary Information For Example Comment Group

1100

| | | 1103a encoding scheme 1 | 1103b encoding scheme 2 | 1103c encoding scheme 3 | |
|---|---|---|---|---|---|
| 1101a | time period N | 25313 | 2111 | 23jaK | ... |
| 1101b | time period N+1 | 25312 | 2111 | 22laG | |
| 1101c | time period N+2 | 35312 | 3112 | 32y8j | |
| 1101d | time period N+3 | 34221 | 3222 | 31-ad | |
| 1101e | time period N+4 | 33223 | 3222 | 300ds | |
| 1101f | time period N+5 | 33132 | 3324 | 30ljs | |
| | ⋮ | ⋮ | ⋮ | ⋮ | |

Encoding Scheme 1 a) total quantity (0-3) – (0: <500, 1: 500-2000, 2: 2001-6000, ...)
b) percent quantity change from prior TP (0-9) – (9: > 900%, ...)
c) sentiment (1-3)
d) 1st highest quantity source
e) 2nd highest quantity source Encoding Scheme 2 a) total quantity (0-9) - 0: < 100, 1: 100-400, ...
b) highest quantity source
c) highest quantity user
d) highest quantity location

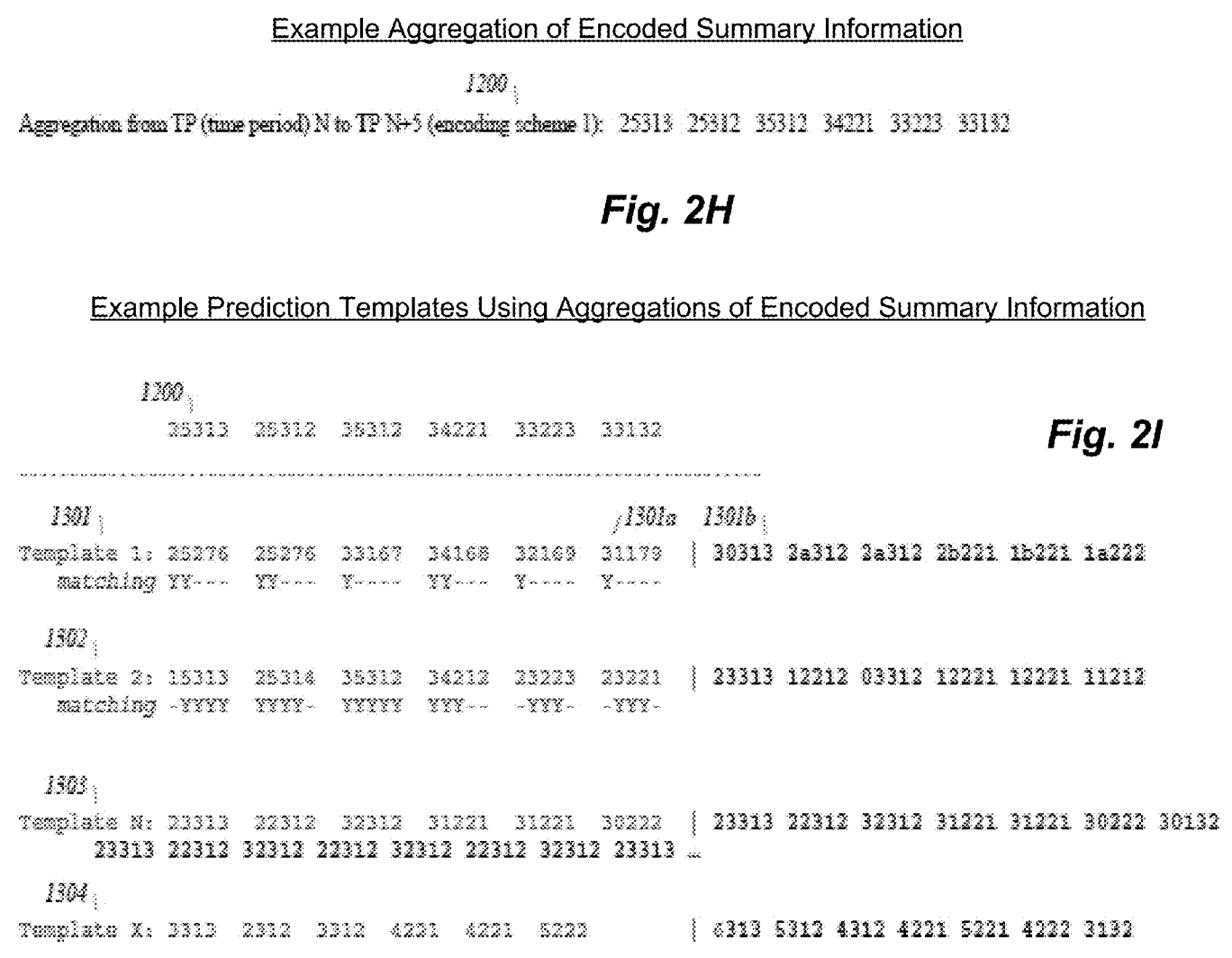

Example Aggregation of Encoded Summary Information

1200

Aggregation from TP (time period) N to TP N+5 (encoding scheme 1): 25313 25312 35312 34221 33223 33132

*Fig. 2H*

Example Prediction Templates Using Aggregations of Encoded Summary Information

```
1200
    25313   25312   35312   34221   33223   33132
.................................................................
1301                                             1301a  1301b
Template 1: 25276   25276   33167   34168   32169   31179  | 30313 2a312 2a312 2b221 1b221 1a222
   matching YY---   YY---   Y----   YY---   Y----   Y----

1302
Template 2: 15313   25314   35312   34212   23223   23221  | 23313 12212 03312 12221 12221 11212
   matching -YYYY   YYYY-   YYYYY   YYY--   -YYY-   -YYY-

1303
Template N: 23313   22312   32312   31221   31221   30222  | 23313 22312 32312 31221 31221 30222 30132
      23313 22312 32312 22312 32312 22312 32312 23313 ...
1304
Template X: 3313  2312  3312  4221  4221  5222             | 6313 5312 4312 4221 5221 4222 3132
```

*Fig. 2I*

Example Predicted Information For Example Comment Group

1400

| | | 1403a total quantity (0-3) | 1403b percent quantity change (0-9) | 1403c sentiment (1-3) | 1403d 1st highest quantity source | 1403e 2nd highest quantity source |
|---|---|---|---|---|---|---|
| 1401a | time period N | 2 | 5 | 3 | 1 | 3 |
| 1401b | time period N+1 | 2 | 5 | 3 | 1 | 2 |
| 1401c | time period N+2 | 3 | 5 | 3 | 1 | 2 |
| 1401d | time period N+3 | 3 | 4 | 2 | 2 | 1 |
| 1401e | time period N+4 | 3 | 3 | 2 | 2 | 3 |
| 1401f | time period N+5 | 3 | 3 | 1 | 3 | 2 |
| 1401g | time period N+6 | 2 | 3 | 3 | 1 | 3 |
| 1401h | time period N+7 | 1 | 2 | 2 | 1 | 2 |
| 1401i | time period N+8 | 0 | 3 | 3 | 1 | 2 |
| 1401j | time period N+9 | 1 | 2 | 2 | 2 | 1 |
| 1401k | time period N+10 | 1 | 2 | 2 | 2 | 1 |
| 1401l | time period N+11 | 1 | 1 | 2 | 1 | 2 |
| | ⋮ | ⋮ | ⋮ | ⋮ | ⋮ | ⋮ |

| | | |
|---|---|---|
| 1501g | time period N+6 | 3 |
| 1501h | time period N+7 | 2 |
| 1501i | time period N+8 | 2 |
| 1501j | time period N+9 | 2 |
| 1501k | time period N+10 | 1 |
| 1501l | time period N+11 | 1 |
| | ⋮ | ⋮ |

*Fig. 2J*

Example Encoding Value Representation Information

| 1505 | 1510 | 1505 | 1510 | 1505 | 1510 | 1505 | 1510 |
|---|---|---|---|---|---|---|---|
| 0 | 0 | G | 16 | W | 32 | m | 48 |
| 1 | 1 | H | 17 | X | 33 | n | 49 |
| 2 | 2 | I | 18 | Y | 34 | o | 50 |
| 3 | 3 | J | 19 | Z | 35 | p | 51 |
| 4 | 4 | K | 20 | a | 36 | q | 52 |
| 5 | 5 | L | 21 | b | 37 | r | 53 |
| 6 | 6 | M | 22 | c | 38 | s | 54 |
| 7 | 7 | N | 23 | d | 39 | t | 55 |
| 8 | 8 | O | 24 | e | 40 | u | 56 |
| 9 | 9 | P | 25 | f | 41 | v | 57 |
| A | 10 | Q | 26 | g | 42 | w | 58 |
| B | 11 | R | 27 | h | 43 | x | 59 |
| C | 12 | S | 28 | i | 44 | y | 60 |
| D | 13 | T | 29 | j | 45 | z | 61 |
| E | 14 | U | 30 | k | 46 | - | 63 |
| F | 15 | V | 31 | l | 47 | _ | 63 |

*Fig. 2K*

Example Real-Time and Predicted Comment Group Discussion Information
1900
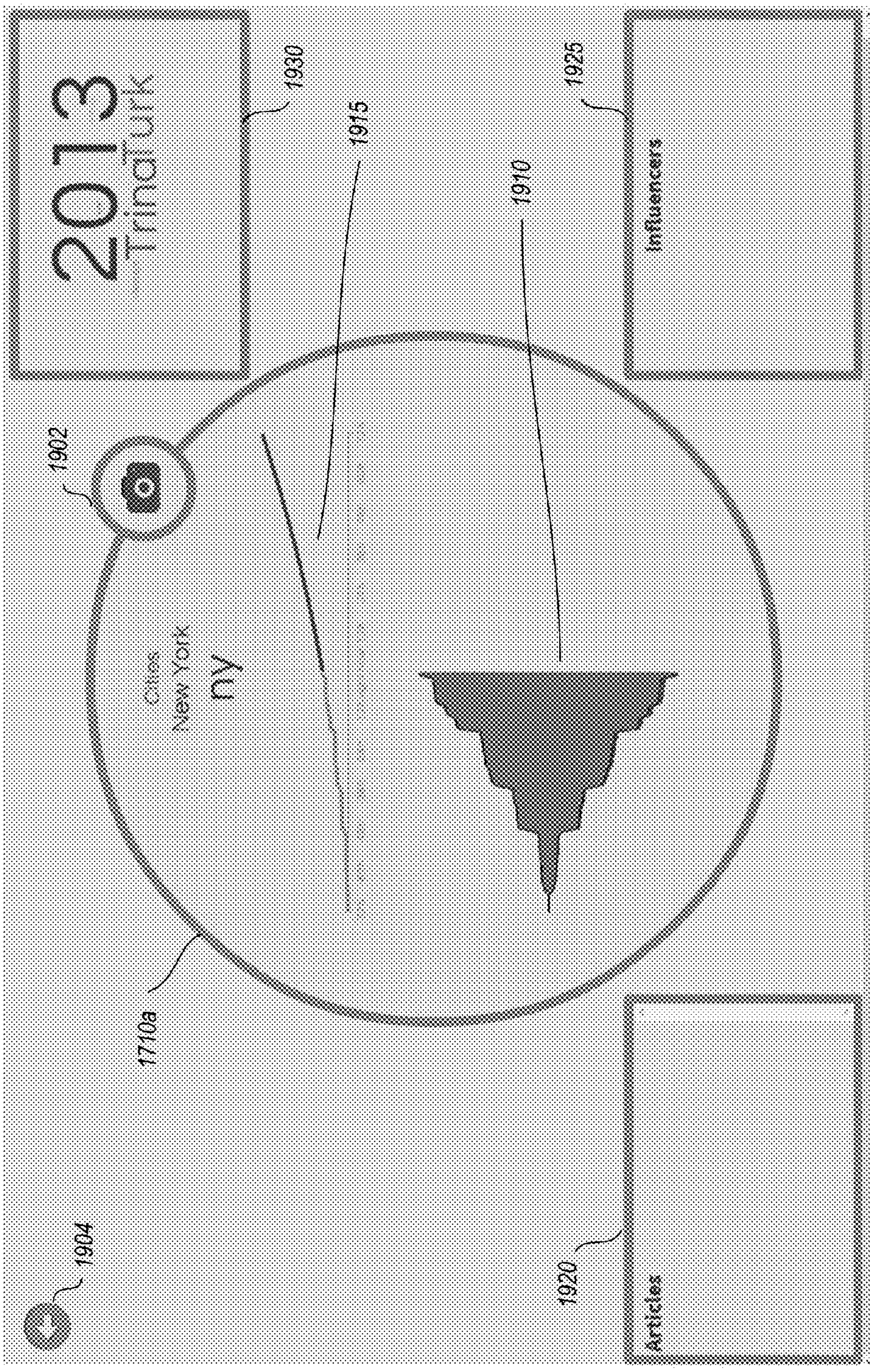
*Fig. 2-O*

Example Real-Time and Predicted Comment Group Discussion Information

Example Real-Time and Predicted Comment Group Discussion Information

Example Real-Time and Predicted Comment Group Discussion Information

Example Real-Time and Predicted Comment Group Discussion Information

Example Real-Time Category Discussion Information

3250

Example User Journey Information

Example Journey Prediction Information and Promotional Information

Example Real-Time Category Discussion Information and Promotional Information

Example Category and Comment Group Inter-Relationship Information

Example Discussion Information Type Inter-Relationships

Example Discussion Information Type Inter-Relationships

DETERMINING INFORMATION INTER-RELATIONSHIPS FROM DISTRIBUTED GROUP DISCUSSIONS

CROSS-REFERENCE TO RELATED APPLICATIONS

This application claims the benefit of U.S. Provisional Patent Application No. 61/906,827, filed Nov. 20, 2013 and entitled "Automated Discovery Of Information Inter-Relationships From Distributed Group Discussions;" and claims the benefit of U.S. Provisional Patent Application No. 61/948,388, filed Mar. 5, 2014 and entitled "User Journeys Through Inter-Related Categories From Distributed Group Discussions;" each of which is hereby incorporated by reference in its entirety.

TECHNICAL FIELD

The following disclosure relates generally to techniques for performing automated operations to analyze user-supplied information related to distributed group discussions and/or to analyze user interactions with information about the distributed group discussions, as well as to use information from the analyzing in various manners.

BACKGROUND

Discussions of current topics of interest by various distributed users are increasingly occurring via social networking sites and other computer-accessible sites that are available to the users, whether by users replying to and commenting on information supplied by other users, or by various users independently submitting information that in aggregate reflects topics of interest. In some situations, a particular distributed group discussion may occur between a particular selected subset of users (e.g., users that are members of a common group, club, service, etc.), while in other situations a distributed group discussion may include any user with access to one or more sites via which that discussion occurs.

Information about discussions that have occurred and/or are occurring may have value to various types of entities, and may be useful to perform various types of additional activities. However, various problems exist with obtaining and disseminating and using such information in a timely manner, including due to the distributed nature of the discussions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-2K illustrate examples of analyzing distributed group discussions and predicting further aspects of the discussions.

FIGS. 2L-2V and 2Y-2AC illustrate examples of displaying information about analyzed aspects of distributed group discussions and about further predicted aspects of the discussions, as well as using promotional information in various manners.

FIGS. 2W-2X and 2AI-2AK illustrate examples of types of inter-relationships that may be automatically discovered between various types of distributed discussion-related information, and of using such discovered inter-relationship information in various manners.

FIGS. 2AD-2AH illustrate examples of displaying and otherwise using journey-related information and promotional information in various manners.

DETAILED DESCRIPTION

Figure 1:
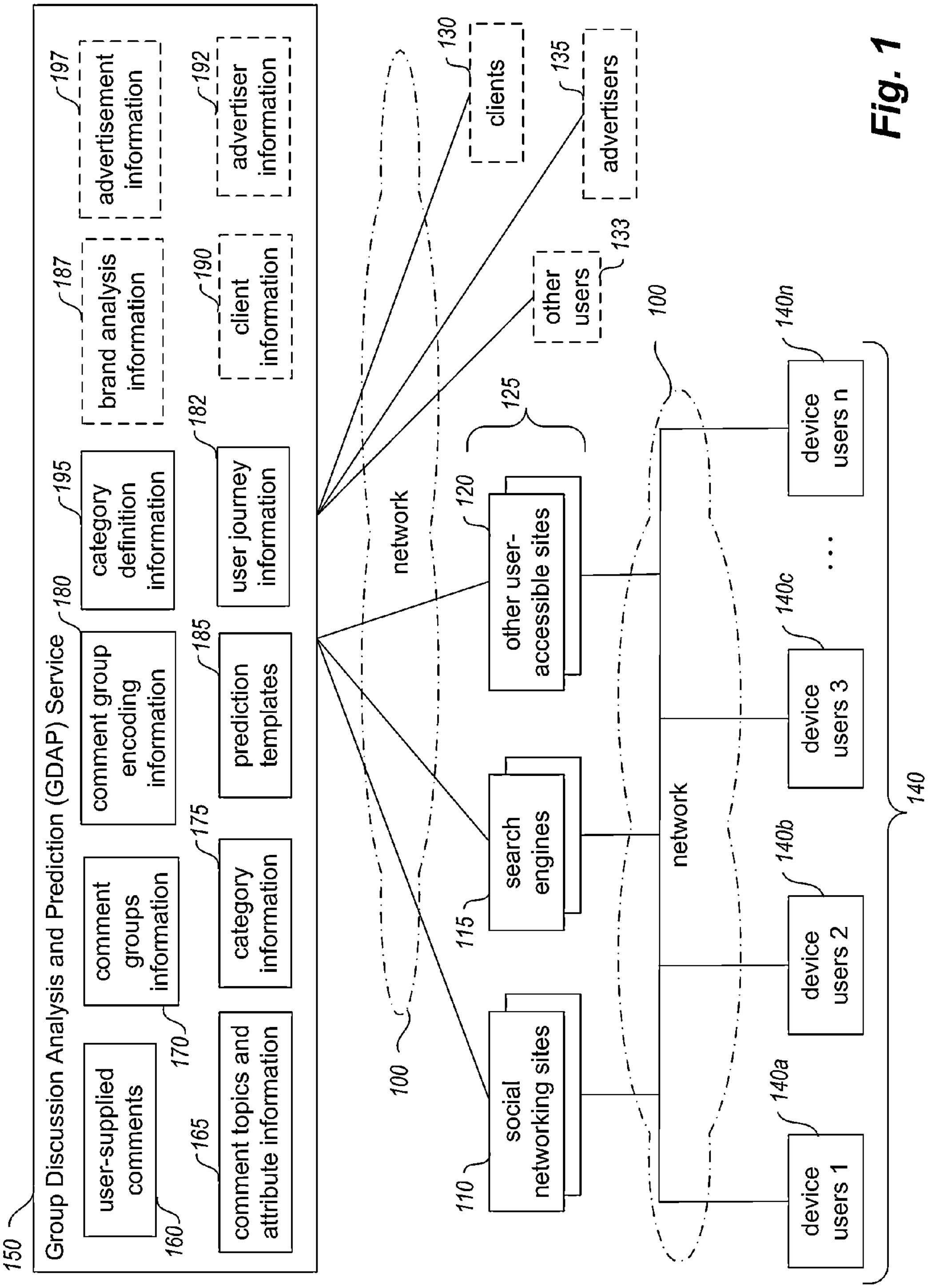
FIG. 1 is a network diagram illustrating an example embodiment of a service that analyzes distributed group discussions and predicts further aspects of the discussions.

Techniques are described for analyzing user-supplied information in various ways, including in some embodiments to predict future aspects of additional related information that is expected to be supplied by users, such as during one or more future time periods. In at least some embodiments, the user-supplied information that is analyzed corresponds to distributed group discussions that involve numerous users and occur via user posts or other user comments or submissions made to one or more computer-accessible sites, such as one or more social networking services. The analysis of user-supplied information may, in at least some embodiments, include determining particular topics that are being discussed for a specified category during one or more periods of time, quantifying an amount of user interest in particular topics and the category during the period of time from the discussion, and predicting future amounts of user interest in the particular topics and the category as part of an expected future discussion during one or more future period of times. As one illustrative example, millions of user Twitter tweets, user posts to social networking sites, and other user-supplied comments or other content items may be analyzed over a prior window of time (e.g., the last 72 hours) in a real-time or near-real-time manner, including to determine trends and other changes in information corresponding to particular topics and categories of interest over the prior window of time, and/or to automatically predict future trends and other changes in information corresponding to particular topics and categories of interest for a future span of time (e.g., the next 24 hours)—in addition, various types of further actions then being taken based on the analyzed current information and/or on the predicted information. Additional details related to analyzing and using user-supplied information in particular manners are described below, and some or all of the described techniques are performed in at least some embodiments by automated operations of a Group Discussion Analysis and Prediction ("GDAP") system, such as while providing a GDAP service for use by various types of users and other external entities.

In at least some embodiments, the described techniques include performing an automated discovery process that involves analyzing user-supplied information from one or more time periods to determine particular categories of interest for those time periods and to identify inter-category relationships for those time periods based on the user-supplied information associated with those categories. As distributed group discussions in the user-supplied information change over time, the determined categories of interest and/or determined inter-category relationships may similarly change. Similarly, analysis of user-supplied information associated with particular categories and/or with particular topics in particular categories for one or more time periods may be used in at least some embodiments to identify further inter-relationships between particular topics (e.g., topics in different categories) and/or between particular topics and other categories to which those topics do not belong, with such further inter-relationships also subject to change over time as the distributed group discussions in the user-supplied information change. Additional details related to performing an automated discovery process in particular manners are described below, and some or all of the described techniques are performed in at least some embodiments by automated operations of the GDAP system, such as while providing a GDAP service for use by various types of users and other external entities.

The described techniques further include displaying or otherwise presenting information to various users about the distributed group discussions and related analyzed information in at least some embodiments, such as via a GUI ("graphical user interface") of the GDAP system—the users to whom the information is presented may in some embodiments include some or all of the users who have supplied the information related to the distributed group discussions, while in other embodiments, some or all of the users to whom the information is presented may be distinct from the users who have supplied the information related to the distributed group discussions. In addition, various types of interactions by users with the presented information may be tracked and analyzed in various manners in various embodiments. As a non-exclusive example, a user may be able to display various information about a particular group of comments corresponding to a topic of interest in a particular category (referred to generally herein as a "topic-specific comment group" or "comment group") or about a particular category of interest, including to change the display to another selected category or topic-specific comment group, such as based on inter-relationships between the initial and subsequent categories and/or comment groups. As another non-exclusive example, a user may be able to specify multiple terms or other attributes of interest, and view a graph or other display indicating the relevance of various topics to such specified terms or other attributes for one or more time periods of interest, such as by viewing information about comment groups of particular categories that correspond to such topics. As another non-exclusive example, a user may be able to view displayed information about inter-relationships between various information categories and/or topic-specific comment groups, such as to enable the user to interact with the displayed information to explore a succession of such inter-related information categories and/or topic-specific comment groups. Additional details related to such display or other presenting of information in particular manners and such tracking and analysis of user interactions with presented information are described below, with some or all of the described techniques being performed in at least some embodiments by automated operations of the GDAP system, such as while providing a GDAP service for use by various types of users and other external entities.

Furthermore, in at least some embodiments, the described techniques include tracking and using information about user interactions with information that is displayed or otherwise presented to the users via a GUI of the GDAP system, such as by tracking user journeys through displays of information about multiple inter-related information categories and/or topic-specific comment groups. Such a user journey may in some embodiments include a sequence of a specified number of distinct categories and/or comment groups that are selected by and displayed to a user, while in other embodiments user journeys may have other forms and may be determined in various manners. After such user journeys are identified, they may be analyzed and used in various manners in various embodiments, including to enable other users to select and playback particular user journeys taken by other users. Additional details related to performing journey-related activities in particular manners are described below, and some or all of the described techniques are performed in at least some embodiments by automated operations of the GDAP system, such as while providing a GDAP service for use by various types of users and other external entities.

Moreover, in at least some embodiments, the described techniques include interacting with advertisers and/or other entities external to the GDAP system to provide various benefits, such as to enable the external entities to provide promotional content to users of the GDAP system in particular indicated situations, to provide the external entities with brand-related information based on analysis of determined inter-relationships between categories and/or topic-specific comment groups and/or to provide the external entities with brand-related information based on user interactions with related information via the GUI of the GDAP system. For example, in at least some embodiments, external entities may select to provide particular promotional information in particular situations (e.g., when information is being displayed via the GUI involving particular terms, topics and topic-specific comment groups, categories, inter-relationships between categories and/or topic-specific comment groups, relevance relationships of topics to terms or other attributes, user journeys, user groups, etc.), such as to display such promotional information via the GUI to users who are interacting with corresponding indicated information. Additional details related to performing promotional-related activities in particular manners are described below, and some or all of the described techniques are performed in at least some embodiments by automated operations of the GDAP system, such as while providing a GDAP service for use by various types of users and other external entities.

The user comments and other user-supplied information that are obtained and analyzed may have various forms in various embodiments, such as to reflect information that is supplied by human users and made available to other users. For example, the user-supplied information may, in at least some embodiments, include posts and other user submissions to sources of such user-supplied information (generally referred to as "comment data sources" herein) that include one or more social networking services or sites, such as tweets to the Twitter service, and/or posts to Facebook, MySpace, Google+, LinkedIn, etc., in which other users may receive or otherwise access such user-supplied information. In addition, in at least some embodiments and situations, the user-supplied information may include comments or other content items submitted to various other types of computer-accessible sites that may act as comment data sources, such as Instagram, Pinterest, Tumblr, Flickr, Vine, Picasa, YouTube, 43 Things, Foursquare, Yelp, etc., in which other users may select and access such user-supplied information. In other embodiments and situations, any type of user-supplied information that is made available to one or more other users may be analyzed and used, including in text form, audio form and/or visual form, such as user emails, SMS ("Short Message Service") messages, Internet chat messages, telephone voice messages and other audio recordings, video recordings, images, search engine searches, news articles and other news releases, commerce-related submissions (e.g., user wish lists or gift registries, user shopping carts, etc.), Wiki-based submissions (e.g., to Wikipedia), etc., and is generally referred to herein as a "user-supplied comment" or "user comment."

By gathering such user-supplied information during one or more time periods of interest, information may be assessed about distributed group discussions that occur during those time periods, including for discussions in which users actively review and respond to comments of others, and more generally for discussions that occur via various user comments that each reflects independent thoughts or opinions of a user that is not in direct response to any other particular user comment of another user (e.g., is not a reply to or comment about another such user comment of another user). Such assessed information may correspond to one or more selected factors about one or more distributed group discussions, including one or more of the following factors for user comments or other content items being supplied with respect to one or more topics and/or categories of interest: a quantity of user comments or other content items for the topic(s) and/or category(ies) that are supplied during a time period (or another measure of distributed user interest in those topics and/or categories rather than content item quantity); subsets of such an overall quantity (or other measure of distributed user interest) supplied during a time period for the topic(s) and/or category(ies) that are associated with particular geographic locations or geographic areas, and/or with particular author users, and/or with particular content item data sources; changes in assessed values for one or more such factors between two or more time periods; etc. In addition, such assessed information corresponding to one or more selected factors for the topic(s) and/or category(ies) may be used to predict future information about user comments or other content items that will be supplied for the topic(s) and/or category(ies), such as predicted future values for a particular one or more of the selected factors for each of one or more future time periods, or instead for other types of predicted future information. Additional details related to assessing values for factors of interest and using such information to make corresponding predictions are included below.

In some embodiments, a variety of types of information may be displayed or otherwise provided to users or other entities about analyzed information and/or predicted information for one or more categories and/or topics or other attributes of interest, such as to reflect constituent member content items that are associated with those categories, topics and/or attributes for one or more time periods—in at least some such embodiments, the information display or other providing may occur in a real-time or near-real-time manner with respect to corresponding events or activities to which the information corresponds (such as within seconds, minutes or hours of such events or activities). A display of information may, for example, indicate multiple categories, and visually indicate information about relative or absolute values for respective categories based on each of multiple selected factors, such as based on use of one or more of the following information for a displayed representation of a category: size, horizontal location, vertical location, color, an associated halo (or shadow), horizontal movement, vertical movement, displayed tags or other visual indicators, etc. —as one example, such information may be provided for a current time period and/or next future time period and for selected factors that include total quantity of constituent member content items, rate of change in total quantity, and aggregate sentiment. A display of information may, for example, indicate multiple comment groups that each represents an associated topic or other attribute of constituent member content items in the comment group (whether instead of or in addition to one or more category indicators), and visually indicate information about relative or absolute values for respective comment groups based on each of multiple selected factors, such as based on use of one or more of the following information for a displayed representation of a category: size, horizontal location, vertical location, color, an associated halo, horizontal movement, vertical movement, displayed tags or other visual indicators, etc. —as one example, such information may be provided for a current time period and/or next future time period and for selected factors that include total quantity of constituent member content items, rate of change in total quantity, and aggregate sentiment. A display of information may, for example, indicate multiple inter-related categories and/or topics, and visually indicate information about relative or absolute values for respective categories and/or topics based on each of multiple selected factors, such as based on use of one or more of the following information for a displayed representation of a category or topic: size, horizontal location, vertical location, color, an associated halo (or shadow), horizontal movement, vertical movement, displayed tags or other visual indicators, etc. As one example, such information may be provided for a current time period and/or next future time period (or more generally for one or more user-specified or system-selected time periods) and for selected factors that include relevance of particular topics and/or categories to one or more targets of interest, such as to one or more terms or other attributes (e.g., one or more particular geographical locations, one or more particular author users, etc.) or to particular content items (e.g., images, videos, links to external content, etc.). As another example, such information may be provided for a current time period and/or next future time period (or more generally for one or more user-specified or system-selected time periods) that relates to a succession of multiple inter-related categories and/or topics that one or more users have previously followed, etc. Additional details related to such display of information about analyzed aspects of distributed group discussions and/or about further predicted aspects of the discussions is included herein, including with respect to example GUI screens or pages of FIGS. 2L-2V and 2Y-2AH and 2AK.

FIG. 1 is a network diagram illustrating an example embodiment of a service that analyzes distributed group discussions, predicts further aspects of the discussions, and uses the analyzed and predicted information in various manners. In particular, an example embodiment of a GDAP (Group Discussion Analysis and Prediction) Service 150 is illustrated, such as may be provided by a GDAP system (not shown) executing on one or more configured computing systems (not shown), with the GDAP system in some embodiments including software instructions that when executed configure one or more processors of the one or more configured computing systems to perform automated operations of the GDAP service. One or more client entities 130 may optionally use devices (not shown) to interact with the GDAP service 150 over one or more networks 100, such as to provide information about categories or topics or terms or non-term attributes or other information of interest, and/or to receive corresponding predicted information and/or other analyzed information from the GDAP service 150, in some cases in exchange for one or more fees from the clients. The GDAP service 150 may store any information received from such clients in various manners, such as to store any received category definition information 195, and any other optional received client information 190.

FIG. 1 further illustrates various users 140 who each have one or more associated client devices (not shown), which the users use to interact with one or more comment data sources 125 over one or more networks 100, such as by supplying user comments or other content items (not shown) to those comment data sources. In this example, the comment data sources 125 include one or more social networking sites 110, one or more search engines 115, and one or more other user-accessible sites 120. Such comment data sources may have various forms in various embodiments, and the resulting user comments or other user-supplied content items may similarly have various forms in various embodiments, as discussed in greater detail elsewhere. After users 140 have provided user comments or other user-supplied content items to comment data sources 125, the GDAP service 150 may interact with the comment data sources 125 over one or more networks 100 to obtain corresponding content items, and to store such information 160 for subsequent analysis.

As part of the operation of the GDAP service 150, it may further analyze the user-supplied content items to identify particular topics and terms and other non-term attributes of the content items, and to store corresponding information 165. The content item information 160 and topics information 165 may further be used to create corresponding comment groups, and to store corresponding information 170. The GDAP service 150 may also use the comment group information 170 to determine particular topics that are associated with a particular category during one or more periods of time, such as based on the created comment groups associated with those topics, and then store corresponding category information 175. The GDAP service 150 may further quantify the user-supplied content items included in a particular comment group and/or associated with a particular category, and use such information for one or more time periods to predict expected additional content items that will be received over one or more later time periods, with corresponding information being stored with the comment group information 170 and/or the category information 175 in this example embodiment—in some embodiments, the quantified information for one or more of the comment groups and/or categories about constituent member content items for a time period may include encoded summary information for that time period, such as with respect to one or more encoding schemes specified in the comment group encoding information 180. As part of performing the prediction, the GDAP service 150 may use one or more defined prediction templates from information 185, and may further generate and store such prediction templates for later use based on actual content items that are received—in some embodiments, the prediction template information may include an aggregation of encoded summary information for constituent member content items that are part of a comment group and/or category for each of multiple time periods (e.g., consecutive time periods during a time window of interest), such as to be matched to aggregated encoded summary information from the comment group information 170 and/or the category information 175. In addition, the GDAP service 150 may further analyze the user-supplied content items, identified comment groups having associated topics, and/or identified categories to determine particular terms and/or non-term attributes (e.g., particular geographical locations, particular author users, etc.) and/or content items (e.g., images, videos, links to external content, etc.) that are highly relevant (e.g., above a defined relevance threshold) for particular identified comment groups and/or identified categories, and may store corresponding information 170 and/or 175. Such determined relevance information and/or other types of information may further be used in some embodiments to determine inter-relationships between particular categories and/or topic-specific comment groups, as discussed further below, and to store corresponding information 170 and/or 175. Furthermore, the GDAP service 150 may further take a variety of types of automated actions based on analyzed and/or predicted information, such as in accordance with client instructions or other client-specified criteria. Additional details related to operation of the GDAP service in particular embodiments are included herein.

As noted above, the GDAP service may in some embodiments provide information to clients 130 about predicted information and/or other analyzed information regarding distributed group discussions and identified information of interest (e.g., categories, comment groups, terms non-term attributes, inter-relationships between categories and/or topic-specific comment groups, etc.), such as in exchange for one or more fees from the clients to the GDAP service, including to display or otherwise present such information via a GUI (not shown) of the GDAP service that is displayed on client devices (not shown) of the clients 130. In a similar manner, various other types of users may interact with the GDAP service and similarly receive predicted information and/or other analyzed information regarding distributed group discussions and identified information of interest, optionally without payment to the GDAP service, including via a GUI (not shown) of the GDAP service that is displayed on client devices (not shown) of the users—such users who receive and interact with information from the GDAP service may include some or all of the users 140 who provide user-supplied information and/or may include optional other users 133. As the clients and/or other types of users receive and interact with information from the GDAP service via the GUI, such interactions may be tracked and analyzed by the GDAP service to determine additional types of information of interest (e.g., related to user journeys through multiple inter-related categories and/or topic-specific comment groups), as discussed in greater detail elsewhere herein.

In addition, in at least some embodiments, other advertisers or other external entities 135 that are not part of the GDAP service may also optionally interact with the GDAP service to obtain similar types of information to that of the clients and other types of users, and/or to receive additional types of information related to particular brands or other categories of interest, such as for categories and/or topic-specific comment groups corresponding to commerce-related activities of interest. Such additional types of information may include, for example, brand analysis information 187 about categories and/or comment groups that are related to an indicated brand or other indicated category or comment group in accordance with any indicated criteria—such brand analysis information may be determined in various manners by the GDAP service (e.g., based on the automated discovery process indicating current structural inter-relationships between indicated categories and/or comment groups within a specified number of degrees of separation, such as to be directly connected (1 degree of separation) or to be within some other N degrees of separation; based on user activity data from user interactions with the GUI that indicates users interacting with categories and/or comment groups in related manners, such as to include a succession of multiple such interaction targets within user journeys; etc.). Furthermore, in at least some embodiments, the advertisers or other external entities may be allowed to register with the GDAP service (with optional advertiser information 192 including corresponding information about the advertisers), and to select or otherwise specify particular situations in which particular types of promotional information are requested to be provided to users who are receiving particular types of information via the GUI (with optional advertisement information 197 including corresponding information about advertisements and other promotional information and about situations in which to display such promotional information). Additional details corresponding to advertising-related activities are discussed in greater detail elsewhere herein.

The one or more networks 100 may, for example, be a publicly accessible network of linked networks, possibly operated by various distinct parties, such as the Internet. In other embodiments, at least one of the network(s) 100 may be a private network, such as, for example, a corporate or university network that is wholly or partially inaccessible to non-privileged users. In still other embodiments, at least one of the network(s) 100 may include one or more private networks with access to and/or from the Internet. In the illustrated embodiment, the GDAP service 150 may include one or more modules that perform particular operations, as discussed in greater detail with respect to FIG. 3, and the GDAP service 150 and any such modules may each include software instructions that execute on one or more computing systems (not shown) to configure those computing systems to perform some or all of the described techniques.

Thus, user-supplied information of interest may be obtained in various manners in various embodiments, including by the GDAP service or system accessing a particular comment data source to retrieve information from that comment data source (e.g., periodically, when the data is needed for analysis, etc.). For example, a GDAP service may obtain information from a particular comment data source in various manners, such as via an API ("application programming interface") provided by that data source, by retrieving information stored in a database or other storage mechanism, by scraping one or more Web pages of a Web site provided by the comment data source, etc. The GDAP service may further obtain some or all of the available data from a particular comment data source, such as for one or more particular users and/or time periods, for all users and/or time periods, for users and/or information that meet specified criteria (e.g., publicly available information that does not have privacy restrictions), etc. In other embodiments and situations, at least some comment data sources may perform actions to supply at least some user-supplied information to the GDAP service, such as in response to one or more prior requests of the GDAP service (e.g., via an RSS, or Really Simple Syndication, feed, or other subscription request of the GDAP service). In addition, in some embodiments and situations, at least some user-supplied comments may be received directly from a user that supplied them to one or more comment data sources, such as if a mobile application executing on a client device of the user also sends the comments to the GDAP service. Furthermore, in some embodiments and situations, information that was initially supplied to one or more comment data sources may be available to the GDAP service from another source, such as from an aggregator service that combines information from multiple comment data sources. In other embodiments, other types of user-supplied information may be obtained and/or other types of comment data sources may be used, and additional details are included below about obtaining user-supplied information of interest to analyze.

Once user-supplied information has been obtained for a particular time period, the user-supplied information may be analyzed in various manners. In some embodiments, the analysis includes analyzing user comments or other user-supplied content items to create corresponding comment groups for the time period, with each such comment group corresponding to a particular topic (and optionally to further reflect that topic within a particular category, as discussed further below). For example, each user-supplied content item may be analyzed to identify any topics of interest in the content, such as terms or phrases, hashtags, links to other data, or other n-grams, and optionally for topics that are determined to be of sufficient importance or relevance to the content item (e.g., by using a TF-IDF, or term frequency-inverse document frequency, analysis, or other content analysis technique). In addition, each user-supplied content item may be analyzed to identify any other types of attributes of interest that are associated with the content item (e.g., in the contents of the content item, in metadata associated with the content item, etc.), such as a location of where the content item was submitted from, an author user who generated or otherwise supplied the content item, a comment data source from which the content item was obtained, any n-grams from metadata associated with the content item, etc. After topics or other attributes of interest are identified, a comment group is created for each such topic or other attribute (or for a selected subset, such as to reflect a percentage or fixed quantity of the most relevant topics or other attributes) for a time period, with the created comment group including any analyzed content items from the time period that include the associated attribute for the comment group. In addition, in at least some embodiments, if additional user-supplied content items are available that were not used in the initial analysis (e.g., from one or more additional or supplemental comment data sources), additional such user-supplied content items that were supplied during the time period are retrieved, and additional content items that include the topic or other associated attribute for each created comment group are added to that comment group. Thus, each created comment group may be considered to represent its associated topic or other associated attribute for that time period. In other embodiments, information about content items may be analyzed and grouped in other manners, and additional details are included below about analyzing user comments or other user-supplied content items to create corresponding comment groups for a time period.

The analysis of user-supplied information for a time period may also include determining current topics that correspond to a particular content category for the time period. For example, a definition for a category of interest may be supplied or otherwise determined, such as to include one or more terms or other attributes corresponding to the category. User-supplied content items for the time period that include one or more of the definition terms or other definition attributes for the category are then identified (e.g., content items having one of the definition attributes, or all of the definition attributes, or a minimum defined quantity or percentage of the definition attributes), and the created comment groups to which those identified content items belong are then determined, with those determined comment groups being candidates to be associated with the content category for the time period. At least some of the determined comment groups are then excluded in some embodiments and situations, such as to remove comment groups that are under-inclusive or over-inclusive with respect to the subject matter relevant to the content category. The topics or other attributes associated with the remaining determined comment groups may then be identified as being the current topics for the content category during the time period. In at least some embodiments, the determination of candidate comment groups to exclude includes determining, for each candidate comment group, the frequency that its included user-supplied content items are in the identified content items for the content category. An average frequency and a standard deviation may then be determined across the candidate comment groups and used to establish lower and/or upper boundaries for the content category, such as to define a minimum exclusion threshold that is the average frequency minus half the standard deviation, and/or to define a maximum exclusion threshold that is the average frequency plus half the standard deviation. In other embodiments, comment groups to include for a content category may be determined in manners other than based on frequency of included user-supplied content items, and additional details are included below about determining current topics that correspond to a particular content category for a time period.

In addition to identifying topic-specific comment groups and categories, the analysis of user-supplied information for a time period may further include identifying relevant terms or other attributes (e.g., particular geographical locations, particular author users, etc.) for particular comment groups and/or categories, such as based at least in part on the comments and other user-supplied content items included in those comment groups and/or categories. For example, as noted above, the analysis of a particular comment or other user-supplied content item may include assessing the relevance of various terms and/or non-term attributes of that content item to the subject matter of the content item as a whole, with a TF-IDF analysis being one example of a technique of assessing such term or other attribute relevance. After assessing such attribute relevance for each user-supplied content item within a comment group, the relevance of particular terms or other attributes to the comment group may then be determined, such as by aggregating the relevance of the terms or other attributes for the user-supplied content items in the comment group, with a selection of relevant aggregated terms or other attributes (e.g., a top %, such as the top 10%; a top quantity, such as the top 10 terms or other attributes; a top statistical sampling, such as above a standard deviation above the mean; all terms or other attributes; etc.) being identified as being highly relevant for the comment group—as one example, the attribute relevance for the attributes of those content items may be normalized, and then the normalized attribute relevance scores for each occurrence of a term or other attribute in the content items may be added together (optionally with the resulting sum divided by the number of occurrences of the term or other attribute). In a similar manner, after assessing such attribute relevance for each user-supplied content item within a category, the relevance of particular terms or other attributes to the category may then be determined, such as by aggregating the relevance of the terms or other attributes for the user-supplied content items in the category, with a selection of relevant aggregated terms or other attributes (e.g., determined in a manner similar to that discussed for a particular comment group) being identified as being highly relevant for the category. One example for such aggregating of the relevance of the terms or other attributes for the user-supplied content items in the category includes aggregating normalized attribute relevance scores for the attributes of the individual content items (in a manner similar to that discussed for a particular comment group), and another example includes first determining the highly relevant terms or other attributes for the comment groups within the category and then aggregating those comment group-specific attribute relevance scores to determine the category-specific attribute relevance scores (e.g., in a manner similar to that discussed with respect to aggregating relevance scores of particular content items within a comment group).

After determining relevant terms or other attributes for particular comment groups and/or categories, such relevance information may be used in various manners in various embodiments. As one example, a user may be provided with a GUI in which the user specifies one or more terms or other attributes (e.g., particular geographical locations, particular author users, etc.) of interest (optionally after the user is presented with relevant terms or other attributes shared by two or more comments groups and/or categories, such as in a manner similar to information 1720, 2220 and/or 2320 of FIGS. 2M, 2S and/or 2T, or instead in other formats), and particular comment groups and/or categories that include relevant terms or other attributes matching the specified terms/attributes may then be displayed or otherwise provided to the user—FIG. 2AK illustrates non-exclusive examples of such a display. By identifying to a user multiple comments groups from different categories that are all related to one or more terms or other attributes (optionally along with a degree of relevance of each such comment group to each such term or other attribute, such as based on the relative or absolute relevance scores of those terms or other attributes for those comment groups), or by identifying to a user multiple categories that are all related to one or more terms or other attributes (optionally along with a degree of relevance of each such category to each such term or other attribute, such as based on the relative or absolute relevance scores of those terms or other attributes for those categories), the user may be able to identify relationships between such displayed comment groups and/or categories that would not otherwise be apparent, as well as further explore additional comment groups and/or categories (e.g., such as by selecting displayed information about a comment group and/or a category and/or an inter-relationship between two or more comment groups and/or categories, in order to obtain additional information about that selection, such as in a manner described in greater detail below).

In addition to using such determined term or other attribute relevance information for particular comment groups and/or categories to display related information to a user, such determined relevance information may also be used in various other manners in various embodiments. For example, inter-relationships between particular comment groups and/or categories may be identified based at least in part on those comment groups and/or categories sharing relevant terms or other attributes. As one example, comment groups in different categories may share the same or overlapping terms or other attributes used to identify the topics for those comment groups, such as if those comment groups represent the same or overlapping topics in different categories—if so, a first type of inter-relationship between those comment groups may be identified on that basis, and those comment groups may further be identified as being related with a second type of relationship to a category (if any) that similarly represents the same or overlapping terms or other attributes for its category definition. As another example, comment groups in different categories may share the same or overlapping terms or other attributes that are highly relevant to each comment group but are different from the term(s) or other attribute(s) used to identify the topics for those comment groups—if so, a third type of inter-relationship between those comment groups may be identified on that basis. As yet another example, different categories may share the same or overlapping terms or other attributes that are highly relevant to each category but are different from the term(s) or other attribute(s) used to define those categories—if so, a fourth type of inter-relationship between those categories may be identified on that basis. In addition, a fifth type of inter-relationship between two or more categories may be identified based on comment groups within those categories being related in one or more manners (e.g., based on the first and/or third types of inter-relationships identified above). Furthermore, other types of inter-relationships between comment groups and categories may be identified, including a membership type of inter-relationship for comment groups that are members of categories, as well a comment group in one category that is identified as being related to another category (e.g., based on that comment group and related other category sharing one or more relevant terms or other attributes). As discussed in greater detail elsewhere, at least some such inter-relationships may be identified based at least in part on an automated discovery process. Additional details related to determining and illustrating various types of inter-relationships between categories and/or comment groups are described elsewhere herein, including with respect to FIGS. 2AI-2AJ.

The analysis of user-supplied information for a time period may further include predicting information about expected additional content items that will be supplied by users for a comment group and/or content category, such as during each of one or more future time periods of interest. For example, the analysis may include quantifying information about the user-supplied content items included in the comment group and/or associated with the content category for the time period, such as based on a quantity of such user-supplied content items, or more generally for each of one or more selected factors of interest. In some situations, the quantification is further performed for particular subsets of the user-supplied content items included in the comment group and/or associated with the content category for the time period, such as to correspond to an intersection of that comment group and/or content category with a particular geographical location (for those content items supplied from each of one or more geographical locations), to correspond to an intersection of that comment group and/or content category with a particular author user (for those content items supplied by each of one or more author users), to correspond to an intersection of that comment group and/or content category with a particular comment data source (for those content items supplied to each of one or more comment data sources), etc. Such quantification information for the constituent member content items supplied during the time period may then be combined with other corresponding quantification information for other related time periods, such as for all of the time periods during a sliding time window of interest (e.g., for every 30-minute time period during a 72-hour time window), and used to generate a histogram or other aggregation of that combined quantification information. In some embodiments, the quantification of information for a time period includes summarizing and encoding information about multiple selected factors for the constituent member content items supplied during the time period, and the aggregation of that combined quantification information that is generated for multiple time periods during a time window of interest includes a succession of the encoded summary information for the selected factors for each of multiple successive time periods during the time window. The aggregated quantification information may then be used to generate predicted information about expected additional content items that will be supplied by users for the comment group or content category (or particular intersection) corresponding to the aggregated quantification information, such as with respect to one or more of the selected factors that are quantified and optionally summarized and encoded.

For example, a non-exclusive list of types of information that may be predicted with respect to a corresponding selected factor for a comment group and/or a category include the following: a predicted amount of (or change in) a total quantity of the comments included in the comment group and/or associated with the category (or particular intersection) in one or more future time periods; a predicted direction of increase or decrease in the quantity of the comments included in the comment group and/or associated with the category (or particular intersection) in one or more future time periods; a predicted change in which topics or other attributes will be associated with the category in one or more future time periods; a predicted amount of (or change in) influence of one or more author users who supply content items included in the comment group and/or associated with the category (or particular intersection) in one or more future time periods; a predicted amount of (or change in) one or more types of sentiment in the content items included in the comment group and/or associated with the category (or particular intersection) in one or more future time periods; a predicted amount of (or change in) comments from one or more geographical locations that are included in the comment group and/or associated with the category (or particular intersection) in one or more future time periods; a predicted direction of increase or decrease in the quantity of the comments from one or more geographical locations that are included in the comment group and/or associated with the category (or particular intersection) in one or more future time periods; a predicted amount of (or change in) comments from one or more comment data sources that are included in the comment group and/or associated with the category (or particular intersection) in one or more future time periods; a predicted direction of increase or decrease in the quantity of the comments from one or more data sources that are included in the comment group and/or associated with the category (or particular intersection) in one or more future time periods; a predicted amount of (or change in) comments from one or more author users that are included in the comment group and/or associated with the category (or particular intersection) in one or more future time periods; a predicted direction of increase or decrease in the quantity of the comments from one or more author users that are included in the comment group and/or associated with the category (or particular intersection) in one or more future time periods; etc.

In some embodiments and situations, the generating of the prediction information includes performing trend prediction based on the aggregated quantification information for a comment group and/or category (or particular intersection), such as by doing a $2^{nd}$ degree polynomial least squares fit to the quantification information in the generated histogram or other aggregation (e.g., using weighting to reflect time and/or one or more other factors for the quantification information in the generated histogram or other aggregation), and using the resulting trend line to determine the predicted information. In other embodiments and situations, the generating of the prediction information includes matching a generated histogram or aggregation of encoded summary information or other quantification aggregation to a portion of a defined prediction template (e.g., to an initial subset of an additional histogram that is based on quantified information for prior actual user-supplied content items that have been received), and using an additional portion of the defined prediction template (e.g., a later subset of the additional histogram, a later portion of the aggregation of encoded summary information, etc.) to indicate the predicted information. In other embodiments, other types of information may be quantified and used to generate prediction information for a comment group and/or content category (or particular intersection), and additional details are included below about predicting information about expected additional content items that will be supplied by users for a comment group and/or content category (or particular intersection).

The analysis of user-supplied information for a time period may further include generating a prediction template that reflects actual user-supplied content items that are received over time for a comment group and/or content category, such as for later use in predicting information about expected additional content items that will be supplied by users. For example, a histogram or aggregation of encoded summary information or other aggregation of quantification information that is generated to reflect user-supplied content items received for a comment group and/or a content category (or particular intersection) may be analyzed to determine if the histogram or aggregation of encoded summary information or other quantification aggregation is successful in predicting other expected content items that will be received in other situations. In addition, or alternatively, trend prediction information that is generated based on a generated histogram or aggregation of encoded summary information or other quantification aggregation for a comment group and/or a content category may be analyzed to determine if the corresponding predicted information reflects later user-supplied content items that are actually received for the comment group or content category. When a generated histogram or aggregation of encoded summary information or other quantification aggregation and/or corresponding trend prediction information is found to be successful in predicting other user-supplied content items, it may be put into use as a prediction template in predicting additional future user-supplied content items that will be received, such as to further evaluate its performance. In other embodiments, prediction templates may be generated in other manners, and additional details are included below about generating a prediction template for later use in predicting information about expected additional content items that will be supplied by users.

After the analysis of user-supplied information for one or more time periods is performed, various types of resulting automated actions may be taken, such as based on analyzed information about the user-supplied content items that have already been received and/or based on predictions about additional user-supplied content items that are expected to be received. For example, information from the analysis may be provided to one or more clients of the GDAP service, such as users or other entities who pay fees to receive information about specified content categories of interest, or more generally to various types of users of the GDAP service, including advertisers and other external entities. In addition, in some embodiments and situations, information from the analysis is used by the GDAP service to take automated actions to supply additional content items that correspond to a comment group or category of interest (e.g., additional comments that are generated by the GDAP service and made available to users), or to otherwise supply information corresponding to the comment group or category (e.g., initiating or changing related Internet-based advertising or other advertising), optionally in accordance with instructions or other criteria specified by one or more clients of the GDAP service—such additional information may, in some situations, alter or otherwise affect future direction of a particular distributed group discussion, such as by including additional supplemental information to further support particular topics, by including additional information to refute or otherwise alter a discussion about particular topics, etc. Similarly, in some embodiments and situations, information about user-supplied content that is being displayed or otherwise provided to a user is used to select corresponding promotional information to also provide to the user, such as based on a specified advertising campaign or other advertising-related request received from each of one or more advertisers or other external entities. In other embodiments, various other types of actions may be taken by the GDAP service in appropriate circumstances, and additional details are included below about taking automated actions based on information generated from the analysis of user-supplied information for one or more time periods.

In addition, other types of analysis of user-supplied information for one or more time periods may be performed in at least some embodiments, such as to generate additional types of information related to distributed group discussions. As a first example, information about users who supply content items in one or more comment groups and/or associated with one or more categories during one or more time periods may be analyzed, such as to determine particular author users who have a high or low amount of influence within the comment groups or categories (e.g., relative to other author users for the same or other comment groups and/or categories), such as to be able to direct how a discussion evolves or changes. As a second example, information about content items in one or more comment groups and/or associated with one or more categories during one or more time periods may be analyzed, such as to perform a sentiment analysis with respect to contents of the content items (e.g., by using term/symbol list matching; topic decomposition and subspace projection; Bayesian classification or other classification techniques, such as using training data from human-annotated sentiment assignments of particular user comments; etc.). Such additional types of discussion-related information for one or more comment groups and/or one or more categories over one or more time periods may be used in various manners, including to encode summary information about one or more such additional types of discussion-related information for one or more corresponding selected factors, to take some or all of the same types of automated actions as discussed above, or instead to take other types of automated actions. In other embodiments, various other types of analyses may be performed by the GDAP service to generate various other types of additional discussion-related information, and additional details are included below about performing analyses with respect to author user influence and/or sentiment analysis.

For illustrative purposes, some embodiments are described below in which specific types of user-supplied information is analyzed to provide particular types of resulting information related to distributed group discussions in specific ways, including to predict various types of information about expected future user-supplied information that will be received. However, it will be understood that such information related to distributed group discussions may be generated in other manners and using other types of input data in other embodiments, that the described techniques may be used in a wide variety of other situations for other types of data, that other types of information related to distributed group discussions may similarly be generated and used in various ways, and that the invention is thus not limited to the exemplary details provided.

FIGS. 2A-2K illustrate examples of analyzing distributed group discussions in particular manners and predicting further aspects of the discussions, such as by an example embodiment of the GDAP service (not shown). While particular example types of user comments, comment groups, categories and types of analyses are discussed, it will be appreciated that the details are provided for illustrative purposes, and that the described techniques may be used with a variety of other types of user-supplied information and to perform other types of analyses.

Figure 2D:
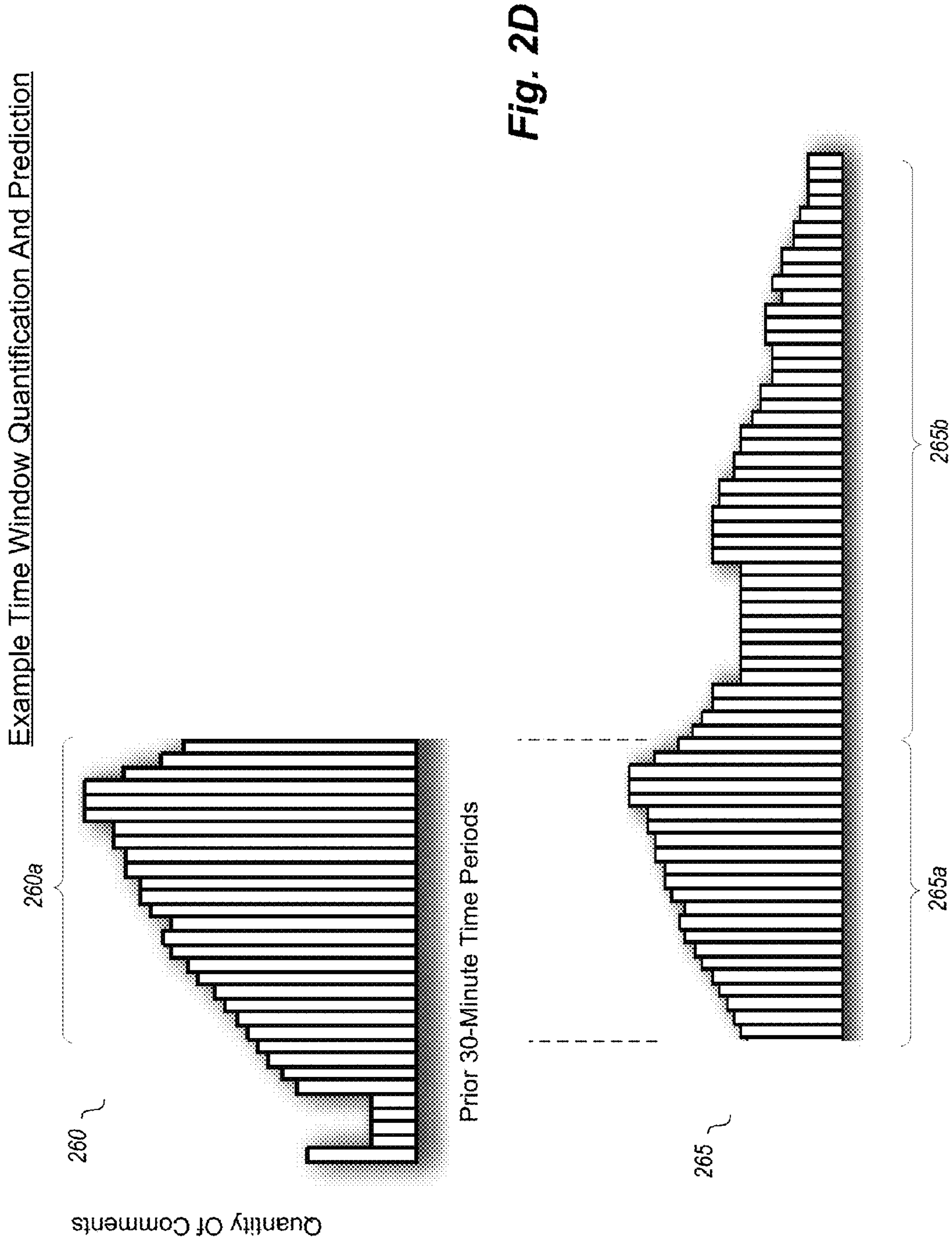
Figure 2E:
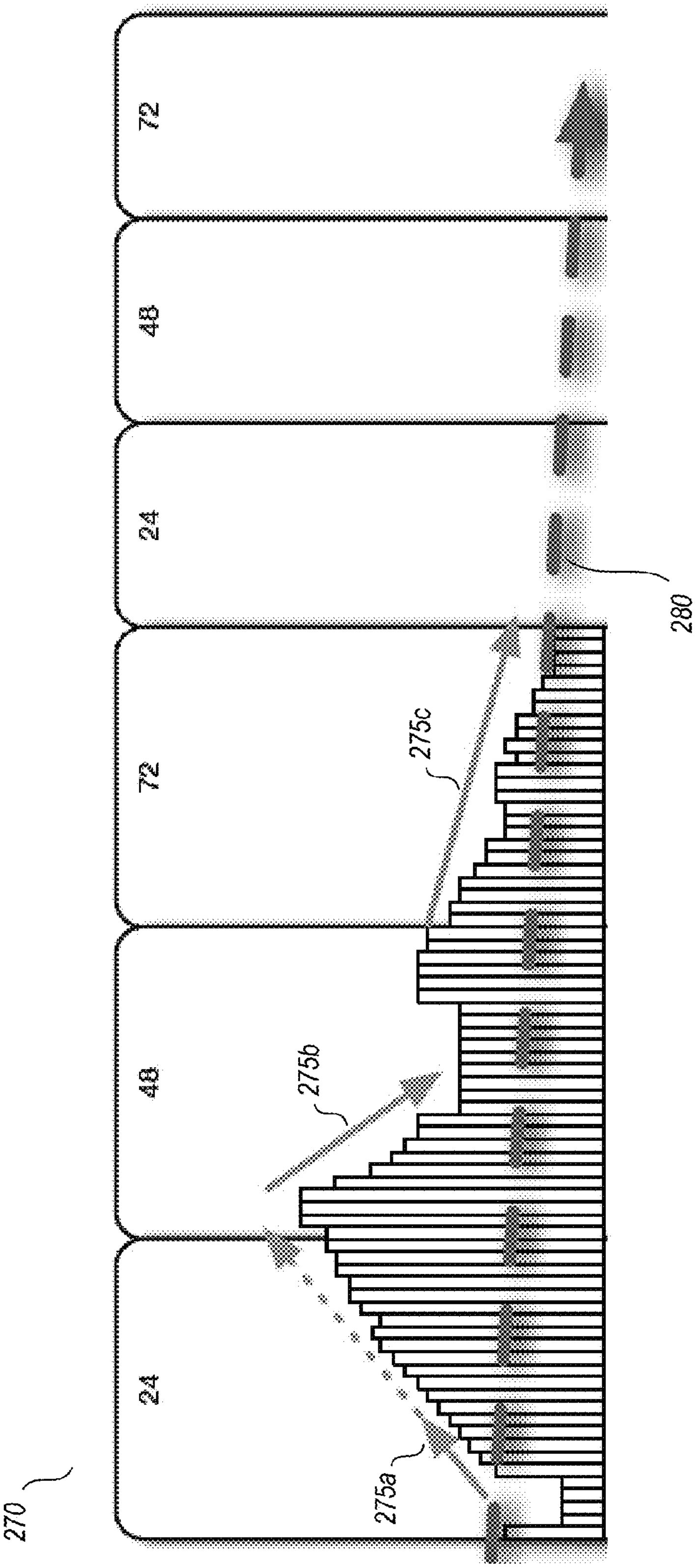
Figure 2L:
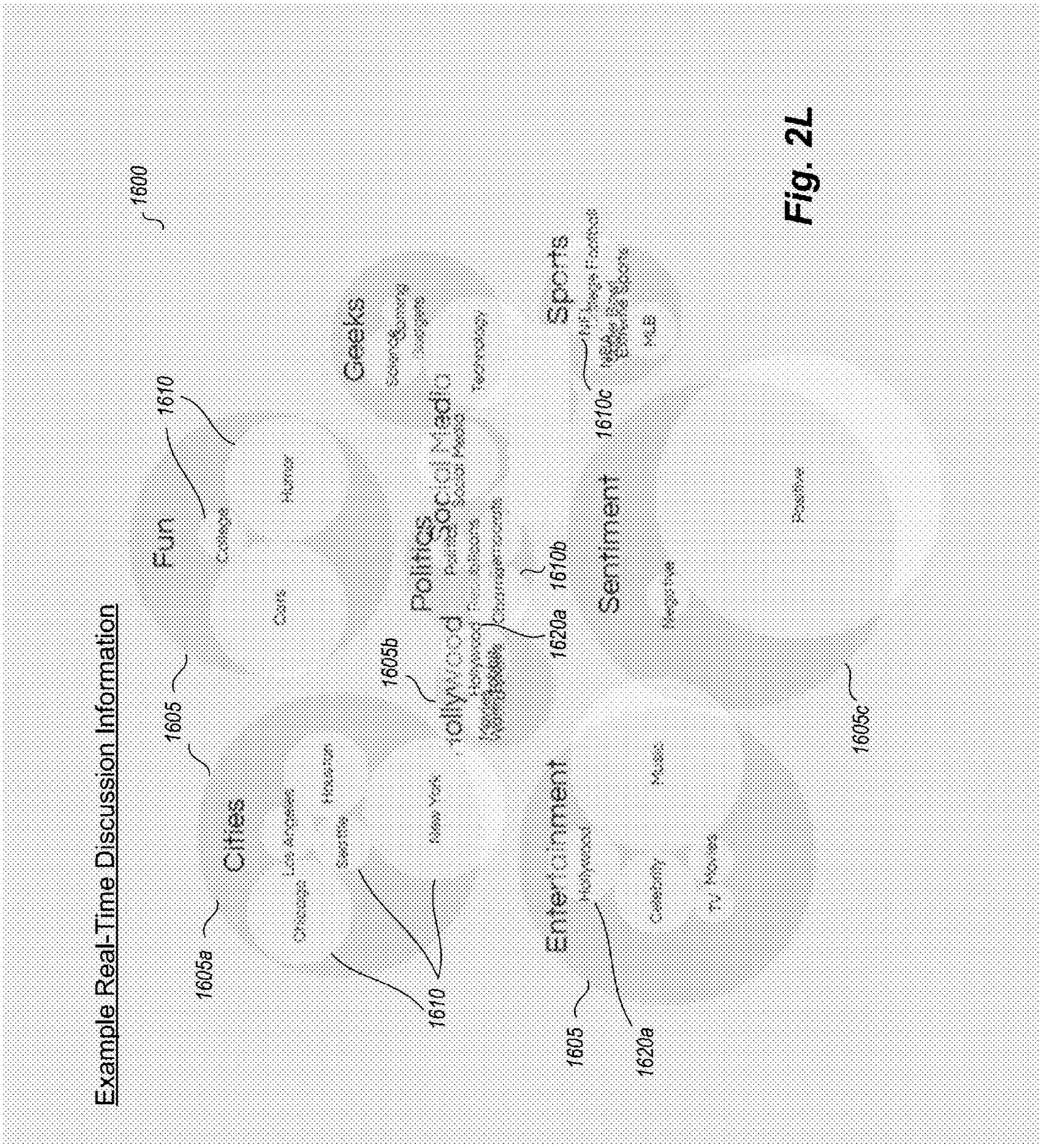
Figure 2M:
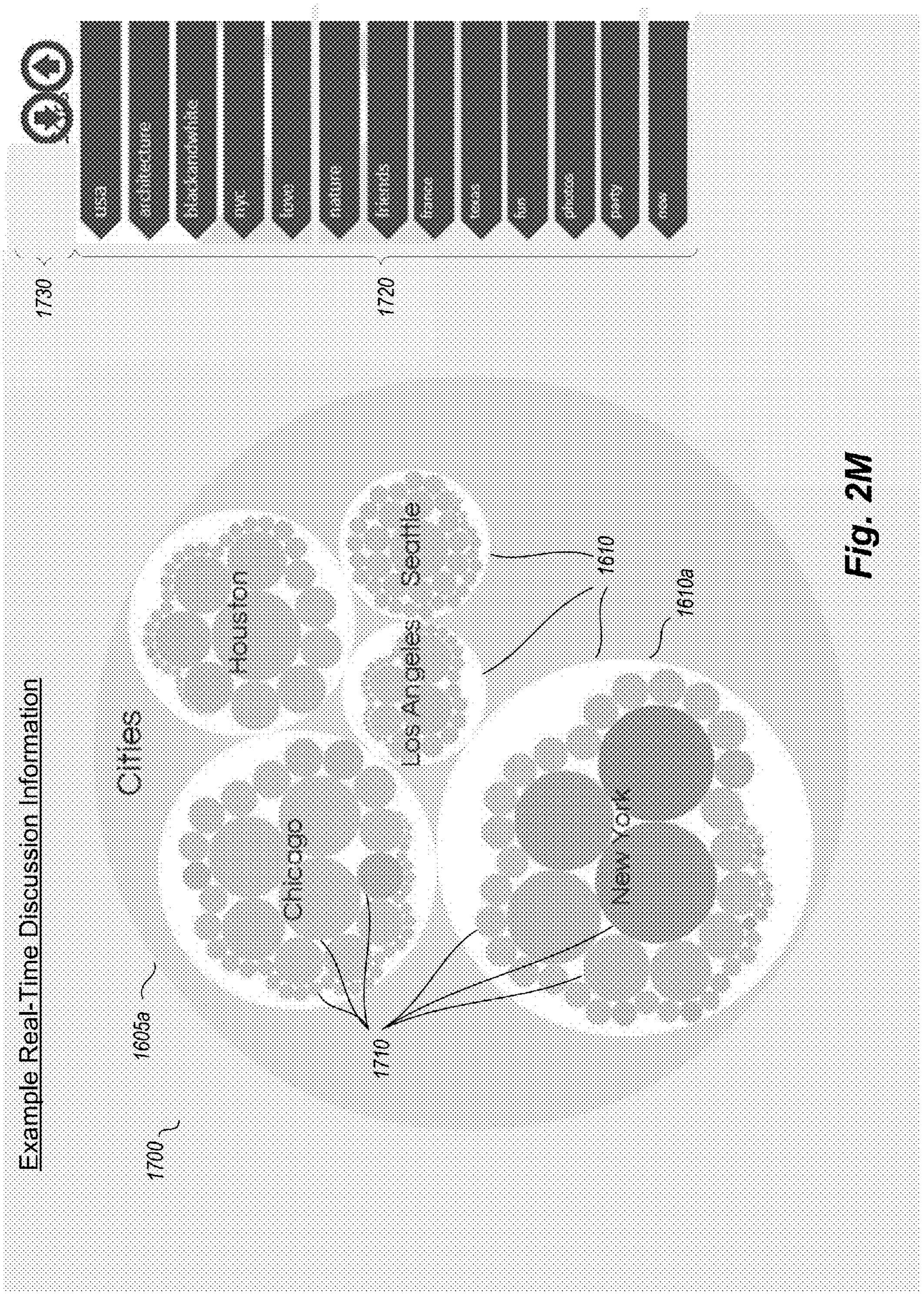
Figure 2N:
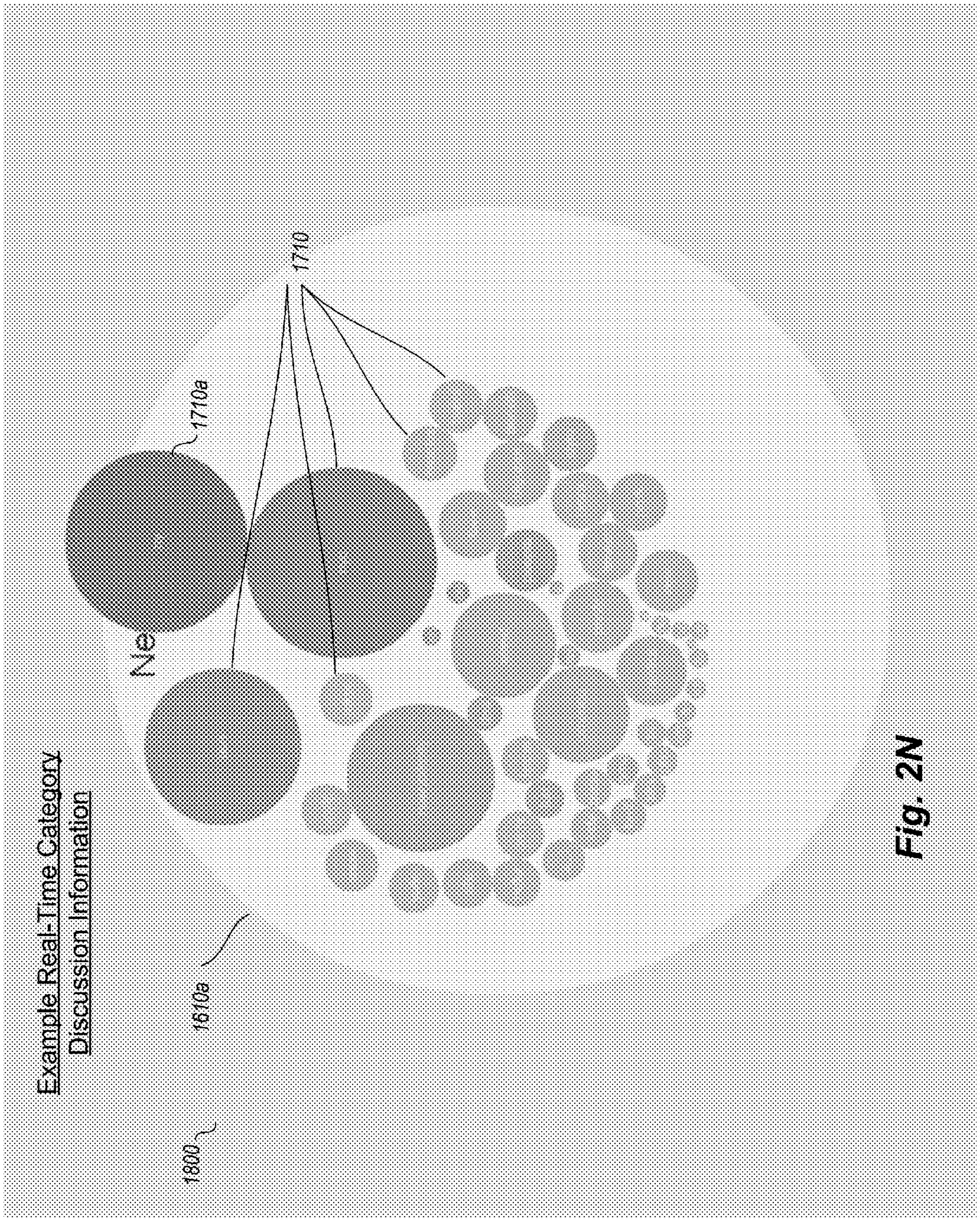
Figure 2P:
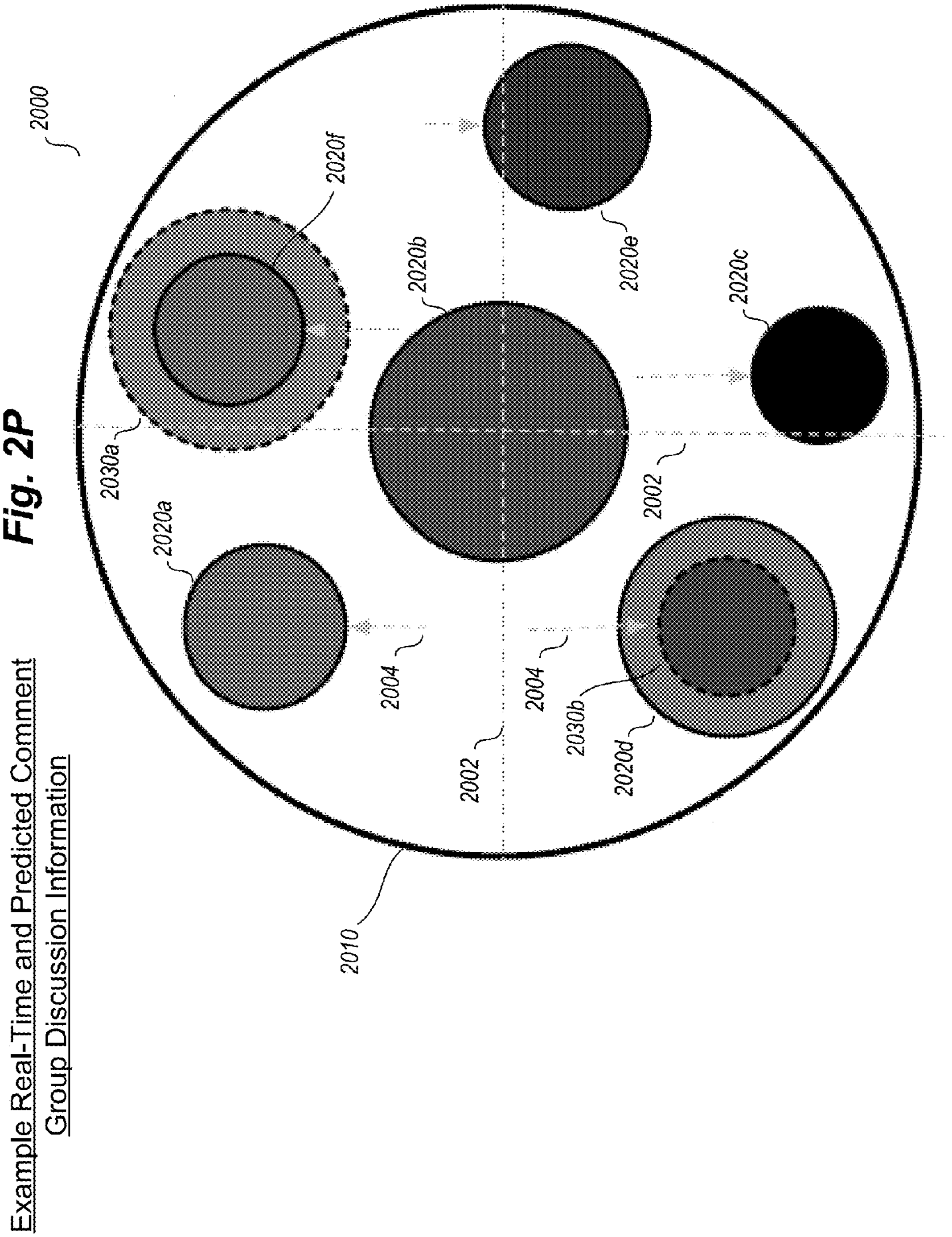
Figure 2Q:
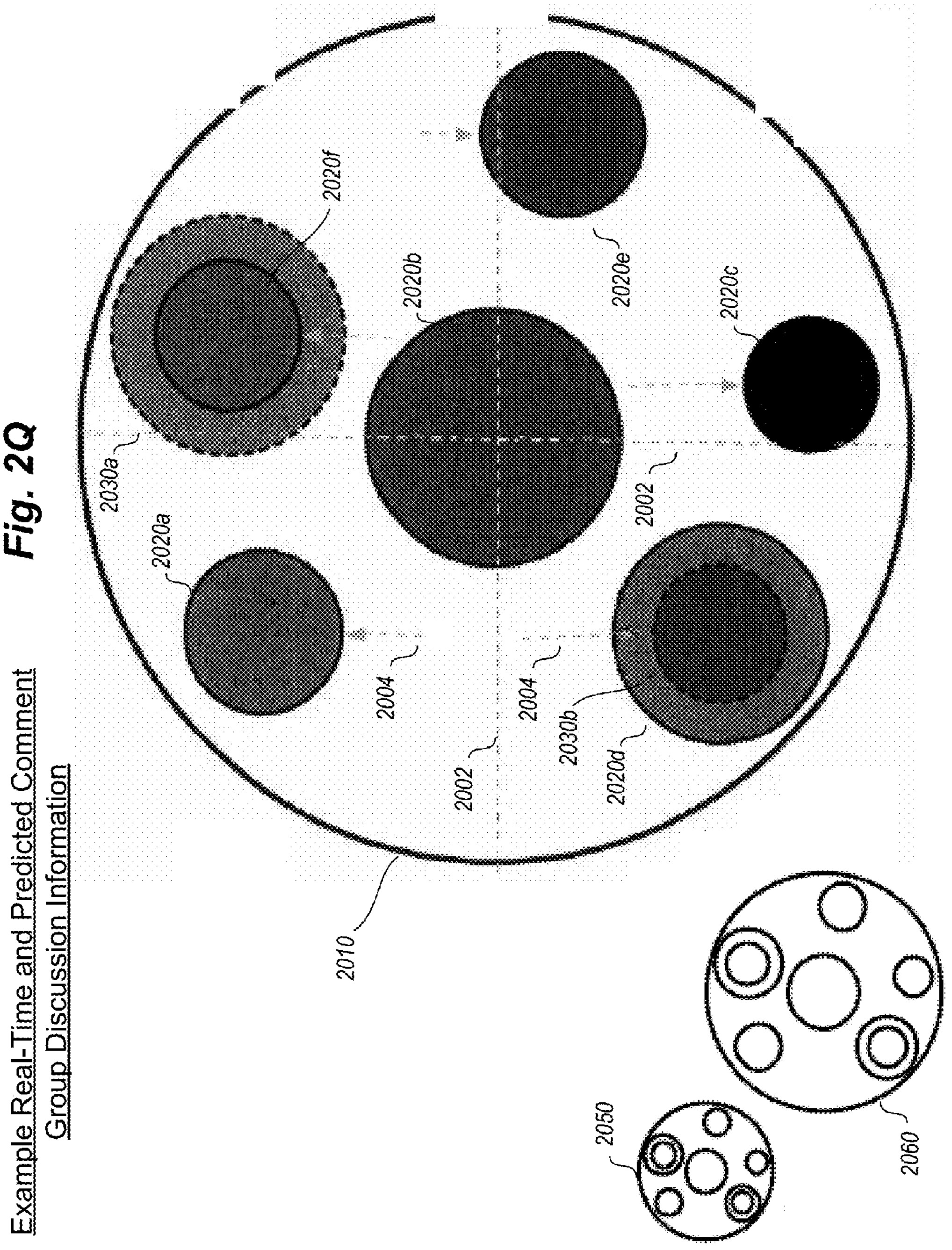
Figure 2R:
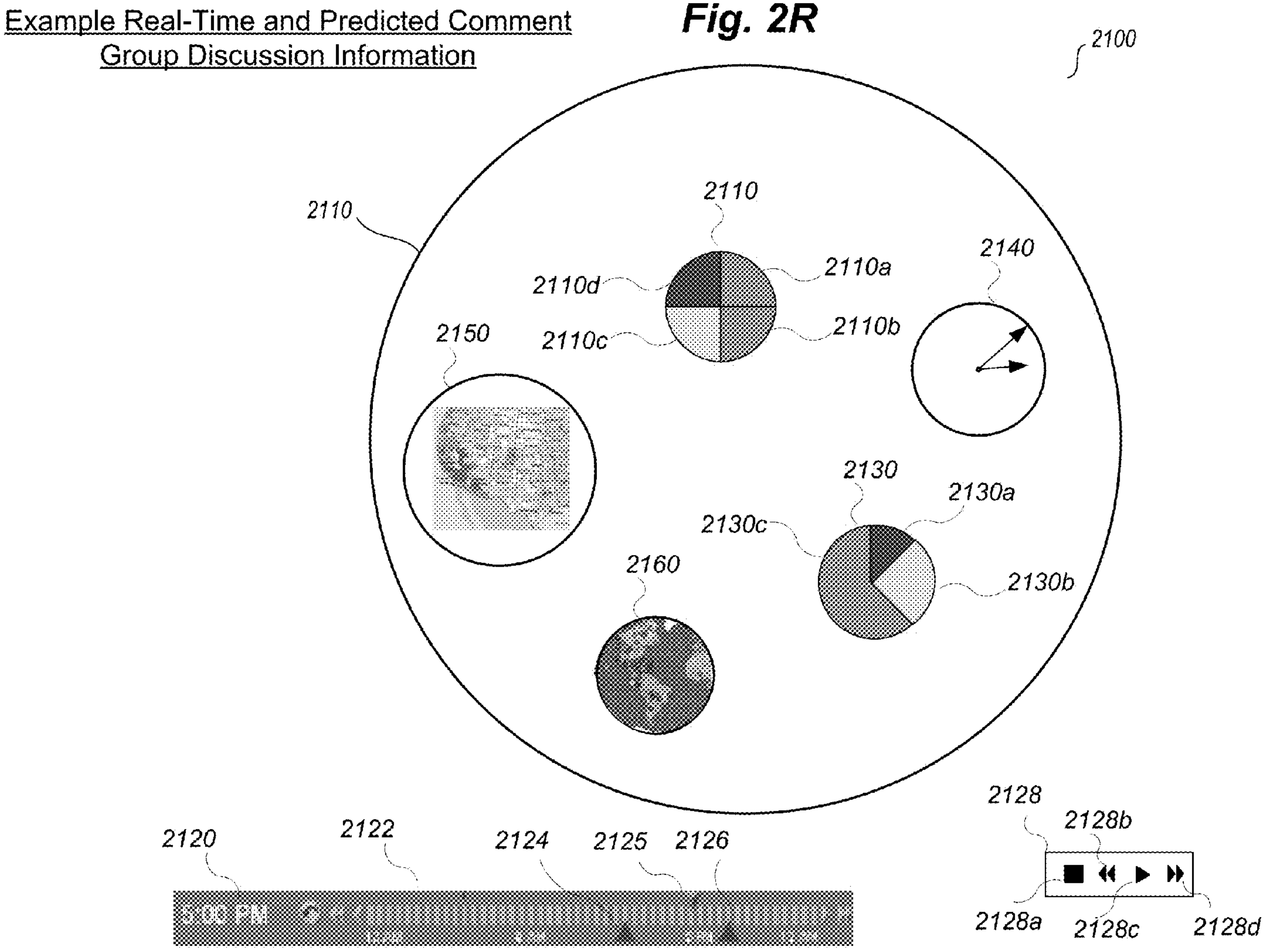
Figure 2S:
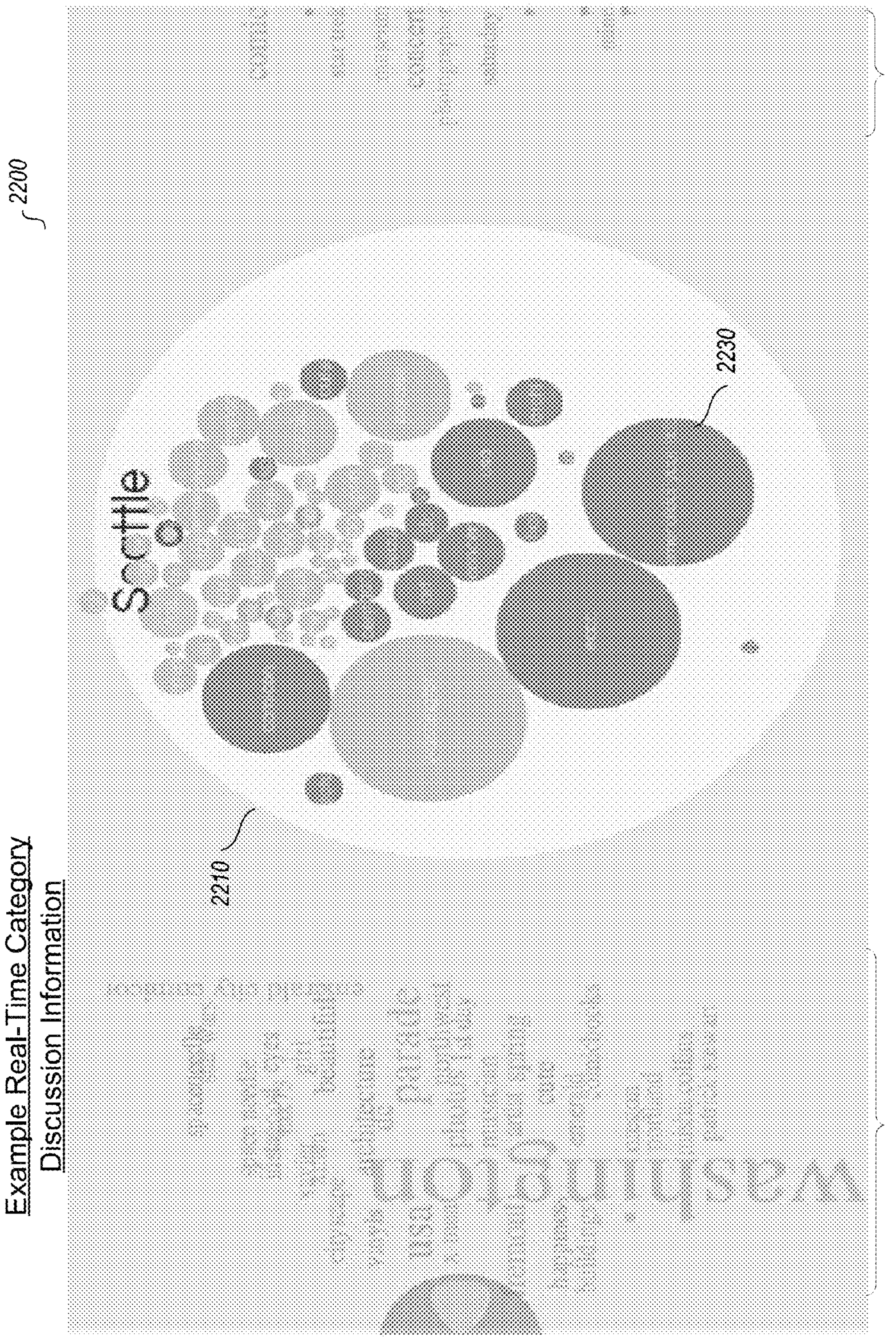
Figure 2T:
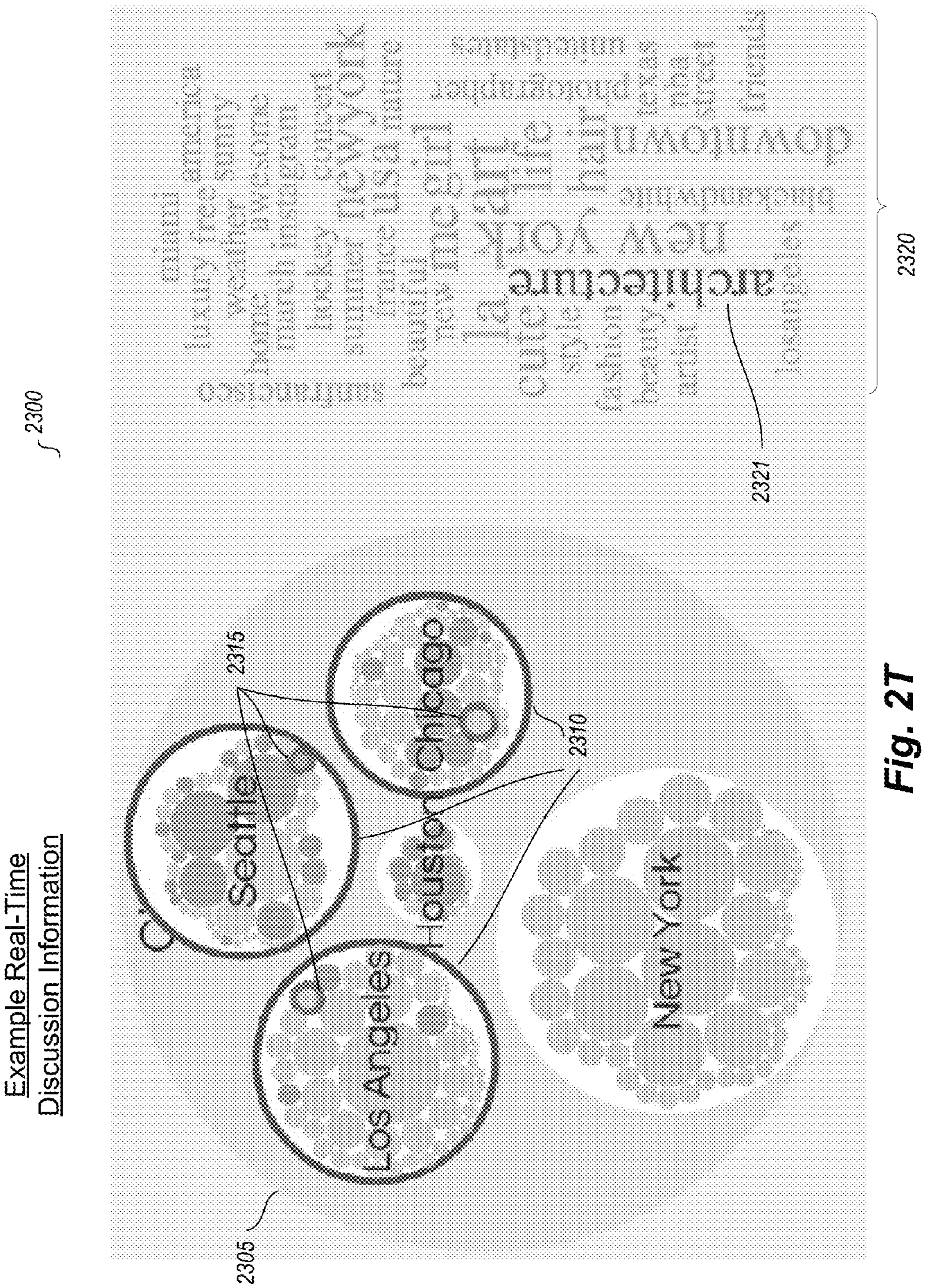
Figure 2U:
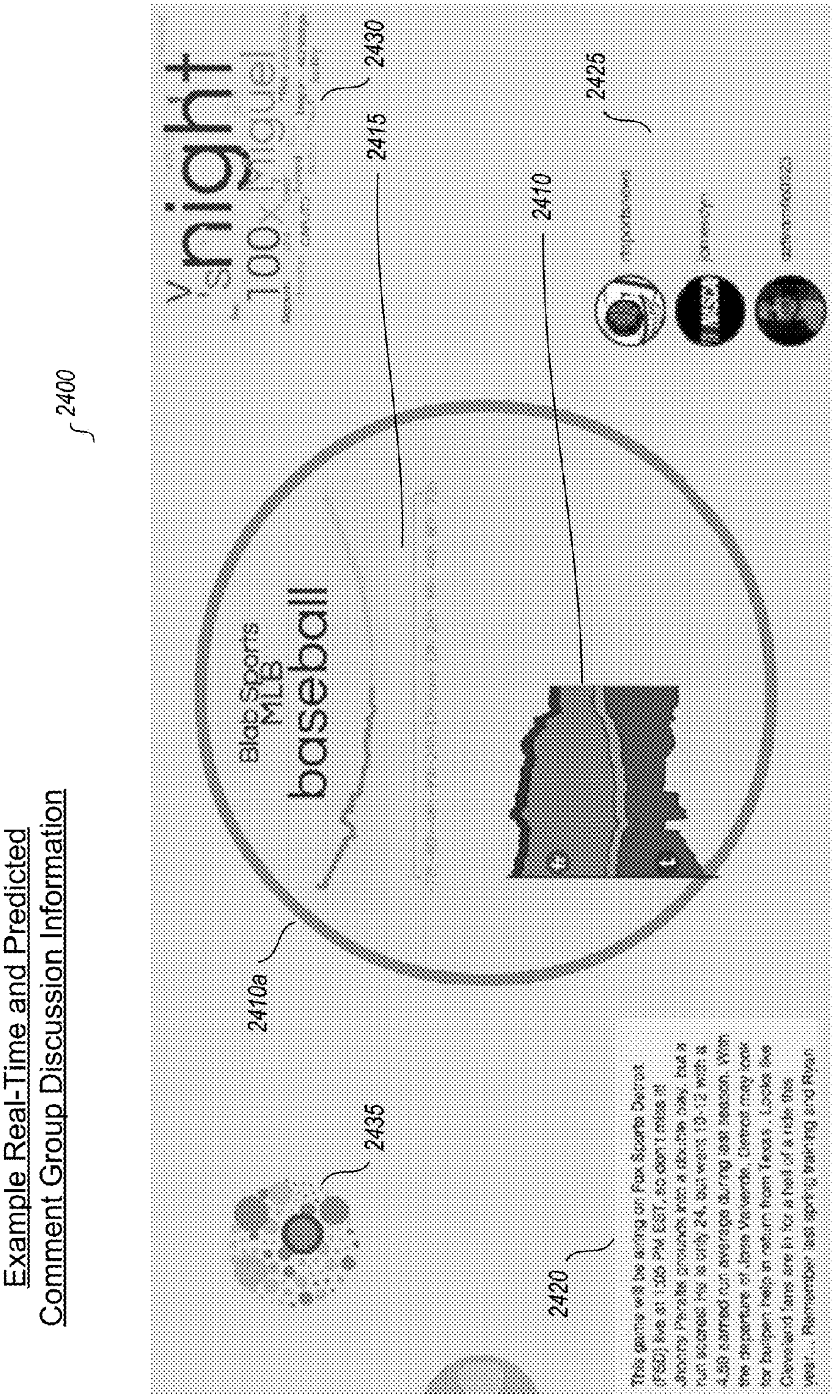
Figure 2V:
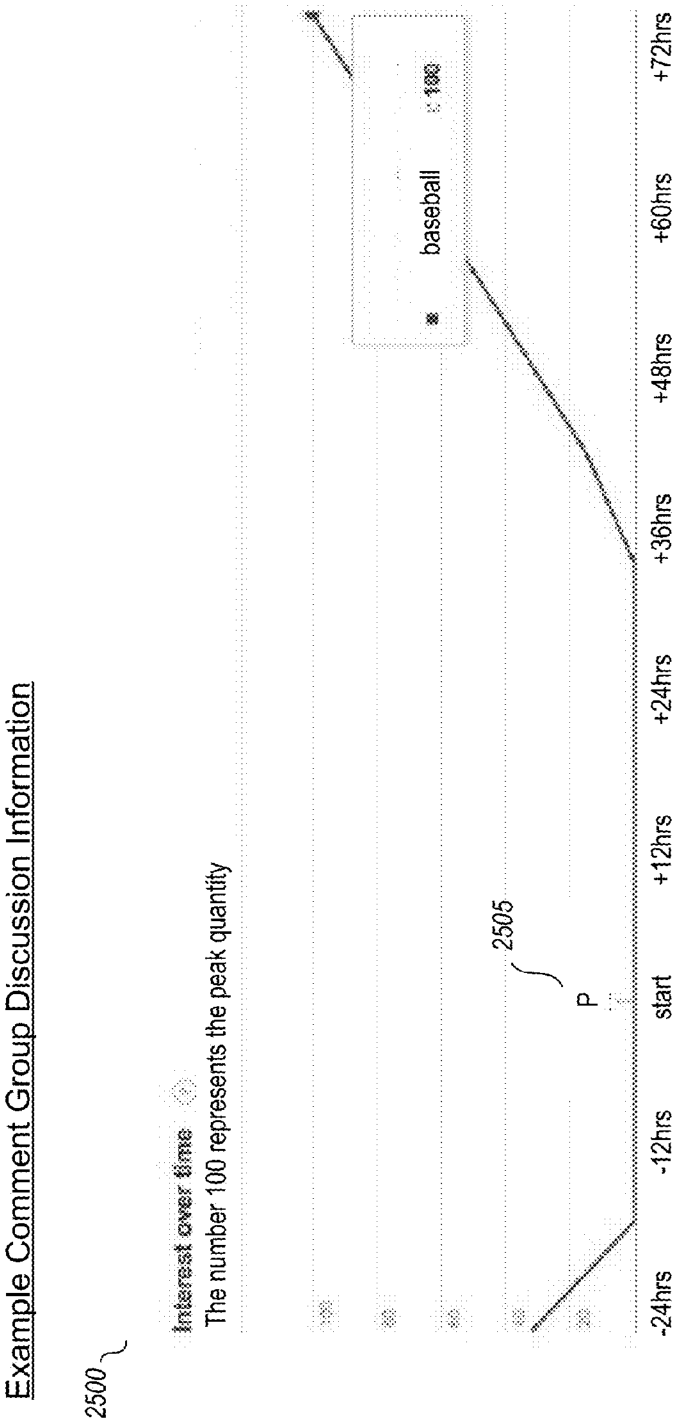
Figure 2W:
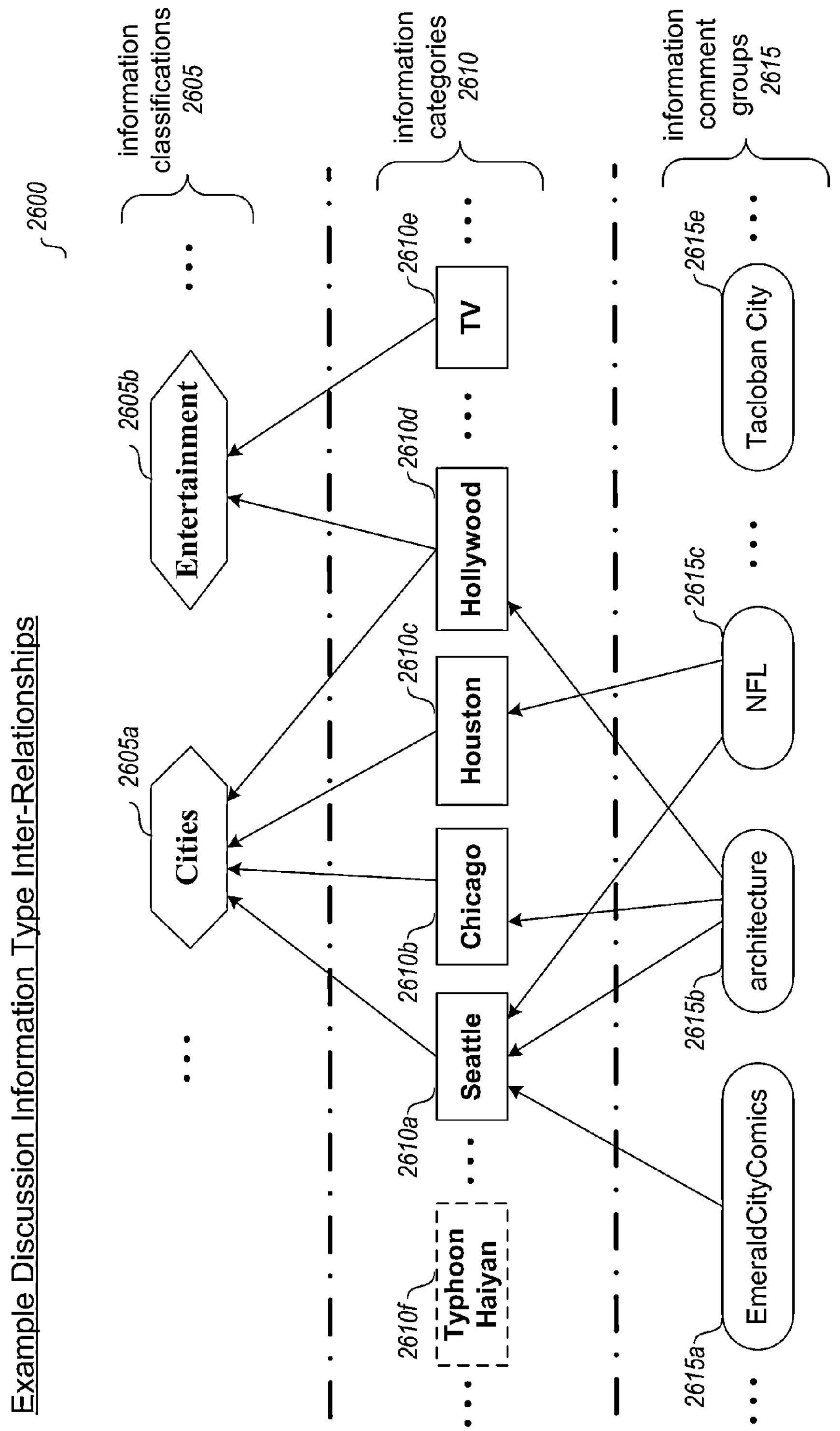
Figure 2X:
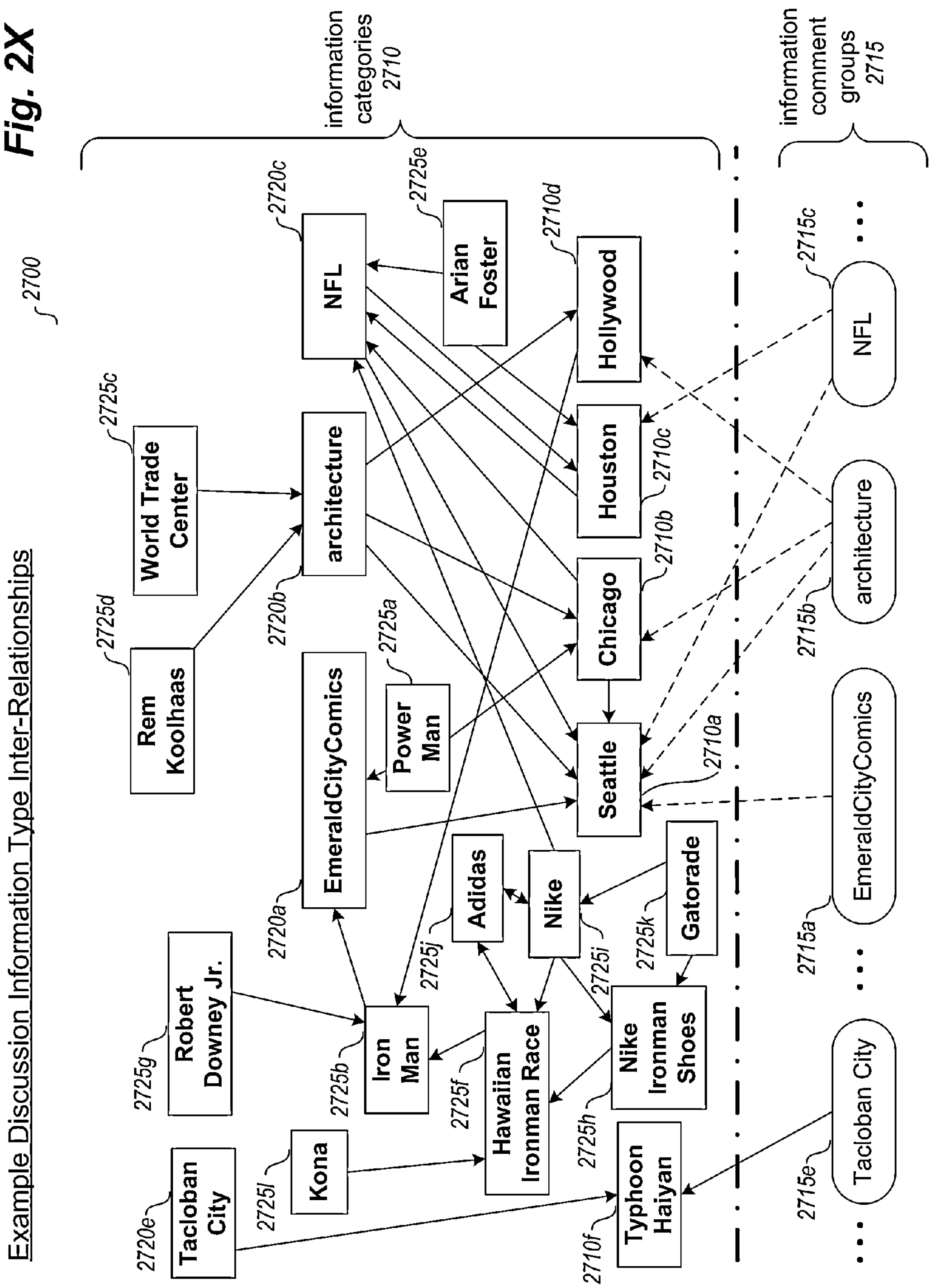
Figure 2Y:
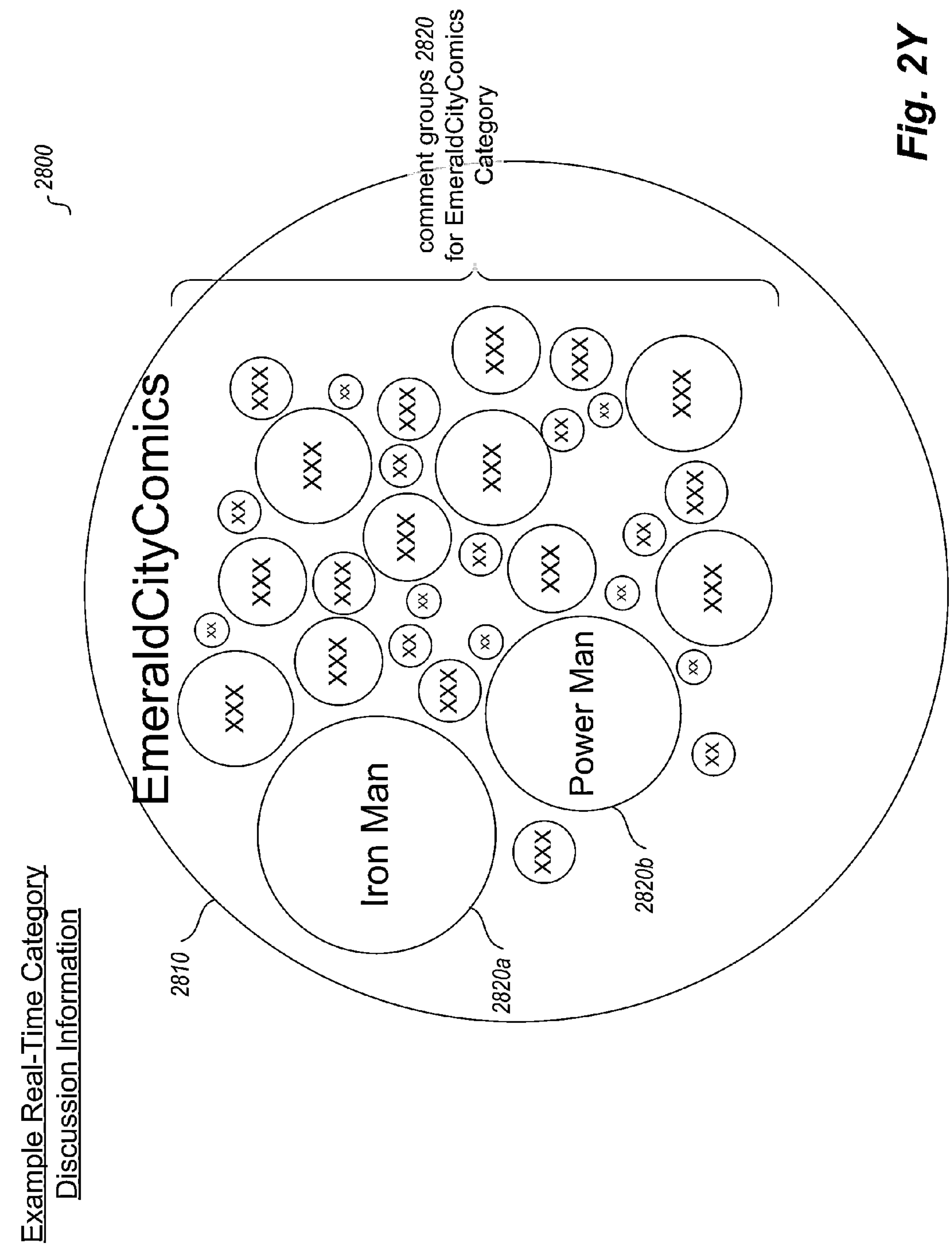
Figure 2Z:
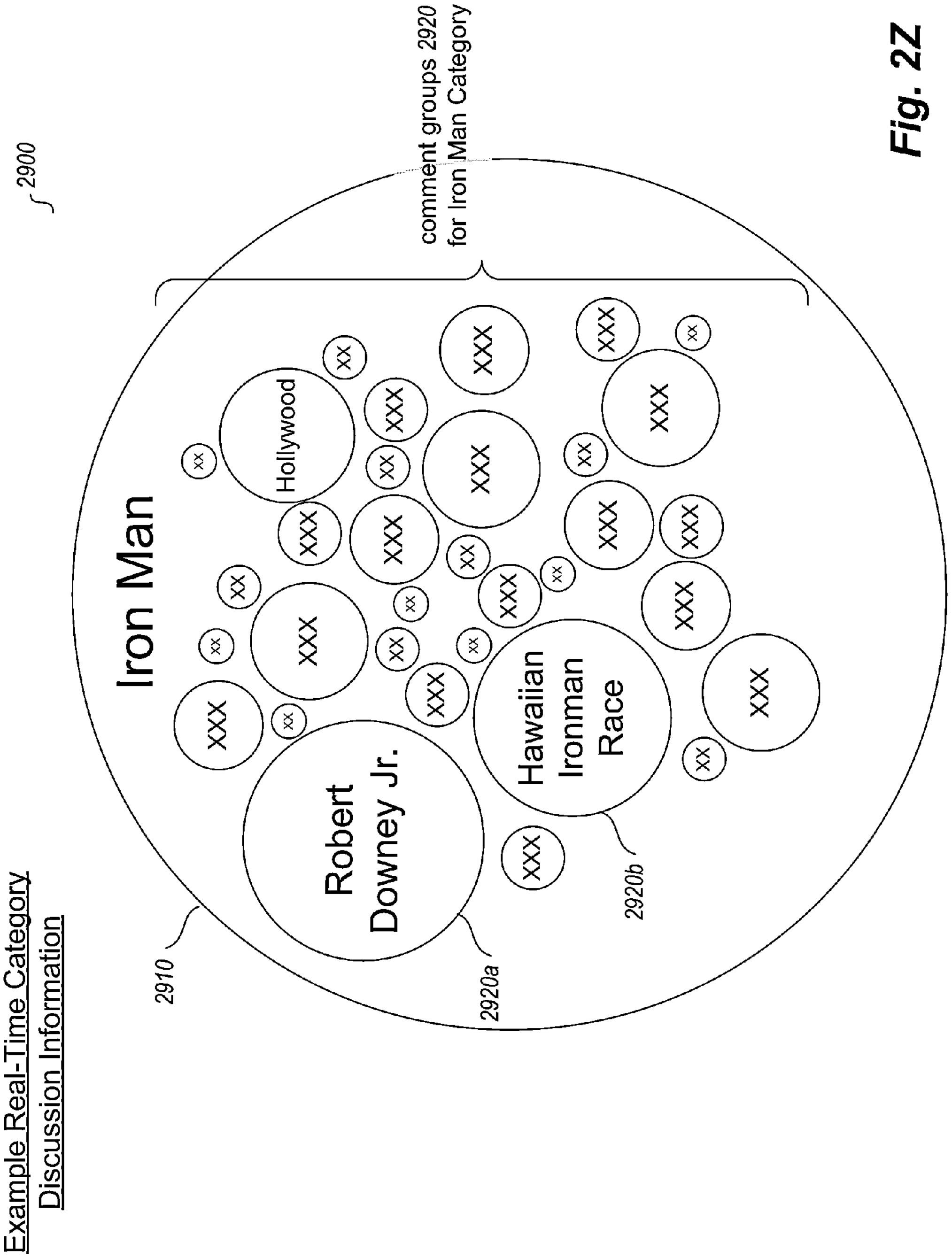
Figure 2A:
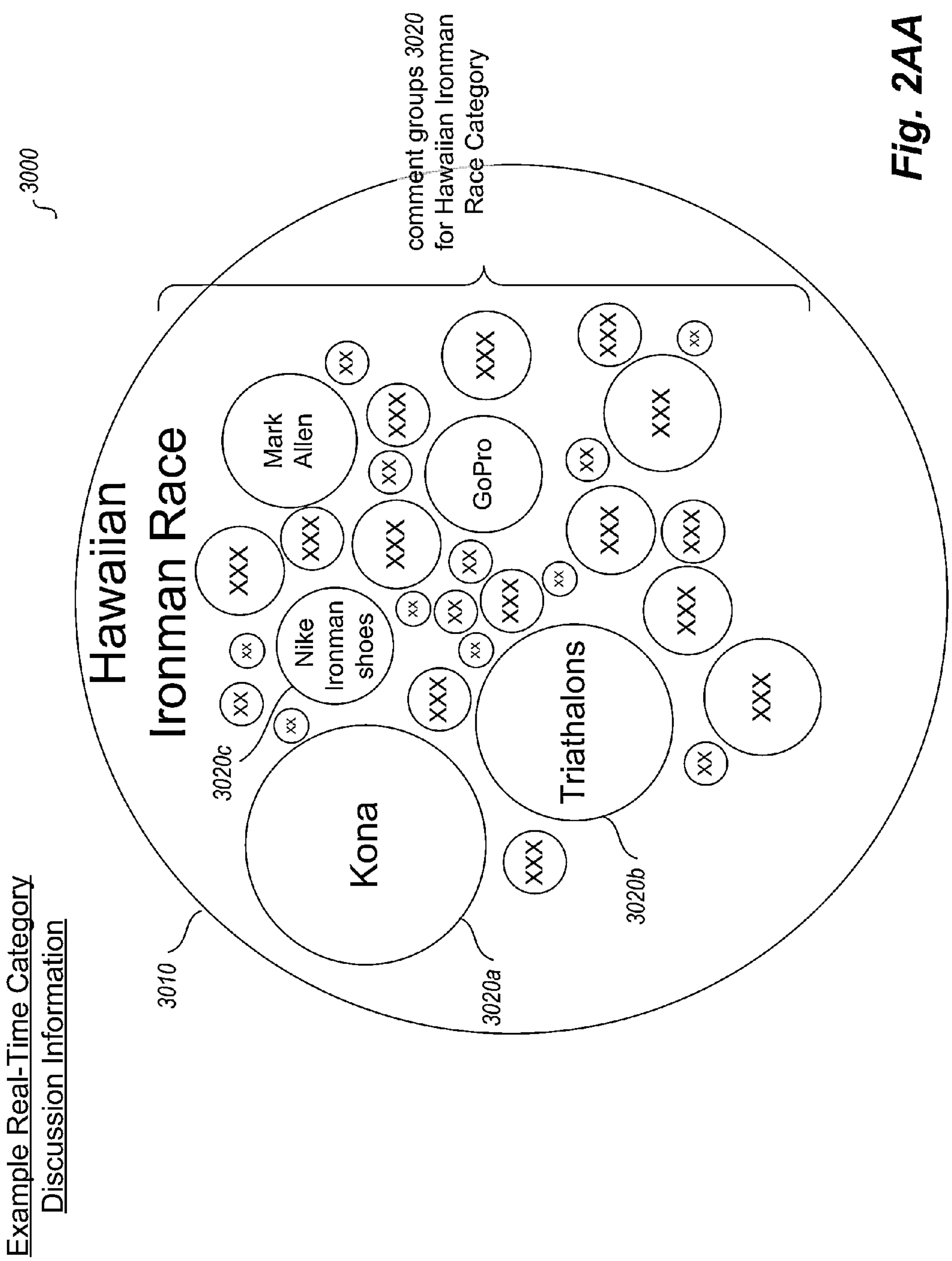
Figure 2A:
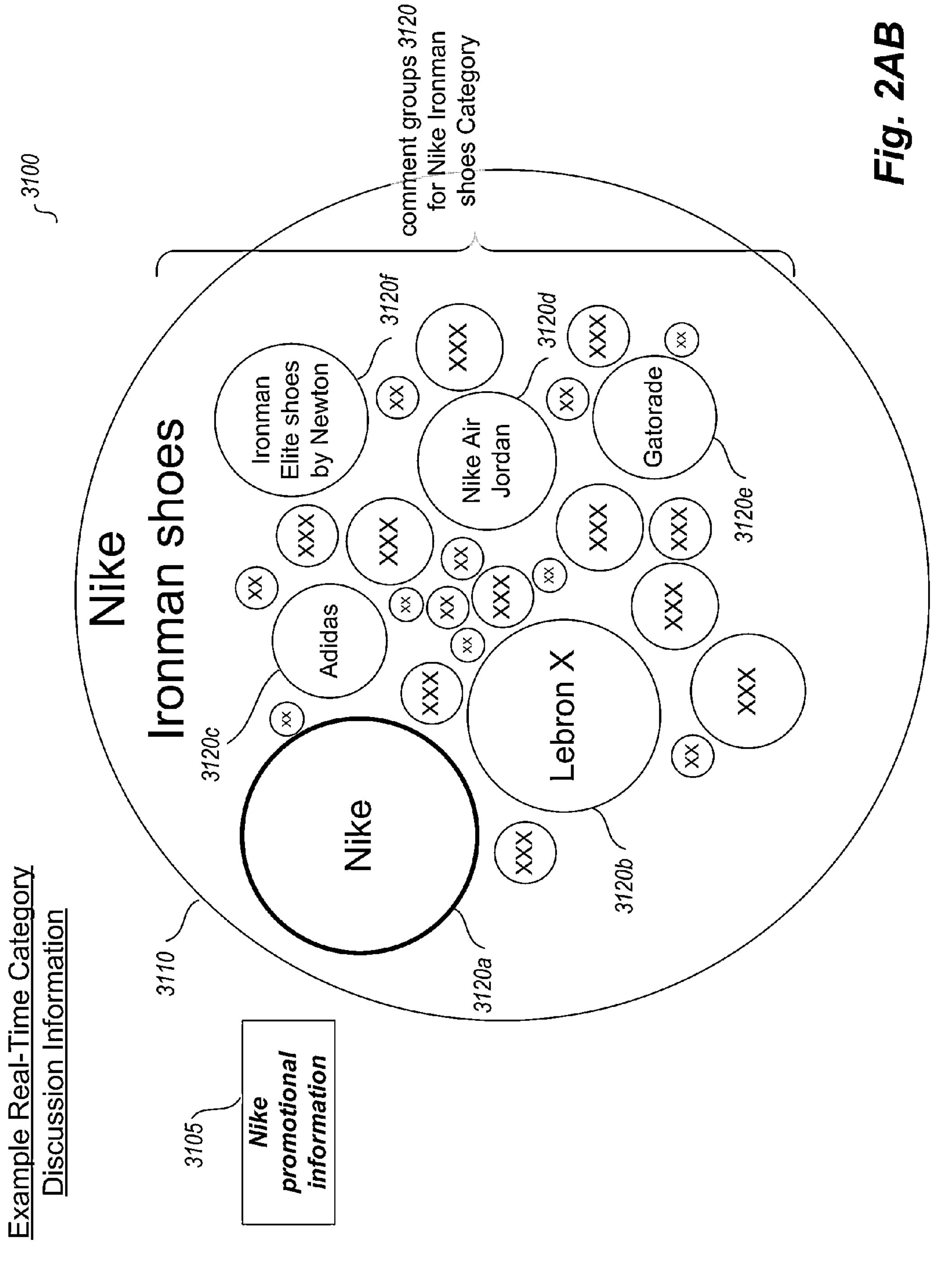
Figure 2A:
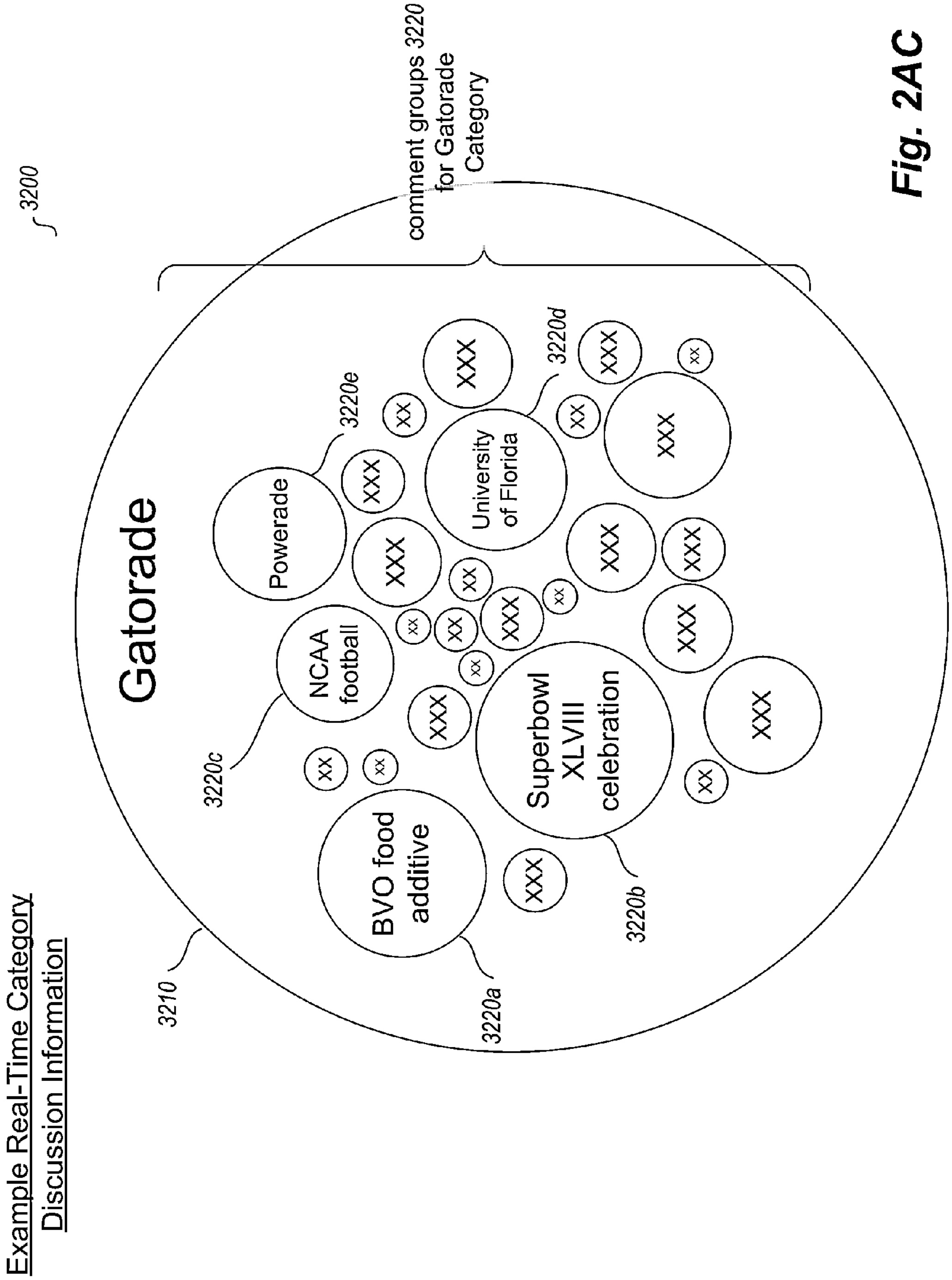
Figure 2A:
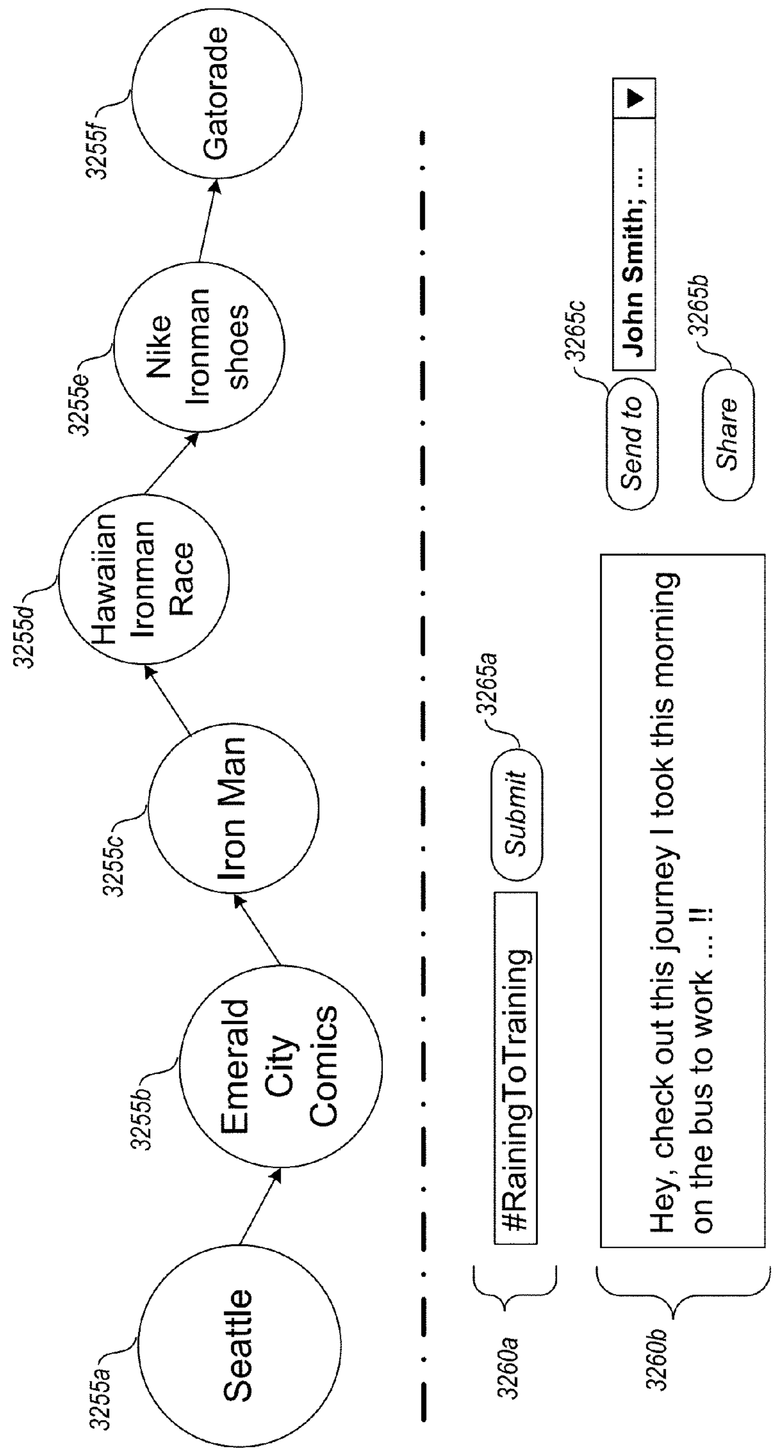
Figure 2A:
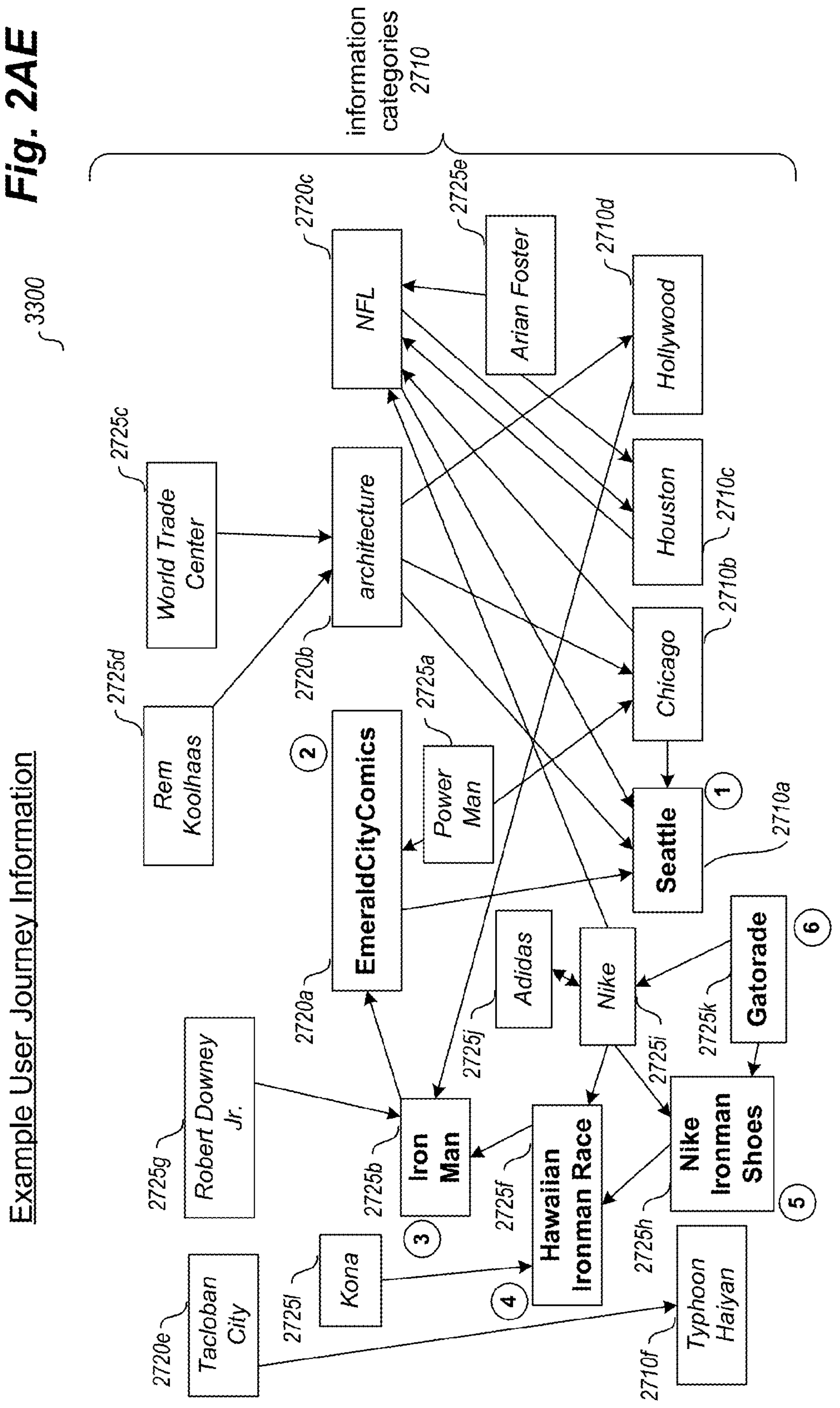
Figure 2A:
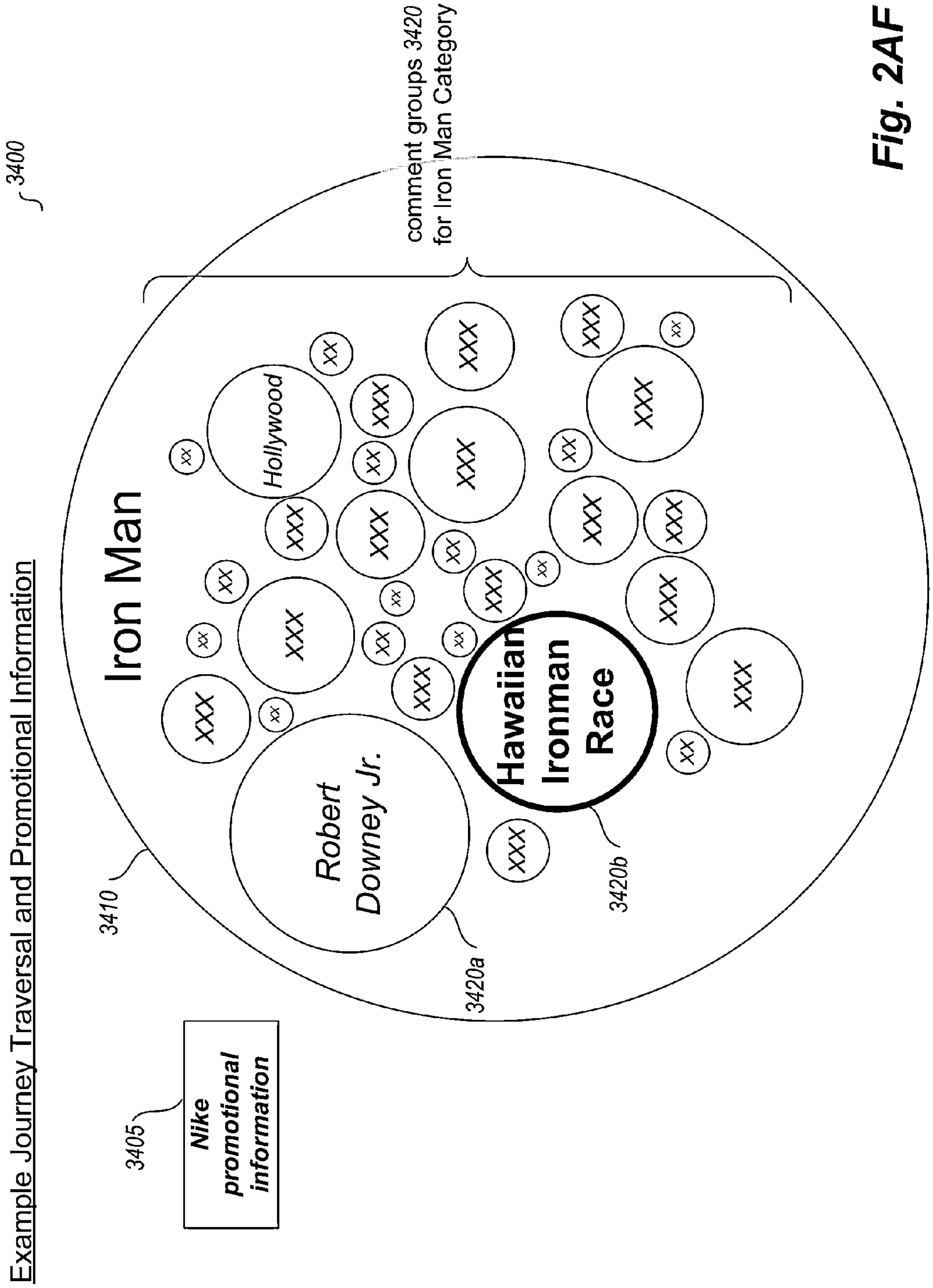
Figure 2A:
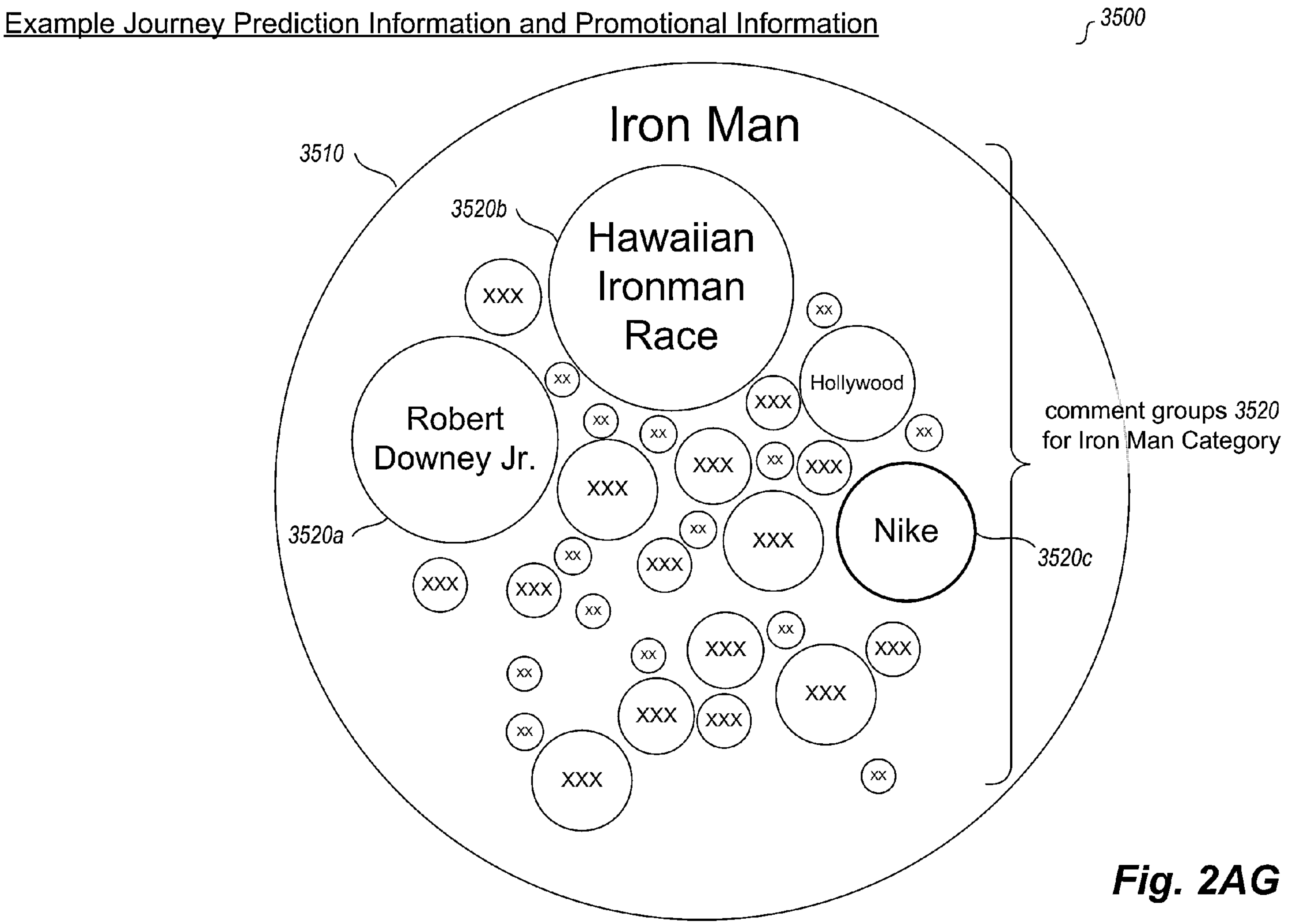
Figure 2A:
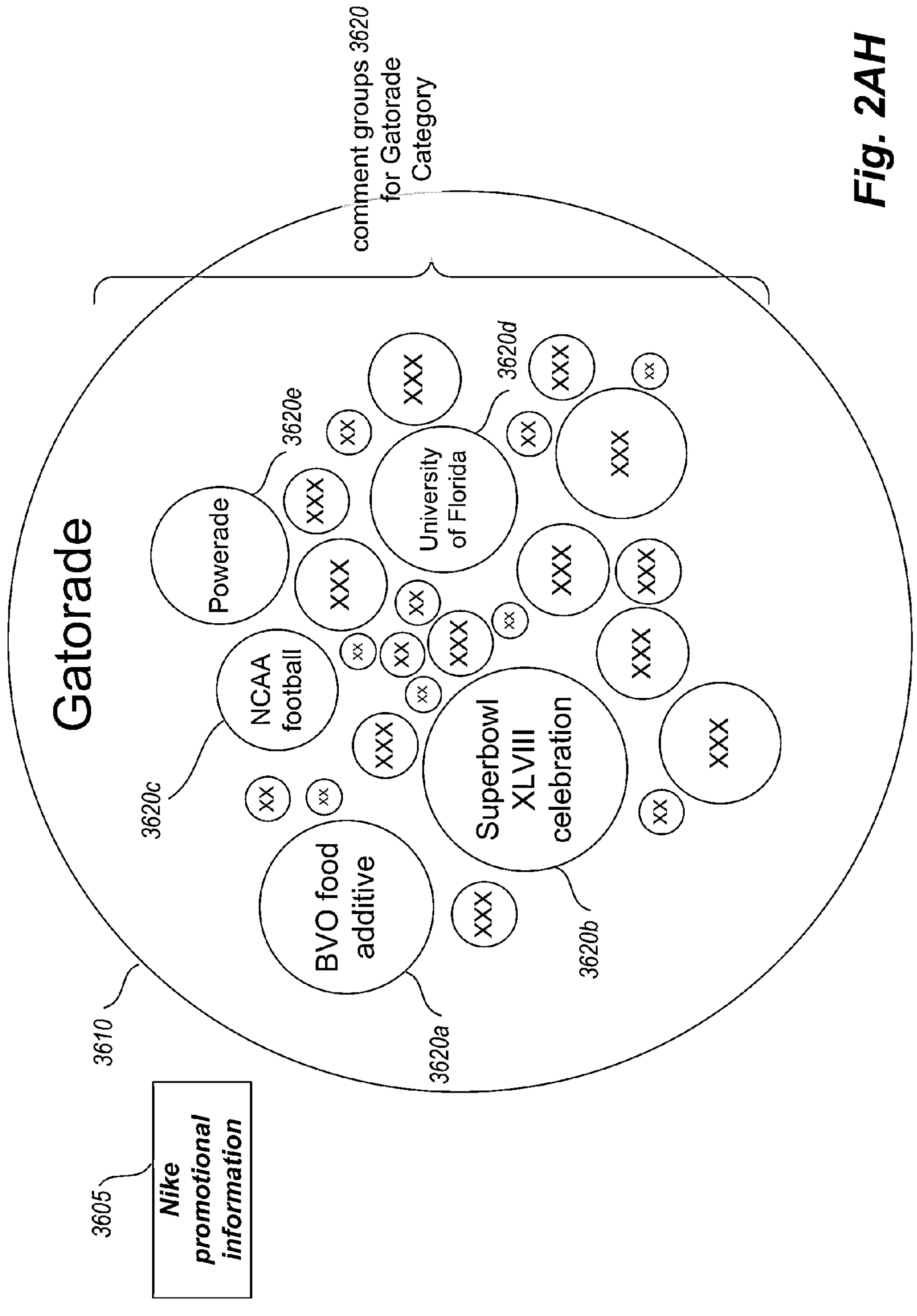
Figure 2A:
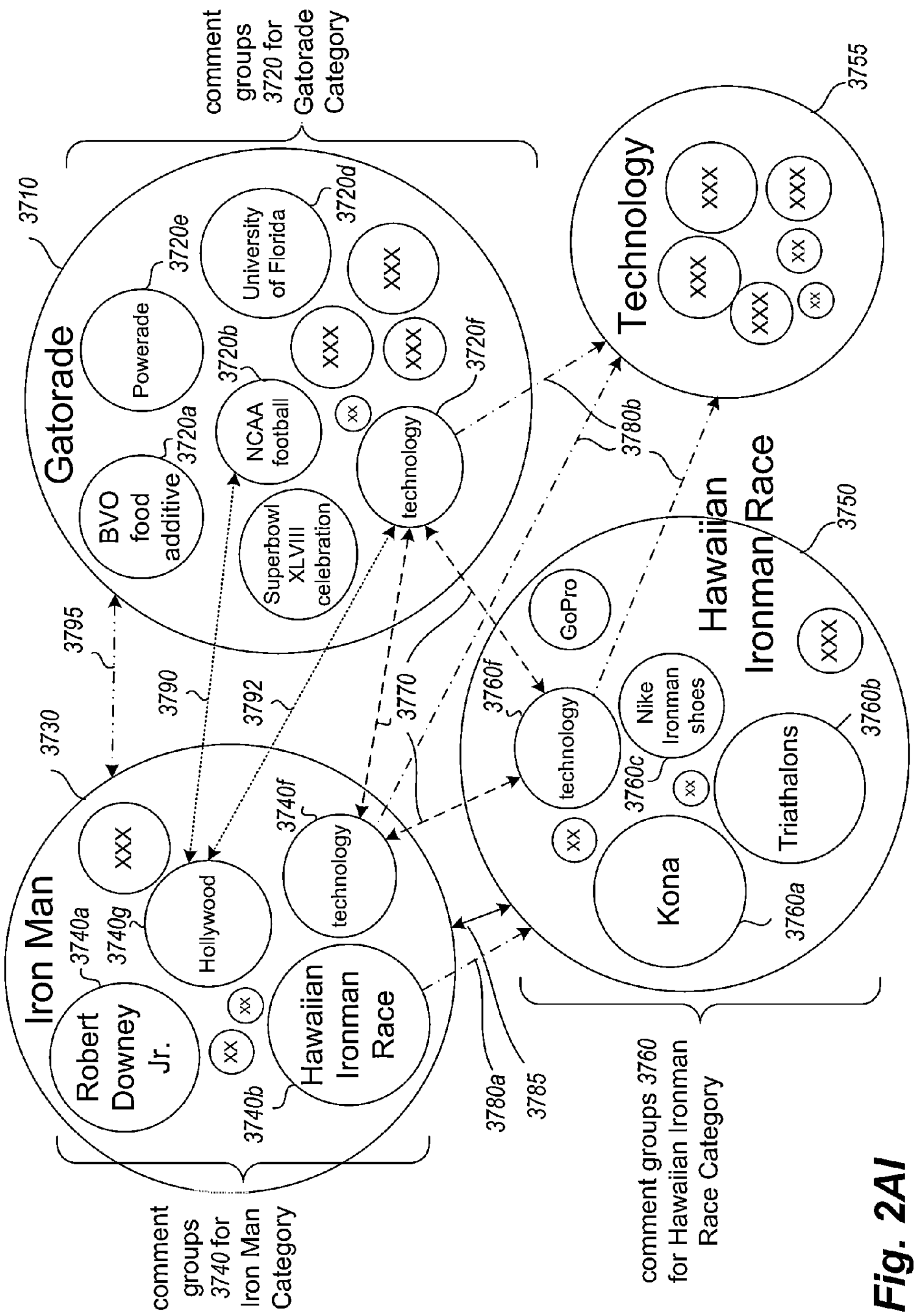
Figure 2A:
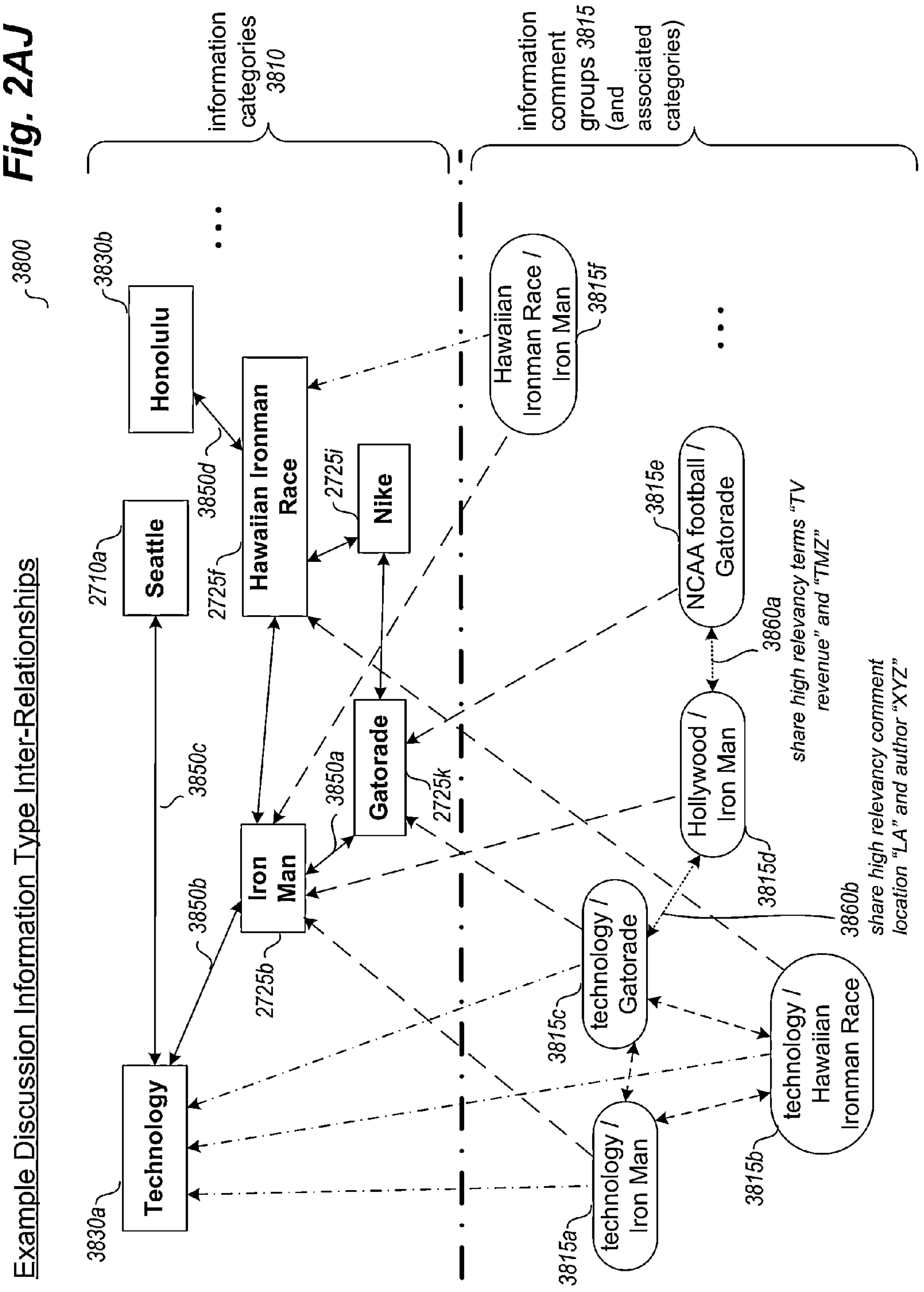
Figure 2A:
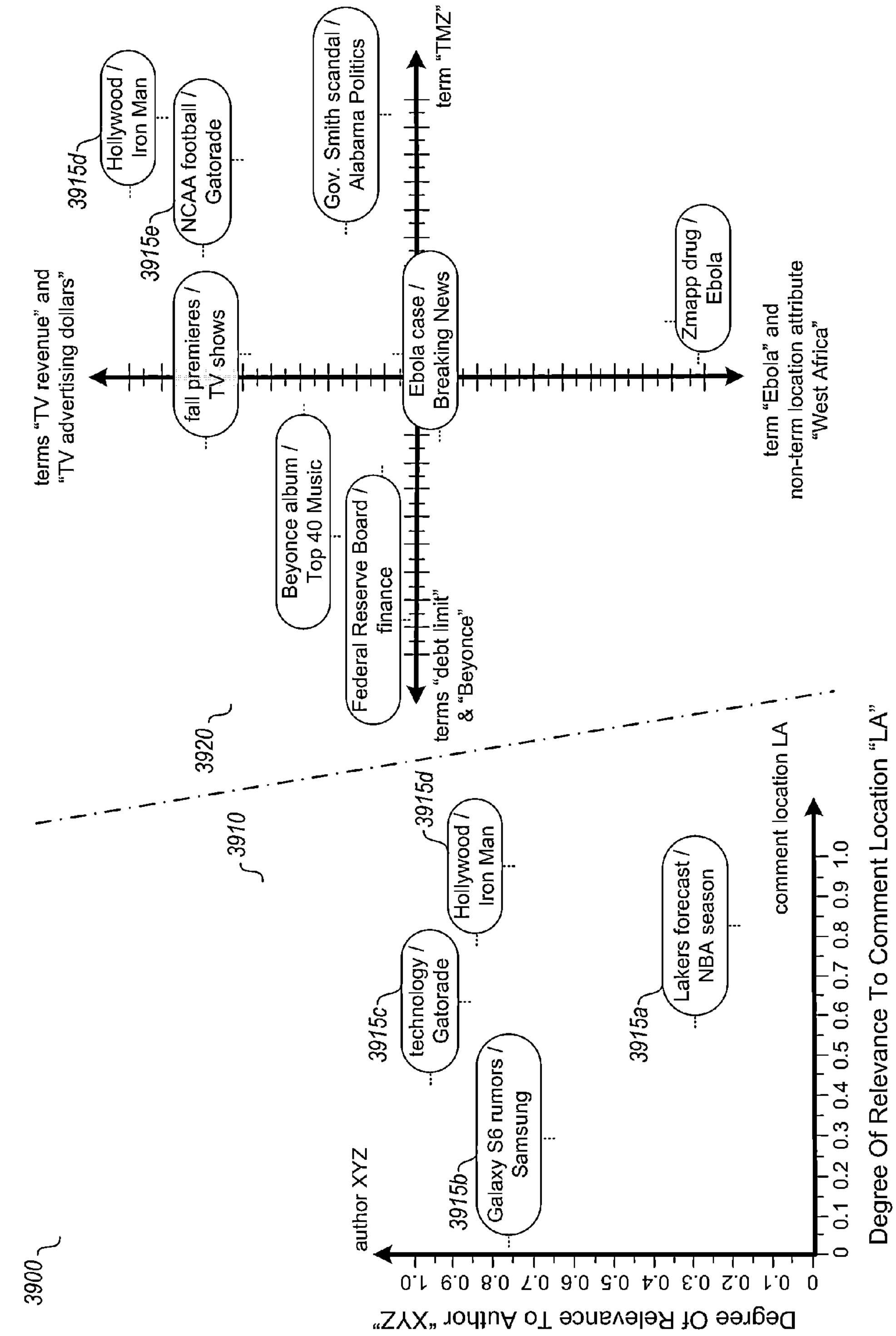

In particular, FIG. 2A illustrates several example user comments 205, along with information about some corresponding initial comment groups 230 that may be created based at least in part on these user comments. In this example, the user comments 205 include comments supplied by different users to a single comment data source (referred to in this example as "comment data source XXX"), such as the Twitter social networking service, although user-supplied information from multiple sources may be obtained and analyzed when creating initial comment groups in some embodiments. In addition, in this example, the illustrated user comments are submitted during a single time period (e.g., within a 30-minute time period), although particular timing information is not illustrated.

In particular, in this example, a first user comment 205*a* is shown, which includes various metadata 210*a* and other content (which in this example includes a title and accompanying textual content). The metadata 210*a* that is available to the GDAP service in this example includes an author user name 211*a*, an author user source-specific identifier 212*a*, information 213*a* about a geographical location from which the comment was supplied, and information 214*a* about the comment data source to which the user comment was supplied—at least some such information may not be displayed to other users, however, such as the geographical location information 213*a* and/or the comment data source information 214*a*. In this example, an analysis of the user comment may identify a variety of topics or other attributes that may be used for subsequent analysis, including in some embodiments and situations to treat each word or phrase in the contents as a topic, and to include each of the indicated types of metadata information 211*a*, 212*a*, 213*a* and 214*a* as a comment attribute. Examples of topics that may be used from the comment's contents include words in the title (e.g., "republican" 222*a*), words in the content body (e.g., "president" 220*a*, "Obama" 221*a*, "are" 224*a*, "the" 225*a*, etc.), and phrases (e.g., "debt limit" 223*a*). In other embodiments, a subset of the words/phrases and other attributes may be selected using one or more of a variety of types of information analysis techniques (e.g., TF-IDF), such as to eliminate words that are too common to be useful in identifying the subject matter of the comment (e.g., "the", "of", etc.), and to ignore differences in capitalization, hyphenation, stemming, etc.

The user comments 205*b* and 205*c* similarly include metadata 210 and other contents, and include various types of information that may be used as topics or other attributes for those comments. For example, user comment 205*b* includes the term "Obama" 222*b* in a manner similar to term 221*a* of comment 205*a*, as well as various other terms (e.g., "eagle" 221*b* and "10860" 228*b*). Comment 205*b* is also illustrated as including two in-line metadata hashtags that may be used as topics for the comment, which in this example are "#OvalOffice" 226*b* and "#Obama" 227*b*. In some embodiments and situations, terms such as "Obama" and "#Obama" may be grouped together and treated as the same topic, while in the illustrated embodiment the terms are handled separately. User comment 205*c* similarly includes various terms, which in this example includes a user-selectable link 229*c* (e.g., an HTML hyperlink, such as a link to additional external content)—in some embodiments, such links and/or associated metadata for the links (e.g., terms that are included as part of the link, tags or other metadata associated with the link, etc.) may be used as topics, and in some embodiments contents available from such a link may be retrieved and analyzed for use as contents and/or metadata of user comment 205*c* in a manner similar to other inline contents, while in other embodiments one or more both such types of information may not be used. In some embodiments, a user comment may further have additional information supplied by other users (e.g., commentary from the other users on the user comment) that may similarly be used as a topic or attribute for the comment (e.g., hashtags, such as #president or #funny; other types of tags, such as "funny" or "like" or "useful" or "☺"; etc.), although such types of additional information are not illustrated in this example, and may not be included as part of the content of the user comment in some embodiments. It will be appreciated that the identification of topics or other attributes for one or more user comments may be performed in a variety of manners in various embodiments. For example, in some embodiments the analysis is performed in a language-neutral manner (e.g., when extracting n-grams from the contents of a user comment), and thus the user comments may include comments in multiple languages—in some such embodiments, translation capabilities may further be employed to translate at least some user comments into one or more target languages before the identification of topics or other attributes for those user comments. As one non-exclusive example of a particular set of techniques for identifying at least some topics or other attributes for at least some user comments, the following steps may be employed: n-grams are extracted from comment title and body text by first converting the text to a collection of n-grams (e.g., bi-grams or tri-grams); the n-grams containing predefined common words in at least some positions are removed from consideration; a most significant set of X n-grams are then selected based on scoring (e.g., via a pointwise mutual information, or PMI, algorithm), with X being a configurable predefined number or otherwise being determined based on the available data (e.g., a specified percentage); and changes in significance of the n-grams are tracked as more comments containing them are identified. Furthermore, such terms or other n-grams that are identified as being relevant for such a user comment may be used not only in associating particular user comments with one or more particular comment groups and/or categories as discussed below, but also to identify relevant terms or other n-grams for those comment groups and/or categories, such as based at least in part on the scores generated for those terms or other n-grams (e.g., using a PMI algorithm or in other manners), as discussed further below.

After the topics and other attributes are identified for a variety of user comments being analyzed, comments groups may be created for each of some or all of the topics and other attributes (e.g., particular geographical locations, particular author users, etc.). A few example comment groups 230 are illustrated, along with information about particular example comments included in each comment group. For example, the "President" comment group 230*a* is based on the topic "president", and includes at least comments 205*a* and 205*c*, since those comments include terms 220*a* and 222*c*, respectively, that match the topic (but does not include comment 205*b* in this example, despite its contents being related to the president of the United States, since the term "president" is not included in comment 205*b*). As discussed in greater detail elsewhere herein, the contents and/or metadata associated with the comments in the comment group may further be used to identify terms and other attributes distinct from "president" that are relevant for the comment group—for example, based on the contents of comment 205*a*, possible other relevant attributes for the comment group might include "Obama", "Republican", "debt limit", "politics", "Andy Jones", "Washington DC", "Comment Data Source XXX", etc., optionally with relevance scores for each such term with respect to comment 205*a* being used as a starting point for the relevance of the term to the comment group, and with such relevance of particular such other attributes increasing for the comment group as other comments in the comment group also include such other attributes, although relevance of particular attributes for the comment group may be ranked relative to other relevant attributes for the comment group in other manners in other embodiments). Comment groups 230*b* and 230*c* further correspond to the topics "Obama" and "#Obama", respectively, and the comment group based on the topic "the" reflects that most or all comments may include such common terms. Comment groups 230*e* and 230*f* provide examples of comment groups corresponding to topics based on comment attributes from metadata rather than contents of at least some user comments, such as for comment group 230*e* corresponding to a particular geographical location (in this example, the city of "Philadelphia") and including any comments supplied from that geographical location (with other comment groups, not shown, corresponding to other geographical locations), and for comment group 230*f* corresponding to a particular author user (in this example, user "Andy Jones") and including any comments supplied by that author user (with other comment groups, not shown, corresponding to other author users). It will be appreciated that geographical locations and users may be represented in a variety of manners in various embodiments, including at differing degrees of specificity (e.g., to represent geographical locations by individual addresses, GPS coordinates, neighborhoods, cities, regions, counties, states, countries, etc.; and to represent users via legal names, source-specific login names or screen names or other identifiers, numeric or other unique identifiers, etc.). While not illustrated here, comment groups may also be created for each of multiple distinct comment data sources, to include comments supplied to those comment data sources.

FIG. 2B continues the example of FIG. 2A, and in particular illustrates additional user comments and corresponding information for some of the created comment groups 230. In particular, after user comments are analyzed for a time period and initial user comment groups are created, those user comment groups may in some embodiments and situations be supplemented to include information about additional related user comments, such as from one or more additional supplemental comment data sources.

In the example of FIG. 2B, additional user comments are obtained from two additional comment data sources, referred to in this example as "comment data source YYY" (as shown in information 244*a*) and "comment data source ZZZ" (as shown in information 244*b*). For example, comment data source YYY may include primarily textual comments, in a manner similar to that comment data source XXX (e.g., posts to the Facebook social networking service), while the comment data source ZZZ may include primarily non-textual comments that include some textual tags or other commentary (e.g., images posted to the Pinterest or Instagram social networking sites). Various other types of comments and content items may be analyzed in other embodiments, as discussed in greater detail elsewhere.

In this example, the additional user comment 245*a* from comment data source YYY includes an additional comment from author user "Andy Jones" 241*a* who also supplied comment 205*a* of FIG. 2A, although the metadata available to the GDAP service from comment data source YYY does not include geographical location information or a source-specific identifier. Nonetheless, if the GDAP service is able to identify the two users as the same person, such as by creating, maintaining and using a mapping between different identifiers for a particular user, the "Andy Jones" comment group 230*f* will be modified to include this comment 245*a*, as shown in the modified comment group information 235 of FIG. 2B—alternatively, in some embodiments, such a comment would be added to the comment group without attempting to verify a common identity, such as based on the author name matching for both comments. Comment 245*a* is also added to the "#Obama" comment group 230*c* based on its inclusion of a #Obama hashtag in its comments.

Additional user comment 245*b* from comment data source ZZZ includes a photo and related supplementary text, and is added to the "Obama" comment group 230*b* (based on the term being included in the textual commentary) and the "Philadelphia" geographical location comment group 230*e* (based on geographical location information 243*b*) for the comment 245*b*. While not illustrated here, in some embodiments an analysis of data in a user comment may be performed to identify additional attributes that may be used to associate the user comment with one or more appropriate comment groups. For example, with respect to the example user comment 245*b*, an image recognition process and/or other analysis of the photo may be performed to identify additional metadata attributes (e.g., based on identified objects, people, locations, etc.) for the user comment—illustrative examples include the following: to recognize President Obama within the photo, and thus associate the user comment with comment group 230*b* even if the provided commentary was absent; to recognize Washington DC or the Capitol building from the photo, and associate the user comment with corresponding comment groups; to examine location and time metadata embedded in the photo or otherwise associated with the photo, and use the location data to associate the user comment with a corresponding comment group; etc. If additional comments 245*a* and 245*b* were, for example, added to the "President" comment group 230*a* of FIG. 2A, the additional contents of those additional comments could be used to add additional relevant attributes for the comment group (e.g., "inauguration", "Euro", etc.) and/or to increase the relevance scores or other relevance measure of other relevant attributes for the comment group (e.g., "Obama", "debt limit", "Andy Jones", etc.). In some embodiments, a comment group 230*e* will include both comments that are supplied from the geographical location of Philadelphia and comments that include the term "Philadelphia" in the contents or other attributes of the comment, while in other embodiments the comment group 230*e* will only include comments that are supplied from the geographical location of Philadelphia. The modified comment group information 235 further illustrates an example of a data source comment group 230*g* in this example, which corresponds to comment data source XXX, although such a comment group 230*g* would not be modified in this supplemental operation in this example since the additional user comments are not from the comment data source XXX. In addition, if new topics or attributes are included in the additional user comments that were not present in the initially analyzed user comments (e.g., comments from author user "Jenny Smith" 241*b*), new comment groups may be created for such new topics or attributes in some embodiments, while in other embodiments such new comment groups will not be created.

FIG. 2C continues the examples of FIGS. 2A and 2B, and in particular illustrates determining information for a category of interest based in part on the user comments and created comment groups discussed in FIGS. 2A and 2B. In particular, definition information is first obtained for one or more categories of interest, and matching user comments are identified, as reflected in section 250 of FIG. 2C. In this example, a first "President Obama" category has been defined, which in this example includes terms "President", "Obama", and "White House" in its definition, and a second "NFL" category has been defined, which in this example includes terms "NFL" and "football". The various user comments for the time period of interest are searched, and any comments matching one or more of the definition terms is associated with the corresponding category. None of the example user comments is associated with the NFL category in this example, as none of the user comments included the terms "NFL" or "football" (although user comment 205*c* of FIG. 2A did have subject matter corresponding to a particular NFL football team). All of the example user comments have been associated with the President Obama category in this example, as each comment included at least one of the category definition terms (although the "president" term included in the football-related user comment 205*c* of FIG. 2A did not actually refer to President Obama). It will be appreciated that the matching of comments and categories may be performed in a variety of manners in various embodiments, including based on contents of the comments and/or based on metadata associated with the comments. For example, in some embodiments, a match between a term or attribute in a comment and a term or attribute for a category definition may be identified and used to associate the comment with the category, such as if measured by a vector inner product or other matching technique. Alternatively, a comment may be projected into a comment group subspace, with the comment group having a projection into a category. In addition, if a photo has been associated by one or more users with an "Obama" tag, the photo (and/or comment that contains the photo) may be associated with the President Obama category 250*a*, even if there is no other mention of "Obama" in the contents and/or other metadata for the photo/comment. Furthermore, rather than such tags being supplied by a user author of a comment and/or by other user reviewers of the comment, such tags may in some embodiments and situations be provided by a comment data source or other entity that provides information about and/or access to comments. Similarly, one possible source for category definition information in at least some embodiments includes such comment data sources or other entities that provide information about and/or access to comments. In addition, in at least some embodiments, some or all of the comments associated with a category may be used to determine relevant terms or other attributes for the category that are distinct from the terms included in the category definition, such as based on aggregating information about the relevant terms or other attributes for those comments—thus, using comments 205*a*, 245*a* and 245*b* as examples, the terms or other attributes determined to be relevant for the "President Obama" category may include "Republican", "debt limit", "politics", "Andy Jones", "Washington DC", "Comment Data Source XXX", "inauguration", "Euro", etc. (and with at least some such relevant attributes each having a determined relevance score for the category or otherwise having their relevance be ranked relative to other relevant attributes for the category).

After the matching user comments are associated with a category in section 250, all of the created comment groups to which those matching user comments belong are then identified, as shown in part in section 255 for the President Obama category. It will be appreciated that each user comment may be associated with multiple comment groups, and thus a large number of comment groups may be initially identified for a category. In the example of section 255, the identified comment groups are then analyzed to determine their relevance to the associated user comments shown in section 250. In particular, in this example, the frequency is determined for each identified comment group that the associated user comments in section 250 are included within that comment group. As an example, information 260 illustrates that 10,000 user comments have been identified as being associated with the "President Obama" category in section 250 (although only a small fraction are shown in section 250). Using the "The" comment group discussed in FIG. 2A as an example, of the 10,000 user comments that are associated with the "President Obama" category in section 250, almost all of those associated user comments include the term "the" and are thus included in the "The" comment group. In this example, the identified comment groups for the "President Obama" category are listed in section 255 in order of decreasing frequency, with the "The" comment group having the highest listed frequency, and a "Chip Kelly" comment group having a lowest listed frequency of 5 comments of the 10,000 associated user comments. For example, user comment 205*c* of FIG. 2A represents one of those 5 comments, since it includes the terms "Chip Kelly" and "president", causing it to be included in the associated user comments in section 250, but to have only 4 other comments in this time period that included both "Chip Kelly" and one of the category definition terms as topics or other attributes of those user comments.

Additional processing is then performed to select a subset of the identified comment groups as being associated with the "President Obama" category for this time period. In particular, as shown in information 260, an average frequency is determined for the identified comment groups, and frequency-based minimum and maximum inclusion thresholds are determined based in part on the average frequency. As one example, the standard deviation (not shown) may be further determined for the frequency values, and the minimum and maximum inclusion thresholds may be determined based in part on the standard deviation. In this example, the lines 255*a* and 255*b* in section 255 denote the lines for the maximum and minimum inclusion thresholds, respectively. Accordingly, a term such as "the" is excluded in this example as being too ubiquitous or general for the category, and a term such as "Chip Kelly" is excluded as being too rare or specific (or irrelevant) for the category. The topics or other attributes of the remaining identified comment groups may then be identified as topics that are relevant to the "President Obama" category for this time period, including topics such as "Obama," "President," "democrat," "inauguration," "debt limit," and "republican," as well as geographical location attributes "Washington DC" and "Chicago"—while no author user attributes or comment data source attributes are illustrated in this example, it will be appreciated that such attributes may similarly be identified and included. It will further be appreciated that some of the identified topics for this category may be fairly constant over different time periods (e.g., "President" and "democrat"), while other identified topics may change over time to reflect subject matter that is or is not of sufficient current interest at a given time (e.g., such that "inauguration" and/or "debt limit" may not be included in this category during some time periods). In addition, in at least some embodiments, some or all of the comment groups associated with a category may be used to determine relevant terms or other attributes for the category that are distinct from the terms included in the category definition, such as based on aggregating information about the relevant terms or other attributes for those comment groups, in a manner similar to that discussed above for aggregating relevance of terms or other attributes for a comment group from the multiple comments included in the comment group. In this example, possible relevant terms or other attributes for the category may include "Republican", "debt limit", "politics", "Andy Jones", "Washington DC", "Comment Data Source XXX", "inauguration", "Euro", etc. —it will be appreciated that some or all such relevant terms or other attributes for the category may in some circumstances match the topics of the comment groups included in the category (e.g., "Republican", "debt limit", "inauguration", etc. in this example), and that some or all such relevant terms or other attributes for the category may in some circumstances not match the topics of the comment groups included in the category (e.g., "politics", "Andy Jones", "Washington DC", "Comment Data Source XXX", "Euro", etc. in this example).

FIG. 2D continues the examples of FIGS. 2A-2C, and includes information about quantifying information about the user comments included in a comment group or about the user comments associated with a content category, and about using the quantified information to predict information about additional user comments that are expected to be received. In particular, FIG. 2D illustrates a histogram graph 260 that may be constructed to represent information about such user comments for a time window, with each time period of a defined length (e.g., 30 minutes) having a distinct value for the histogram. In this example the histogram is constructed using 30 prior time periods (for a time window of 15 hours), although in other embodiments a time window of other lengths may be used (e.g., 24 hours, 48 hours, 72 hours, etc.). If the histogram 260 corresponds to a particular comment group, such as the "inauguration" comment group that is one of the determined comment groups for the "President Obama" content category discussed in FIG. 2C, the shape of the histogram may reflect that interest in a distributed group discussion involving the inauguration topic has recently increased, but may recently be decreasing over the last 3 time periods. Such quantified information may provide various types of benefits to various entities, such as people planning for attendance at inauguration-related activities, companies that are offering products or services affected by inauguration-related activities, news organizations or other entities that track interest in political topics, etc., particularly if the quantified information is available in a real-time or near-real-time manner with respect to the underlying user comments (e.g., within minutes or hours).

While such quantified information may be of use to reflect recent events and status, such quantified information may further be used to predict information about additional user comments that are expected to be received, including changes with respect to topics that are part of a category, and/or changes with respect to how many, when, where and by whom that expected future user comments will be received for a particular comment group or content category. FIG. 2D further illustrates one example of how such prediction may be performed based on the histogram graph 260, which involves matching the histogram graph 260 to a defined prediction template 265. The prediction template 265 may, for example, be one of multiple defined prediction templates that are available to be used, with some or all such defined prediction templates being based at least in part on prior actual user comments have been received. In particular, in this example, a portion 260*a* of the histogram graph 260 is matched to a corresponding portion 265*a* of a prediction histogram that is part of the template 265—such matching may be performed in various manners, such as by measuring differences for values for corresponding time periods in the two histograms being compared, or more generally using techniques to compare two curves or other shapes. It will be appreciated that the matching of a histogram graph to a prediction template may be performed in a variety of manners in various embodiments. A non-exclusive list of techniques that may be used as part of the matching includes the following: root-mean-square ("RMS") error or deviation; vector inner product; absolute difference; information-theoretic measures (e.g., the Kullback-Leibler divergence); etc. In addition, in some embodiments, the prediction templates are selected in a manner that is not specific to particular categories and/or comment groups, such as to instead identify and use patterns over time that are repeatedly observed across comment groups and/or categories (e.g., by promoting and using the prediction templates that are successful over time, while decreasing and removing the use of prediction templates that are not successful). Furthermore, in some embodiments and situations, a histogram template of a given length of time (e.g., 72 hours) with data points for each time period of interest (e.g., 30 minutes) may consider one or more prediction templates with respect to each data point (e.g., with each such prediction template being for the same given length of time).

Based on the match to portion 265*a* of prediction template 265, some or all of the additional portion 265*b* of the prediction template 265 may be used to predict additional expected future comments that will be received for the comment group or category represented by histogram graph 260, such as after any appropriate scaling is performed. In particular, in this example, the additional portion 265*b* of the prediction template 265 may be used to predict that the quantity of user comments will continue to fall for five more time periods, and to then level off for about eight additional time periods, after which the quantity will rise again somewhat before gradually decreasing. It will be appreciated that a variety of types of shapes may be represented by prediction templates in a variety of manners, such as to reflect a variety of types of distributed group behavior related to an underlying discussion that is occurring.

By generating such quantified information for each determined comment group for a content category, and by predicting additional corresponding information for each such comment group, a variety of types of information may be determined for the content category. As one example, if the quantity of comments that are predicted to occur for a first comment group decreases sufficiently, while the comments that are predicted to occur for a second comment group increases, the increasing influence of the topic for the second comment group to the content category may be determined. In addition, the time at which a particular topic will stop and/or start being a sufficiently relevant topic for a content category may be predicted. Based on such information, the GDAP service or a client that receives such information may be able to take various types of corresponding actions, such as to reduce or stop activities related to topics that are losing relevance, to increase or start activities to try to increase interest in a topic of importance that is otherwise losing relevance, to target additional activities related to topics that are increasing in relevance, etc. In addition, when such quantified information is generated for geographical location attributes, comment data source attributes, and/or author user attributes that are determined topics for a content category, and when additional corresponding expected future information is predicted for such attribute-based comment groups, a variety of additional types of information may be determined for the content category. For example, not only can relative differences be determined in the relevance of different topics to a category, but such differences can similarly be tracked and predicted across different geographical areas (e.g., this topic is increasing in relevance in location A, but remaining constant in location B), different comment data sources, and/or different author users. Differences across other types of attributes may similarly be tracked and predicted, and such information about attribute-based comment groups may similarly be used by the GDAP service or a client that receives such information to take various types of corresponding actions.

FIG. 2E continues the examples of FIGS. 2A-2D, and includes additional information about using quantified information to predict information about additional user comments that are expected to be received. In particular, FIG. 2D provided an example of performing prediction based on a defined prediction template that is determined to sufficiently match a generated histogram. In other embodiments or situations, such as when no such defined prediction templates exist or sufficiently match the generated histogram, prediction activities may be performed for a generated histogram in other manners, with FIG. 2E providing additional details about one such example of other prediction activities.

FIG. 2E illustrates a histogram graph 270 that is similar to graph 260 of FIG. 2D, but that includes data for additional time periods, and in particular corresponds to a 72-hour sliding time window of prior time periods. In order to predict additional future user comments that will be received based on the existing actual comments that have been received during the time window, a trend line 280 is determined from the existing data in the generated histogram, and is projected across one or more future time periods of interest (in this example over a future period of at least 24 hours). While particular future values are not individually illustrated, they can be easily determined for a particular future time period from such a prediction trend line. It will be appreciated that trend lines may be generated in various manners in various embodiments, and that a $2^{nd}$ degree polynomial least squares fit may be used in at least some embodiments to generate such a prediction trend line—in addition, while the trend lines illustrated in FIG. 2E are linear, in other embodiments and situations such trend lines that are generated and used may have a variety of other shapes (e.g., various types of curves, such as based on higher-order polynomials used with least squares fit, or otherwise based on exponential and/or weighted techniques). In addition, in some embodiments a minimum threshold may be established for having sufficient data to generate such trend line predictions, such as a minimum quantity in one or more time periods and/or a minimum number of time periods with quantified values, such that the trend line prediction may not be performed until the sufficient data threshold is reached.

In addition to using a trend line prediction to generate prediction information for future time periods, the same or similar types of trend line prediction information may be used to assist in generating new defined prediction templates. For example, considering the histogram graph 270, various portions of the histogram graph may be selected for additional analysis, such as the last 24 hours (the portion labeled "72" that includes histogram data), the last 48 hours (the portions labeled "48" and "72" that include histogram data), the first 24 hours (the portion labeled "24" that includes histogram data), the first 48 hours (the portions labeled "24" and "48" that include histogram data), etc. For each such portion of the histogram, a prediction trend line may be generated based on the data in that portion, and the subsequent portions of data about actual user comments may be used to determine if the prediction trend line accurately predicted information about those actual user comments. If the prediction trend line for a portion of the histogram does accurately predict such information, that portion of the histogram may be selected to be used or evaluated as a prediction template for performing future predictions, and/or that portion of the histogram plus the later actual matching predicted data may be selected for use as such a prediction template. In the example of FIG. 2E, a prediction trend line 275*a* has been generated to correspond to the portion of the histogram for the first 24 hours, a prediction trend line 275*b* has been generated to correspond to the portion of the histogram for the second 24 hours, and a prediction trend line 275*c* has been generated to correspond to the portion of the histogram for the third (or last) 24 hours, with neither of the prediction trend lines 275*a* and 275*b* appearing to accurately predict data for the next 24 hour period in this example. When evaluating a prediction trend line that uses the most recent actual data (e.g., trend lines 275*c* or 280), the evaluation based on actual data may be deferred until a future time when that actual data is available, such as after an additional 24 hours have passed. It will be appreciated that such matching of a predicted trend line to actual user comment data may be performed in various manners, such as by measuring differences for values for one or more time periods between the predicted values and the actual values, or more generally using techniques to compare two curves or other shapes. It will also be appreciated that the matching of a trend line to a histogram graph may be performed in a variety of manners in various embodiments, including in some embodiments to use techniques similar to those previously described with respect to matching histogram graphs and prediction templates.

FIGS. 2F-2K continue the examples of 2A-2C, and illustrate alternative techniques for predicting future information about a comment group and/or category and/or an intersection of a comment group and a category (e.g., based on the content items that are part of the comment group and that are associated with the category). In particular, in the example embodiments of FIGS. 2F-2K, summary information is determined and aggregated for multiple content items (e.g., the content items of a comment group) at a time period, such as to correspond to multiple selected factors for the multiple content items, and is encoded to represent the summary information in a compact form. Additional information is similarly summarized and encoded for other time periods for related groups of multiple content items for those same selected factors (e.g., for the content items that are part of a single comment group during each of successive periods of time), and the encoded summary information for each of the time periods during a time window of interest is aggregated—such an aggregation may include, for example, a succession of the encoded summary information for the selected factors for each of multiple successive time periods during the time window. Such aggregated encoded summary information may then be used in various manners, including to predict future information for related future groups of content items (e.g., for future content items that will belong to the same single comment group), such as with respect to one or more of the selected factors. In at least some embodiments, such prediction may include matching such aggregated encoded summary information to a prediction template that similarly includes encoded summary information for multiple prior time periods for some or all of the same selected factors, and then using an additional portion of encoded summary information for that prediction template (e.g., for later time periods) to enable the prediction.

In particular, FIG. 2F illustrates an example of various types of information that may be quantified for an example comment group (or other group of related content items). An example table 1000 is illustrated in FIG. 2F, with each of the rows 1001*a*-1001*f* corresponding to a different successive time period (e.g., successive 30-minute time periods) and including various types of quantified information for the example comment group during that time period. In this example, the types of quantified information 1003 include a total quantity 1003*a* of content items, smaller quantities 1003*b*-1003*c* that represent a subset of the total quantity of content items at each of multiple different geographical locations of interest, other smaller quantities 1003*d*-1003*e* that represent a subset of the total quantity of content items supplied via each of multiple different data sources, other smaller quantities 1003*f*-1003*g* that represent a subset of the total quantity of content items supplied by each of multiple different author users, information 1003*h* to indicate an assessed aggregate sentiment for the comment group (e.g., using an automated sentiment analysis), and information 1003*i* to indicate an assessed most influential author for the comment group—it will be appreciated that various other types of information may be quantified in some embodiments (e.g., a degree of relevance of one or more particular terms or other attributes for a comment group, category and/or category/comment group intersection; the presence or absence of one or more particular relevant terms or other attributes for a comment group, category and/or category/comment group intersection; etc.), whether instead of or in addition to the illustrated types of quantified information.

A comparison or other analysis of the quantified information in the table 1000 provides various information about the changes of the quantified information over time, including the following non-exclusive examples: a change in total quantity of content items over successive time periods, such as may be measured in an absolute number or percentage change (e.g., to determine that the total quantity increases in amount by approximately the same quantity between each of the first four time periods, which are time period N through time period N+3 as shown in rows 1001*a*-1001*d*, but the increase slows in time period N+4); changes between different geographical locations over time (e.g., to reflect that location 1 initially has much larger quantities that location 2 but that the quantities for location 1 begin to decrease in time period N+2, while the quantities continue to grow for location 2 until time period N+3 and surpass the quantities for location 1 in time period N+2); changes between different data sources over time (e.g., to reflect that data source 1 initially has much larger quantities than data source 2 but that the quantities for data source 1 begin to decrease in time period N+2, while the quantities continue to grow for data source 2 until time period N+3 and surpass the quantities for data source 1 in time period N+3); changes between different author users over time (e.g., to reflect that author user 1 initially supplies larger quantities that author user 2 but that the quantities for author user 1 begin to decrease in time period N+2, while the quantities continue to grow for author user 2 until time period N+3 and surpass the quantities for author user 1 in time period N+3); changes in aggregate user sentiment, such as to reflect that user sentiment changes from positive (with value ‘3’) to neutral (with value ‘2’) in time period N+3 and to negative (with value ‘1’) in time period N+5; changes in the most influential author user, such as to reflect that author user 1 continues to be the most influential in time period N+3 despite not supplying the most content items during that time period, and that author user 2 surpasses author user 1 as the most influential in time period N+4; etc. It will be appreciated that various other types of information may be determined in some embodiments from analyses of quantified information, whether instead of or in addition to the discussed types of information.

FIG. 2G continues the example of FIG. 2F, and illustrates how various types of summary information may be encoded for the example comment group, such as with respect to various types of selected factors of interest. In particular, FIG. 2G illustrates information 1100 to reflect 3 different types of encoding schemes that may be used to represent different types of selected factors and corresponding data summarizations, with each of the rows 1101*a*-1101*f* corresponding to the same successive time periods shown in rows 1001*a*-1001*f* of FIG. 2F. Each of the rows additionally shows an encoded summary value for the example comment group during that time period for each of the 3 example encoding schemes. In this example, the encoding scheme information 1103 include information 1103*a* for encoding scheme 1, information 1103*b* for encoding scheme 2, and information 1103*c* for encoding scheme.

FIG. 2G further illustrates information about the encoding scheme 1, which in this example represents 5 selected factors and data summarization types, as follows: a) total comment quantity information (based on column 1003*a* of FIG. 2F), with the corresponding encoding scheme value being encoded into one of four values 0-3 with corresponding indicated ranges of quantity values; b) percentage quantity change information relative to the prior time period, with the corresponding encoding scheme value being encoded into one of ten values 0-9 with corresponding ranges of percentage change values; c) aggregate sentiment information (based on column 1003*h* of FIG. 2F), with the corresponding encoding scheme value being the same values as shown in column 1003*h*; d) an indicator of the data source with the highest quantity for the time period (based on columns 1003*d*-1003*e* of FIG. 2F), with the corresponding encoding scheme value being an identifier with a value in the range of 0-63; and e) an indicator of the data source with the second highest quantity for the time period (based on columns 1003*d*-1003*e* of FIG. 2F), with the corresponding encoding scheme value being an identifier with a value in the range of 0-63.

FIG. 2G also illustrates information about the alternative encoding scheme 2, which in this example represents 4 selected factors and data summarization types—for example, the first factor for encoding scheme 2 represents total comment quantity information in a manner similar to factor (a) of encoding scheme 1, but with different encoding scheme values (in this example, with the quantity being encoded into one of ten values 0-9 with corresponding indicated ranges of quantity values that are different from those for encoding scheme 1); the second factor for encoding scheme 2 represents an indicator of the data source with the highest quantity for the time period like factor (d) of encoding scheme 1; and the third and fourth factors for encoding scheme 2 represent different types of information not represented in encoding scheme 1. While details about the alternative encoding scheme 3 are not shown, it also represents 5 selected factors and data summarization types but they differ from those of encoding scheme 1 in one or more manners (e.g., to correspond to an indicated type of information about particular determined relevant terms or other attributes for a comment group, category and/or category/comment group intersection). It will be appreciated that various other types of information may be encoded in various other manners in other embodiments, whether instead of or in addition to the illustrated types of encoded summary information.

FIG. 2H continues the examples of FIGS. 2F-2G, and illustrates an example of how the encoded summary information for the example comment group and a particular encoding scheme may be aggregated for multiple time periods of interest. In particular, in the example of FIG. 2H, an aggregation 1200 is shown corresponding to a time window of six time periods, which in this example includes the six time periods whose encoded summary information is shown in rows 1101*a*-1101*f* and column 1103*a* for encoding scheme 1 of FIG. 2G. In the example of FIG. 2H, the aggregation 1200 includes the six encoded summary values for the six time periods in succession, with spaces between the values for readability, but multiple such encoded summary values may be aggregated in other manners in other embodiments (e.g., as a string with no spaces between the successive values, by using one or more characters other than a space to separate successive values, by combining encoded summary values for a particular selected factor in other manners, etc.). In addition, while not shown in FIG. 2H, similar or other types of aggregations may be generated for one or more other encoding schemes, such as by using the encoded summary values in columns 1103*b* and/or 1103*c* of FIG. 2G for encoding scheme 2 and/or 3.

FIG. 2I continues the examples of FIGS. 2F-2H, and illustrates an example of how an aggregation of encoded summary information for the example comment group and a particular encoding scheme may be used to predict future values for one or more of the selected factors represented by the encoding scheme. In particular, in the example of FIG. 2I, the aggregation 1200 is shown again, along with several prediction templates 1301-1304 that also include encoded summary information. In this example, prediction template 1 (reference numeral 1301) and prediction template 2 (reference numeral 1302) are alternative prediction templates which both include summary information that is encoded using encoding scheme 1. In addition, prediction template 1 includes an initial portion 1301*a* that in this example represents six time periods, and an additional portion 1301*b* that represents six additional successive time periods—the other templates 1302-1304 similarly include initial portions and additional portions, with the additional portions being shown in bold in this example.

Furthermore, prediction template 3 (reference number 1303) illustrates that different prediction templates may include different amounts of data for the additional portions, such as if prediction templates 1 and 2 are used to predict future information for up to 6 future time periods, and prediction template 3 is used to predict future information for an additional number of future time periods (e.g., up to 24, up to 48, up to 72, up to 144, etc.)—in other embodiments, all of the prediction templates may include the same amounts of data for the additional portions, but different subsets of the additional portion data may be selected and used (e.g., if the additional portion includes data for 144 time periods, but at times only the next six time periods may be selected and used). In addition, prediction template 4 (reference number 1304) illustrates that different prediction templates may include summary data that is encoded using different encoding schemes, such as to include an initial portion and additional portion whose summary data is encoded using encoding scheme 2.

The initial portions of one or more of the prediction templates may be matched to the aggregation 1200 in various manners in various embodiments—in this example, matching information is illustrated for prediction templates 1 and 2, using a bitwise comparison with a binary yes or no determination of a match. Thus, in comparing the first encoded summary value "23313" of the aggregation 1200 to the first encoded summary value "23276" of the initial portion 1301*a* of prediction template 1, a matching value of "YY---" results, with 'Y' representing a binary yes and "-" representing a binary no, based on the initial '2' of each of the values matching, the next '3' of each of the values matching, the next '3' of the aggregation not matching the next '2' of the prediction template, the next '1' of the aggregation not matching the next '7' of the prediction template, and the next '3' of the aggregation not matching the next '6' of the prediction template. Similar matching values are shown for the remaining part of the initial portion of prediction template 1, as well as for the initial portion of prediction template 2. In other embodiments, a degree of match between two pieces of encoded summary information may be made in manners other than a binary yes or no (e.g., for a selected factor whose values are enumerated with multiple numerical values, to determine a numerical difference between two values).

Given multiple candidate prediction templates such as prediction templates 1 and 2, a best match to the aggregation 1200 may be determined in various manners in various embodiments. In some embodiments, the overall degree of match between the entire aggregation and the entire initial portion may be used, which in this example results in prediction template 2 being a better match to aggregation 1200 than prediction template 1—in particular, prediction template 2 has an 80% degree of overall match (24 matches out of 30 possible values), while prediction template 1 has only a 30% degree of overall match (9 matches out of 30 possible values). If prediction template 2 is selected (e.g., based on being the best match; based on having a degree of match above a defined threshold, such as 75%; etc.), some or all of the additional portion of prediction template 2 may be used to predict future information for one or more of the selected factors represented by encoding scheme 1, as discussed in greater detail with respect to FIG. 2J.

In other embodiments, the degree of match between a subset of the aggregation and a subset of a prediction template's initial portion may instead be assessed. For example, encoding scheme 1 includes information about 5 selected factors, but only 1 factor may currently be of interest, such as factor a) discussed in FIG. 2G corresponding to total quantity information. If so, only the subset of each encoded summary value that corresponds to that selected factor may be considered, which in this example is the first value encoded for each time period—using such a comparison in this example, prediction template 1 is a better match than prediction template 2, as prediction template 1 has a 100% degree of match for factor a) between the six time periods of the aggregation 1200 and of the initial portion 1301*a* of prediction template 1 (6 matches out of 6 possible), while prediction template 2 has only a 50% degree of match for factor a) (3 matches out of 6). If prediction template 1 is selected for use with respect to factor a), some or all of the additional portion of prediction template 1 that corresponds to factor a) may be used to predict future information for that selected factor, as is also discussed in greater detail with respect to FIG. 2J.

FIG. 2J continues the examples of FIGS. 2F-2I, and illustrates an example of how an additional portion of a matching prediction template may be used to predict future information for one or more selected factors represented in the encoding scheme being used. In particular, FIG. 2J illustrates information 1400 to reflect predicted information based on the encoding scheme 1 used for the aggregation 1200 and the prediction templates 1 and 2 discussed in FIG. 2I. In this example, each of the rows 1401*a*-1401*f* corresponding to the same successive time periods N through N+5 shown in rows 1001*a*-1001*f* of FIG. 2F and 1101*a*-1101*f* of FIG. 2G. Additional rows 1401*g*-1401*l* are shown that correspond to six successive time periods N+6 through N+11, and additional rows 1501*g*-1501*l* similarly correspond to those same six successive time periods but include alternative predicted information. In this example, the 5 selected factors of encoding scheme 1 are shown separately in columns 1403*a*-1403*e*, with column 1403*a* corresponding to factor a), column 1403*b* corresponding to factor b), column 1403*c* corresponding to factor c), column 1403*d* corresponding to factor d), and column 1403*e* corresponding to factor e).

Based on prediction template 2 of FIG. 2*l* being selected as the best overall match to the aggregation 1200, the columns 1401*g*-1401*l* illustrate the values from the encoded summary information shown for the additional portion of prediction template 2 for each of the six successive time periods. Thus, with respect to column 1403*a* corresponding to factor a), rows 1401*a*-1401*f* illustrate the encoded summary information for the total quantity information in time periods N through N+5 (corresponding to encoded versions of the quantification information in column 1003*a* and rows 1001*a*-1001*f* of FIG. 2F), and rows 1401*g*-1401*l* illustrate the encoded summary information for the total quantity information that is predicted for future time periods N+6 through N+11 based on the corresponding values in the additional portion of prediction template 2. Accordingly, the values in column 1403*a* for rows 1401*g*-1401*l* represent predictions for the total quantity of content items in the example comment group that will be supplied during each of the next six time periods. In a similar manner, the information in columns 1403*b*-1403*e* for rows 1401*g*-1401*l* illustrate predictions for the values corresponding to the other 4 selected factors represented in encoding scheme 1 for each of the next six time periods.

The information for column 1403*a* corresponding to factor a), and for rows 1501*g*-1501*i*, illustrate alternative predicted information that may be generated with respect to the next six time periods for the total quantity of content items in the example comment group. In particular, if prediction template 1 of FIG. 2I is selected as the best match for this particular selected factor, the corresponding values for this factor from the additional portion of prediction template 1 may be extracted and used to generate predictions for this factor, whether instead of or in addition to the prediction information in rows 1401*g*-1401*i* for column 1403*a*. It will be appreciated that predicted information from prediction templates may be displayed and used in other manners in other embodiments.

FIG. 2K continues the examples of FIGS. 2F-2J, and illustrates an example of how values may be encoded to allow a single character to represent any of the possible values for the encoded summary information for a particular selected factor during a particular time period. In particular, FIG. 2K corresponds to a base 64 variant of base 32 hex encoding, with 64 possible values each being matched to a unique alphanumeric character. In this example, the values 0-63 are shown in columns 1510, and the matching characters are shown to their left in columns 1505, such that value '0' is matched to character '0', value '11' is matched to character 'B', and value 37 is matched to character 'b'. It will be appreciated that various other types of value encodings may be used in other embodiments, including for different numbers of values, using different characters, etc.

It will also be appreciated that the details discussed with respect to the examples of FIGS. 2A-2K are provided for illustrative purposes, and that the described techniques may be used with a variety of other types of user-supplied information and may be performed in a variety of other ways.

FIGS. 2L-2V and 2Y-2AC illustrate examples of displaying or otherwise providing analyzed information and/or predicted information for one or more categories and/or comment groups and/or classifications of interest, to reflect corresponding constituent member content items for one or more time periods, as well as for using promotional information in various corresponding manners—such information may, for example, be displayed or otherwise provided to users or other entities by an example embodiment of the GDAP service, whether directly or via an intermediate affiliated or third-party system. While particular types of visual information and user-selectable controls are discussed with respect to particular example types of user comments, comment groups, categories and classifications, it will be appreciated that the details are provided for illustrative purposes, and that the described techniques may be used with a variety of other types of user-supplied information, and with a variety of other types of visual information and user-selectable controls.

Figure 3:
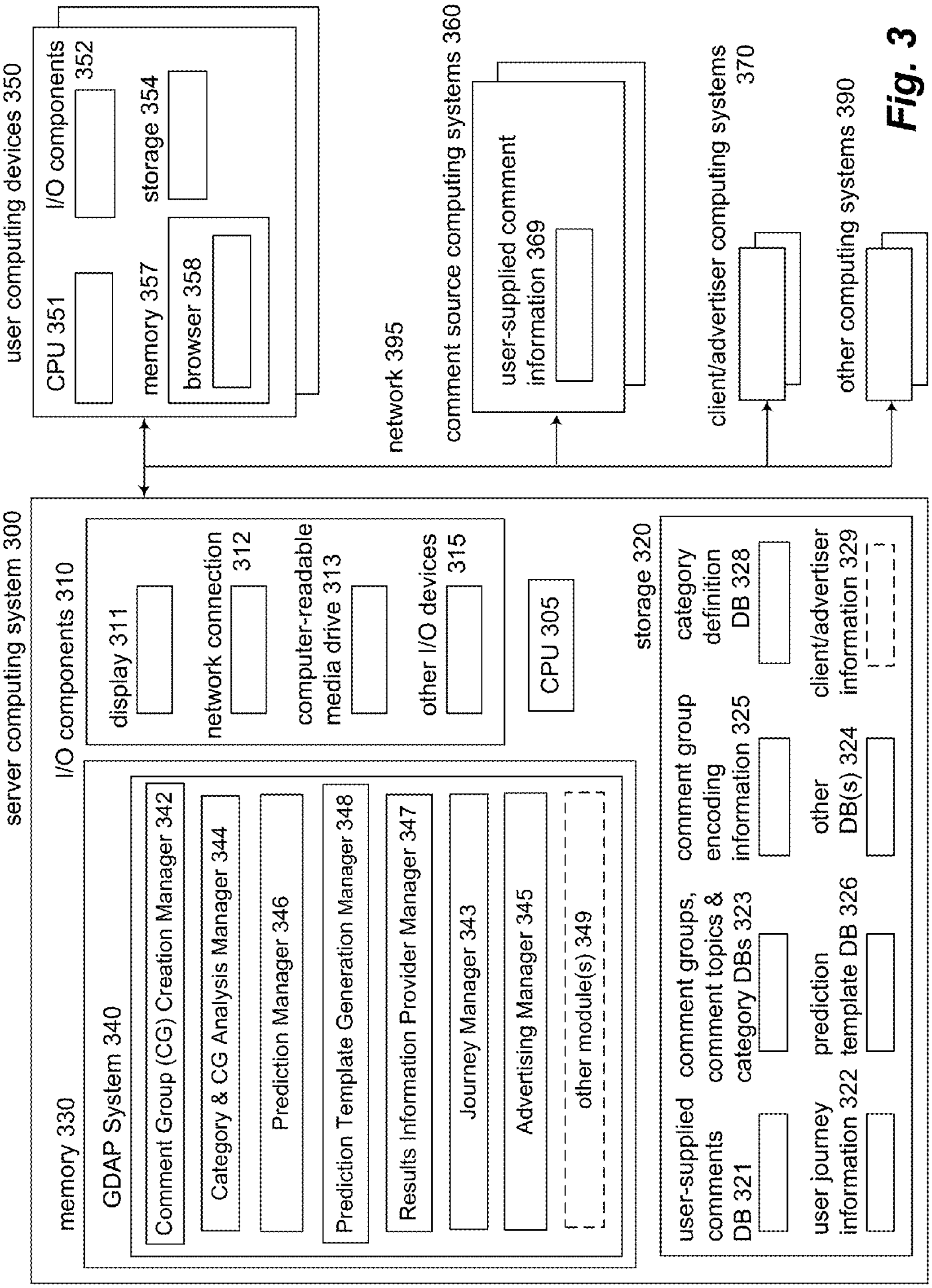
FIG. 3 is a block diagram illustrating a computing system suitable for executing embodiments of a described system for analyzing distributed group discussions and predicting further aspects of the discussions.

In particular, FIG. 2L illustrates an example of a GUI screen or page 1600 that may be displayed to a user of the GDAP service, such as on a client computing device of a client 130 of FIG. 1, on a client computing system 370 of FIG. 3, or for another end-user of the GDAP service. In this example, the GUI 1600 illustrates various example real-time information about a variety of distributed group discussions that are occurring concurrently or recently—in other embodiments, information about other times (e.g., predicted future information, historical actual information, etc.) may be displayed, whether in addition to or instead of the real-time information. In particular, in the example of FIG. 2L, a classification-level view is displayed that includes information about several general classifications or areas 1605 of interest, such as to include information about "Cities," "Fun," "Geeks," "Politics," "Hollywood," "Entertainment," "Sentiment," "Sports," "Social Media," etc. Each of the general classifications 1605 may include information about various categories 1610 within that general classification. For example, the "Fun" general classification may include information about categories 1610 that include "Cars," "Humor," "College," etc. Similarly, the classification "Cities" 1605*a* may include information about various categories 1610 that include "Chicago," "New York," etc. The displayed information may include all or a subset of available classifications, and all or a subset of available categories, such as based on user preferences, user configuration, an amount of data available (e.g., to order information according to relevance in one or more manners, and only display a subset of the most relevant information, etc.). In addition, while the example GUI 1600 may include information for a single current time period (e.g., the most recently completed time period, a current partially completed time period, etc.), in other embodiments the determination of one or more time periods for which to display information may be made in other manners (e.g., may be selectable or configurable by the user).

While various GUI controls may be displayed in some embodiments, in the current example such GUI controls are not displayed, although some or all of the displayed indications of the classifications 1605 and/or categories 1610 may themselves be user-selectable controls, such as to enable a user to select a particular classification or category to obtain additional information about it. For example, the user may in some embodiments be able to click on, hover over or otherwise select the "Obama" category 1610*b* in the "Politics" classification, such as to obtain information about the corresponding category (e.g., in a manner similar to that of the "President Obama" category discussed with respect to FIG. 2C and elsewhere). Similarly, the user could select the "NFL" category 1610*c* in the "Sports" classification to obtain corresponding information about an NFL category, such as in a manner similar to that discussed with respect to FIG. 2C and elsewhere. It will be appreciated that some categories may be shared across multiple classifications, such as with respect to the "Hollywood" category 1620*a* that is part of the "Entertainment" classification and the "Hollywood" classification, and with "Hollywood" further representing both a category and a classification in this example. In a similar manner, particular comment groups (and associated topics or other attributes) may be shared across multiple categories and/or classifications, as discussed in greater detail elsewhere, including with respect to FIG. 2M. In addition, while information such as sentiment may be analyzed and provided with respect to particular classifications and/or categories and/or comment groups, the "Sentiment" classification 1605*c* in the illustrated embodiment further illustrates that sentiment information may similarly be analyzed and provided with respect to all distributed group discussions that are occurring, such as if the current overall sentiment is significantly more positive than negative. The "Sentiment" classification 1605*c* further illustrates that some classifications may include a defined enumerated number of possible categories (e.g., "Positive" and "Negative," or "Positive" and "Negative" and "Neutral"), while others may include categories that vary over time (e.g., based on distributed group discussions that occur).

In the example of FIG. 2L, the displayed information may use various visual aspects to convey corresponding information to the user, such as by using relative size of different classifications and/or categories to illustrate information about a selected factor of interest for those classifications and/or categories (e.g., a current real-time quantity of constituent member content items). Thus, in this example, if such a size-based aspect is used, it can be easily determined that the overall current distributed group discussions within the "Fun" classification have a higher total quantity (or volume) than distributed group discussions in the "Politics" classification, based on the size of the "Fun" classification being larger than the size of the "Politics" classification. Similarly, it can be easily determined that the "Cars" category within the "Fun" classification currently has a larger quantity of constituent member content items than that of the "College" category within the same classification based on their relative sizes. In a similar manner, other visual aspects that are displayed may be used to provide other types of information for classifications and/or categories, such as based on relative location within the overall display, movement in one or more directions, color, shape, etc., as discussed in greater detail with respect to FIG. 2P and elsewhere. Furthermore, in some embodiments, the display may be personalized to the current user and/or configurable by the current user in various manners, including to display information about classifications and/or categories that are of interest to the current user (e.g., based on prior explicit indications of the user, inferred interests based on past user activities or other information about the user, etc.).

FIG. 2M continues the example of FIG. 2L, and in particular provides an example of an expanded view of a particular classification (in this example, the "Cities" classification 1605*a*, such as based on a user selection of that classification in the GUI 1600 of FIG. 2L, or instead based on another user manipulation of the GUI 1600 to zoom or expand a portion of the display). In particular, the example GUI screen or page 1700 of FIG. 2M is an expanded classification-level view that continues to include information about various categories 1610 within the classification 1605*a*, but additional information about various comment groups 1710 are now displayed within each of the categories, although particular topics associated with particular comment groups are not illustrated in this example. In a manner similar to that discussed with respect to FIG. 2L, various information within the GUI 1700 may be user-selectable, including particular categories 1610 and/or comment groups 1710, such as to enable the user to obtain additional information about a selected item. Furthermore, and in a manner similar to that illustrated with respect to FIG. 2L, the visual aspects of the different categories 1610 and/or comment groups 1710 that are displayed may be used to convey information to the user, such as with respect to relative size, location, colors, movement in one or more directions, etc., as discussed in greater detail with respect to FIG. 2P, and various other GUI controls may be displayed in some embodiments. In this example, color has been added with respect to some of the comment groups to display relative types of information between comment groups.

FIG. 2M further illustrates various example GUI controls 1720 and 1730 that may be displayed in at least some embodiments. In particular, in this example, the GUI controls 1720 include information about various topics or other attributes that are shared across multiple categories and/or classifications, with each such topic or other attribute being user-selectable in the current example. Thus, for example, if the user were to select the "nature" control 1720, the display of information in the GUI 1700 may be updated to reflect one or more comment groups corresponding to the "nature" topic across the current classification 1605*a* and categories 1610, such as by highlighting or otherwise emphasizing those comment groups while still displaying information about other comment groups, or instead by displaying information only about those comment groups and corresponding categories. Additional information for a selected shared topic or attribute may further be retrieved and displayed in some environments, such as to indicate changes in distributed group discussions involving the shared topic or other attribute (e.g., changes over time and/or between categories and/or between classifications). Furthermore, additional shared topics or other attributes may be available for display but not currently displayed, such as if the up and down arrow GUI controls 1730 may be used to scroll through other shared topics or attributes. For example, a subset of the shared topics or other attributes may be initially selected for display, such as based on ordering the shared topics or other attributes in one or more manners (e.g., to include topics or other attributes first that have a highest quantity or that are most relevant to the current categories and classifications displayed in the GUI, to include topics or other attributes that are of most interest to the current user, etc.). Additional information may also optionally be displayed for different shared topics/attributes, such as by using different font sizes and/or colors for different shared topic controls to illustrate relevant information. In addition, while not displayed in this example, further information about some or all of the determined relevant terms or other attributes (e.g., particular geographical locations, particular author users, etc.) for one or some or all displayed categories may be displayed in various manners (e.g., for a particular category upon selection of that category) in various embodiments, or aggregated such information may be displayed for the "Cities" classification 1605*a*.

FIG. 2N continues the examples of FIGS. 2L-2M, and in particular illustrates a GUI screen or page 1800 that includes additional information about a particular category of interest (in this example, the "New York" category 1610*a*, such as based on selection of category 1610*a* in the GUI 1700 of FIG. 2M). Thus, a category-level view is displayed that illustrates additional information with respect to the comment groups 1710 within the category 1610*a* (relative to that displayed in FIG. 2M), including to indicate a name or other identifier for some or all of the displayed comment groups, and to further add additional color information. In a manner similar to that discussed with respect to FIGS. 2L and 2M, various information within the GUI may be user-selectable, including particular comment groups, and various other GUI controls may be displayed in some embodiments. While not illustrated here, additional GUI controls could be included here in a manner analogous to the GUI controls 1720 and 1730 of FIG. 2M, such as to display particular topics or other attributes (e.g., particular geographical locations, particular author users, etc.) that are shared across multiple comment groups and/or categories, including to optionally be user-selectable in a manner similar to that discussed with respect to FIG. 2M, and/or to be ordered or selected for display based on the topics or other attributes that are most relevant to the current comment groups and categories displayed in the GUI or instead based on other manners. In addition, while not displayed in this example, further information about some or all of the determined relevant terms or other attributes for the displayed category and/or for one or some or all displayed comment groups may be displayed in various manners (e.g., for a particular comment group upon selection of that comment group) in various embodiments. Additional details are included elsewhere related to particular visual aspects of the display and corresponding information that may be conveyed to a user, including with respect to FIG. 2P.

FIG. 2O (shown as "2-O" to differentiate from the number "20") continues the examples of FIGS. 2L-2N, and in particular illustrates a GUI screen or page 1900 that displays a comment group-level view that includes additional information about a particular selected comment group (in this example, the "ny" comment group 1710*a*, such as based on selection of the comment group 1710*a* circle in the GUI 1800 of FIG. 2N). In this example, the comment group 1710*a* is displayed with additional information inside, such as a chart 1915 that shows information about one or more selected factors of interest over time (e.g., a quality of constituent member content items over time, including in this example to include information from the last 72 hours up until the current time based on actual data, and to also include predicted future quantity information over a future 72-hour period). The display for the current example comment group 1710*a* further includes a graphical chart 1910 to provide additional information about the comment group, such as with respect to the same selected factor of interest as shown in the chart 1915 (e.g., an indication of change in sentiment over the past 72 hours based on actual data), or instead for a different selected factor.

As discussed in greater detail elsewhere, various of the types of information that are displayed may be personalized to the user and/or configurable to the user in various manners. In addition, in this example, various additional types of information and user-selectable controls 1902, 1920, 1925, and 1930 are displayed, such as to allow the user to obtain additional information of one or more types corresponding to the current comment group. For example, if the user selects control 1902, additional details about particular constituent member content items of one or all types (e.g., photos) may be displayed in an updated GUI. Similarly, areas 1920, 1925, and 1930 may include information of various types to the user (although particular details are not currently shown in areas 1920 and 1925), such as details about some or all of the constituent member content items, about particular author users (e.g., users who have high or low influence), about particular data sources from which the constituent member content items are provided, about particular geographical areas with which the constituent member content items are associated, etc. —in at least some embodiments, selection of one or more such user-selectable controls and information areas will provide expanded information to the user of that type. In addition, while not displayed in this example, further information about some or all of the determined relevant terms or other attributes for the displayed comment group may be displayed in various manners in various embodiments. The GUI 1900 in this example further includes an additional user-selectable control 1904 to allow the user to modify the current display, such as to return to a previous page (e.g., the page of information displayed in the GUI 1800 of FIG. 2N), and similar maneuverability or other modification controls may be provided in other manners in other of the example GUI screens and in other embodiments.

FIG. 2P continues the examples of FIGS. 2L-2O, and in particular illustrates an example GUI screen or page 2000 corresponding to an example item 2010 and several sub-items 2020 that are represented in an abstract manner, with various types of visual aspects that may be conveyed to a user using different types of information being illustrated. For example, item 2010 may correspond to a particular category 1610 (such as in a manner similar to FIG. 2N, with the sub-items corresponding to particular comment groups 1710 or to particular determined relevant terms or other attributes for the category), may correspond to a particular classification 1605 (such as in a manner similar to FIG. 2M, with the sub-items corresponding to particular categories 1610 and/or comment groups 1710), may correspond to a particular group of multiple classifications 1605 (such as in a manner similar to FIG. 2L, with the sub-items corresponding to particular classifications 1605 and/or categories 1610 and/or comment groups 1710), may correspond to a particular comment group (as discussed with respect to FIG. 2-O, with the sub-items corresponding to particular determined relevant terms or other attributes for the comment group), etc. For the purpose of illustration, item 2010 will be discussed in greater detail with respect to FIG. 2P as if it corresponds to a particular category, with sub-items within the larger overall item 2010 being discussed as if they represent particular comment groups within that category, in a manner similar to that of FIG. 2N. While the overall item 2010 is displayed as a circle in this example, it will further be appreciated that similar information may be displayed in other shapes and manners in other embodiments.

As one example of a visual aspect that may be conveyed in a display similar to that of FIG. 2P, the relative size of the overall item 2010 and/or the sub-items 2020 may provide information about current absolute or relative values with respect to a selected factor of interest, with the quantity of constituent member content items being one example of such a selected factor. Thus, a visual inspection easily identifies that sub-item 2020*b* has a larger absolute or relative value for the selected factor of interest than does, for example, sub-items 2020*e* or 2020*c*. While not illustrated here, a legend or key could be further illustrated to identify the selected factor of interest that is currently associated with the size aspect, including to optionally provide a scale with respect to corresponding values for different sizes, and such information may further optionally be configurable in various manners in some embodiments.

FIG. 2Q illustrates an additional example of multiple different relative sizes of an overall item, with alternative overall item 2060 (shown at a reduced scale relative to overall item 2010) illustrating how a particular example overall item with a larger value for the size-related selected factor of interest may be displayed, in contrast to alternative item 2050 (also shown at the reduced scale) in which the item and its sub-items have smaller absolute or relative values for the selected factor of interest. It will be appreciated that alternative items 2050 and 2060 of FIG. 2Q are displayed in a consistent scale with respect to each other in this example, but at a different scale than item 2010 shown in FIG. 2Q.

Returning to FIG. 2P, and in addition to the sizes of the overall item 2010 and/or the sub-items 2020, the locations of the sub-items 2020 may further provide additional information about one or more selected factors of interest, such as to differ from the selected factor represented by the size aspect. For example, in the example GUI 2000 of FIG. 2P, distinct selected factors are associated with each of the X and Y axes, which both differ from the quantity-related factor associated with the size visual aspect—the X and Y axes are represented by axes lines 2002 in this example, although such axes lines may not be illustrated in at least some embodiments. As one example, the X axis may be currently associated with a selected factor that corresponds to a degree of sentiment, with the horizontal center of the overall item 2010 representing a neutral sentiment in this example, such that a sub-item 2020 that is farther to the right has a larger positive sentiment value, while a sub-item 2020 that is farther to the left has a larger negative sentiment value (or alternatively a smaller positive sentiment value in other embodiments in which sentiment is measured only on a scale of more or less positive sentiment). Thus, for example, a visual inspection can readily identify that the sub-item 2020*e* has a greater positive sentiment than does, for example, sub-items 2020*d* or 2020*a*. Alternatively, in other embodiments the X and/or Y axes may each correspond to one or more selected determined relevant terms or other attributes (e.g., particular geographical locations, particular author users, etc.), with the included sub-items corresponding to particular comment groups (e.g., from different categories) and/or categories that are relevant to those selected determined relevant terms or other attributes, as discussed in greater detail with respect to FIG. 2AK—if so, other visual aspects (e.g., size, color, movement, etc.) may or may not be used to represent other factors related to the displayed sub-items.

In addition, in this example, the Y axis is associated with a selected factor that corresponds to a rate of change (e.g., a percentage increase or decrease) in the quantity of constituent member content items with respect to a prior time period, with the vertical center of the overall item 2010 representing a constant rate of change in quantity in this example—in other embodiments, the Y axis may instead correspond to an absolute amount of change in quantity of constituent member content items with respect to a prior time period. In this example, a sub-item 2020 that is higher in the display than the x-axis has a progressively higher positive rate of change in quantity, while a sub-item 2020 that is lower in the display than the x-axis has a progressively higher rate of a negative change in quantity (i.e., a reduction in rate of change in quantity). Thus, a visual inspection can readily determine that sub-item 2020*f* has a higher growth rate in quantity of constituent member content items than does, for example, sub-item 2020*b* (which has a zero rate of quantity change, or a constant quantity), and with sub-item 2020*b* having a higher growth rate in quantity than the negative growth rates for sub-items 2020*c* and 2020*d*.

In addition to the displayed vertical location, different colors are also mapped to different vertical locations in this example to emphasize different rates (or alternatively, amounts) of quantity change. In particular, the blue color of sub-item 2020*b* represents a mostly constant quantity (or zero rate, or amount, of quantity change) for the constituent member content items, the purple color of sub-item 2020*f* represents a relatively high value for the rate (or amount) of quantity change (and with varying degrees of color between blue and purple indicating increasing positive values), and with the black of sub-item 2020*c* indicating a relatively large negative value for the rate (or amount) of quantity change (with corresponding degrees of darker blue and gray between the blue of sub-item 2020*b* and the black of sub-item 2020*c* indicating increasing negative values). By using both color and vertical location to illustrate a single selected factor in this example, corresponding information can be easily determined by a user in multiple visual manners, although in other embodiments color and vertical location may represent different types of information for different selected factors.

As with the size-related visual aspect, the visual aspects corresponding to vertical location, horizontal location and/or color may in some embodiments have associated legends, keys, and/or scales that are displayed to the user, and one or more of the vertical location, horizontal location and color visual aspects may be further configurable by the user in various manners in various embodiments (e.g., to allow the user to specify a different selected factor with respect to one or more of the visual aspects, etc., to change a scale with respect to a particular selected factor, etc.).

In addition to size, vertical location, horizontal location, and color, the example GUI 2000 could further use movement in the vertical and/or horizontal directions that is represented within a single time period (e.g., via animation) to represent further selected factors of interest in at least some embodiments, although such movement-based visual aspects within a single time period are not used in this example GUI (although changes in location for different time periods do reflect changes in corresponding information over those time periods). For example, a horizontal movement visual aspect within a single time period could be used to illustrate a rate of change in sentiment or other selected factor assigned to the X axis (e.g., for actual information over one or more prior time periods to the current time period, for predicted information from the current time period through one or more future time periods, etc.), or instead could be used to illustrate information for a selected factor other than the one assigned to the X axis. As an alternative to animation, visual arrow indicators 2004 could be displayed to reflect information about vertical movement, such as with the length of the arrow indicating an amount of movement. Similar types of horizontal movement visual aspect may also be displayed, whether in addition to or instead of the vertical movement information.

In addition to size, horizontal location, vertical location, and color, the illustrated example GUI 2000 further includes information not only about the current real-time information for one or more time periods of interest, but also predicted future information for one or more future time periods of interest. In particular, in this example, some of the sub-items 2020 have an associated halo 2030 (or alternatively, a shadow that does not fully encompass the sub-item) that corresponds to predicted future information for that sub-item, with the size and/or color of the halo providing additional information about the corresponding predicted future information. For example, with respect to sub-item 2020*f*, if the size of the sub-item corresponds to the quantity of constituent member content items for that sub-item, then the size of the prediction halo 2030*a* for the sub-item may indicate that the quantity of constituent member content items for that sub-item is predicted to increase over the one or more future time periods of interest, with the size of the prediction halo 2030*a* indicating the predicted quantity. As can be visually determined, the predicted future quantity for the sub-item 2020*f* is thus roughly the same amount as the current quantity for sub-item 2020*b*, as both are a similar size. In a similar manner, the prediction halo 2030*b* for sub-item 2020*d* indicates that the predicted quantity of constituent member content items for the sub-item 2020*d* is expected to decrease over the one or more future time periods of interest, with the size of the prediction halo 2030*b* indicating that predicted smaller future quantity. The colors of the prediction halos may also convey various types of information, such as to be selected to be different from the color of the corresponding sub-items (e.g., to enable easy identification of the prediction halo, such as to use the color orange of the prediction halo 2030*a* for all prediction halos, or for prediction halos whose predicted future quantity is larger than the current actual quantity of the corresponding sub-item), or to further use different colors for a given prediction halo to display additional information about the predicted future quantities (e.g., to use different colors for a prediction halo to indicate a predicted future rate of change). As with other aspects discussed, additional legend, key, and scale information may be displayed corresponding to the prediction halos, and some or all of the aspects of the prediction halo display may be configurable by the user in at least some embodiments.

Thus, given a variety of different visual aspects, a visual inspection of the example GUI 2000 of FIG. 2P illustrates a variety of information about the different sub-items. For example, if sub-item 2020*b* corresponds to a first comment group of interest for a category represented by overall item 2010, the visual information about that first comment group 2020*b* quickly identifies various information, as follows: the large size of the first comment group 2020*b* indicates a relatively large quantity of constituent member content items; the absence of a prediction halo indicates that a change in quantity is not predicted for the one or more future time periods of interest; the centered horizontal location indicates that a neutral sentiment currently exists for the first comment group; and the centered vertical location as well as color indicates that the rate of change in quantity since one or more prior time periods of interest is near zero, with the quantity remaining essentially constant. Conversely, the visual information about a second comment group corresponding to sub-item 2020*a* identifies various information, as follows: the second comment group 2020*a* has a lower current quantity of constituent member content items compared to the first comment group due to its smaller size; the lack of a prediction halo indicates that the quantity of constituent member content items for the second comment group is not predicted to change over the one or more future time periods of interest; the horizontal position on the left side of overall category item 2010 indicates that the current sentiment for the second comment group is relatively negative; and the vertical location above the x-axis as well as the color indicate that the rate of change in quantity for the second comment group is a relatively high positive value (and is higher than that of the first comment group). As another example, the visual information about a third comment group corresponding to sub-item 2020*c* identifies various information, as follows: the third comment group 2020*c* has a smaller current quantity of constituent member content items than do the first and second comment groups, based on its smaller size; the lack of a prediction halo indicates that the quantity of constituent member content items for the third comment group is not predicted to change in quantity over the one or more future time periods of interest; the horizontal position that is slightly to the right side of center of the overall category item 2010 indicates that the current sentiment for the third comment group is slightly positive; and the vertical location below the x-axis as well as the color indicate that the rate of change in quantity for the third comment group is a relatively large negative value (and is lower than that of the first comment group). Similar information can be easily determined visually for the other example sub-items 2020*d*, 2020*e*, and 2020*f*.

While various example visual aspects and corresponding selected factors and information are illustrated with respect to FIG. 2P, it will be appreciated that a variety of types of modifications can be made to these aspects, that various additional visual aspects may be used, and that one or more of the existing visual aspects may not be used in other embodiments. As one example, and as previously noted, selected factors that are used for particular visual aspects may be configurable by the user in at least some embodiments.

In addition, in some embodiments, different shapes may be used rather than circles to convey additional types of information for a corresponding sub-item based on the corresponding shape. As one example, the shapes used may not be symmetrical in both the X and Y axes, such as to use the different X and Y vales to convey additional information. For example, a circle may be replaced with an oval, such as an oval that is longer along the X axis than the Y axis, or that is instead longer along the Y axis than the X axis. If so, the length along the X axis could illustrate additional information about the selected factor for the X axis (e.g., a rate of change in sentiment), while the position along the X axis continues to indicate a current sentiment value, and while the distance along the Y axis could continue to be used to indicate a quantity size for constituent member content items. In a similar manner, other types of shapes could be used that differ in the X and Y dimensions, such as diamonds, triangles, etc. Furthermore, a different shape that is not symmetrical could be used to optionally illustrate information over time. For example, a teardrop shape could be used to represent changes over time of a particular factor of interest. Consider, for example, a teardrop shape whose central axis runs left to right, such that the shape at the left end (whether the teardrop point or the teardrop bulb) corresponds to a past period of time and the shape at the right end of the teardrop corresponds to a current or future time, such that the length of the teardrop along the x-axis represents a length of time, and with the width of the teardrop in the y-axis direction at a given point indicating a value in sentiment or some other selected factor at a corresponding time—in this manner, the overall teardrop shape may be used to indicate changes in the sentiment value over the length of time corresponding to the teardrop length. It will be appreciated that other types of shapes can similarly be used in other manners and other embodiments.

In addition to shapes of individual sub-items, the information that is displayed within particular sub-items may further provide an additional visual aspect that conveys additional information, with the examples of FIG. 2R illustrating examples of such additional information. In particular, FIG. 2R continues the examples of FIG. 2L-2Q, and illustrates a GUI screen or page 2100 with an overall item 2110 similar to item 2010 of FIG. 2P, but with particular sub-items 2110, 2130, 2140, 2150 and 2160 being modified to include additional types of information.

As one example, sub-item 2130 illustrates displaying pie chart information within the sub-item to illustrate additional information about different subsets of the constituent member content items for the sub-item. Thus, for example, the pie chart could correspond to an additional selected factor, with the different pie slices 2130*a*-2130*c* indicating the relative size of different subsets of the constituent member content items corresponding to different values for that selected factor (e.g., with different pie slices representing different geographical locations associated with the constituent member content items, different author users associated with the different constituent member content items, different data sources associated with the different constituent member content items, etc.). As with other visual aspects discussed, additional legend, key, and/or scale information could further be illustrated for such a visual aspect.

Sub-item 2110 illustrates an alternative type of information that could be displayed within the sub-item, and in particular illustrates timing-related information to show information for the constituent member content items over time. As one example, the upper right quadrant 2110*a* could represent information about a current time for a selected factor, while the additional slices 2110*b*-2110*d* could illustrate the same type of information but for successive predicted future periods of time, or instead the different quadrants (or other divisions of the circle) could correspond to other combinations of two or more past and/or future time periods. Accordingly, each quadrant or other slice could indicate a particular value for a corresponding selected factor for a corresponding time period, such as to indicate an identifier of a highest data source or highest geographical location or highest author user during that time period, to indicate an actual or predicted rate of change for the corresponding time period, etc.

Sub-item 2140 illustrates yet another alternative type of information that could be displayed within a sub-item, and in particular illustrates a different type of timing-related information to show information for the constituent member content items at a particular indicated time. For example, the illustrated information may be used to represent a clock and to indicate a particular time that a corresponding value of interest has occurred or is predicted to occur for a selected factor, such as a time at which a maximum or minimum value occurs for the selected factor, a time at which a change is expected to occur between two indicated values, etc. It will be appreciated that a variety of other types of information could similarly be displayed within a sub-item, including bar charts, line charts, textual information, etc.

Sub-items 2150 and 2160 illustrate other alternative types of information that could be displayed within a sub-item, and in particular illustrate two types of map-related information that may be used to show information for the constituent member content items at a particular indicated time. For example, location-related information may be displayed within the sub-item corresponding to the constituent member content items for the sub-item, such as to use coloring, shading, location indicators, etc. within the map to indicate different geographical locations that correspond to the constituent member content items (e.g., to show relative quantities of constituent member items in different geographical locations, or to instead show other types of location-related information).

FIG. 2R further illustrates additional example user-manipulatable time-related controls 2120-2128 that a user may be provided with in at least some embodiments, such as to control the display of information over multiple periods of time using one or more visual aspects. In this example, the time-related controls include an indicator 2120 of a current time to which the current displayed information corresponds, as well as a time slider control 2122 that illustrates a range of times. In this example, time period indicator control 2124 may be manipulated by a user to select an earliest time for which the user wishes to view actual and/or predicted information as part of an animation, and time period indicator control 2126 may be manipulated by the user to select a latest time of interest for which the user wishes to view such information as part of the animation. Additionally, the time indicator control 2125 visually indicates the currently selected time within the time slider control, which may be inside or outside the time span set by the controls 2124 and 2126. The illustrated time-related controls further include time sequence manipulation playback controls 2128, which in this example include four user-selectable controls to allow manipulation of the display of corresponding information over a sequence of multiple selected time periods. In this example, those controls include a “Play” control 2128*c*, a “Fast-Forward” control 2128*d*, a “Rewind” control 2128*b*, and a “Stop” control 2128*a*. Various other related controls may be provided in some embodiments, such as a “Pause” control and/or controls to jump forward and/or backward by a predefined amount of time (e.g., 15 minutes, an hour, a day, a particular number of time periods, etc.). In this example, the “Play” control 2128*c* allows a user to animate information for one or more sub-items between the time span indicated by the indicators 2124 and 2126. As the corresponding time progresses in the animation, the displayed GUI for the overall item and/or one or more sub-items may be updated to display information for the corresponding time. It will be appreciated that a variety of other types of time-related controls may be provided and used in other manners in other embodiments.

While the illustrated GUI 2000 of FIG. 2P and GUI 2100 of FIG. 2R are displayed along two dimensions, in other embodiments the display may be altered to have a single dimension (e.g., a slider or ruler along the X or Y axes), to have three dimensions (e.g., to add a depth, or Z, dimension to that illustrated in FIG. 2P), to use animation to reflect changing values at different times, to use animation to reflect changing values over different possible subsets of the constituent member content items for a selected factor (e.g., different geographical locations associated with the constituent member content items, different author users associated with the different member constituent content items, different data sources associated with the different constituent member content items, etc.), etc.

FIG. 2S continues the examples of FIGS. 2L-2R, and in particular illustrates an example GUI screen or page 2200 corresponding to a category-level view with an example category item 2210 that includes a number of sub-items corresponding to particular comment groups within the category, such as in a manner similar to that illustrated in FIG. 2N. The example GUI 2200 further includes various textual information 2220, such as on the right and/or left sides of the item 2210. In this example, the textual information identifies names of some or all of the comment groups within the category (e.g., all comment groups in the category, regardless of whether a corresponding sub-item is currently displayed; for comment groups having a displayed sub-item, which in some cases may be a subset of all comment groups for the category; etc.). Such textual information enables easier identification of comment groups with small sizes, and in embodiments in which the terms in the textual information are user-selectable, enables a user selection of a textual term to highlight or otherwise emphasize the corresponding comment group sub-item. While not illustrated here, in other embodiments a similar display could be used to illustrate determined relevant terms or other attributes (e.g., particular geographical locations, particular author users, etc.) for the category and/or one or more of the constituent comment groups, whether instead of or in addition to the displayed textual information regarding comment group names. Furthermore, in other embodiments, information could be displayed about shared topics or attribute information for comment groups within the category, whether in addition to or instead of other indicated types of information that could be displayed. It will be appreciated that such additional techniques may similarly be used with other information views, including classification-level views, comment group-level views, etc.

FIG. 2T continues the examples of FIGS. 2L-2S, and in particular illustrates an example GUI screen or page 2300 corresponding to a classification-level view with an example category item 2305 that includes a number of sub-items corresponding to particular categories within the classification, and with those category sub-items including further sub-items corresponding to particular comment groups within those categories, such as in a manner similar to that illustrated in FIG. 2M. The example GUI 2300 further includes various textual information 2320, which in this example represent shared topics or attribute information, in a manner similar to information controls 1720 of FIG. 2M. In this example, the terms in the textual information are user-selectable, such that a user selection of a textual term such as term 2321 causes it to be highlighted or otherwise emphasized within the information 2320, and further causes sub-items for a particular comment group corresponding to the selected term (e.g., sub-items 2315) to be highlighted or other emphasized (in this example, to be shown with a bolded green enclosing circle), and similarly causes sub-items for particular categories (e.g., sub-items 2310) including that comment group to be similarly highlighted or otherwise emphasized. While not illustrated here, in other embodiments a similar display could be used to illustrate determined relevant terms or other attributes (e.g., particular geographical locations, particular author users, etc.) for the classification and/or one or more of the constituent categories, whether instead of or in addition to the displayed textual information regarding shared topic or attribute information. It will be appreciated that such additional techniques may similarly be used with other information views, including category-level views, comment group-level views, etc.

FIG. 2U continues the examples of FIGS. 2L-2T, and in particular illustrates an example GUI screen or page 2400 corresponding to a comment group-level view with an example comment group item 2410*a* that includes various information corresponding to particular constituent member content items within the comment group, such as in a manner similar to that illustrated in FIG. 2-O. The displayed elements 2410*a*, 2415, 2410, 2420, 2425 and 2430 are similar to the displayed elements 1710*a*, 1915, 1910, 1920, 1925 and 1930 of FIG. 2-O, respectively. For example, article information 2420 illustrates the textual contents of a particular one of the constituent member content items, influencer information 2425 identifies particular current high influencer users for the comment group, and terms information 2430 identifies particular frequently occurring terms within the constituent member content items (such as to reflect highly relevant terms for the comment group). In addition, the timeline chart 2415 similarly shows actual data (including real-time current data) and predicted future data for total quantity of constituent member content items within the comment group during a time window, and the graphical chart 2410 illustrates the contributions from different data sources (e.g., Tumblr, Facebook, etc.) to the total quantity information for the actual data—while predicted data source contribution information is not shown for the predicted future data in this example within the chart 2410, in other embodiments such predicted information could further be added. The example GUI 2400 further includes additional information 2435 relative to FIG. 2-O, which in this example is an overall item corresponding to a category-level view for a category that includes the current comment group as a member, with the current group being highlighted within the overall category item, and with the overall item shown at a reduced scale relative to overall item 2410*a*.

FIG. 2V continues the examples of FIGS. 2L-2U, and in particular illustrates an example GUI screen or page 2500 that shows actual total quantity information for constituent member content items within a comment group over a time window, such as to enable a determination of how well a prediction at a particular time corresponds to the actual future information that occurs at future times. For example, as is shown in the timeline chart 2415 of FIG. 2U, the actual quantity information for a comment group over a prior time window may show decreasing quantity, such that a trend curve analysis would predict a continued decrease in quantity during future time periods (or at best, a low constant quantity over such future time periods). However, in the example of FIG. 2U, the use of a prediction template (not shown) enables a prediction of a future change in quantity in which the quantity is predicted to begin increasing in approximately 24 hours—such a prediction template may be based on a variety of types of data and selected factors other than merely quantity information (e.g., while the total quantity has been decreasing, a change is noted in which one or more particular data sources and/or one or more particular geographical locations and/or one or more particular author users are beginning to increase the quantity of their corresponding subset, and past data has shown that such a change typically results in increasing overall quantity within approximately 24 hours). The actual results data timeline chart 2500 of FIG. 2V is generated at least 72 hours after the current time of the timeline chart 2415 of FIG. 2U, with that current time being indicated as the prediction time 2505 in timeline chart 2500. As is illustrated, the actual results data for the following 72 hours after the prediction may illustrate that the predictions shown in FIG. 2U were correct in this case, with the actual quantity data being to increase substantially between 24 and 36 hours after the prediction. It will be appreciated that such actual results data may be used in various manners in various embodiments, including to be displayed to users, used for an automated comparison to previously made predictions, etc.

FIGS. 2W-2X illustrate examples of types of inter-relationships that may be automatically discovered by the GDAP service between various types of distributed discussion-related information. In particular, FIG. 2W illustrates example information that is based in part on the examples of FIGS. 2L-2U, and in particular illustrates one example of information 2600 about types of inter-relationships that may be automatically identified between various types of distributed discussion-related information. For example, distributed discussion-related information may in some embodiments be grouped into one or more information classifications or other areas 2605 of interest, which may each include one or more information categories 2610, which may each include one or more comment groups 2615 that are each associated with a corresponding topic.

While not shown in FIG. 2W, some or all of the illustrated information may in some embodiments be stored in one or more defined data structures, such as to have a copy of a classification-related data structure for each information classification 2605, to have a copy of a category-related data structure for each information category 2610, and/or to have a copy of a comment group-related data structure for each information comment group 2615, with links or other relationships defined to represent the illustrated determined inter-relationships between the classifications, categories and comment groups. In addition, while only a small number of classifications, categories, comment groups and their inter-relationships are illustrated in FIG. 2W for the sake of brevity, it will be appreciated that the actual numbers of such information types and relationships may be much larger in some situations, such as to include hundreds, or thousands, or millions, or billions such information types and/or relationships.

As shown in FIG. 2W, distributed discussion-related information may in some embodiments be grouped into one or more information classifications or other areas 2605 of interest, which in the example of FIG. 2W includes a Cities classification 2605*a* and an Entertainment classification 2605*b*. As discussed in greater detail with respect to FIG. 2L and elsewhere, a variety of types of information classifications may be used in some embodiments, while in other embodiments such information classifications may not be used. In addition, information about such classifications may be determined in various manners, such as based on one or more of the following: by being predefined by an operator of the GDAP system; by being specified by one or more clients of the GDAP system; by being automatically identified based on determined inter-relationships between information categories, as discussed in greater detail below; etc.

In addition, distributed discussion-related information may in some embodiments be grouped into one or more information categories 2610, which in the example of FIG. 2W includes a Seattle category 2610*a*, a Chicago category 2610*b*, a Houston category 2610*c*, and a Hollywood category 2610*d*, which are each part of the Cities classification 2605*a* in the example of FIG. 2W. The information categories further include a TV category 2610*e*, which is part of the Entertainment classification 2605*b* in the example of FIG. 2W, along with the Hollywood category 2610*d*—thus, in the illustrated example, at least some information categories may be part of multiple defined information classifications. FIG. 2W further illustrates an example of a potential information category 2610*f* corresponding to Typhoon Haiyan, which may currently be part of various distributed discussions (e.g., may be part of one or more trending discussions if the storm is currently occurring or has recently occurred), but which may not be identified as an actual information category in at least some embodiments and situations—for example, if some or all information categories are defined by clients of the GDAP service and/or are manually defined by an operator of the GDAP service, such trending categories may not initially be identified and defined in that manner.

Distributed discussion-related information may also in some embodiments be grouped into one or more information comment groups 2615 that each has an associated topic, which in the example of FIG. 2W includes an EmeraldCityComics comment group 2615*a*, an architecture comment group 2615*b*, and an NFL comment group 2615*c*, which are each automatically determined to be part of the Seattle category 2610*a* in the example of FIG. 2W. While the EmeraldCityComics comment group 2615*a* is part of only a single category 2610, the architecture and NFL comment groups 2615*b* and 2615*c* are each part of multiple categories 2610 in this example—thus, in the illustrated example, at least some information comment groups may be part of multiple defined information categories, and may further have different (e.g., overlapping) sets of constituent member content items as part of the different categories. Furthermore, in this example, the recent ongoing distributed discussions include comments about Tacloban City, based on the damage that it recently received from Typhoon Haiyan, resulting in a corresponding Tacloban City comment group 2615*e* in this example. However, in this example, the Tacloban City comment group 2615*e* is not part of any defined information categories, such as due to such information categories not yet being manually defined or automatically discovered, but would be part of potential information category 2610*f* corresponding to Typhoon Haiyan if it becomes an actual information category.

As is illustrated in FIG. 2W, various types of inter-relationships between distributed discussion-related information may be present in various embodiments and situations. For example, in some embodiments and situations, a particular information category 2610 may be part of multiple information classifications 2605, or instead may be part of a single information classification 2605 or no information classification 2605. Similarly, in some embodiments and situations, a particular comment group 2615 may be part of multiple information categories 2610, or instead may be part of a single information category 2610 or no information category 2610. In addition, while not illustrated in FIG. 2W, inter-relationships may be automatically determined between multiple information categories 2610 or between multiple comment groups 2615 in some embodiments, with one example of inter-category relationships being discussed in greater detail with respect to FIG. 2X. In addition, while not illustrated in FIG. 2W, some or all of the illustrated comment groups, categories and/or classifications may each have determined relevant terms or other attributes (e.g., particular geographical locations, particular author users, etc.), including to be based at least in part on some embodiments by some of the inter-relationships between categories, comment groups and/or classifications, as discussed in greater detail elsewhere herein.

FIG. 2X has some similarities to FIG. 2W, but illustrates additional example information 2700 about types of inter-relationships that may be automatically identified between various types of distributed discussion-related information, including in this example to automatically identify relationships between various example information categories 2710.

In particular, each of the information categories 2710 may include one or more comment groups, as discussed in greater detail elsewhere herein, but only limited information comment group 2715 information is illustrated in this example for the sake of brevity. In particular, the illustrated information categories Seattle 2710*a*, Chicago 2710*b*, Houston 2710*c* and Hollywood 2710*d* may include one or more of the illustrated comment groups EmeraldCityComics 2715*a*, architecture 2715*b* and NFL 2715*c*, in a manner similar to the information categories Seattle 2610*a*, Chicago 2610*b*, Houston 2610*c* and Hollywood 2610*d* and comment groups EmeraldCityComics 2615*a*, architecture 2615*b* and NFL 2615*c* that are illustrated in FIG. 2W.

The illustrated information categories 2710 also include a number of additional example categories 2720*a-c*, 2720*e* and 2725*a-l* that have been automatically discovered based on an analysis of the user-supplied information for the ongoing distributed group discussions, along with relationships between various of the information categories 2710. The automated discovery of such additional categories and of such inter-category relationships may be performed in various manners in various embodiments. Each of the information categories 2710 may similarly include various comment groups, but such additional comment groups are not illustrated in this example. In addition, while no information classifications are illustrated in the example of FIG. 2X, in some embodiments some or all of the information categories 2710 may be part of one or more information classifications, while in other embodiments some or all of the information categories 2710 may not be determined to be part of any information classifications.

As one example, consider the Seattle category 2710*a*, which may have been predefined and have one or more associated definition terms (e.g., "Seattle") that are used to identify a number of constituent member comment groups in a manner previously described, including the illustrated comment groups EmeraldCityComics 2715*a*, architecture 2715*b* and NFL 2715*c*. As part of the example automated discovery, the topic for each comment group that is a constituent member of the Seattle category 2710*a* may be considered as a possible category of its own, and used to identify its own constituent member comment groups. In some embodiments, each such comment group whose topic is not already a category will be used to create a new category (e.g., with the new category using definition term (s) based on the one or more topic terms for the comment group), while in other embodiments additional restrictions may be used when determining which comment groups' topics will become new categories (e.g., based on a quantity of comments in a comment group, such as for use with restriction(s) that the quantity is to be below and/or above specified thresholds; based on a quantity of other comment groups that are related to the current comment group due to overlapping comments or using another measure, such as for use with restriction(s) that the quantity is to be below and/or above specified thresholds; etc.).

Accordingly, in this example, new information categories EmeraldCityComics 2720*a*, architecture 2720*b* and NFL 2720*c* are created to correspond to the illustrated comment groups EmeraldCityComics 2715*a*, architecture 2715*b* and NFL 2715*c*. In addition, based on those new categories corresponding to comment groups that were constituent members of the Seattle category 2710*a*, inter-category relationships are identified between the new categories 2720*a-c* and the Seattle category 2710*a*, such that the new categories 2720*a-c* may be considered to be sub-categories of the Seattle category 2710*a* or otherwise part of the Seattle category 2710*a*. Similarly, the Chicago category 2710*b* has been identified as another sub-category of the Seattle category 2710*a* in this example. For example, the constituent member comment groups of the Seattle category 2710*a* may have also included a Chicago comment group (not illustrated in FIG. 2X), such as due to one or more distributed discussions that involve both Seattle and Chicago (e.g., related to the Boeing company, whose corporate headquarters are in Chicago and whose largest operational locations are near Seattle; related to an upcoming sports contest between Seattle and Chicago teams; etc.)—if so, a new Chicago category would not be created during the automated discovery due to the Chicago category 2710*b* already being present, but the indicated inter-category relationship between the categories 2710*a* and 2710*b* may be automatically identified as part of the automated discovery. While only a small number of new categories and inter-category relationships are illustrated in FIG. 2X for the sake of brevity, it will be appreciated that the actual numbers of categories and/or inter-category relationships may be much larger in some situations, such as to include hundreds, or thousands, or millions, or billions such categories and/or inter-category relationships.

The automated discovery may further continue to identify, for each new category, any comment groups that are part of the new category, and any further corresponding inter-category relationships involving the new category. For example, consider the new EmeraldCityComics category 2720*a*, which may be defined to have one or more associated definition terms, for example, of "EmeraldCityComics" or of ("EmeraldCityComics" OR "Emerald City Comics" OR

#EmeraldCityComics)—such definition term(s) may be identified in various manners, such as from the term(s) or other attribute(s) used to create the comment group, a title of the corresponding comment group, the contents of comments within the comment group, etc. In addition, while Boolean And-Or Logic is used in the second example above to combine multiple terms, it will be appreciated that multiple terms can be specified and used together in various manners in various embodiments, and that some embodiments may include only a single definition term for each category. In a manner similar to that described with respect to FIGS. 2A-2C and elsewhere herein, the definition term(s) used for the new EmeraldCityComics category 2720*a* may be used to identify corresponding user-supplied comments or other content items that are associated with the definition term(s), and to identify some or all of the comment groups that include those identified user-supplied comments or other content items to be included as constituent members of the new EmeraldCityComics category 2720*a*. Such constituent member comment groups are not illustrated in this example, but may, for example, include an "Iron Man" comment group (e.g., based on an Iron Man promotion or event that the Emerald City Comics store is hosting), a "Power Man" comment group (e.g., based on the Power Man comic book character living in Seattle), etc. Information about the new EmeraldCityComics category 2720*a* may be displayed to users and/or used for predictions or other analysis in a manner similar to that of any other defined category. For example, in a manner similar to the displayed GUI of FIG. 2S for an example Seattle category, FIG. 2Y illustrates an example displayed GUI for the new EmeraldCityComics category 2720*a*.

Continuing with the example, after defining the new EmeraldCityComics category 2720*a* and identifying constituent member comment groups, the automated discovery process may continue and consider the topic for each comment group that is a constituent member of the new EmeraldCityComics category 2720*a* as a possible category of its own, such as to create new "Iron Man" and "Power Man" categories 2725*b* and 2725*a* (along with any other constituent member comment groups, not shown, that did not already have corresponding categories). In addition, inter-category relationships may be defined to indicate that the new "Iron Man" and "Power Man" categories 2725*b* and 2725*a* are sub-categories of the EmeraldCityComics category 2720*a*. In a manner similar to that described for the EmeraldCityComics category 2720*a*, each of the new "Iron Man" and "Power Man" categories 2725*b* and 2725*a* may be analyzed to identify corresponding user-supplied comments or other content items that are associated with definition term(s) used to define the new categories 2725*b* and 2725*a*, and to identify some or all of the comment groups that include those identified user-supplied comments or other content items to be included as constituent members of the new categories 2725*b* and 2725*a*. Using the "Iron Man" category 2725*b* as an example, the illustrated GUI screen or page 2700 of FIG. 2X demonstrates that other new "Robert Downey Jr." and "Hawaiian Ironman Race" categories 2725*g* and 2725*f* are discovered and are determined to have inter-category relationships with the "Iron Man" category 2725*b* as sub-categories of the category 2725*b*, and that an additional inter-category relationship is determined from the existing Hollywood category 2710*d* to the new "Iron Man" category 2725*b* as a sub-category of the category 2725*b*. Information about the new "Iron Man" category 2725*b* may be displayed to users and/or used for predictions or other analysis in a manner similar to that of any other defined category, such as is illustrated in the example GUI of FIG. 2Z. Various other example categories 2725*c-l* and inter-category relationships are similarly identified, with the example GUI screen or page of FIG. 2AA corresponding to the "Hawaiian Ironman Race" category 2725*f*, the example GUI screen or page of FIG. 2AB corresponding to the "Nike Ironman shoes" category 2725*h*, and the example GUI screen or page of FIG. 2AC corresponding to the "Gatorade" category 2725*k*.

Such continuing automated discovery may be performed in a recursive manner until all possible new categories are identified in this manner (e.g., until every existing category has been analyzed, and does not have any remaining comment groups that are not already a category), or until other criteria have been satisfied for the automated discovery process (e.g., a specified amount of time has been spent, a specified number of categories have been identified, etc.). In other embodiments, new categories may be identified in other manners, such as to first identify various comment groups from user-supplied comments or other content items during one or more time periods in a manner previously described, and to then treat each such comment group as a category in the manner discussed above. In addition, the automated discovery process may in some embodiments allow new categories to be identified and used that would not otherwise have been identified, including for new trending topics and related categories. Thus, in the example of FIG. 2X, the new discovered categories include a defined Typhoon Haiyan category 2710*f* that includes the Tacloban City comment group 2715*e*, and has a defined inter-category relationship with the corresponding new Tacloban city category 2720*e*. To further facilitate the discovery of rapidly changing information, the GDAP system may in some embodiments, as part of the automated discovery process, also examine information about trending topics and select some or all of them to use as new categories, such as to use statistical methods to determine the trending topics of most interest (e.g., those with the highest current or predicted following, those that are changing the fastest, those that are the most differentiated from other topics, etc.). In addition, while not illustrated in FIG. 2X, some or all of the illustrated comment groups and/or categories may each have determined relevant terms or other attributes (e.g., particular geographical locations, particular author users, etc.), including to be used in some embodiments to identify at least some inter-relationships between categories and/or comment groups, as discussed in greater detail elsewhere herein.

The ability to discover new categories and/or inter-category relationships may provide a variety of benefits, including to allow users to browse through related categories and discover additional new comment groups and topics that may be of interest. Similarly, the ability to discover new comment groups and to discover inter-relationships between comment groups and/or between comment groups and categories may provide a variety of benefits, as discussed further below.

For example, a user may be using the GUI 2200 of FIG. 2S to review current comment groups and topics that correspond to the city of Seattle, and may identify that comment group 2230 corresponding to EmeraldCityComics is of interest, such as to find out information about individual or aggregated user-supplied comments or other content items about the Emerald City Comics store in Seattle. If so, the user may select that comment group 2230 to obtain various information about that comment group within that Seattle category, as discussed in greater detail elsewhere. It will be appreciated that the comments included within the comment group 2230 may in some embodiments and situations be limited to user-supplied comments or other content items that correspond to both Emerald City Comics and Seattle, such as to not include information about the Emerald City Comics store in Eugene, Oreg. Similarly, if a separate Eugene Oreg. category existed and had its own EmeraldCityComics comment group, that comment group may include at least some user-supplied comments or other content items that differ from those in the EmeraldCityComics comment group 2230, such as for content items that include information about the Emerald City Comics store in Eugene, Oreg. but to not include content items that are specific to Seattle.

Rather than using the comment group 2230 of FIG. 2S to obtain information specific to that comment group, a user may instead use that comment group 2230 or another GUI control (e.g., via a pop-up menu accessible from the comment group 2230) to obtain information about the new EmeraldCityComics category that has been defined using the automated discovery process. It will be appreciated that the comment groups included within the new EmeraldCityComics category in some embodiments and situations include additional information that is not part of the comment group 2230 within the Seattle category. For example, as part of the example discussed above, the comment group 2230 within the Seattle category may include information about the Iron Man event or promotion that is occurring within the Seattle Emerald City Comics store. Conversely, an Iron Man comment group within the EmeraldCityComics category may include additional information, such as related to events or promotions within a chain of multiple Emerald City Comics stores that are not limited to the Seattle area.

Thus, after a user uses the comment group 2230 of FIG. 2S to select information about the new EmeraldCityComics category (or otherwise selects that category, such as via a search or browse process), a new GUI screen or page 2800 of FIG. 2Y may be displayed to the user for the new EmeraldCityComics category. In particular, the GUI 2800 of FIG. 2Y corresponds to a category-level view with an example category item 2810 for the EmeraldCityComics category, corresponding to category 2720*a* of FIG. 2X, and with the category item 2810 including a number of sub-items 2820 corresponding to particular comment groups within the category. The comment groups 2820 include a comment group 2820*a* for Iron Man and a comment group 2820*b* for Power Man, as well as various other example comment groups that are not identified for the sake of brevity. These various comment groups 2820 may be selected and used in a manner similar to that previously described elsewhere, including to obtain individual and/or aggregated information about user-supplied comments or other content items related to the topics of those comment groups within the EmeraldCityComics category. While not illustrated in FIG. 2Y, the GUI 2800 may further have various textual information and user-selectable controls to enable the user to obtain additional information, in a manner similar to that discussed elsewhere herein.

In addition, the user may continue to explore related categories and topics in a similar manner. For example, the user may use any of the displayed comment groups to obtain more information about the topics of those comment groups within the EmeraldCityComics category, or may instead use a particular comment group such as the comment group 2820*a* of FIG. 2Y to select to see information about the new Iron Man category that corresponds to that comment group 2820*a*. If the user selects to see information about the category corresponding to comment group 2820*a*, a new GUI screen or page 2900 of FIG. 2Z may be displayed to the user for the new Iron Man category. In particular, the GUI 2900 of FIG. 2Z corresponds to a category-level view with an example category item 2910 for the Iron Man category, corresponding to category 2725*b* of FIG. 2X, and with the category item 2910 including a number of sub-items 2920 corresponding to particular comment groups within the category. The comment groups 2920 in this example include a comment group 2920*a* for Robert Downey Jr. and a comment group 2920*b* for the Hawaiian Ironman triathlon race, as well as various other example comment groups. These various comment groups 2920 may similarly be selected and used in a manner similar to that previously described elsewhere, including to obtain individual and/or aggregated information about user-supplied comments or other content items related to the topics of those comment groups within the Iron Man category, or instead or in addition to obtain information about new categories corresponding to the comment groups (e.g., to select comment group 2920*a* to obtain information about a new Robert Downey Jr. category). While not illustrated in FIG. 2Z, the GUI 2900 may further have various textual information and user-selectable controls to enable the user to obtain additional information, in a manner similar to that discussed elsewhere herein.

Thus, the user may similarly continue to explore related categories and topics from the GUI 2900 of FIG. 2Z, such as to use any of the displayed comment groups to obtain more information about the topics of those comment groups within the Iron Man category, or to instead use a particular comment group to select to see information about a corresponding category that is not limited to the context of the current Iron Man category. For example, if the user selects to see information about the category corresponding to comment group 2920*b*, a new GUI screen or page 3000 of FIG. 2AA may be displayed to the user for the corresponding new Hawaiian Ironman Race category. In particular, the GUI 3000 of FIG. 2AA corresponds to a category-level view with an example category item 3010 for the Hawaiian Ironman Race category, corresponding to category 2725*f* of FIG. 2X, and with the category item 3010 including a number of sub-items 3020 corresponding to particular comment groups within the category. The comment groups 3020 in this example include a comment group 3020*a* for Kona, a comment group 3020*b* for Triathalons, and a comment group 3020*c* for Nike Ironman shoes, as well as various other example comment groups. These various comment groups 3020 may similarly be selected and used in a manner similar to that previously described elsewhere, including to obtain individual and/or aggregated information about user-supplied comments or other content items related to the topics of those comment groups within the current category, or instead or in addition to obtain information about new categories corresponding to the comment groups. While not illustrated in FIG. 2AA, the GUI 3000 may further have various textual information and user-selectable controls to enable the user to obtain additional information, in a manner similar to that discussed elsewhere herein.

The user may similarly continue to explore related categories and topics from the GUI 3000 of FIG. 2AA, such as to use any of the displayed comment groups to obtain more information about the topics of those comment groups within the Hawaiian Ironman Race category, or to instead use a particular comment group to select to see information about a corresponding category that is not limited to the context of the current Hawaiian Ironman Race category. For example, if the user selects to see information about the category corresponding to comment group 3020*c*, a new GUI screen or page 3100 of FIG. 2AB may be displayed to the user for the corresponding new Nike Ironman shoes category. In particular, the GUI 3100 of FIG. 2AB corresponds to a category-level view with an example category item 3110 for the Nike Ironman shoes category, corresponding to category 2725*h* of FIG. 2X, and with the category item 3110 including a number of sub-items 3120 corresponding to particular comment groups within the category. The comment groups 3120 in this example include a comment group 3120*a* for Nike, a comment group 3120*b* for Lebron X, a comment group 3120*c* for Adidas, a comment group 3120*d* for Nike Air Jordan, a comment group 3120*e* for Gatorade, and a comment group 3120*f* for Ironman Elite shoes by Newton, as well as various other example comment groups. These various comment groups 3120 may similarly be selected and used in a manner similar to that previously described elsewhere, including to obtain individual and/or aggregated information about user-supplied comments or other content items related to the topics of those comment groups within the current category, or instead or in addition to obtain information about new categories corresponding to the comment groups. While not illustrated in FIG. 2AB, the GUI 3100 may further have various textual information and user-selectable controls to enable the user to obtain additional information, in a manner similar to that discussed elsewhere herein.

The GUI screen or page 3100 of FIG. 2AB further provides non-exclusive examples of how promotional information may be provided to users within the GUI of the GDAP system. For example, a representative of the Nike company may have acted as an advertiser, and previously provided a request to the GDAP system for specified Nike-related promotional information (e.g., information related to the Nike company, information related to the Nike brand, information related to one or more Nike products, information related to one or more Nike services, etc.) to be supplied to users in specified circumstances. The specified circumstances may, for example, correspond to any display of information in the GUI that includes a "Nike" comment group (such as comment group 3120*a*), or instead that satisfies other specified types of circumstances (e.g., any information display that has a comment group that includes the term "Nike", such as comment groups 3120*a* or 3120*d*; any information display about the "Nike Ironman shoes" category 3110, such as a category-level view for that category as illustrated in FIG. 2AB; any information display about a category that includes the term "Nike", such as the "Nike Ironman shoes" category 3110; based on the determined relevant terms or other attributes for a comment group or category including the term "Nike" or one or more other indicated attributes; etc.). In addition, the specified circumstances may include various other details, such as particular times, particular numbers of instances of presenting the promotional information, particular types or groups of users to whom to present the promotional information, particular portions of the GDAP service's GUI in which to display the promotional information (e.g., as part of category-level views but not comment group-level views), etc., as discussed in greater detail elsewhere herein.

In addition, promotional information may be provided to users in various ways. For example, in some embodiments and situations, additional promotional information may be displayed externally to or separately from the other information being displayed, such as promotional information 3105 being separate from category item information 3110 in the example of FIG. 2AB. Furthermore, such promotional information 3105 may be displayed or otherwise presented in various manners, such as in a manner similar to a banner ad, a hover-based ad, another type of pop-up ad, etc., as well as by presenting textual information, images, audio, video, etc. Alternatively, in some embodiments and situations, promotional information may be included as part of user-requested information that is otherwise being displayed, whether instead of or in addition to other additional promotional being displayed—in FIG. 2AB, for example, the representation 3120*a* for the Nike comment group within the category information 3110 may be enhanced as part of the providing of promotional information for advertiser Nike, such as by increasing the size of the representation 3120*a* and/or by otherwise increasing the prominence of how the representation 3120*a* is displayed (e.g., via highlighting, bold, color, blinking or other visual animation or enhancement, etc.). It will be appreciated that promotional information may be displayed in various other manners in other embodiments.

The user may similarly continue to explore related categories and topics from the GUI 3100 of FIG. 2AB, such as to use any of the displayed comment groups to obtain more information about the topics of those comment groups within the Nike Ironman shoes category, or to instead use a particular comment group to select to see information about the category that corresponds to that comment group. For example, if the user selects to see information about the category corresponding to comment group 3120*e*, a new GUI screen or page 3200 of FIG. 2AC may be displayed to the user for the corresponding new Gatorade category. In particular, the GUI 3200 of FIG. 2AC corresponds to a category-level view with an example category item 3210 for the Gatorade category, corresponding to category 2725*k* of FIG. 2X, and with the category item 3210 including a number of sub-items 3220 corresponding to particular comment groups within the category. The comment groups 3220 in this example include a comment group 3220*a* for BVO food additive, a comment group 3220*b* for Superbowl XLVIII celebration, a comment group 3220*c* for NCAA football, a comment group 3220*d* for University of Florida, and a comment group 3220*e* for Powerade, as well as various other example comment groups. These various comment groups 3220 may similarly be selected and used in a manner similar to that previously described elsewhere, including to obtain individual and/or aggregated information about user-supplied comments or other content items related to the topics of those comment groups within the current category, or instead or in addition to obtain information about new categories corresponding to the comment groups. While not illustrated in FIG. 2AB, the GUI 3200 may further have various textual information and user-selectable controls to enable the user to obtain additional information, in a manner similar to that discussed elsewhere herein. It is noted that, if advertiser Nike had specified circumstances for its Nike-related promotional information similar to those discussed with respect to FIG. 2AB, such Nike-related promotional information may not be selected for use in the GUI screen or page 3200 of FIG. 2AC, such as due to the lack of any Nike-related terms, comment groups or categories displayed in the GUI screen or page 3200.

Thus, by using inter-relationships between multiple categories and between categories and their comment groups, a user may review a wide variety of types of information, including to quickly review information that may be unrelated to an original starting point (e.g., by reaching information about Iron Man in FIG. 2Z and/or about Gatorade in FIG. 2AC that may be unrelated to the original Seattle-related information of the Seattle category in FIG. 2S from which this user's exploration of categories began). While not illustrated in these example figures, a user may similarly explore a succession of multiple inter-related comment groups, or a succession of inter-related comment groups and categories, with similar types of information about such selected comment groups and/or selected interspersed comment groups and categories being displayed to the user.

As discussed with respect to FIG. 2S and FIGS. 2Y-2AC, a particular user in this example has explored a series of inter-related categories, which in this example include Seattle, EmeraldCityComics, Iron Man, Hawaiian Ironman Race, Nike Ironman shoes, and Gatorade. The information page 3250 of FIG. 2AD includes example information 3255*a*-3255*f* that represents this exploration, such as for use as a possible defined user journey. For example, the user who explored these inter-related categories may indicate to define this series of six categories as a user journey, including to save it for possible later use by the user. While not illustrated here, a user may similarly explore a succession of multiple inter-related comment groups, or a succession of inter-related and interspersed comment groups and categories, and such a succession may similarly be defined as a user journey and used in the manners discussed below.

While not illustrated in this example, the current user may in some embodiments be allowed to designate a particular user journey in various other manners, such as by receiving information that illustrates some or all activities previously taken by the current user during a current interaction session with the GUI, with user-selectable controls to allow the user to select some or all of those activities to include as part of a current defined user journey. Thus, with respect to the example of FIG. 2AD, the current user may be presented with information such as categories 3255*a*-3255*f*, and determine to designate a defined user journey that includes categories 3255*a*-3255*d*, a defined user journey that includes categories 3255*b*-3255*f*, and/or a defined user journey that includes categories 3255*a*-*b* and 3255*d*-*e*. Thus, as discussed in greater detail elsewhere, in some embodiments the current user may define a user journey other than in a manner of sequential categories and/or comment groups. In addition, in at least some embodiments, the GDAP service may automatically identify at least some user journeys based on activities of particular users that meet specified criteria (e.g., to identify a sequence of selections of inter-related categories and/or comment groups that are independently made by at least a specified number of different users).

In addition, in at least some embodiments, a user who defines a user journey may also optionally provide information about the user journey to other users. For example, in FIG. 2AD, the current user who explored the inter-related categories may use user-selectable GUI controls 3260*a* in order to specify one or more hashtags for the user journey, and to submit those hashtags using control 3265*a* for other users to search for or otherwise discover via the GUI of the GDAP system. In addition to or instead of such user-selectable controls 3260*a*, the example GUI screen 3250 also includes user-selectable controls 3260*b* with which the current user can provide information about the defined user journey to one or more other specified users. In particular, in this example, the current user may specify a textual message to be provided to the other user(s), and may further designate one or more specified users to whom to send the textual message and information about the user journey using user-selectable controls 3265*c*. Alternatively or in addition to sending such information to particular specified users, a current user may indicate using user-selectable control 3265*b* to share this information with other users, such as to post the information to an account of the current user that is accessible to at least some other users (e.g., to designated friends of the current user). It will be appreciated that the current user may specify ways to provide information about the defined user journey to other users in other manners in other embodiments.

FIG. 2AE illustrates additional information 3300 that provides an alternative representation of the defined user journey discussed with respect to FIG. 2AD. In particular, in the example of FIG. 2AE, information similar to that of FIG. 2X is illustrated, but with particular information categories 2710 being highlighted and annotated to indicate a particular defined user journey. Thus, a sequence of categories 2710*a*, 2720*a*, 2725*b*, 2725*f*, 2725*h*, and 2725*k* is illustrated in this example. In some embodiments, such an information display may be provided to some or all users of the GDAP service, while in other embodiments such information may not be displayed to users. For example, information about the information categories 2710 may in some embodiments be displayed to a user who uses the information to define a user journey by selecting a group of multiple inter-related categories, whether based on a series of inter-related categories previously visited by the user, or instead by selecting the group of multiple inter-related categories based solely on interactions with the displayed information categories 2710 information.

While not illustrated here, the GDAP service may further provide various GUI screens to users to allow them to perform other types of journey-related activities, such as to search for defined user journeys (e.g., based on hashtags, or determined relevant terms or other attributes included in at least one or some or all categories and/or comment groups of a journey, or other specified search criteria), to display lists or other information about at least some defined user journeys (e.g., rankings or other lists of popular and/or trending defined user journeys), to vote on or otherwise specify positive or negative interest in particular defined user journeys, to review defined user journeys associated with particular users and/or particular categories and/or particular comment groups (e.g., by providing comments and/or ratings with respect to a defined ratings metric), to retrieve and review information about defined user journeys or other information sent directly to the user by others, to review posts made by other users with which the current user has a defined friendship or other relationship, etc.

FIG. 2AF illustrates an example GUI 3400 that has a category-level view of the Iron Man category, in a manner similar to that of FIG. 2Z. However, in the example of FIG. 2AF, a second user has selected to playback the defined user journey that was created by the first user as previously discussed with respect to FIG. 2S and FIGS. 2Y-2AD. In this example, the playback of the defined user journey has progressed through the Seattle category and the EmeraldCityComics categories, and is currently on the third Iron Man category of the defined user journey.

In the example of FIG. 2AF, the playback of the defined user journey is performed in a manner that allows the second user to control the rate at which the playback and movement between the inter-related categories occurs, but does not allow the second user to deviate from the series of inter-related categories of the example defined user journey, although in other embodiments the playback may occur without any user control (e.g., by displaying each category-level view of the example defined user journey for a defined amount of time before automatically progressing to the next category-level view of the example defined user journey), or instead the GUI may allow the second user to leave the playback at any time (e.g., by indicating to the second user which selection to make to move to the next category-level view in the inter-related categories for the example defined user journey, or optionally a next comment group-level view for another defined user journey in which the next selected item was a comment group, but allow the second user to make another selection if so desired). In particular, in this example, the comment group 3420*b* of the GUI 3400 corresponds to the next category-level view for the defined user journey, and in this example embodiment is displayed in a highlighted and user-selectable manner, while other comment groups 3420 are deemphasized and in this example are not user-selectable controls. In this manner, when the user is ready to move to the next category-level view of the example defined user journey, the user may select the displayed comment group 3420*b* to move ahead, although in other embodiments may control the playback of the example defined journey in other manners (e.g., to have a user-selectable 'Next' control that is displayed separately from the category information 3410).

FIG. 2AF further illustrates that promotional information may be associated with and displayed in conjunction with a defined user journey. For example, if an advertiser specified promotional information to be displayed in circumstances that include Nike-related information displays, but without being associated with any defined user journeys, the current category-level view for the Iron Man category may not qualify to receive such promotional information, since it does not in this example include any Nike-related information. However, if the advertiser instead specified circumstances for the Nike-related promotional information that include a defined journey with a Nike-related category as part of the journey (e.g., Nike Ironman shoes) or a defined user journey that has one or a specified number of category-level views that include Nike-related comment groups (e.g., the Nike Ironman shoes and/or Hawaiian Ironman Race categories) and/or comment group-level views related to Nike, optionally by considering associated determined relevant terms or other attributes for the comment groups and/or categories, the current category-level view of the playback of the defined user journey may qualify to receive a display of such Nike-related promotional information based on being part of a user journey that satisfies such specified circumstances (despite Nike-related information not being displayed at the current time). Thus, in this example, the Nike promotional information 3405 is displayed to the user during the playback of the example defined user journey based on such journey-related advertising circumstances associated with this promotional information. It will be appreciated that advertisers may specify promotional information to be displayed in other manners in other embodiments, whether for defined user journeys or otherwise.

In addition, as previously noted, the GDAP service may in some embodiments and situations generate predicted information related to future user-supplied comments that are expected to be received, such as with respect to particular comment groups and/or categories. In a similar manner, the GDAP service may in some embodiments similarly generate predicted information about the playback or other use of a particular defined user journey that is expected to occur over one or more future periods of time, such as by tracking the usage and/or popularity of the defined user journey over multiple prior time periods (e.g., based on the number of users who playback, who positively vote on the defined user journey, etc.), and use prediction templates or other types of prediction methods to predict how the usage and/or popularity of the defined user journey will continue over one or more future time periods. Thus in a manner similar to that displayed with respect to FIG. 2D and FIG. 2E, the GDAP service may predict the future use of particular defined journeys, and provide corresponding information to at least some users.

In addition to such prediction of future use of a defined user journey by various users of the GDAP service, the GDAP service may further use information about defined user journeys to affect the display of information to users who are not currently performing a playback of or otherwise using a particular user journey. For example, FIG. 2AG illustrates a GUI 3500 screen in which a current user is currently displaying a category-level view of the Iron Man category, with category icon 3510 including related information for the category, including indications of various comment groups 3520 that are part of the current category. Moreover, in the current example, while the user is not performing a playback of the previously discussed user journey, the GDAP service has identified the previously discussed user journey as being of possible interest to the current user (e.g., based on the current user having previously viewed the Seattle and EmeraldCityComics categories before the current Iron Man category, and thus having independently participated in the first three inter-related categories of the defined user journey).

Accordingly, the GDAP service has modified the current display 3500 in this example based on such identification of possible interest of the current user in that defined user journey. In particular, the comment group 3520*b* corresponding to the Hawaiian Ironman Race comment group, which corresponds to the next category along the example defined user journey, has been modified in the current display to be visually enhanced, such as to have a larger size and/or bolded visual display, to reflect that the comment group 3520*b* may be of enhanced interest to the current user. If the current user then proceeds to select the category corresponding to comment group 3520*b* for display, the GDAP service in some embodiments may automatically initiate playback of the example defined user journey to the current user (optionally with an indication to the user of the playback that is being performed), while in other embodiments may display the information about the next Hawaiian Ironman Race category to the current user without such journey playback being initiated (but optionally with the display of that next category being similarly modified to enhance its comment group corresponding to the following category of the defined user journey, and/or with a control that allows the user to select to initiate the playback). In other embodiments, the comment group 3520*b* could be indicated to the current user in other manners, such as to have its visual display the same as shown in FIG. 2Z, but with other user-selectable controls or information displayed in the GUI 3500 to indicate the possible user journey of interest (e.g., to allow the user to begin playback of the user journey from the current category, and to continue through the three remaining inter-related categories). In yet other embodiments, the information about the possible relevance of the defined user journey may be used to enhance the display of the comment group 3520*b* in the manner shown in FIG. 2AG, but without any user-selectable controls to allow the user to playback the defined user journey.

FIG. 2AG also illustrates an additional possible use of promotional information in example GUI 3500. In particular, as previously illustrated and discussed with respect to FIGS. 2Z and 2AF, the Iron Man category does not currently include a "Nike" comment group. However, if an advertiser or other external entity had specified circumstances that are satisfied by the current category-level information display, and has requested that Nike-related promotional information be provided in such a situation, the category-level information 3510 may be further altered to include a new comment group 3520*c* corresponding to the Nike-related promotional information, such as by adding a new comment group to the display for possible selection by the user, despite it not otherwise being currently part of this category. It will be appreciated that, in some such embodiments, such promotionally added comment groups may be visually indicated to a user as being sponsored or otherwise newly added information, while in other embodiments such an added comment group may be displayed to the user without any visual indication that it is sponsored or otherwise newly added to the display.

FIG. 2AH illustrates a GUI 3600 similar to that of FIG. 2AC with a category-level view for the Gatorade category, but with the GUI screen 3600 being enhanced to include additional promotional information 3605. For example, a brand-related analysis of information by the GDAP service may have determined a relationship between the Nike brand and the Gatorade category, and an advertiser or other external entity may have correspondingly decided to include such promotional information related to Nike with the Gatorade category information. Such a brand-related analysis may determine the relationship between the Nike brand and the Gatorade category in various manners. For example, with respect to the inter-related category information 2700 of FIG. 2X, it can be seen that the Gatorade category 2725*k* is a sub-category of the Nike category 2725*i*, and may further be of interest for Nike-related advertising based on it being a non-competitive complementary product. Alternatively, such category-related information 2700 could be used by a Nike advertiser to identify other competitive brands or products that are related to the Nike brand, such as for use in providing Nike-related promotional information in conjunction with such competitive categories, with one competitor example being the Adidas category 2725*j*. The brand-related analysis by the GDAP service may similarly identify the Gatorade category as being related to the Nike category based on user activities in using the GUI of the GDAP service, such as based on popularity of the previously discussed example defined user journey that includes both the Gatorade category and other categories related to Nike (e.g., the Nike Ironman shoes category), and/or based on other similar user activities via the GUI that indicate a relationship between Nike-related products and Gatorade. In some embodiments, the GDAP service may perform a statistical analysis to identify other categories that are included in defined user journeys in which a particular brand or other indicated category is also included.

As previously noted, user journeys may be defined in various manners in various embodiments, including to allow a user who has participated in a series of interactions with the GUI to specify that a particular series of past interactions are part of a new user journey. In other embodiments and situations, the GDAP service may automatically identify some or all such defined user journeys based on analyzing usage data from the GDAP system and its service, such as by tracking the aggregate popularity across all users of the GDAP service of any sequence of sequential inter-related category views and/or comment group views of a specified minimum or exact length, such as to identify a most popular group of such user journeys (e.g., a top N number of such user journeys, a top P percentage of such user journeys, etc.). In addition, in some embodiments, such user journeys may be defined in manners other than a sequential set of a specified number of category views and/or comment group views, such as a user journey that includes a specified number X categories and/or comment groups within a total number of Y category and/or comment group selections (e.g., by including a particular group of 5 categories and/or comment groups in any combination of 8 category and/or comment group selections), whether with those 5 categories and/or comment groups being in any order, or instead with those 5 categories and/or comment groups being in an indicated order relative to each other (e.g., with category A being before category B and category B being before category C, but optionally with other categories between A and B and/or between B and C). Another alternative would be to include at least M of a set of N categories and/or comment groups together, such as any 5 of these 7 identified categories and/or comment groups, whether in a sequence of only 5 categories and/or comment groups, or in a larger group of L categories and/or comment groups (e.g., any 5 of those 7 being included in any 9 total categories and/or comment groups). Another alternative is to include a sequence of particular categories and/or comment groups, but to include multiple alternatives for a particular category view and/or comment group view, such as a defined user journey that includes category A, followed by category B, followed by any one of categories C or D or E, followed by category F, etc. It will be appreciated that user journeys may be specified in various other manners in various embodiments, and may be defined in any manner that allows a determination of whether a series of user activities correspond to a particular defined user journey.

As previously noted, advertisers or other entities may specify promotional information to include in various manners in various embodiments. For example, an advertiser or other entity may specify or request that a particular piece of promotional information be displayed in a particular situation, and may optionally pay a corresponding fee to the GDAP service for that to occur. Alternatively, such advertisers or other external entities may provide bids as to an amount of money that they are willing to pay to have a particular piece of promotional information displayed in a particular situation, with the highest bid for a particular situation being selected and used when such situations arise, and the advertisers or other external entities being billed accordingly. As previously noted, such advertisers or other external entities may specify various factors related to situations in which their promotional information is to be displayed, including time periods during which a campaign is effective, particular times of day during which a campaign is effective, etc. In addition, advertisers or other entities may specify particular terms or other attributes (e.g., definition terms, determined relevant terms or other attributes, etc.), comment groups, categories, journeys, user groups, user types, etc., as factors to define a particular situation in which promotional information is to be displayed. Advertisers or other entities may further specify additional factors to be used in determining circumstances in some embodiments and situations, such as to include particular promotional information with a particular comment group or category that is included in a journey that is trending or sufficiently popular, with any trending categories or comment groups or popular journeys, with a particular comment group or category regardless of whether it is being displayed as part of a user journey, etc. In addition, information about popularity or trending information may be combined with other types of information, such as to include a particular piece of promotional information with any trending topic or comment group within a particular category of interest, for any comment group and/or category that is predicted to increase in popularity over an upcoming specified period of time, etc.

As noted above, in some embodiments a defined category may be associated with a single definition term, while in other embodiments a defined category may have multiple associated definition terms (or may be defined in a manner other than via associated terms). If multiple definition terms are used, they may be specified and combined in various manners, including by using Boolean Logic. For example, multiple terms may be used to capture alternative representations of a single idea (e.g., “EmeraldCityComics” and “Emerald City Comics”, “AT&T” and “ATT”, etc.), to capture related representations (e.g., “EmeraldCityComics” and “#EmeraldCityComics”), etc. In addition, multiple definition terms may be combined in manners to affect a quantity and/or type of comment groups that are identified as belonging to a particular category. For example, if a category is initially defined with a single term but it has too few associated user-supplied comments or other content items that are associated with the term, the category definition may be expanded to include one or more alternative or related representations, as indicated above. Conversely, if a category is initially defined with a single term but it has too many associated user-supplied comments or other content items that are associated with the term, and/or comments that appear to be directed to multiple independent groupings, the category definition may be narrowed using one or more additional terms, such as to effectively split the category into multiple smaller categories. For example, if an Apple category is defined related to the computer company with a single “Apple” term, it could be separated into a category that is more specifically focused on the company’s phone products via a change in the definition to (“Apple” AND “iPhone”), and other related categories for other Apple product lines could optionally be created (e.g., “Apple” AND “iPod”, “Apple” AND (“Mac” OR “iPad”), etc.). Conversely, if an Apple category is defined with a single “Apple” term and is including comments about both the computer company and the fruit, the category definition could be expanded to focus on just the computer company (e.g., “Apple” AND NOT (“fruit” or “cook*” or “juicy”), “Apple” AND (“iPad” OR “iPhone” OR “Mac” OR “iPod” OR “Jobs”), etc.). In at least some embodiments, such category definition modification may be automatically performed, such as part of the automated discovery process, based on factors such as the number of comments or other content items in the category being too small (e.g., below a defined threshold) or being too large (e.g., above a defined threshold), and optionally by identifying topics within the content items of the category as part of identifying possible additional terms to add as part of the category definition. While in some embodiments such modifications to a category’s definition may be automatically performed by the GDAP system, in other embodiments at least some such category definition modifications may be performed based at least in part on human input (e.g., by an operator of the GDAP system, by a client of the GDAP system, etc.).

It will be appreciated that the details discussed with respect to the examples of FIGS. 2L-2AH are provided for illustrative purposes, and that the described techniques may be used with a variety of other types of user-supplied information and may be performed in a variety of other ways.

FIG. 2AI illustrates information 3700 that includes category-level view information for multiple categories, in a manner similar to that of FIGS. 2Z, 2AA and 2AC that show category-level view information separately for some of the categories illustrated in FIG. 2AI (i.e., example categories “Iron Man” 3730, “Gatorade” 3710 and “Hawaiian Ironman Race” 3750), and also illustrates an additional example “Technology” category 3755. In addition, the information 3700 includes further information 3770-3795 related to various types of inter-relationships between categories and/or comment groups that may be determined by the GDAP service.

Information about the four illustrated categories, their respective comment groups, and the comments and other content items included in those comment groups and categories has been analyzed in order to determine and identify various types of inter-relationships. While the example below discusses user comments that are included in comment groups and/or categories, it will be appreciated that other types of user-supplied content items may be included and analyzed in other embodiments, whether instead of or in addition to user comments. Similarly, while the example below discusses term-based attributes that may be used to identify at least some of the determined types of inter-relationships, it will be appreciated that other non-term-based attributes may similarly be used to determine and identify various types of inter-relationships in other embodiments, whether instead of or in addition to user comments.

As one example, each of the Iron Man, Gatorade, and Hawaiian Ironman Race categories has been identified to include a comment group with a topic related to the term “technology” in this example, with those comment groups **3740*f*, 3720*f* and 3760*f* being illustrated respectively for categories 3730, 3710 and 3750. Due to the three comment groups sharing a common topic (e.g., having one or more overlapping or identical definition terms, not shown, for the comment groups, such as “technology” and/or “technological”), the three comment groups have been identified as being inter-related on that basis, and have been linked to each other, as shown by lines 3770 of a first type. As discussed in greater detail elsewhere, it will be appreciated that the different technology comment groups may include different comments (in whole or in part) from each other, based on their inclusion in their respective categories. Thus, the technology comment group 3720*f* of the Gatorade category 3710 may include comments that relate to technology within the Gatorade category (e.g., technology used to develop the Gatorade formula), while the comments in the technology comment group 3740*f* of the Iron Man category 3730** may include comments related to technology corresponding to Iron Man (e.g., technology of the Iron Man suit, technology used in making the Iron Man movies, etc.).

In addition to the three illustrated technology comment groups being inter-related via links 3770 of the first type, each of those technology comment groups is also related to the Technology category 3755 via a link **3780*b* of a second type, such as to reflect a child-parent or subset-superset relationship. As discussed in greater detail elsewhere, the Technology information category 3755 may include a variety of technology-related comment groups, including comments that are not necessarily related to other of the Gatorade, Iron Man, and Hawaiian Ironman Race categories, although particular such comment groups and comments are not illustrated here. In a similar manner, the Hawaiian Ironman Race comment group 3740*b* of the Iron Man category 3730 is related to the Hawaiian Ironman Race category 3750 via a link 3780*a* of the second type, in a manner similar to that previously discussed with respect to FIG. 2**X.

In addition to the illustrated inter-relationships of the first and second types between particular comment groups and other categories to which those comment groups do not directly belong, the illustrated types of inter-relationships also include one or more inter-relationships from categories to other categories. For example, the illustrated link 3785 indicates that the Iron Man category 3730 and the Hawaiian Ironman Race category 3750 have been determined to be related to each other. Such an inter-category relationship may be determined in various manners, such as based at least in part on the link 3780*a* in this example between the comment group 3740*b* of category 3730 and the category 3750, and/or based at least in part on the link 3770 between the technology groups 3740*f* and 3760*f* in the two categories 3730 and 3750—for example, in one embodiment, the strength of the relationship between two such categories may be based at least in part on a quantity of comment group-to-category and/or comment group-to-comment group links between those two categories. In addition, such an inter-category relationship may be determined on other factors in at least some embodiments, whether in addition to or instead of such a link 3780*a* and/or such a link 3770, such as based on the two categories sharing topics, comment groups, determined relevant terms and/or non-term attributes (e.g., one or more particular geographical locations, one or more particular author users, etc.), etc., as discussed in greater detail elsewhere.

In addition to such an inter-category relationship between categories 3730 and 3750, the illustrated types of inter-relationships in this example further include multiple inter-comment group relationships. For example, the Hollywood comment group 3740*g* of the Iron Man category 3730 is determined in this example to be related to the NCAA football comment group 3720*b* of the Gatorade category 3710, as reflected by the illustrated link 3790 of a third type. Such inter-comment group relationships may be determined in various manners in various embodiments, such as based on shared terms or other attributes (e.g., particular geographical locations, particular author users, etc.) that are determined to be relevant to both comment groups and/or shared comments (e.g., textual comments, photos, videos, information links, etc.) between the comment groups, with additional details regarding such relevance discussed elsewhere herein. As one non-exclusive illustrative example, the two comment groups 3740*g* and 3720*b* may be determined to both have highly relevant terms of "TV revenue" and "TMZ" based on the comments included in the comment groups, and/or to both be highly relevant to one or more geographical location attributes (e.g., based on including comments from the one or more geographical locations) and/or to one or more author user attributes (e.g., based on including comments from the one or more author users), although such determined relevant terms or other attributes for the comment groups are not illustrated in this example. In a similar manner, the Hollywood comment group 3740*g* of the Iron Man category 3730 is also determined to be related to the technology comment group 3720*f* of the Gatorade category 3710, as illustrated by the link 3792 of the third type between the comment groups 3740*g* and 3720*f*, although the Hollywood comment group 3740*g* is not identified in this example as being related to the other example technology comment groups 3740*f* and 3760*f*. As with the link 3790, the inter-comment group relationship between comment groups 3740*g* and 3720*f* may be based on various factors in various embodiments—as one non-exclusive illustrative example, the comment groups 3740*g* and 3720*f* may share one or more relevant attributes based on having one or more determined relevant author users who submit comments included in both comment groups and/or based on having a determined relevant geographical location from which comments included in the two comment groups originate.

In addition to the illustrated inter-comment group relationships, FIG. 2AI further includes an additional example inter-category relationship 3795 of a fourth or fifth type that reflects that the Iron Man category 3730 and the Gatorade category 3710 are related. As with the inter-category relationship reflected by link 3785, the relationship between the categories 3730 and 3710 may be determined in various manners in various embodiments, including based at least in part on the inter-comment group links 3790 and/or 3792, based on the inter-comment group relationship 3770 between the technology comment groups 3740*f* and 3720*f*, etc. As previously noted, other types of relationships between the categories 3730 and 3710 may also be used to determine their inter-relationship in some situations, whether instead of or in addition to the information related to the links 3790, 3792 and 3770, such as based on shared relevant topics, comment groups, comments, terms, non-term attributes, etc. Additional details related to multiple types of inter-relationships between categories and/or comment groups are included elsewhere herein.

It will be appreciated that inter-relationships between categories and/or comment groups may be determined and illustrated in a variety of other manners in other embodiments, and that the details illustrated with respect to FIG. 2AI are included for the purposes of illustration. In some embodiments, information similar to that of FIG. 2AI may be displayed to non-administrative users in some embodiments (e.g., clients of the GDAP service), while in other embodiments such information may be determined by the GDAP service but be made available only to administrative users (e.g., users who participate in operating the GDAP service) or not made available to any users.

FIG. 2AJ includes information 3800 that continues the example of FIG. 2AI, including to illustrate additional information about determined inter-relationships between particular illustrated categories and/or comment groups. In particular, FIG. 2AJ includes information that is somewhat similar to that previously illustrated with respect to FIG. 2X, including to illustrate information about various example information categories 3810, as well as various example information comment groups 3815. In this example, the illustrated information categories 3810 include categories Iron Man 2725*b*, Gatorade 2725*k*, and Hawaiian Ironman Race 2725*f*, in a manner similar to that discussed with respect to FIG. 2X, as well as to correspond to information categories 3730, 3710 and 3750 discussed in FIG. 2AI. In addition, FIG. 2AJ includes a Technology category 3830*a* that corresponds to category 3755 of FIG. 2AI, as well as other categories Nike 2725*i*, Seattle 2710*a* and Honolulu 3830*b* that are not illustrated in the example of FIG. 2AI.

In the example of FIG. 2AJ, various inter-category relationships are illustrated between some of the information categories 3810, such as to correspond to the inter-category relationships discussed with respect to FIG. 2AI. Such inter-category relationships include relationship 3850*a* between the Iron Man and Gatorade categories, and relationship 3850*b* between the Iron Man and Technology categories, as shown in FIG. 2AI. In addition, other inter-category relationships 3850*c* and 3850*d* are illustrated between the Technology and Seattle categories, and the Honolulu and Hawaiian Ironman Race categories, respectively, although such inter-category relationships are not illustrated in FIG. 2AI. Furthermore, other inter-category relationships are illustrated in a manner similar to that previously discussed with respect to FIG. 2X, including between the Nike and Hawaiian Ironman Race categories, between the Nike and Gatorade categories, and between the Iron Man and Hawaiian Ironman Race categories.

In addition to the inter-category relationships illustrated in FIG. 2AJ, various inter-comment group relationships are also illustrated between various of the information comment groups 3815. Such inter-comment group relationships include inter-relationships between the three technology comment groups 3815*a*, 3815*b* and 3815*c*, which are respectively part of the Iron Man, Hawaiian Ironman Race, and Gatorade categories (as shown in the illustrated names for the comment groups), and correspond to comment groups 3740*f*, 3760*f* and 3720*f* of FIG. 2AI. In addition, an inter-comment group relationship 3860*a* is illustrated between the Hollywood comment group 3815*d* of the Iron Man category and the NCAA football comment group 3815*e* of the Gatorade category, corresponding to link 3790 of FIG. 2AI—as illustrated in this example with respect to link 3860*a*, such an inter-comment group relationship may be determined between the two comment groups based on them sharing high relevance term attributes, which include the terms "TV revenue" and "TMZ" in this example. In addition, the illustrated inter-comment group relationships include a relationship 3860*b* between the technology comment group 3815*c* of the Gatorade category and the Hollywood comment group 3815*d* of the Iron Man category, corresponding to link 3792 of FIG. 2AI—the illustrated information for the link 3860*b* in this example indicates that the inter-relationship may be determined based on the comment groups sharing high relevance non-term attributes, which may include a highly relevant common author for the comments included in the two comment groups and/or a highly relevant common comment location for the comments included in the two comment groups. It will be appreciated that a particular inter-relationship may be based on a combination of one or more relevant term attributes and one or more relevant non-term attributes in other situations.

In addition to these example inter-category relationships and the inter-comment group relationships, additional information is illustrated with respect to relationships between particular categories and comment groups. For example, each of the illustrated comment groups includes a link to reflect its membership in the category to which it belongs, with comment group 3815*a* having a membership link to the Iron Man category 2725*b*, comment group 3815*c* including a membership link to the Gatorade category 2725*k* and the comment group 3815*b* including a link to the Hawaiian Ironman Race category 2725*f*. In addition, each of the technology comment groups includes a child-parent type link to the respective Technology category 3830*a*. The other comment groups 3815*d*, 3815*e* and 3815*f* each include corresponding membership links to the categories to which they belong, such as the membership link from the Hawaiian Ironman Race comment group 3815*f* to the Iron Man category 2725*b*. In addition, the Hawaiian Ironman Race comment group 3815*f* also includes an additional link to the Hawaiian Ironman Race category 2725*f* to indicate the child-parent relationship with respect to that category. It will be appreciated that various other types of inter-relationships may be determined and illustrated in other manners in other embodiments. In addition, information similar to that of FIG. 2AJ may be displayed to non-administrative users (e.g., clients of the GDAP service) in some embodiments, while in other embodiments such information may be determined by the GDAP service but be made available only to administrative users (e.g., users who participate in operating the GDAP service) or not made available to any users.

FIG. 2AK continues the examples of FIGS. 2AI and 2AJ, including to illustrate a GUI 3900 that illustrates two different views for identifying relevance of particular comment groups to particular terms or other attributes (e.g., one or more particular geographical locations, one or more particular author users, etc.), although both views may not be displayed simultaneously in some embodiments, or only one of the views may be available. It will be appreciated that the details discussed with respect to the examples of FIGS. 2AI-2AK are provided for illustrative purposes, and that the described techniques may be used with a variety of other types of user-supplied information and may be performed in a variety of other ways, including to display information about determined relevant terms or other attributes for comment groups and/or categories, and/or to display information about inter-relationships between categories and/or comment groups in other manners.

In particular, while not illustrated in this example, a user of the GDAP service may have previously specified particular terms or other attributes of interest, and the GDAP service may have correspondingly illustrated this type of information in a GUI display to the user. For example, with respect to the GUI view 3910, a graph is illustrated that includes a first attribute along the X-axis, and a different attribute along the Y-axis, with the X-axis in this example representing the determined degree of relevance of particular comment groups to the attribute for the comment location of the city of "LA," and with the Y-axis in this example representing the determined degree of relevance of particular comment groups to the attribute for a particular author user "XYZ". While only a single attribute is indicated in this example for each of the X- and Y-axes, it will be appreciated that multiple terms or other attributes could be included for one or both axes in other examples, such as to aggregate the relevance of multiple such terms or attributes with respect to the comment groups that are illustrated, as shown and discussed with respect to GUI view 3920.

In this example, the relevance for each of the indicated attributes is on a scale of 0 to 1, with the illustrated comment groups 3915*c* and 3915*d* both having a relatively high degree of relevance along both of the X- and Y-axes. In particular, in this example the comment groups 3915*c* and 3915*d* correspond to the technology comment group 3720*f* of the Gatorade category 3710 and the Hollywood comment group 3740*g* of the Iron Man category 3730 that were previously determined to be related in FIG. 2AI, such as based on those two comment groups sharing a high degree of relevance with respect to these two attributes illustrated on the axes of the graph 3910, as further discussed with respect to link 3860*b* of FIG. 2AJ. In addition, other example comment groups 3915*a* and 3915*b* are illustrated in this example, such as with comment group 3915*b* having a relatively high degree of relevance with respect to the attribute for the Y-axis (e.g., based on including a large quantity of comments from Author XYZ, based on including one or more comments from that author user that are of high relevance for the comment group, etc.) while having a relatively low degree of relevance with respect to the attribute for the X-axis (e.g., based on including few or no comments from the LA geographical location, based on including one or more comments from the LA geographical location but that are of low relevance for the comment group, etc.), and vice versa with respect to the comment group 3915*a*.

It will be appreciated that the selection of particular comment groups to display may be performed in various manners, including to filter comment groups that lack a sufficiently high degree of relevance in some embodiments with respect to one or more of the indicated attributes for the axes (e.g., using a user-specified or otherwise defined relevance threshold, based on a quantity of comment groups to display, etc.). Furthermore, additional user-selectable controls may be displayed in some embodiments to allow the user to control the display in additional manners, such as to specify a minimum and/or maximum degree of relevance with respect to one or both axes, or to otherwise alter the display. In addition, the illustrated comment groups may be selectable by the user in the illustrated example, such that the user may select the illustrated comment group 3915*c*, for example, to obtain additional information about the technology comment group of the Gatorade category, such as illustrated and discussed in greater detail elsewhere herein.

FIG. 2AK also illustrates an example GUI view 3920 that is similar to that of GUI view 3910, but that includes additional attributes with respect to that of GUI 3910, as well as including term attributes in addition to a non-term attribute (in other embodiments and situations, only term attributes may be used). In particular, GUI view 3920 includes a graph with X and Y axes, with the top end of the Y-axis being assigned the related terms "TV revenue" and "TV advertising dollars" in this example, and the bottom end of the Y-axis being assigned the term "Ebola" and the related non-term geographical location attribute of "West Africa" in this example. In at least some such embodiments, there may be no requirement of such a relationship between two or more terms or other attributes at the same end of an axis and/or between two or more terms or other attributes at opposite ends of an axis, although in other embodiments and situations such a relationship may exist (e.g., to reflect positive and negative aspects of a given type between terms or other attributes at opposite ends of an axis, such as "hot" and "cold" with respect to temperature). Thus, considering only the Y-axis for a moment, the displayed indicator of the comment group "fall premieres" in the "TV shows" category shows that the comment group has a relatively high degree of relevance to the terms "TV revenue" and/or "TV advertising dollars" (e.g., based on the terms "TV revenue" and/or "TV advertising dollars" being determined relevant term(s) for that comment group, optionally with a relatively high relevance score) and a relatively low degree of relevance to the term "Ebola" and/or the non-term geographical location attribute "West Africa" (e.g., based on the term "Ebola" and/or non-term geographical location attribute "West Africa" not being determined relevant attribute(s) for that comment group, or being determined attribute(s) with a relatively low relevance score), given its position in the upper sixth of the Y-axis. Conversely, and again considering only the Y-axis, the displayed indicator of the comment group "Ebola case" in the "Breaking News" category shows that the comment group has a relevance to a combination of the terms "TV revenue" and "TV advertising dollars" and to a combination of the term "Ebola" and the non-term geographical location attribute "West Africa" that is nearly equal, as reflected by its position near the vertical center of the Y axis—while such a near-center position may in some cases indicate that the comment group is not very relevant to the combination of terms or other attributes at either end of the Y-axis (although if sufficiently non-relevant, such a comment group may be filtered before being selected for display), in the current example the comment group may be highly relevant to both combinations of terms or other attributes, to a nearly equal degree. When determining the relevance of a comment group or a category to a combination of related attributes such as the terms "TV revenue" and "TV advertising dollars" or the term "Ebola" and the non-term geographical location attribute "West Africa", the combination may be handled in various manners in various embodiments, as discussed further below.

With respect to the X axis of the example graph displayed in GUI view 3920, the right end of the X-axis is assigned the term "TMZ" in this example, and the left end of the X-axis is assigned the unrelated terms "debt limit" and "Beyonce"—as will be appreciated, in such an embodiment, there may be no requirement of a relationship between two such unrelated terms assigned to the same end of an axis (e.g., a relationship that reflects synonymous, similar or otherwise related aspects of a given type, such as "cold" and "freezing" with respect to temperature), although in other embodiments and situations such a relationship may exist. In some embodiments, any combination of terms and/or non-term attributes may be specified for any end of any axis, such as based on corresponding selections or instructions by a user to whom the corresponding graph is displayed. Thus, considering only the X-axis for a moment, the displayed indicator of the comment group "Federal Reserve Board" in the "finance" category shows that the comment group has a relatively high degree of relevance to the terms "debt limit" and "Beyonce," and a relatively low degree of relevance to the term "TMZ", given its position in the left eighth of the X-axis. When multiple unrelated terms such as "debt limit" and "Beyonce" are included together in such a manner, the relevance of a comment group to such multiple unrelated terms may be determined in various manners in various embodiments. For example, if two terms or other attributes are determined to be sufficiently related (e.g., synonyms or near synonyms, or otherwise sufficiently similar, such as based on statistical analyses of content items), the relevance of a comment group or category to a combination of such related attributes may be determined in some embodiments and situations by using the highest relevance of the comment group or category to either attribute, by aggregating (e.g., averaging) the relevance of the comment group or category to each attribute, by increasing the relevance of the comment group or category to the most relevant attribute based on the determined relevance of the comment group or category of some or all of the other attributes, etc. As another example, if two terms or other attributes are determined to be sufficiently unrelated (e.g., based on not being determined to be sufficiently related; based on being antonyms or near-antonyms, or otherwise sufficiently dissimilar, such as based on statistical analyses of content items; etc.), the relevance of a comment group or category to a combination of such unrelated attributes may be determined in some embodiments and situations by using the lowest relevance of the comment group or category to either attribute, by aggregating (e.g., averaging) the relevance of the comment group or category to each attribute, by decreasing the relevance of the comment group or category to the most relevant attribute based on the determined relevance of the comment group or category to some or all of the other attributes, etc. Furthermore, the relevance of a comment group to a single particular term or non-term attribute may similarly be determined in various manners, such as discussed with respect to the Y-axis and elsewhere herein. As another example, and again considering only the X-axis, the displayed indicator of the comment group "Gov. Smith scandal" in the "Alabama Politics" category shows that the comment group has a relatively high degree of relevance to the term "TMZ" and a relatively low degree of relevance to the combination of the terms "debt limit" and "Beyonce". When adding in a consideration of the Y-axis in addition to the X-axis, it can be seen that both the "Federal Reserve Board/finance" comment group and the "Gov. Smith scandal/Alabama Politics" comment group are a little more relevant to the combination of terms "TV revenue" and "TV advertising dollars" than to the combination of the term "Ebola" and the non-term geographical location attribute "West Africa", as reflected by their respective positions slightly above the vertical center of the Y axis. Conversely, the "Hollywood/Iron Man" comment group 3915*d*, which corresponds to comment group 3740*g* of FIG. 2AI and comment group 3815*d* of FIG. 2AJ, is highly relevant to both the terms "TV revenue" and "TMZ" (as discussed with respect to FIGS. 2AI-2AJ), and is not very relevant to the terms "Ebola", "debt limit" and "Beyonce" or the non-term geographical location attribute "West Africa". Similar information may be determined for the other illustrated comment groups.

By providing displays such as those illustrated in the example GUI views 3910 and 3920 of FIG. 2AK, various types of benefits may be achieved. For example, a user may quickly and easily obtain a visual reflection of the relevance of various comment groups (including comment groups from different categories) to any arbitrary combination of selected terms and/or non-term attributes. For example, by listing different terms and/or non-term attributes at different ends of a given axis, the relative relevance of comment groups to those listed terms/non-term attributes may be determined, such as to identify comment groups that are much more relevant to one term/non-term attribute versus the other term/non-term attribute, and to identify comment groups whose relevance to both terms/non-term attributes may be similar (whether both having a high relevance, a low relevance, etc.). Conversely, by listing different terms and/or non-term attributes along different axes, the relevance of a comment group to each of those terms/non-term attributes can be identified. Furthermore, by combining multiple terms and/or non-term attributes together at one end of a given axis, the relevance of comment groups to that combination of terms may be determined, such as if an aggregation of the relevance of a comment group to each of those terms/non-term attributes is used for that axis. In addition, in at least some embodiments, each of the displayed comment group indications may be user selectable, such that a user can select a comment group indicator and obtain additional information about that comment group—such additional information may include, for example more detailed information about the relevance of that comment group to the terms and/or non-term attributes currently used for the graph axes, more detailed information about some or all determined relevant attributes for that comment group, information about inter-relationships of that comment groups with other comment groups and/or categories (e.g., any other displayed comment groups that are inter-related with the selected comment group), additional information about content items of the selected group (e.g., in a manner similar to that displayed with respect to FIGS. 2-O and 2U), etc. Furthermore, when a user explores a succession of multiple comment groups and/or categories (e.g., via interactions with GUI views such as those of FIG. 2AK, via displayed information about inter-relationships between comment groups and/or categories, etc.), information about the user's journey through that succession may be saved and used in various manners, as discussed in greater detail elsewhere herein.

While the example GUI views 3910 and 3920 of FIG. 2AK illustrate examples of types of visual displays that may be used to illustrate the relevance of various comment groups (including comment groups from different categories) to particular terms and non-term attributes, it will be appreciated that such information may be displayed or otherwise provided to users in other manners in other embodiments, and that other types of information may similarly be displayed or otherwise provided to users in other embodiments. For example, rather than displaying the relevance of just comment groups to specified terms and/or non-term attributes, information about the relevance of categories and/or classifications to particular specified terms and/or non-term attributes may be displayed, whether instead of or in addition to displayed relevance of comment groups. In addition, while 2-dimensional graphs are used to display relevance in GUI views 3910 and 3920, other types of information displays may be used in other embodiments and situations, such as along a 1-dimensional line or using a graph with more than 2 dimensions, by showing a list of comment groups and/or categories that are ordered with respect to relevance to one or more specified terms and/or non-term attributes, etc. Moreover, in at least some embodiments and situations, promotional information may be displayed along with information such as that displayed in one or more of FIGS. 2AI-2AK, such as to be selected and displayed in a manner similar to that discussed elsewhere herein. Furthermore, various types of user-selectable controls may be displayed or otherwise available to users in at least some embodiments and situations, such as to allow the user to select particular terms and/or non-term attributes for some or all of the axes, to specify a type of graph to display, to specify other filters or criteria for which comment groups are selected for display, to affect how particular items are displayed, etc. In addition, in at least some embodiments and situations, the selection of which comment groups to display and/or of how to perform the display may be customized or personalized to the user, such as based at least in part on previous selections made by the user and/or based on inferred preferences of the user. Thus, other types of information and/or other types of displays may be used in other embodiments, whether in addition to or instead of the illustrated types of views.

FIG. 3 is a block diagram illustrating an embodiment of a server computing system 300 that is suitable for performing at least some of the described techniques, such as by executing an embodiment of a Group Discussion Prediction ("GDP") system 340 that provides a GDAP service. The example server computing system 300 includes one or more central processing unit ("CPU") processors 305, various input/output ("I/O") components 310, storage 320, and memory 330, although in other embodiments multiple such server computing systems may operate together to execute the system 340 in a distributed manner. Illustrated I/O components in this example embodiment include a display 311, a network connection 312, a computer-readable media drive 313, and other I/O devices 315 (e.g., keyboards, mice or other pointing devices, microphones, speakers, etc.).

The user computing devices 350 are similarly illustrated as each having one or more CPU processors 351, one or more I/O components 352, memory 357, and storage 354, although particular I/O components and stored information is not illustrated. The other computing systems 360, 370 and 390 may similarly include some or all of the same types of components as the server computing system 300, but such components are not illustrated in this example for the sake of brevity. The server computing system 300, the GDAP system 340 and the system 340 modules may also communicate with such other computing devices and systems in various manners, including via one or more networks 395 (e.g., the Internet, one or more cellular telephone networks, etc.).

In the illustrated embodiment, the GDAP system 340 is executing in memory 330, and in this example includes several modules, including a Comment Group Creation Manager module 342, a Category And Comment Group Analysis Manager module 344, a Prediction Manager module 346, a Prediction Template Generation Manager module 348, a Results Information Provider Manager module 347, a Journey Manager module 343, an Advertising Manager module 345, and optionally one or more other modules 349. The system 340 and/or the system modules may in some embodiments include software instructions that, when executed, program or otherwise configure the processor(s) 305 and the server computing system(s) 300 to perform automated operations that implement at least some of the described techniques.

The GDAP system 340 and its modules may obtain and use various information as part of its automated operations, such as to obtain user-supplied textual comments or other user-supplied content items from information 369 on one or more comment source computing systems 360 (e.g., computing systems that support one or more social networking sites or other available sites with user-supplied information) and/or from other computing systems (e.g., directly from computing devices 350 of users who supply the information, from other external computing systems 390, etc.), and may store such obtained information in a comment information database 321 on storage 320. The content items supplied to the computing systems 360 and/or 390 may originate from, for example, human users interacting with their user client computing devices 350, such as via a Web browser 358 executing in memory 357 of the client device, or via other software applications (not shown) executing on the client device.

In addition, the GDAP system 340 may optionally obtain various types of client-related information from users or other entities that act as clients of the GDAP system 340, such as by interacting with corresponding client computing systems 370 (e.g., via a corresponding optional module 349 that enables clients to register with the system 340 and/or to provide other types of client-specific information to the system 340), and may store some or all such information in optional client information database 329 on storage 320. Similarly, the GDAP system 340 may optionally obtain various types of advertiser-related information from users or other entities that act as advertisers for the GDAP system 340, such as by interacting with corresponding advertiser computing systems 370 (e.g., via module 345 that enables advertisers to register with the system 340 and/or to provide other types of advertising-specific information to the system 340), and may store some or all such information in optional advertiser information database 329 on storage 320. While client and advertiser information 329 and client and advertiser computing systems 370 are shown together in this example, in other embodiments such information may be stored separately and/or such entities may use different types of computing systems to communicate with the GDAP system, or instead only one of the types of entities may interact with the GDAP system. In at least some embodiments, some or all of the category definition information in database 328 may similarly be received from clients and/or advertisers, such as to analyze information about a particular specified content category on behalf of a client or advertiser who specifies a definition and/or other information about the content category. When such clients and/or advertisers exist, the GDAP system 340 may further provide various types of information to the clients and/or advertisers (e.g., by sending the information to the computing systems 370), and/or take various other types of automated actions on behalf of such clients and/or advertisers, such as in accordance with specified instructions or other specified criteria from the clients and/or advertisers. While not illustrated here, in other embodiments some or all of the GDAP system 340 may execute on behalf of a single client or a single other entity (e.g., an organization with multiple employees or other members).

The Comment Group Creation Manager module 342 may perform automated operations to analyze various user-supplied textual comments or other user-supplied content items that have been supplied for one or more time periods (e.g., as may be stored in database 321 on storage 320 or in one or more other locations), such as to group content items based on common topics in their contents or based on other comment attributes that they share, and to optionally store corresponding comment topic information and comment group information in databases 323 on storage 320. The module 342 may further perform automated operations to determine relevance of particular terms and other attributes for particular comments or other content items, and to optionally store corresponding comment information in comment information database 321. In some embodiments, quantified comment group information that is stored in one or more of the databases 323 may include, for one or more of the comment groups, encoded summary information about constituent member content items in the comment group for each of one or more time periods, such as with respect to one or more encodings specified in comment group encoding information 325 on storage 320.

The Category And Comment Group Analysis Manager module 344 may perform automated operations to determine topics or other attributes that are associated with a specified content category for one or more time periods, such as by identifying particular comment groups that are relevant for the specified content category for one or more time periods based on user-supplied comments or other content items included in those comment groups. In doing so, the module 344 may use information stored in comment information database 321, comment group and comment topic databases 323, and category definition database 328 stored on storage 320, and may store corresponding determined category information in category information database 323 stored on storage 320. In addition, the automated operations of the module 344 may include determining relevance of particular terms and other attributes for particular comment groups and/or categories, and to store corresponding information in comment group and comment topic databases 323 and/or category information database 323. The automated operations of the module 344 may further include performing automated discovery operations to identify inter-relationships between categories and/or comment groups, such as based at least in part on comment groups that are part of particular categories and/or based on the determined relevant terms and/or other attributes for particular comment groups in categories and/or content items in comment groups and categories, and to similarly do so using information from databases 321, 323 and 328, and to store corresponding information in category information database 323. In some embodiments, quantified category information that is stored in category information database 323 may include, for one or more of the categories, encoded summary information about constituent member content items in the category (e.g., for all content items in the category, for content items in an intersection of the category and a particular constituent member comment group, etc.) for each of one or more time periods, such as with respect to one or more encodings specified in comment group encoding information 325 on storage 320.

The Journey Manager module 343 may perform automated operations to define new user journeys to reflect user interactions via the GUI with multiple inter-related categories, whether based on explicit user identification of such user journeys and/or automated identification of user journeys that meet specified criteria (e.g., having at least a minimum number of users who take each of those user journeys). The automated operations may further include allowing users to share information about user journeys with other users in various manners, and enabling users to identify user journeys of possible interest (e.g., for user journeys that are popular or currently trending), as well as to playback or otherwise view information about particular selected user journeys. In doing so, the module 343 may use information stored in database 322 regarding user journeys and/or in other databases 324 regarding interactions of users with the GUI of the GDAP system related to user journeys, and may store corresponding information about determined user journeys and other analyzed information in user journey database 322. While the module 343 may obtain and analyze information about interactions of users with the GUI of the GDAP system in some embodiments, in other embodiments users may access information generated by the GDAP system in other manners (e.g., via a GUI of an external service, not shown, that receives corresponding information from the GDAP system), and if so the module 343 may obtain and analyze information about user access to and interactions with such generated information in such other manners, whether in addition to or instead of information about interactions of users with the GUI of the GDAP system.

The Prediction Manager module 346 may perform automated operations to quantify user-supplied comments or other content items that are associated with particular comment groups and categories, and to use such quantified information for a category or comment group to predict information about additional user-supplied comments or other content items that are expected to be supplied for the category and/or comment group. In some situations, the predictions are performed by generating prediction trends, and in other situations the predictions are performed using previously generated prediction templates. In doing so, the module 346 may use information stored in comment group database 323, category information database 323 and/or prediction template database 326 stored on storage 320, and may store quantified information about content items associated with particular comment groups and categories in comment group and/or category information database(s) 323, and may store corresponding generated prediction information in comment group and category information database(s) 323 (or instead in one or more other prediction information databases, not shown, in other embodiments). In some embodiments, the prediction template information may include encoded summary information for constituent member content items that are part of a comment group and/or category for each of multiple time periods (e.g., consecutive time periods during a time window of interest), such as to be matched to encoded summary information from the comment group information and/or the category information in database(s) 323. In addition, the automated operations of the module 346 may include quantifying use of particular defined user journeys for one or more time periods, and predicting information about expected future use of those defined user journeys during one or more future time periods, including to do so using information from databases 322 and 326, and to store corresponding predicted information in database 322. In some embodiments, the prediction template information may further include encoded summary information about quantities of user playbacks and/or other views of a defined user journey for each of multiple time periods (e.g., consecutive time periods during a time window of interest), such as to be matched to encoded summary information from the journey-related information in database 322.

The Prediction Template Generation Manager module 348 may use quantified information about supplied comments or other content items associated with a category and/or with comment groups, and/or may use predicted information about additional user-supplied comments or other content items that are expected to be supplied for the category and/or comment groups, such as to identify or generate a histogram or other template of information that accurately reflects comments or other content items actually supplied for a category and/or comment groups, and that may be used as a template to predict information about additional user-supplied comments or other content items that are expected to be supplied for the category and/or comment groups. In doing so, the module 348 may use information stored in comments database 321, comment group database 323, and/or category information database 323 stored on storage 320, and may store corresponding new prediction templates in prediction template database 326. In addition, the module 348 may use quantified information about user playbacks and/or other views of defined user journeys, and/or may use predicted information about additional user playbacks and/or other views that are expected to occur for defined user journeys, such as to identify or generate a histogram or other template of information that accurately reflects user playbacks and/or other views that have actually occurred for one or more defined user journeys, and that may be used as a template to predict information about additional user playbacks and/or other views that are expected to occur for the defined user journeys. In doing so, the module 348 may use information stored in database 322 regarding user journeys and/or in other databases 324 regarding interactions of users with the GUI of the GDAP system related to user journeys, and may store corresponding new prediction templates in prediction template database 326.

The Advertising Manager module 345 may perform automated operations to analyze information about an indicated brand or other indicated category, such as to identify other categories that are related to the indicated brand/category based on determined structural inter-relationships between categories and/or based on user activities via the GUI involving both the indicated brand/category and the identified other categories. The automated operations may further include providing information to advertisers or other external entities about such brand analysis information, and to receiving and storing information about requests from the advertisers or other external entities to provide particular promotional information in particular situations. In doing so, the module 345 may use information stored in database 329 regarding advertisers and/or in other databases 322 and/or 324 regarding interactions of users with the GUI of the GDAP system that involve different categories, and may store corresponding information about brand analysis information and other analyzed information in one of the other databases 324. Promotional information to be used for particular advertisers or other external entities may similarly be received from them and stored in one of the other databases 324 for later user, and may have various forms in various embodiments. For example, promotional information may include recommendations of particular products and/or services, advertisements for particular products and/or services, information about available promotions (e.g., corresponding to particular products and/or services, product brands, product categories, products associated with a specified event, etc.), etc.

The Results Information Provider Manager module 347 may retrieve analyzed information and/or predicted information for one or more categories and/or comment groups and/or classifications, such as to reflect constituent member content items that are associated with those categories, comment groups and/or classifications for one or more time periods, and may then initiate the display of such information via the GUI of the GDAP system or otherwise provide such information to one or more entities. Similarly, the module 347 may retrieve analyzed information and/or predicted information for one or more user journeys or to otherwise reflect user interactions with the GDAP system, and may then initiate the display of such information via the GUI of the GDAP system or otherwise provide such information to one or more entities. In addition, when information being displayed or otherwise provided to a user corresponds to circumstances indicated by one or more advertisers or other external entities, the module 347 may further select promotional information specified by one or more such advertisers or other external entities and include it in the information being displayed or otherwise provided, whether as additional information separate from the other information being displayed or otherwise provided, or by modifying the other information being displayed or otherwise provided in accordance with the promotional information. The entities to whom information is displayed or otherwise provided may include one or more of the following: a client (e.g., for display to a user representative of the client), such as via a Web browser or other application (e.g., a client-side app or module provided by the GDAP system 340, such as one of the other modules 349), not shown, that is executing on a corresponding client computing system or device 370; an advertiser or other entity external to the GDAP system, such as via a Web browser or other application (not shown) that is executing on a corresponding advertiser computing system or device 370; other end-users of the GDAP system, such as to publicly provide at least a subset of the analyzed information and/or predicted information to users via computing devices 350 and/or other computing systems 390; other affiliated or third-party systems (not shown), such as for further analysis or manipulation by those other systems and/or for those other systems to display or otherwise provide to the other systems' users at least a subset that is made available by the GDAP system to the other systems of the analyzed information and/or predicted information; etc. In at least some such embodiments, the information display or other providing by the GDAP system may occur in a real-time or near-real-time manner with respect to corresponding events or activities to which the information corresponds, such as the supplying of corresponding constituent member content items (e.g., within seconds, minutes or hours of such events or activities). In addition, in at least some embodiments, the module 347 may display or otherwise provide information to an entity in a manner that is personalized to the entity (e.g., such as based on explicit or implicit preferences previously specified or determined for the entity), and may further optionally allow at least some such entities to configure various types of information to be displayed or otherwise provided, as discussed in greater detail elsewhere, including with respect to FIGS. 2L-2V and 2Y-2AH. In performing its automated operations, the module 347 may, for example, use information stored in comments database 321, comment group database 323, category information database 323, and/or client information 329, and may store corresponding new information (e.g., client preference information) in client information 329.

It will be appreciated that the illustrated computing systems are merely illustrative and are not intended to limit the scope of the present invention. For example, computing system 300 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate intercommunication capabilities. For example, the illustrated system 340 and/or its modules may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software modules and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system modules may in some embodiments be combined in fewer modules or distributed in additional modules. Similarly, in some embodiments the functionality of some of the illustrated modules may not be provided and/or other additional functionality may be available. As one non-exclusive example, in some embodiments a Group Discussion Analysis (GDA) system may be provided and used that does not include modules and functionality discussed herein related to performing predictions and using predicted information, but that includes some or all of other modules and functionality. As another non-exclusive example, in some embodiments a Future Group Discussion (FGD) system may be provided and used that includes some or all modules and functionality discussed herein related to performing predictions and/or using predicted information, but that does not include some or all of other modules and functionality.

Thus, in at least some embodiments, the illustrated modules and/or systems are software-based modules/systems including software instructions that, when executed by the CPU(s) 305 or other processor means, program the processor(s) to automatically perform the described operations for that module/system. Furthermore, in some embodiments, some or all of the modules and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
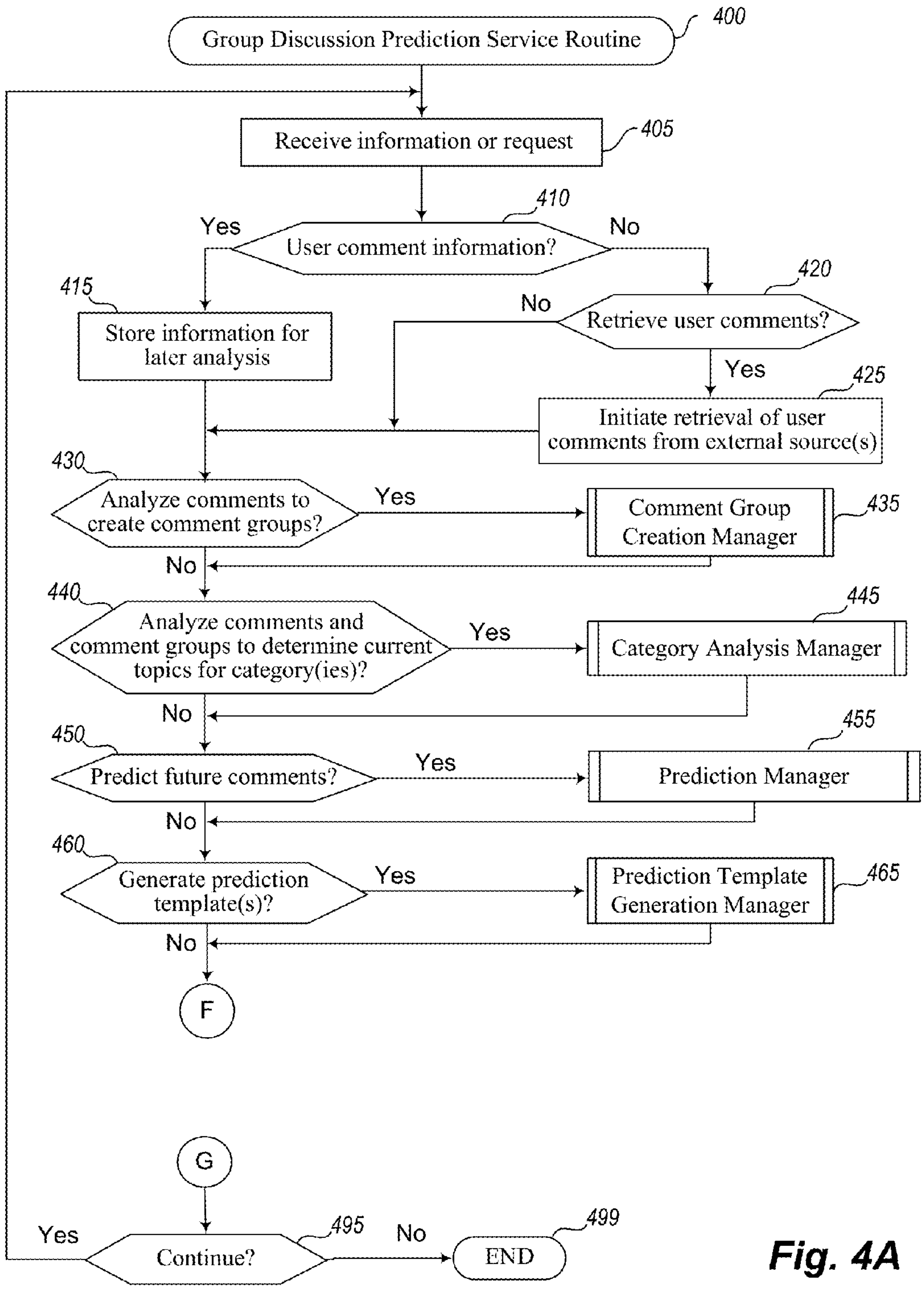
FIGS. 4A-4B are an example flow diagram of an illustrated embodiment of a Group Discussion Prediction Service routine.
Figure 4B:
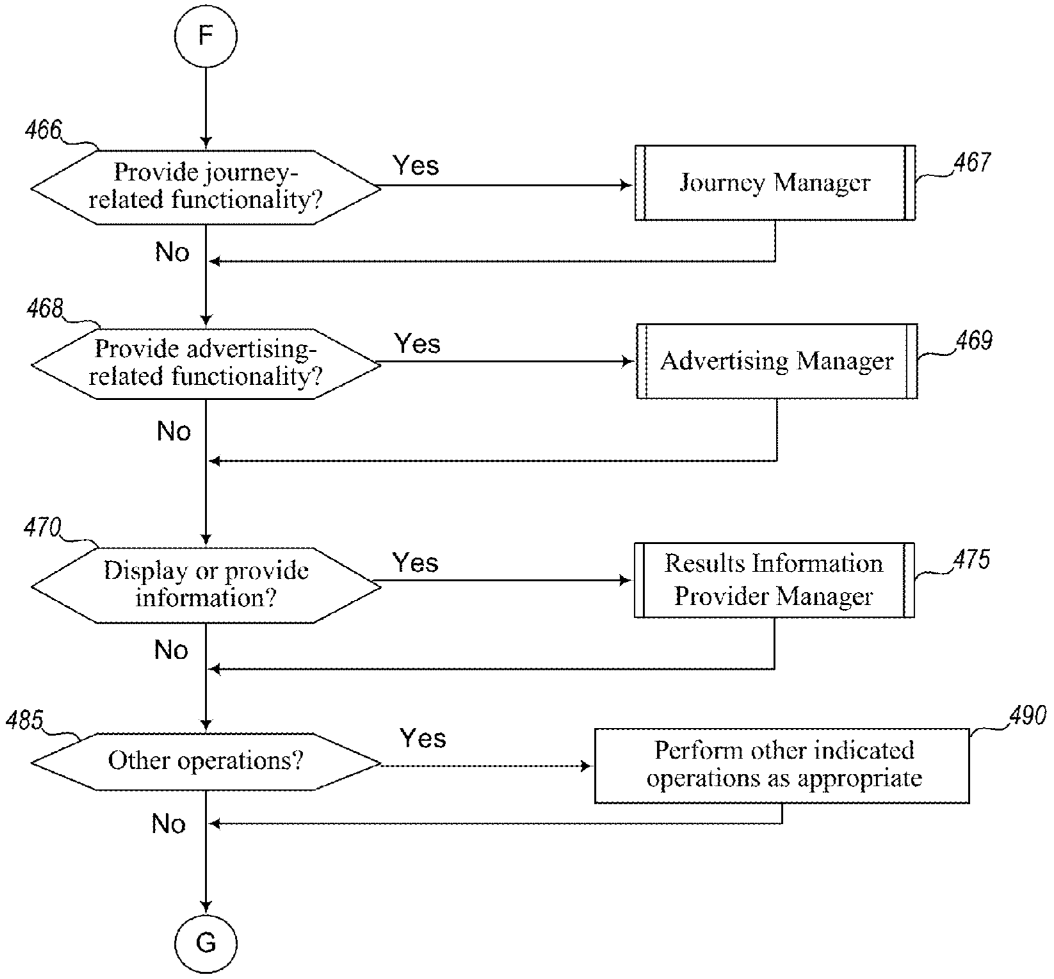

FIGS. 4A-4B are an example flow diagram of an illustrated embodiment of a Group Discussion Prediction Service routine 400. The routine may be provided by, for example, execution of an embodiment of the Group Discussion Prediction Service 150 of FIG. 1, the group discussion prediction service discussed with respect to FIGS. 2A-2AH and/or the Group Discussion Prediction ("GDP") system 340 of FIG. 3, such as to analyze distributed group discussions and to predict future characteristics of such discussions. While the illustrated embodiment of the routine may analyze particular aspects of distributed group discussions with respect to particular metrics, such as a quantity of user comments received with respect to a particular topic or category, it will be appreciated that other aspects and/or metrics may be used in other embodiments. In addition, while the illustrated embodiment of the routine discusses obtaining and analyzing user comments, it will be appreciated that other types of user-supplied content items may be obtained and analyzed in other embodiments, whether instead of or in addition to user comments.

The routine begins at block 405, where information or a request is received. The routine continues to block 410 to determine if information has been received about one or more user comments (or other user-supplied content items), such as for user comments that have recently or concurrently been supplied to one or more comment sources and sent to the routine 400 by the comment source(s) (e.g., in response to one or more previous requests from the routine 400, such as with respect to blocks 425 or 490). If so, the routine continues to block 415 to store some or all of the received information for later analysis. If it is instead determined in block 410 that the received information or request of block 405 is not user comment information, the routine continues instead to block 420 to determine to retrieve user comments (or other user-supplied content items) from one or more external comment sources, such as to do so on a periodic basis or when the information is needed for a corresponding analysis. If so, the routine continues to block 425 to initiate the retrieval of user comments (or other user-supplied content items) from one or more external comment sources, such as one or more social networking services or other publicly accessible sites at which users may supply information. In the illustrated embodiment, the retrieval of the user comments in block 425 is performed in an asynchronous manner, by initiating requests to those external comment sources and later receiving corresponding responses, although in other embodiments the routine may instead complete the retrieval of particular user comments from particular comment sources in block 425 before continuing.

After blocks 415 or 425, or if it is instead determined in block 420 that the information or request received in block 405 is not to retrieve user comments, the routine continues to block 430. In block 430, the routine determines whether the information or request received in block 405 is to analyze user comments (or other user-supplied content items) to create corresponding comment groups, such as for information just received with respect to block 415 (e.g., for a current time period), or instead for a prior time period of a specified length (e.g., 30 minutes). If so, the routine continues to block 435 to execute a Comment Group Creation Manager routine to perform the analysis and creation of the comment groups, with one example of such a routine being described in greater detail with respect to FIG. 5.

After block 435, or if it is instead determined in block 430 that the information or request received in block 405 is not to analyze comments, the routine continues to block 440 to determine whether the information or request received in block 405 is to analyze user comments (or other user-supplied content items) and comment groups to determine current topics for one or more categories and one or more time periods, optionally with respect to comment groups that were just created in block 435 and/or for user comments just received in block 415. If so, the routine continues to block 445 to execute a Category Analysis Manager routine to determine the current topics for the category(ies) for the one or more time periods, with one example of such a routine being described in greater detail with respect to FIG. 6.

After block 445, or if it is instead determined in block 440 that the information or request received in block 405 is not to determine current topics for one or more categories, the routine continues instead to block 450 to determine whether the information or request received in block 405 is to predict information about future user comments (or other user-supplied content items) that are expected to be received for one or more comment groups and/or categories, such as for one or more future time periods, and optionally based on comment groups that were just created in block 435 and/or for user comments just received in block 415 and/or for category information that was just determined in block 445. If so, the routine continues to block 455 to execute a Prediction Manager routine to quantify one or more aspects of the user comments (or other user-supplied content items) for the comment groups and/or the category(ies), and to generate corresponding predictions based on such quantified information, with one example of such a routine being described in greater detail with respect to FIGS. 7A-7C.

After block 455, or if is instead determined in block 450 that the information or request received in block 405 is not to predict information about future user comments, the routine continues instead to block 460 to determine whether the information or request received in block 405 is to generate one or more prediction templates based on prior distributed group discussions and corresponding analyses. Such generation of one or more prediction templates may be performed, for example, with respect to information about actual user comments (or other user-supplied content items), comment groups and categories determined in blocks 435 and/or 445, and/or with respect to information about future comments (or other user-supplied content items) that are predicted in block 455. If so, the routine continues to block 465 to execute a Prediction Template Generation Manager routine to generate one or more such prediction templates, with one example of such a routine being described in greater detail with respect to FIGS. 8A and 8B.

After block 465, or if it is instead determined in block 460 that the information or request received in block 405 is not to generate prediction templates, the routine continues to block 466 to determine whether the information or request received in block 405 is to provide information or other functionality related to defined user journeys. Such a request may include, for example, an indication to define one or more new user journeys, an indication from a user to share information about a particular user journey with one or more other users, a request from a user to obtain information about one or more user journeys, etc. If so, the routine continues to block 467 to execute a Journey Manager routine to provide such functionality, with one example of such a routine being described in greater detail with respect to FIGS. 10A-10B. After block 467, or if it is instead determined in block 466 that the information or request received in block 405 is not to provide functionality related to defined user journeys, the routine continues to block 468 to determine whether the information or request received in block 405 is to provide information or other functionality related to advertising. Such a request may include, for example, an indication to perform a brand analysis or other analysis of categories related to an indicated category, a request to provide brand analysis information or other advertising-related information, a request to provide promotional information in indicated circumstances, etc. If so, the routine continues to block 469 to execute an Advertising Manager routine to provide such functionality, with one example of such a routine being described in greater detail with respect to FIGS. 11A-11B.

After block 469, or if it is instead determined in block 468 that the information or request received in block 405 is not to provide advertising-related functionality, the routine continues to block 470 to determine whether the information or request received in block 405 is to display or otherwise provide information to a user or other entity. Such a request or information may include, for example, a request from the user or other entity for the information, an automated determination that information is available to provide in response to a prior request (e.g., a request to push information to the user or other entity periodically or upon other indicated criteria being satisfied), an automated determination that a predetermined time has been reached or that other indicated criteria are currently satisfied (e.g., based on receipt or determination of current real-time or near-real-time data of one or more types, based on current prediction of future information of one or more types, etc.), etc. If so, the routine continues to block 475 to execute a Results Information Provider Manager routine to display or otherwise provide such information, with one example of such a routine being described in greater detail with respect to FIGS. 9A-9B.

After block 475, or if it is instead determined in block 470 that the information or request received in block 405 is not to display or otherwise provide information, the routine continues instead to block 485 to determine whether a request corresponding to one or more other operations has been received. If so, the routine continues to block 490 to perform one or more other indicated operations as appropriate. Such other indicated operations may include, for example, one or more of the following non-exclusive list: receiving and storing definitions and other information about categories of interest; receiving and storing information about particular comment sources of interest (e.g., how to obtain comments or other user-supplied content items from them, timing for obtaining comments or other user-supplied content items from them, types of comments or other user-supplied content items available from them, etc.); receiving and storing information about clients of the service (e.g., categories of interest to the client, criteria under which to notify the client of discussion predictions and/or current discussion information of interest, types of automated actions to take under specified circumstances with respect to one or more categories of interest, etc.); etc.

After block 490, or if it is instead determined in block 485 that the information or request received in block 405 is not to perform other indicated operations, the routine continues instead to block 495 to determine whether to continue, such as until an explicit indication to terminate is received. If it is determined to continue, the routine returns to block 405, and otherwise continues to block 499 and ends. In at least some embodiments, the routine may execute in a continuous or near-continuous manner, such as to gather and store information about comments (or other user-supplied content items) as they become available, and to analyze such user comment information during each time period of an indicated length (e.g., every 30 minutes).

Figure 5:
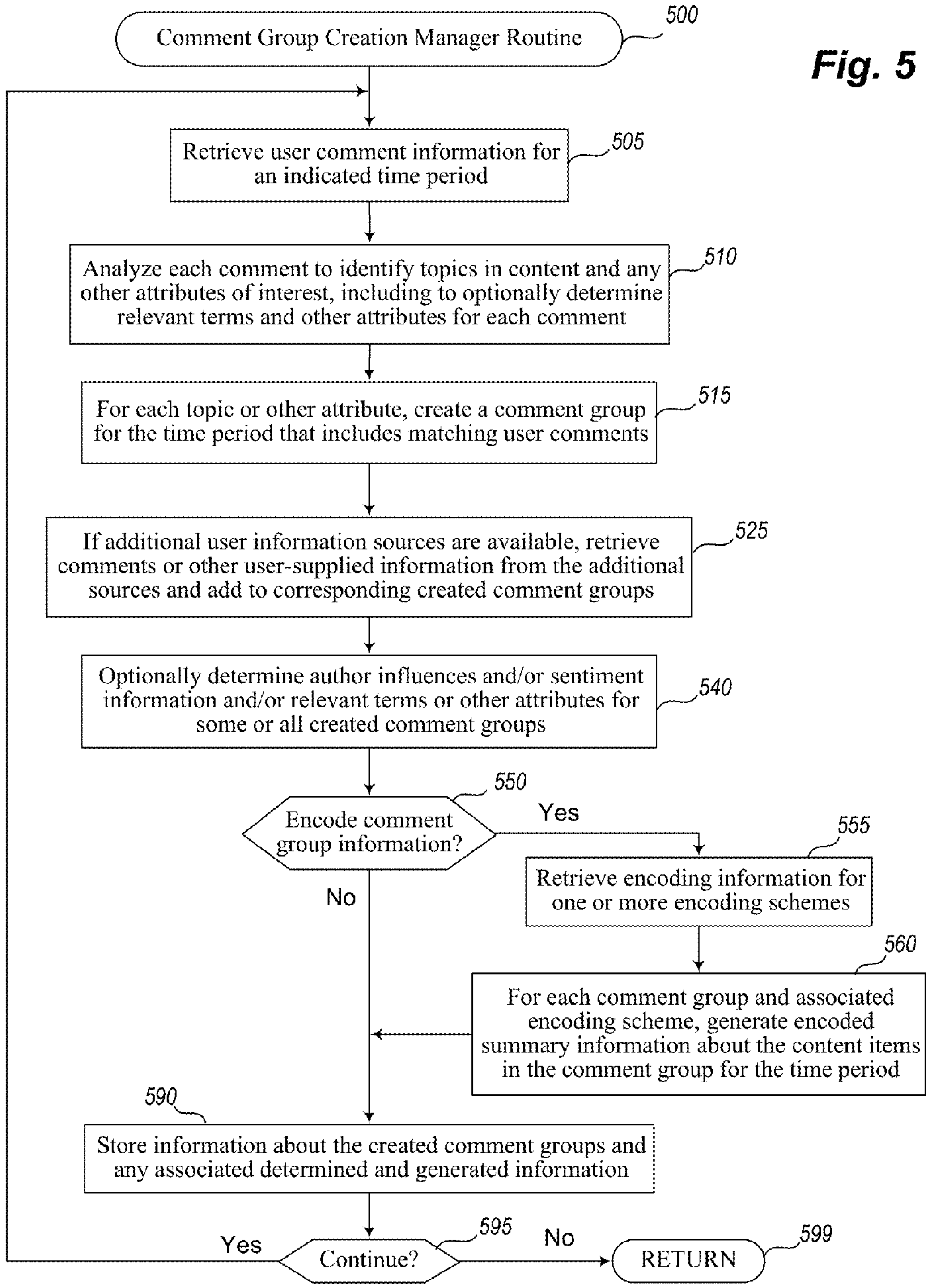
FIG. 5 is an example flow diagram of an illustrated embodiment of a Comment Group Creation Manager routine.

FIG. 5 is an example flow diagram of an illustrated embodiment of a Comment Group Creation Manager routine 500. The routine may be performed by, for example, execution of the Comment Group Creation Manager module 342 of FIG. 3, the group discussion prediction service discussed with respect to FIGS. 2A-2AH and/or the Group Discussion Prediction Service 150 of FIG. 1, such as to analyze user comment information that has been received for a particular time period in order to create corresponding comment groups. The routine may be invoked in various manners in various embodiments and situations, including with respect to block 435 of FIG. 4A. In addition, while the illustrated embodiment of the routine discusses obtaining and analyzing user comments, it will be appreciated that other types of user-supplied content items may be obtained and analyzed in other embodiments, whether instead of or in addition to user comments.

The illustrated embodiment of the routine begins at block 505, where user comment information for an indicated time period is retrieved, such as for information received and stored with respect to block 415 of FIG. 4A. The routine then continues to block 510 to analyze each user comment to identify any topics of interest in the content and/or any other attributes of interest corresponding to the comment, such as a location of where the comment was submitted from, an author user who generated or otherwise supplied the user comment, a comment data source from which the user comment was obtained, any n-grams in the contents of the user comment (including any hashtags), etc. In at least some embodiments, the analysis of terms and other attributes of a comment may include determining a relevance score or other measure of some or all of the terms or other attributes for the comment, as discussed in greater detail elsewhere herein.

After block 510, the routine continues to block 515 to, for each topic or other attribute that is identified in any of the user comments, create a corresponding comment group for the indicated time period that includes user comments matching that topic or other attribute for that time period. The routine then continues to block 525 to, if additional user information sources are available, retrieve additional comments or other user-supplied information from the additional sources that correspond to the topic or other attribute for each created comment group, and to add any such additional retrieved user-supplied information to the corresponding created comment groups.

In some embodiments, the routine may further perform additional optional activities with respect to block 540, to determine additional information about some or all of the created comment groups, such as to analyze the user comments included in some or all comment groups to determine particular author users who have high or low influence for the comment group (e.g., relative to other author users for the same comment group and/or for other comment groups), to analyze the user comments included in some or all comment groups to enable performance of a sentiment analysis with respect to contents of the comments, etc. In addition, in at least some embodiments, the analysis activities of block 540 may include determining, for some or all comment groups, one or more terms or other attributes of the comment group (other than the comment group's one or more definition terms) that are relevant to the comment group, such as by aggregating information about relevant terms or other attributes of the comments in the comment group, which may include determining a relevance score or other measure of some or all of the terms or other attributes for the comment group, as discussed in greater detail elsewhere herein. Information generated by such optional additional activities may be stored and/or used in various manners, including to provide some or all of the generated information to clients, to take additional automated actions based on the generated information, to use some or all of the generated information as part of other analyses and determinations performed by the group discussion prediction service, etc. Additional details related to such additional optional activities are discussed in greater detail elsewhere.

After block 540, the routine continues to block 550 to determine whether to encode summary quantified information for one or more of the created content groups. If so, the routine continues to block 555 to retrieve information about one or more encoding schemes that are available to use, and optionally to indicate particular comments groups that are associated with particular encoding schemes. After block 555, the routine in block 560 further, for each encoding scheme and any associated comments groups (or in some embodiments for each comment group), uses the encoding scheme to generate encoded summary information that quantifies information about constituent member content items of the comment group for the time period.

After block 560, or if it was instead determined in block 550 not to generate any encoded summary information, the routine continues to block 590 to store information about the created comment groups for later use, along with any associated determined and/or generated information for such comment groups, such as for information generated in blocks 515 and 525, block 540 and block 560.

After block 590, the routine continues to block 595 to determine whether to continue, such as until an explicit indication to terminate is received. If it is determined to continue, the routine returns to block 505, such as to wait until the next time period of an indicated length is completed, or until corresponding user comment information for such a next time period is available. If it is determined in block 595 to not continue, the routine continues to block 599 and returns, such as to return to block 435 of FIG. 4A.

Figure 6:
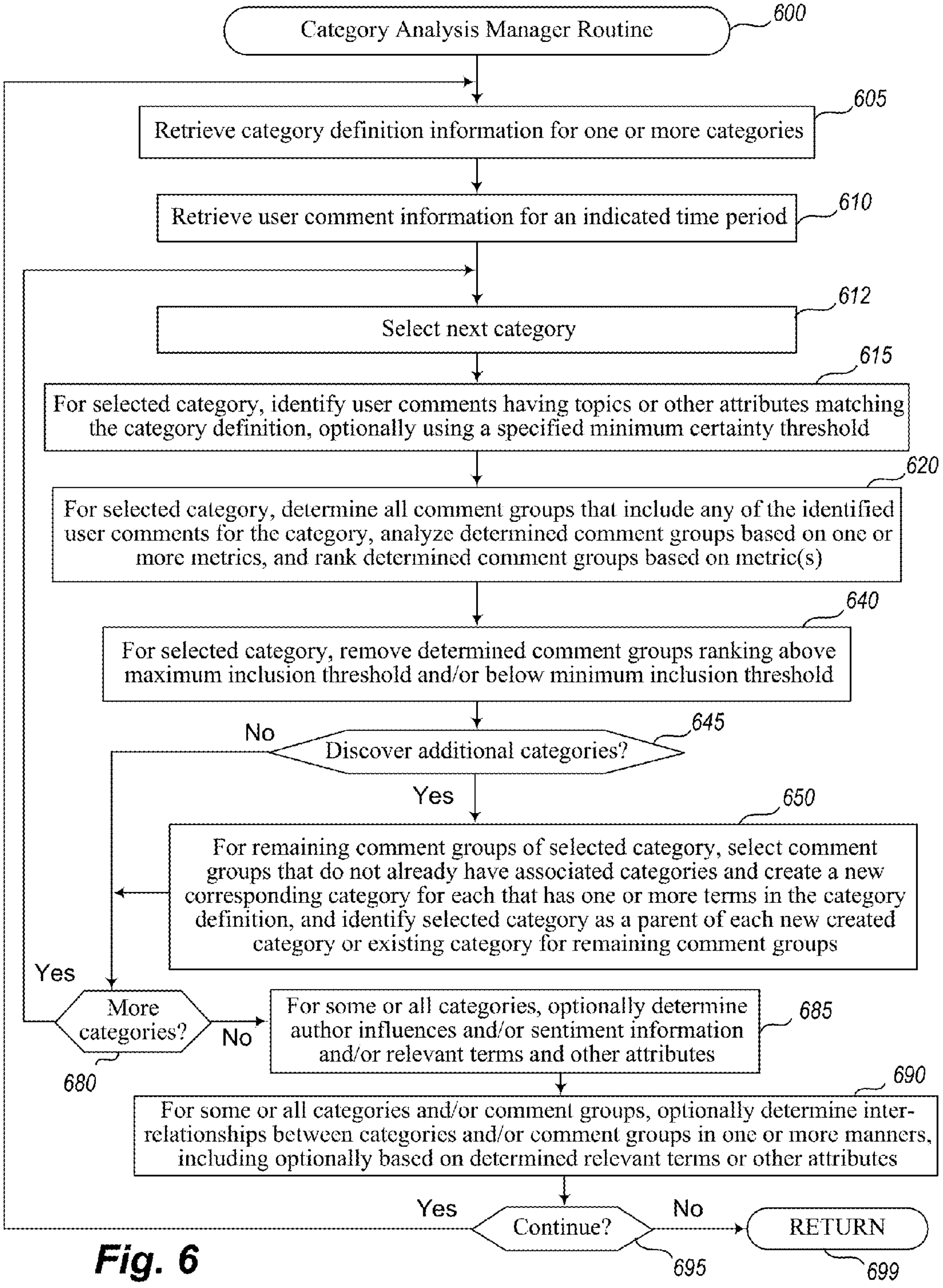
FIG. 6 is an example flow diagram of an illustrated embodiment of a Category Analysis Manager routine.

FIG. 6 is an example flow diagram of an illustrated embodiment of a Category Analysis Manager routine 600. The routine may be performed by, for example, execution of the Category Analysis Manager module 344 of FIG. 3, the group discussion prediction service discussed with respect to FIGS. 2A-2AH and/or the Group Discussion Prediction Service 150 of FIG. 1, such as to analyze information about comments received during an indicated time period in order to identify current topics that are most relevant for the category during the time period. The routine may be invoked in various manners in various embodiments and situations, including with respect to block 445 of FIG. 4A. In addition, while the illustrated embodiment of the routine discusses analyzing user comments, it will be appreciated that other types of user-supplied content items may be obtained and analyzed in other embodiments, whether instead of or in addition to user comments.

The illustrated embodiment of the routine begins at block 605, where category definition information is retrieved for one or more categories of interest. In block 610, the routine then retrieves user comment information for an indicated time period. The routine then continues to block 612 to select the next category to analyze that has not yet been analyzed, beginning with the first (or, if only one category is identified in block 605, selecting that category). As discussed in greater detail with respect to blocks 645 and 650, if automated discovery is performed in which new categories may be identified, additional such categories may be subsequently identified and later selected in subsequent iterations of performing block 612. After block 612, the routine continues to block 615.

In block 615, the routine then, for the currently selected category, identifies user comments that have topics or other attributes matching the definition for the category, optionally using a specified minimum certainty threshold. As one example, in some embodiments a category definition may include one or a small number (e.g., four) of definition terms, and a user comment is identified as satisfying the category definition if it includes at least one of those definition terms, while in other embodiments the user comment may need to include all of the indicated definition terms or a specified minimum number of the definition terms to satisfy the minimum certainty threshold with respect to the category.

After block 615, the routine continues to block 620 to, for the currently selected category, determine all the comment groups that include any of the user comments that were identified for the category, and to then analyze those determined comment groups based on one or more metrics. After the analysis, the determined comment groups are ranked with respect to the one or more metrics. As one example, the metrics may include the frequency in which comments of each determined comment group appear in the identified user comments for the category, such as to assess a relevance of each comment group to the category. The analysis of the determined comment groups based on the metric(s) may further include, in at least some embodiments, determining an average and a standard deviation with respect to the frequencies for the determined comment groups.

After block 620, the routine continues to block 640 to determine information about a maximum inclusion threshold and/or a minimum inclusion threshold for the currently selected category, such as in some embodiments to be based on the information about the determined average frequency for determined comment groups of the category and standard deviation information (e.g., to have the maximum inclusion threshold be one-half of the standard deviation above the average, and/or to have the minimum inclusion threshold be one-half of the standard deviation below the average frequency). After the maximum inclusion threshold and/or minimum inclusion threshold are determined, the determined comment groups for the currently selected category that are above the maximum or below the minimum inclusion thresholds are removed from the category, with the remaining determined comment groups reflecting current topics and other attributes that are currently most relevant for the category. Information about the determined comment groups for the category is then stored for later use. In some embodiments, only one of a maximum inclusion threshold and a minimum inclusion threshold may be used.

After block 640, the routine continues to block 645 to determine whether to automatically discover additional categories based on the currently selected category. In other embodiments, the routine may always determine to automatically discover additional categories (and if so block 645 and its No branch may be removed) while there are such additional categories available, or may always determine to not automatically discover additional categories (and if so block 645 and its Yes branch, including block 650, may be removed). If it is determined in block 645 to automatically discover additional categories (or if the determination is not made on a per-category basis), the routine continues to block 650 to, for each comment group that is remaining in the currently selected category after block 640, determine whether a category already exists that corresponds to the comment group, and if not creates a new category for that comment group (e.g., by generating a definition for the new category, such as by using the term(s) or other attribute(s) used to define the comment group, and by adding the new category to zero or more other categories that were identified in block 605 and not yet selected in block 612). In addition, the routine in block 650, for each new category being created for a comment group whose corresponding category does not already exist, identify the currently selected category as a parent category to the new category, such that the new category is a sub-category of the currently selected category. After block 650, the routine continues to block 680 to determine whether there are more categories queued to be analyzed, whether from categories originally identified in block 605 or from new categories that were automatically discovered and added in block 650. If so, the routine returns to block 612 to select a next category to analyze from the queue of categories to be analyzed, and otherwise continues to block 685.

In block 685, the routine may further perform additional optional activities in some embodiments, to determine additional information about some or all of the categories, such as to analyze the user comments associated with the category to determine particular author users who have high or low influence for the category (e.g., relative to other author users for the same category and/or for other categories), to analyze the user comments associated with the category to enable performance of a sentiment analysis with respect to contents of the user comments, etc. In at least some embodiments, the operations of block 685 further include determining, for some or all categories, one or more terms or other attributes of the category (other than the category's one or more definition terms) that are relevant to the category, such as by aggregating information about relevant terms or other attributes of the comments in the category and/or of the comment groups in the category, which may include determining a relevance score or other measure of some or all of the terms or other attributes for the category, as discussed in greater detail elsewhere herein. Furthermore, after block 685, the routine continues to block 690 to, in at least some embodiments, further analyze information about the identified comment groups and categories to determine various types of inter-relationships between them, including based on determined relevant terms or other attributes in at least some situations, as well as in other manners in other situations. Information generated by such optional additional activities of blocks 685 and 690 may be stored and/or used in various manners, including to provide some or all of the generated information to clients, to take additional automated actions based on the generated information, to use some or all of the generated information as part of other analyses and determinations performed by the group discussion prediction service, etc. Additional details related to such additional optional activities are discussed in greater detail elsewhere.

After block 690, the routine continues to block 695 to determine whether to continue, such as until an explicit indication to terminate is received. If it is determined to continue, the routine returns to block 605, such as to wait until the next time period of an indicated length is completed, or until corresponding comment group information for such a next time period is available. If it is determined in block 695 to not continue, the routine instead continues to block 699 and returns, such as to return to block 445 of FIG. 4A.

Figure 7A:
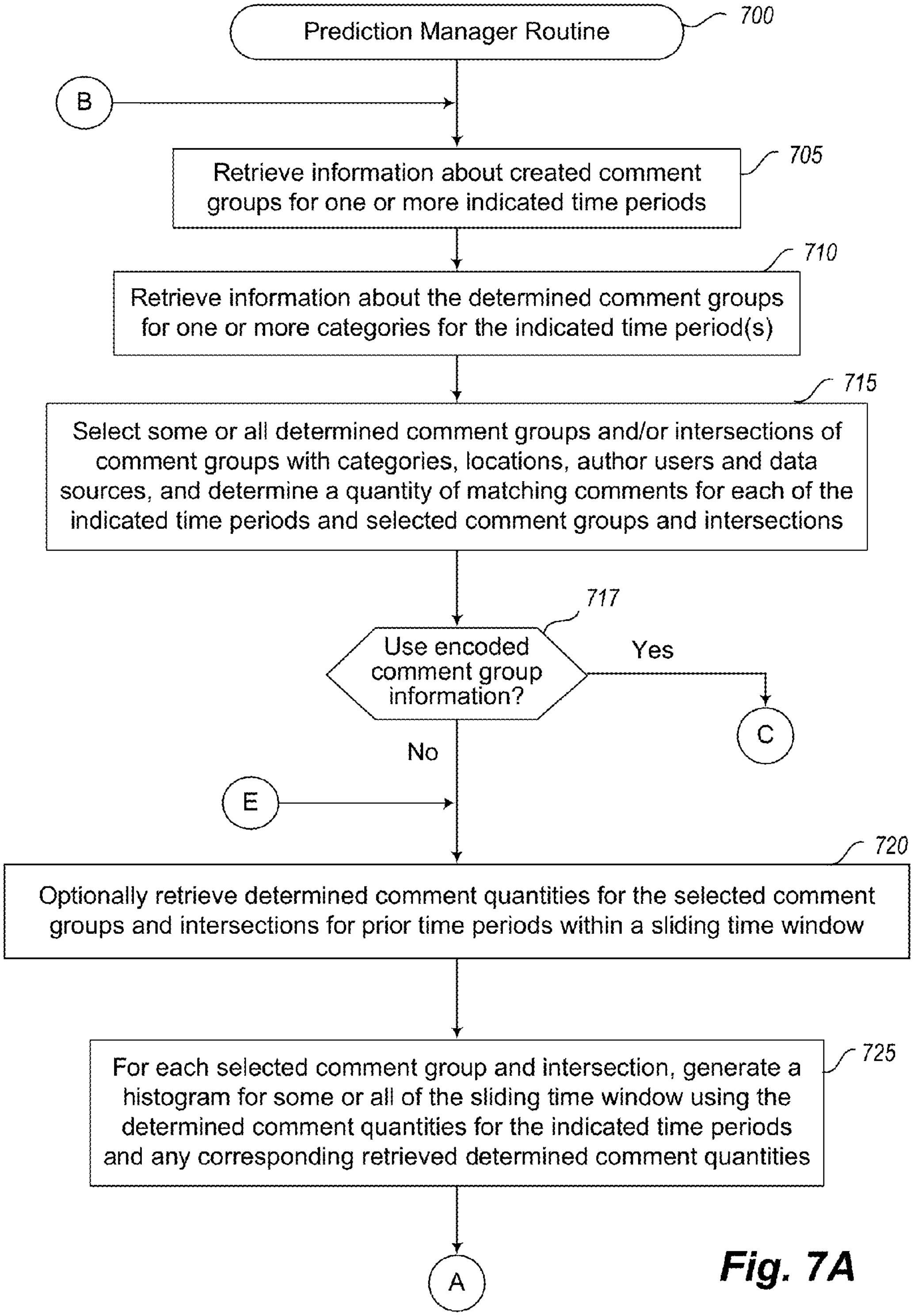
FIGS. 7A-7C are an example flow diagram of an illustrated embodiment of a Prediction Manager routine.
Figure 7B:
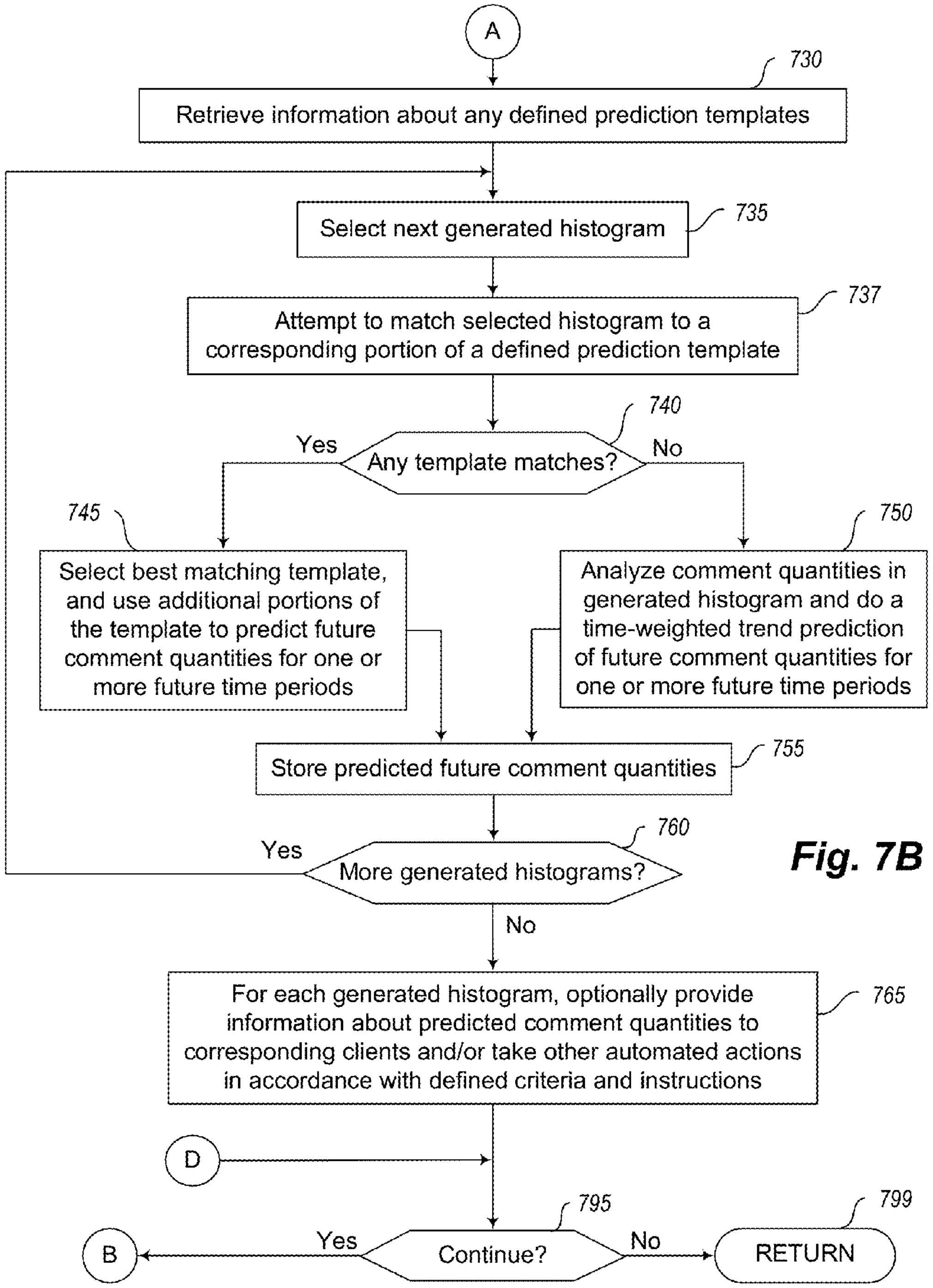
Figure 7C:
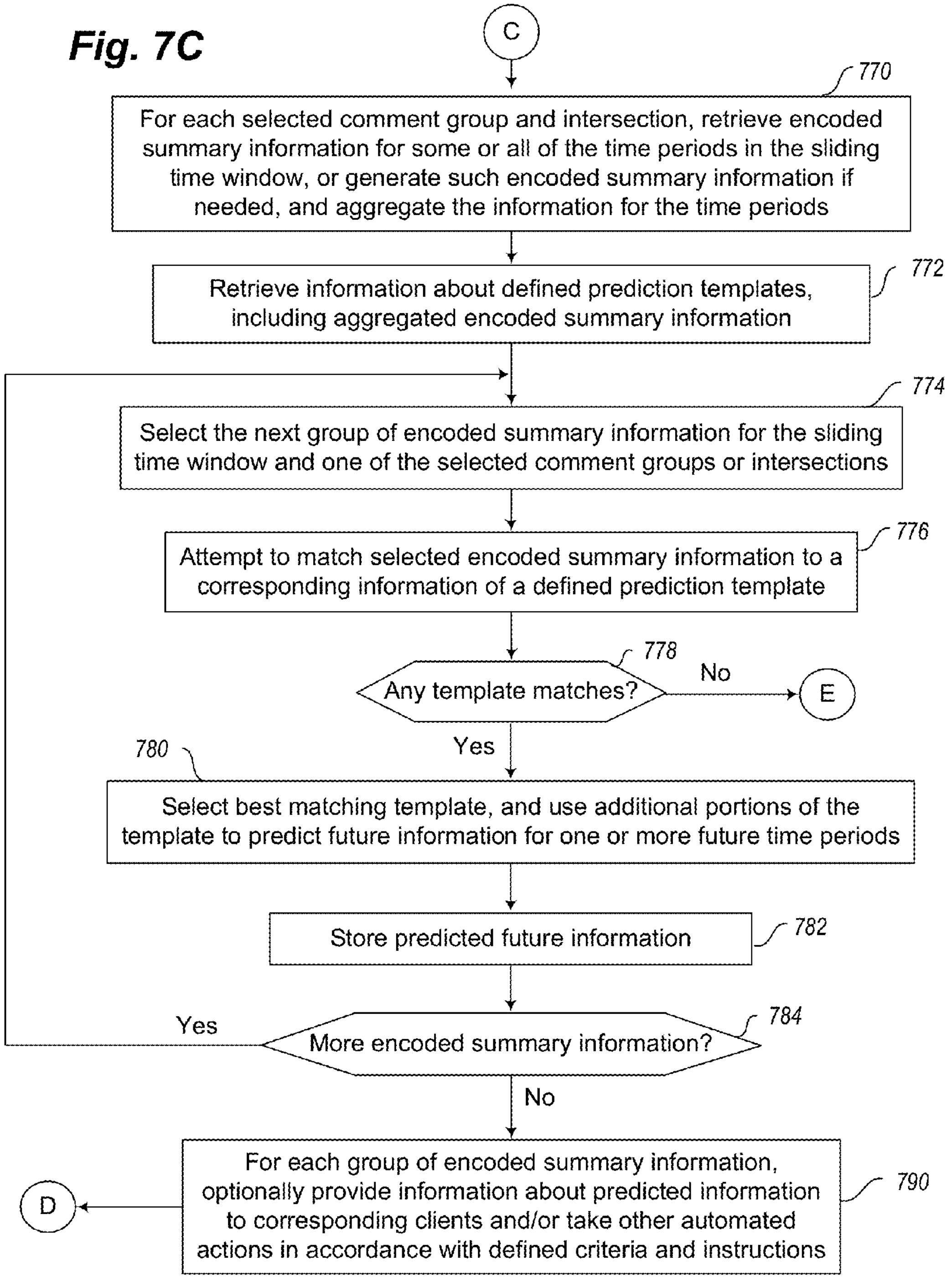

FIGS. 7A-7C are an example flow diagram of an illustrated embodiment of a Prediction Manager routine 700. The routine may be performed by, for example, execution of the Prediction Manager module 346 of FIG. 3, the group discussion prediction service discussed with respect to FIGS. 2A-2AH and/or the Group Discussion Prediction Service 150 of FIG. 1, such as to predict information about future user comments that will be received with respect to one or more comment groups and/or categories for one or more future time periods based at least in part on comment information for those comment groups and/or categories that have already been received. The routine may be invoked in various manners in various embodiments and situations, including with respect to block 455 of FIG. 4A. In addition, while the illustrated embodiment of the routine discusses analyzing user comments, it will be appreciated that other types of user-supplied content items and/or other types of information may be obtained and analyzed in other embodiments, whether instead of or in addition to user comments. As one non-exclusive example, in some embodiments the routine may obtain information about user playbacks and/or other views of one or more defined user journeys for one or more time periods that have occurred, and predict information about future user playbacks and/or other view of those defined user journeys that will occur for one or more future time periods.

The illustrated embodiment of the routine begins at block 705, where information is retrieved about created comment groups for one or more indicated time periods. In block 710, information is then retrieved about the comment groups that have been determined to be relevant for one or more categories for the indicated time periods. After block 710, the routine continues to block 715 to select some or all of the determined comment groups for further analysis, including in some embodiments to select some or all intersections of the determined comment groups with corresponding categories, locations, author users, and/or data sources. For each selected comment group and/or intersection, the routine in block 715 then quantifies information about the associated user-supplied comments for the selected comment group and/or intersection, such as by determining a quantity of matching comments for each of the indicated time periods of interest.

After block 715, the routine continues to block 717 to determine whether to use encoded summary comment group information for the selected comment groups and/or intersections to predict future information for those selected comment groups and/or intersections, such as if such encoded summary information is available for those selected comment groups and/or intersections (e.g., with respect to block 560 of FIG. 5), and if the available prediction template information includes encoded summary information to use for matching purposes. If so, the routine continues to block 770. Otherwise, or if it is instead determined in block 778 that there are no template matches, the routine continues to block 720 to predict future information for those selected comment groups and/or intersections by generating and using histogram information for those selected comment groups and/or intersections.

In particular, in block 720, the routine continues to optionally retrieve additional determined comment quantity information for the selected comment groups and/or intersections, such as for prior time periods within a sliding time window (e.g., the last 72 hours). In block 725, the routine then, for each selected comment group and intersection, generates a histogram for some or all of the sliding time window using the determined comment quantities for the indicated time periods and any corresponding retrieved determined comment quantities for prior time periods, such as to have a separate value in the histogram for each time period of an indicated length during the sliding time window (and optionally removing any information from a previous histogram for time periods that are no longer part of the sliding time window).

After block 725, the routine continues to block 730 to retrieve information about any defined prediction templates that are available for use in performing predictions. The routine then continues to block 735 to select the next generated histogram, beginning with the first. In block 737, the routine then attempts to match the selected generated histogram to one or more of the defined prediction templates. In block 740, it is determined if any of the prediction templates had a sufficient match for the selected histogram, and if so, the routine then continues to block 745 to select the best matching prediction template, and to use additional portions of the prediction template to predict future comment quantities for one or more future time periods corresponding to the selected histogram. If it is instead determined in block 740 that there were not any matching prediction templates (or no prediction templates were available to attempt to match), the routine continues instead to block 750 to perform a time-weighted trend prediction of future comment quantities for one or more future time periods based on the comment quantities in the generated histogram. It will be appreciated that the matching of a histogram to a prediction template, the use of an additional portion of a matching template to predict future quantities, and the time-weighted trend prediction may each be performed in various manners in various embodiments, as discussed in greater detail elsewhere.

After blocks 745 or 750, the routine continues to block 755 to store the predicted future comment quantity information for subsequent use. In block 760, it is then determined if any additional histograms generated in block 725 remain to be analyzed, and if so returns to block 735 to select a next such generated histogram. Otherwise, the routine continues to block 765 to optionally perform one or more additional activities. Such additional activities may, in at least some embodiments, include providing information about predicted comment quantities and/or about determined current quantities for a generated histogram to one or more corresponding clients or other information sources that previously requested such information, optionally in accordance with any specified criteria by such clients or other information sources. In addition, in at least some embodiments, the routine may, in block 765, further take one or more other automated actions for a generated histogram in accordance with defined criteria and client instructions based at least in part on predicted comment quantities and/or on determined current comment quantities, such as to initiate and add one or more comments to one or more comment sources that include information relevant to a discussion for a category or a comment group associated with the generated histogram (e.g., to provide additional information corresponding to the category or to the topic of the comment group, or to otherwise influence a direction in which the discussion may take place in the future).

If it is determined in block 717 to use encoded summary comment group information for the selected comment groups and/or intersections to predict future information for those selected comment groups and/or intersections, the routine continues to block 770. In block 770, the routine retrieves encoded summary information for the selected comment groups and/or intersections for prior time periods within a sliding time window (e.g., the last 72 hours), such as for information generated in block 560 of FIG. 5. If any of the selected comment groups and/or intersections lack stored encoded summary information, the routine further retrieves, for each such selected comment groups and/or intersection, information about the constituent member content items for the selected comment group or intersection for the time periods of the time window, and generates encoded summary information for the time window using each of one or more encoding schemes, such as in a manner similar to that described with respect to blocks 555 and 560 of FIG. 5. For example, with respect to an intersection of a comment group with a category, content items that are part of the comment group and are associated with the category may be identified, and encoded summary information may be quantified for an aggregation of those constituent member content items. The routine then, for each of the selected comment groups and/or intersections, aggregates the encoded summary information for the prior time periods during the time window in block 770, such as by included the encoded summary information for each time period in succession in the aggregation.

After block 770, the routine continues to block 772 to retrieve information about any defined prediction templates that are available for use in performing predictions and that include aggregated encoded summary information for multiple time periods corresponding to at least a portion of the time window. For example, if the summary information for a comment group and/or intersection is encoded to represent information about five types of attributes for the constituent member content items of the comment group and/or intersection during each of multiple prior time periods, the aggregated group of summary information for the retrieved matching prediction template similarly encodes information about those five types of attributes in at least some embodiments. The routine then continues to block 774 to select the next aggregated group of encoded summary information for one of the selected comment groups and/or intersections, beginning with the first. In block 776, the routine then attempts to match the selected aggregated group of encoded summary information to one or more of the defined prediction templates. In block 778, it is determined if any of the prediction templates had a sufficient match for the selected aggregated group of encoded summary information, and if so, the routine then continues to block 780 to select the best matching prediction template, and to use additional encoded summary information from the prediction template to predict future information for one or more future time periods corresponding to the selected aggregated group of encoded summary information. For example, if the summary information for a comment group and/or intersection is encoded to represent information about five types of attributes for the constituent member content items of the comment group and/or intersection during each of multiple prior time periods, and the aggregated group of summary information for a matching prediction template similarly encodes information about those five types of attributes, the additional information from the matching prediction template is used to predict future information about one or more of those five types of attributes. If it is instead determined in block 778 that there were not any matching prediction templates, the routine continues instead to block 720. It will be appreciated that the matching of an aggregated group of encoded summary information to a prediction template, the use of additional encoded summary information of a matching prediction template to predict future information may each be performed in various manners in various embodiments, as discussed in greater detail elsewhere, with the examples discussed with respect to FIGS. 2F-2K providing one example of such prediction.

After block 780, the routine continues to block 782 to store the predicted future information for subsequent use. In block 784, it is then determined if any additional aggregated groups of encoded summary information generated in block 770 remain to be analyzed, and if so returns to block 774 to select a next such generated aggregated group of encoded summary information. Otherwise, the routine continues to block 790 to optionally perform one or more additional activities, including to provide information about predicted future information to one or more clients or other information sources and/or to further take one or more other automated actions in accordance with defined criteria and client instructions, such as in a manner previously described with respect to block 765.

After blocks 765 or 790, the routine continues to block 795 to determine whether to continue, such as until an explicit indication to terminate is received. If it is determined to continue, the routine returns to block 705, such as to wait until the next time period of an indicated length is completed, or until corresponding to wait until additional information about created comment groups and/or about determined comment groups for categories for such a next time period is available. If it is instead determined in block 795 not to continue, the routine instead continues to block 799 and returns, such as to return to block 455 of FIG. 4A.

Figure 8A:
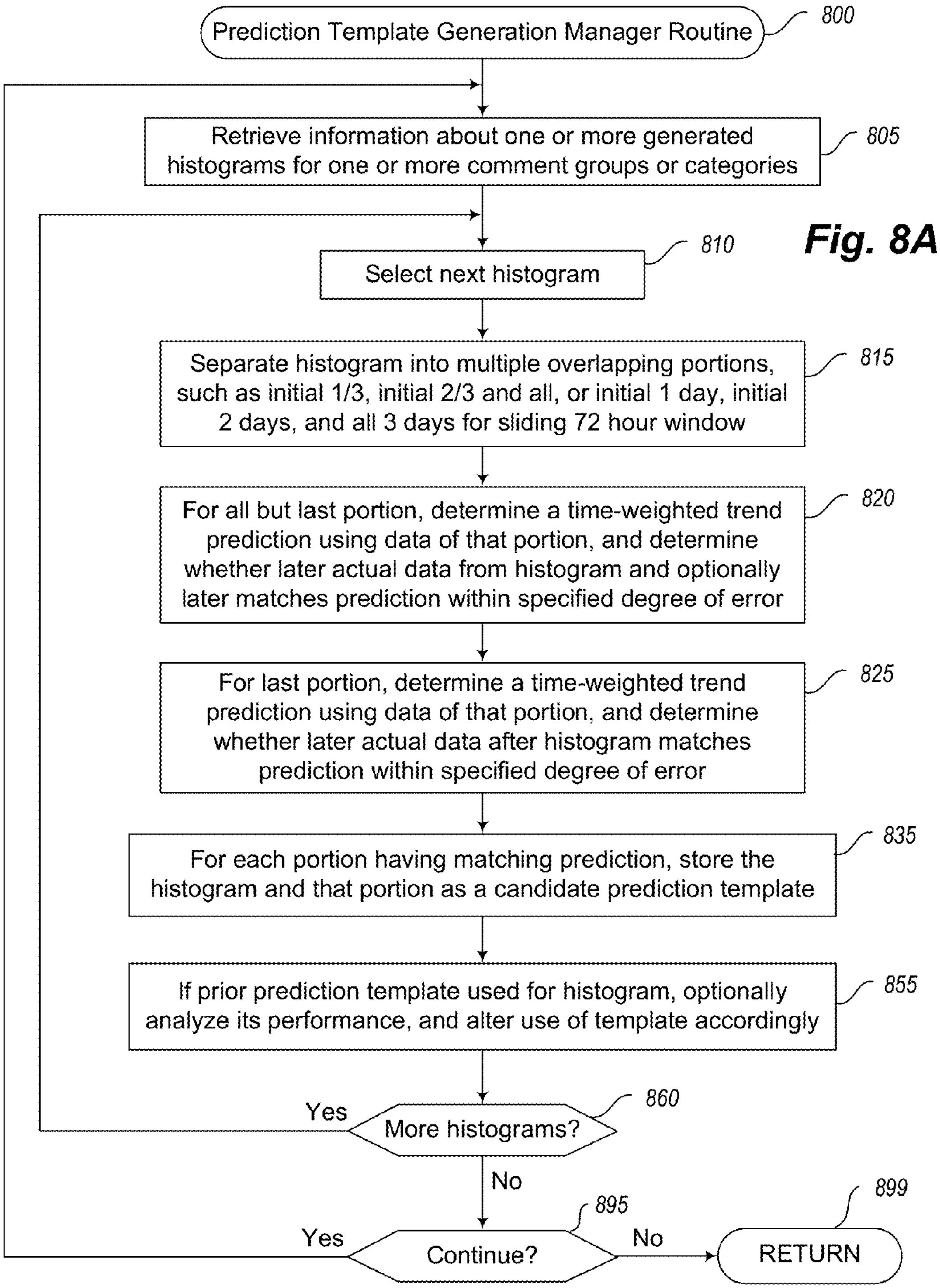
FIGS. 8A and 8B are example flow diagrams of illustrated embodiments of a Prediction Template Generation Manager routine.
Figure 8B:
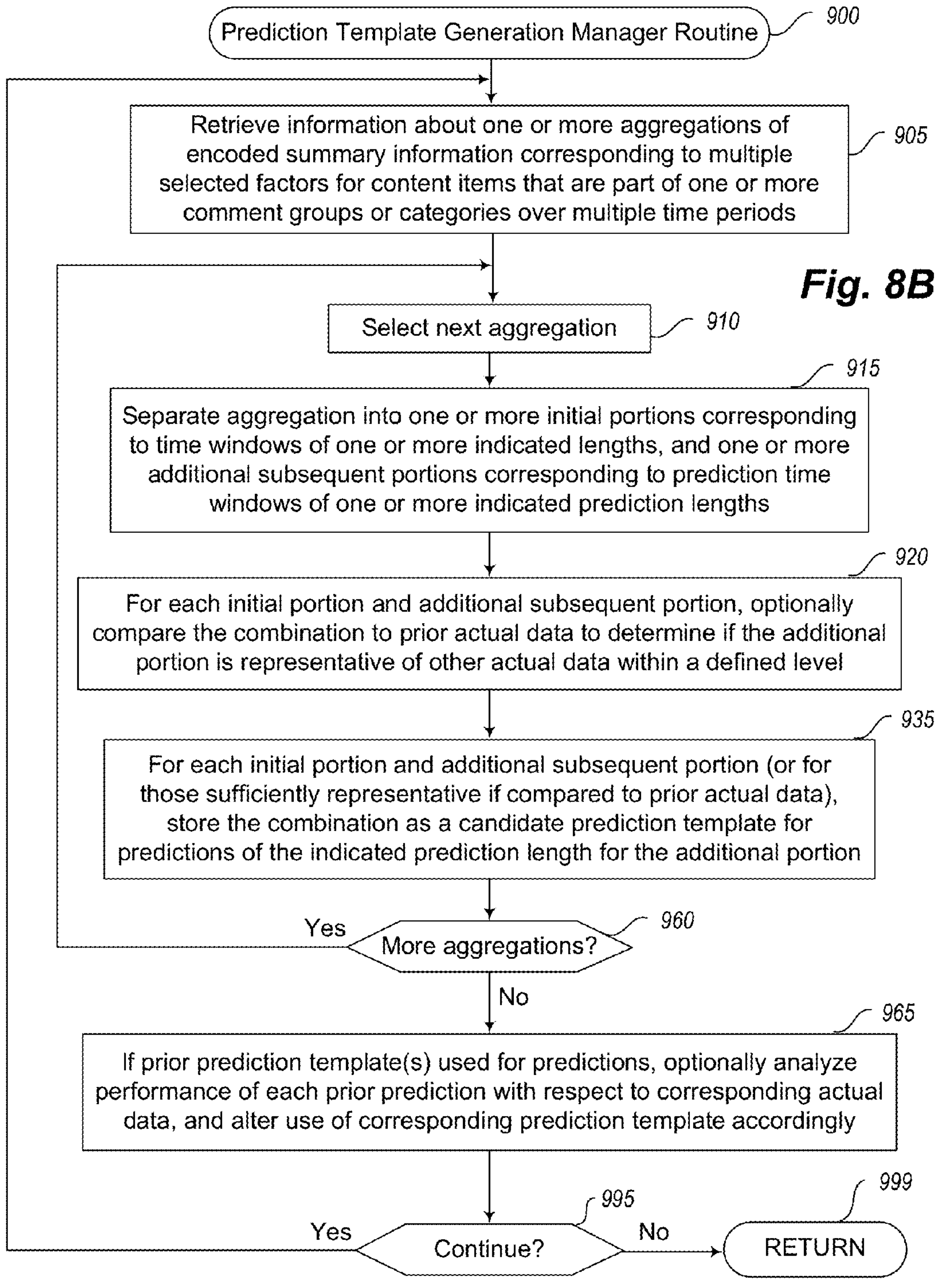

FIGS. 8A and 8B illustrate example flow diagrams of alternative embodiments of a Prediction Template Generation Manager routine. The routines of FIGS. 8A and 8B may each be performed by, for example, execution of the Prediction Template Generation Manager module 348 of FIG. 3, the group discussion prediction service discussed with respect to FIGS. 2A-2AH and/or the Group Discussion Prediction Service 150 of FIG. 1, such as to generate new prediction templates based on prior actual comments associated with a comment group or a category and/or based on predicted future comments for a comment group or a category. The routines may be invoked in various manners in various embodiments and situations, including with respect to block 465 of FIG. 4A. In addition, while the illustrated embodiment of the routine discusses analyzing user comments, it will be appreciated that other types of user-supplied content items and/or other types of information may be obtained and analyzed in other embodiments, whether instead of or in addition to user comments. As one non-exclusive example, in some embodiments the routine may obtain information about user playbacks and/or other views of one or more defined user journeys for one or more time periods that have occurred, and use such information to generate new prediction templates based on such prior user activities for one or more defined user journeys and/or based on predicted future user activities for those defined user journeys.

In particular, FIG. 8A illustrates an example flow diagram of an embodiment of a Prediction Template Generation Manager routine 800 that uses histograms and associated trend curves to predict future information and to assess the accuracy of such predictions. The illustrated embodiment of the routine 800 begins at block 805, where information is retrieved about one or more generated histograms for one or more comment groups or categories, such as for histograms generated in block 725 of routine 700. The routine then continues to block 810 to select the next generated histogram, beginning with the first. In block 815, the routine then separates the generated histogram into multiple overlapping portions, such as the initial ⅓ portion of the generated histogram, the initial ⅔ portion of the generated histogram, and the entire portion of the generated histogram—thus, if the histogram covers, for example, a sliding time window of 72 hours (or 3 days), the multiple overlapping portions may correspond to the first day, the first and second days, and all 3 days. In other embodiments and situations, other types of histogram portions and time lengths may be used.

In blocks 820 and 825, each of the histogram portions is analyzed to determine whether the information in that histogram portion is able to accurately predict additional user comments that will be received, such as if the user comment information represented in that histogram portion represents a typical or otherwise repeated pattern of user comments. In particular, in block 820, for all but the last of the histogram portions, a time-weighted trend prediction is performed using the information in the histogram portion, and additional information about actual user comments received (e.g., from other later portions of the generated histogram) is used to determine whether that trend prediction is consistent with that actual user comment information. In block 825, for the last of the histogram portions, a time-weighted trend prediction is performed using the information in the histogram portion, and additional information about actual user comments received (e.g., from one or more time periods after the sliding time window corresponding to the generated histogram) is used to determine whether that trend prediction is consistent with that actual user comment information—in some situations, such as if the selected histogram was just completed and represents the most current comment information that is available, the performance of the analysis of block 825 may be deferred until additional user comment information is received and analyzed. The time-weighted trend predictions performed in blocks 820 and 825 may, for example, be similar to or the same as that performed in block 750 of routine 700, and the determination of whether the trend prediction is consistent may be performed with respect to a specified degree of error.

After block 825, the routine continues to block 835 to, for each histogram portion having a prediction that is consistent with actual information, store information about the histogram portion (and optionally the subsequent additional information used to verify the prediction) as a candidate histogram template for later use in generating other predictions, such as with respect to block 745 of routine 700.

In some embodiments, the routine may further perform additional optional activities with respect to block 855, to assess whether one or more prior predictions made from use of a prediction template for the histogram were accurate, such as with respect to block 745 of routine 700, and to corresponding alter use of the prediction template. For example, if the prior use of a prediction template was accurate, an accuracy rate for that prediction template may be increased accordingly, and the prediction template may continue to be used, optionally with an increased confidence in its accuracy based on the increased accuracy rate. Conversely, if the prior use of a prediction template was not accurate, an accuracy rate for that prediction template may be decreased accordingly, optionally with a corresponding decreased confidence in its accuracy based on the increased accuracy rate, and the prediction template may be taken out of use if its accuracy rate is too low. The prior use of a prediction template that may be assessed may in some situations include waiting until later actual information is available about user comments that are received, for comparison to the prior prediction made for the histogram. After block 855, the routine continues to block 860 to determine whether more generated histograms are available, and if so returns to block 810 to select a next such histogram.

If it is instead determined in block 860 that no more histograms are available, the routine continues to block 895 to determine whether to continue, such as until an explicit indication to terminate is received. If it is determined to continue, the routine returns to block 805, such as to wait until additional information about generated histograms and/or corresponding actual comment information corresponding to predictions are available. If it is instead determined in block 895 not to continue, the routine instead continues to block 899 and returns, such as to return to block 465 of FIG. 4A.

FIG. 8B illustrates an example flow diagram of an embodiment of a Prediction Template Generation Manager routine 900 that uses aggregations of encoded summary information for selected factors of interest to predict future information, such as for one or more of the selected factors, and to assess the accuracy of such predictions. The illustrated embodiment of the routine 900 begins at block 905, where information is retrieved about one or more generated aggregations of encoded summary information corresponding to multiple selected factors for constituent member content items of one or more comment groups or categories, such as for aggregations generated in block 770 of routine 700. The routine then continues to block 910 to select the next generated aggregation, beginning with the first.

In block 915, the routine then separates the generated aggregation into one or more initial portions that each correspond to a time window having a time length of one or more indicated lengths, including to optionally have multiple initial overlapping portions, such as an initial 6 hours of the aggregation, an initial 24 hours of the aggregation, an initial 48 hours of the aggregation, and an initial 72 hours of the aggregation—thus, if the aggregation includes, for example, a sliding time window of at least 72 hours (or 3 days), the multiple overlapping portions may correspond to the first day, the first and second days, and all 3 days. In other embodiments and situations, other types of aggregation portions and time lengths may be used. The routine further identifies one or more additional subsequent portions of the aggregation for each of the initial portions, with each additional subsequent portion having a time length of one or more indicated prediction lengths, such as a next 6 hours of the aggregation, a next 24 hours of the aggregation, a next 48 hours of the aggregation, and a next 72 hours of the aggregation. Thus, as one example, the initial portion may be for 72 hours, and the additional subsequent portion may be for the subsequent 72 hours, such as if at least 144 hours of encoded summary information are available in the aggregation. Other non-exclusive examples include the following: the initial portion is for 72 hours, and the additional subsequent portion is for the subsequent 24 hours; the initial portion is for 24 hours, and the additional subsequent portion is for the subsequent 24 hours (thus, the additional subsequent portion in this example may be part of the initial portion in the prior example in which the initial portion is for 72 hours); the initial portion is for 24 hours, and the additional subsequent portion is for the subsequent 6 hours; the initial portion is for 24 hours, and the additional subsequent portion is for the subsequent 72 hours; etc.

In block 920, each of the initial portion and additional subsequent portion combinations is optionally analyzed to determine whether the information in that additional portion is able to accurately predict additional user content items that will be received after data matching the initial portion has occurred, such as by comparing that combination to other prior actual data having a matching initial portion to see if the additional portion of the combination matches subsequent actual data from that prior actual data—such a comparison may show, for example, whether the combination being considered represents a typical or otherwise repeated pattern of user comments or other content items. The degree of match between corresponding initial portions and/or corresponding additional portions of a current candidate combination and prior actual data may be performed in various manners, as discussed in greater detail elsewhere—if the comparison of block 920 is performed, a current candidate combination may be retained as a candidate only if it sufficiently matches a specified quantity (e.g., one, more than one, etc.) of prior sets of actual data, such as with respect to a specified degree of error.

After block 920, the routine continues to block 935 to, for each combination of an initial portion and an additional subsequent portion that is determined in block 920 to be sufficiently representative, or for each combination of an initial portion and an additional subsequent portion determined in block 915 if the comparison in block 920 is not performed, store information about the combination of aggregated encoded summary information for use as part of a candidate prediction template for later use in generating other predictions, such as with respect to block 780 of routine 700. After block 935, the routine continues to block 960 to determine whether more generated aggregations are available, and if so returns to block 910 to select a next such aggregation.

In some embodiments, the routine may further perform additional optional activities with respect to block 965 if no more aggregations are determined in block 960 to be available, in order to assess whether one or more prior predictions made from use of a prediction template using aggregated encoded summary information were accurate, such as with respect to block 780 of routine 700, and to corresponding alter use of that prediction template. For example, if the prior use of a prediction template was accurate, an accuracy rate for that prediction template may be increased accordingly, and the prediction template may continue to be used, optionally with an increased confidence in its accuracy based on the increased accuracy rate. Conversely, if the prior use of a prediction template was not accurate, an accuracy rate for that prediction template may be decreased accordingly, optionally with a corresponding decreased confidence in its accuracy based on the increased accuracy rate, and the prediction template may be taken out of use as a candidate if its accuracy rate is too low.

After block 965, the routine continues to block 995 to determine whether to continue, such as until an explicit indication to terminate is received. If it is determined to continue, the routine returns to block 905, such as to wait until additional information about generated aggregations and/or corresponding actual comment information corresponding to predictions are available. If it is instead determined in block 995 not to continue, the routine instead continues to block 999 and returns, such as to return to block 465 of FIG. 4A.

Figure 9A:
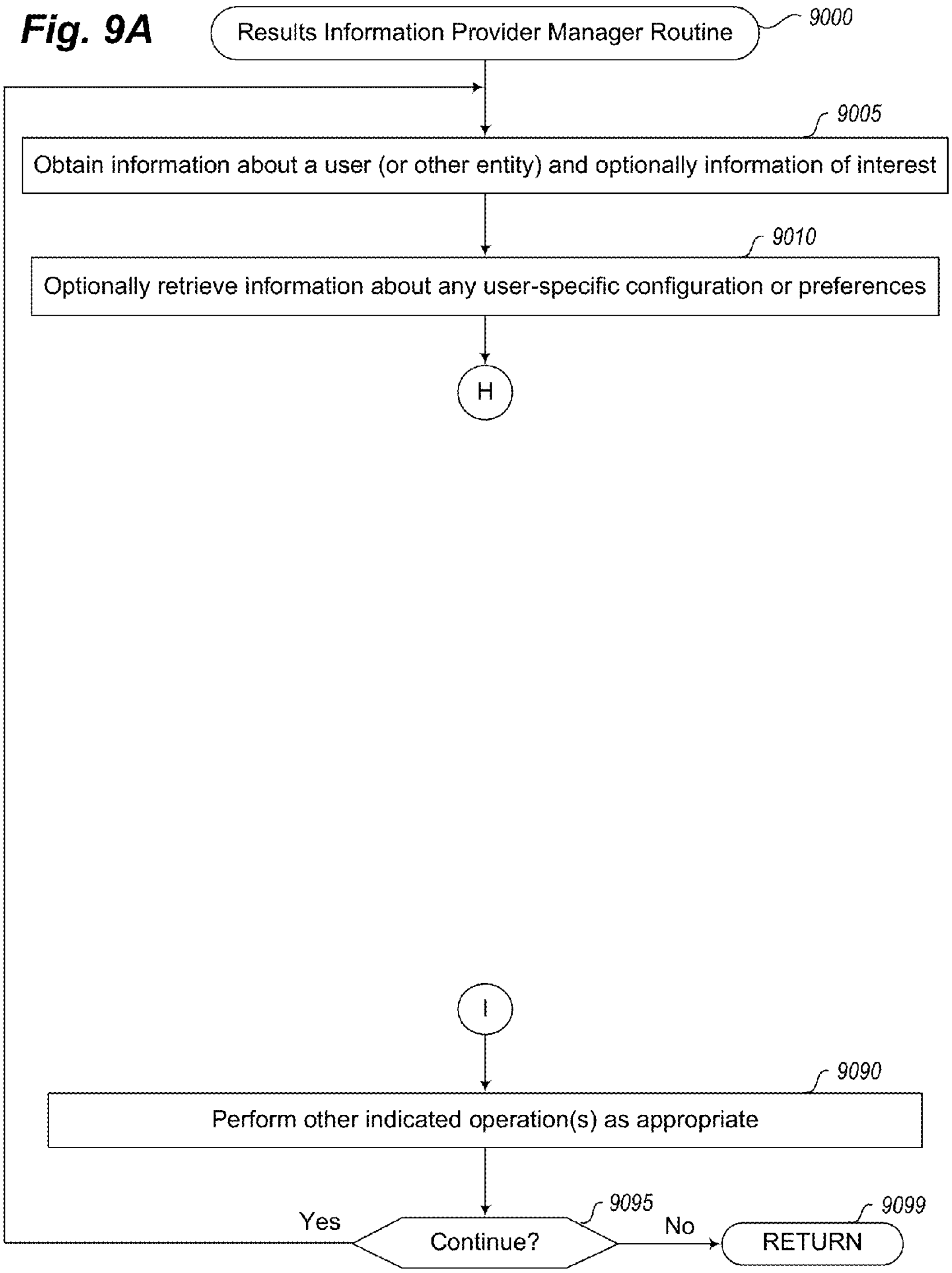
FIGS. 9A-9B are an example flow diagram of an illustrated embodiment of a Results Information Provider Manager routine.
Figure 9B:
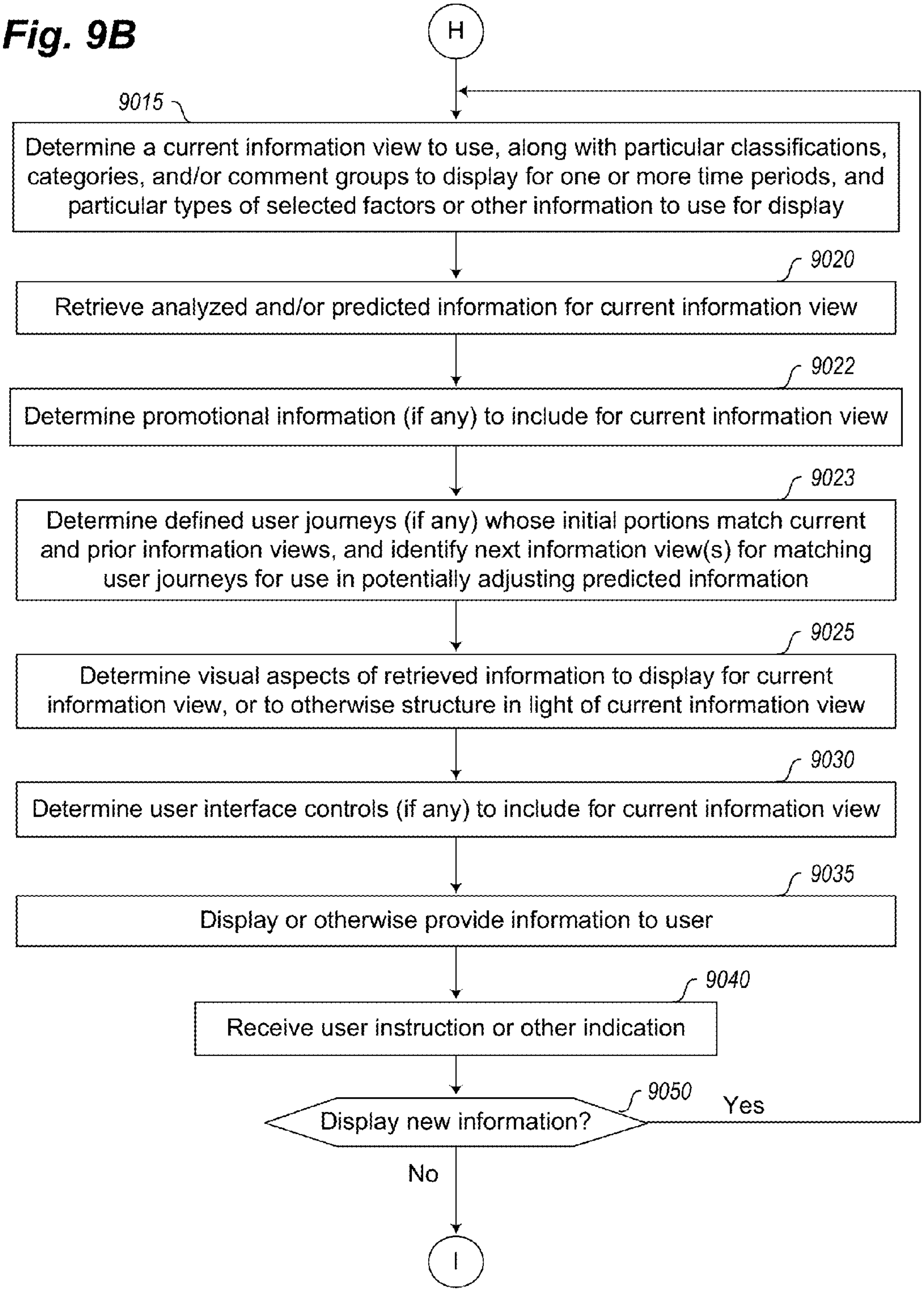

FIGS. 9A-9B are an example flow diagram of an illustrated embodiment of a Results Information Provider Manager routine 9000. The routine may be performed by, for example, execution of the Results Information Provider Manager module 347 of FIG. 3, the group discussion prediction service discussed with respect to FIGS. 2A-2AH and/or the Group Discussion Prediction Service 150 of FIG. 1, such as to display or otherwise provide analyzed information and/or predicted information for one or more categories and/or comment groups and/or classifications of interest, to reflect corresponding constituent member content items for one or more time periods, as well as to optionally provide promotional information in appropriate circumstances. The routine may be invoked in various manners in various embodiments and situations, including with respect to block 475 of FIG. 4B. In addition, while the illustrated embodiment of the routine discusses displaying information of specific types in specific manners, it will be appreciated that other types of information may be displayed in other manners in other embodiments, including information that is not related to distributed group discussions. As one non-exclusive example, in some embodiments the routine may receive requests for information about one or more defined user journeys (e.g., information about popular journeys, about trending journeys, about journeys that match a defined hashtag or that were performed by an indicated user or that include an indicated category or that otherwise satisfy indicated search criteria, etc.), and may display or otherwise provide corresponding information to one or more users.

The routine begins at block 9005, where information is obtained about a user or other entity to whom to display or otherwise provide information, optionally including one or more indications of interest. Such obtained information may, for example, be based on a request received from the user or other entity (such as to optionally indicate one or more time periods of interest, a type of information view of interest, one or more classifications and/or categories and/or comment groups of interest, etc.), or instead may be determined based on expiration of a time associated with providing such information, an automated determination to provide such information (e.g., a determination that information of one or more indicated types is available to push to the user or other entity, such as based on a prior request; a determination that one or more other types of indicated criteria are currently satisfied, such as based on receipt or determination of current real-time or near-real-time data of one or more types, based on current prediction of future information of one or more types; etc.), etc.

After block 9005, the routine continues to block 9010 to optionally retrieve information about any configurations previously specified by the user or other entity, and/or any preferences previously determined for the user or other entity (e.g., based on explicit indications of preferences; based on inferred indications of preferences from prior actions of the user or other entity; etc.). For example, a first user may specify that he/she is interested in beginning interactions with a classification-level view that includes information about one or more indicated classifications of interest, while a second user may specify that he/she is interested in beginning interactions with a category-level view that includes information about one or more indicated categories of interest, while a third user may specify that he/she is interested in beginning interactions with a comment group-level view that includes information about one or more indicated comment groups of interest, etc. User or entity configurations or preferences may further include particular selected factors whose information is to be displayed in particular manners, as well as other information about types of information to expose or hide at particular times (e.g., legends, keys, scale information, tags and other visual indicators, user-selectable controls, etc.), as discussed in greater detail elsewhere.

After block 9010, the routine continues to block 9015 to determine particular types of information to display or otherwise provide at the current time, including a current information view, one or more current, past and/or future time periods for which to display information, particular classifications and/or categories and/or comment groups, particular types of selected factors to use, etc. In some embodiments, some or all such information may be user-configurable or otherwise personalized to a particular user or other entity, and in some embodiments, some or all such information may be predefined (e.g., defaults that can be overridden by the user or other entity, fixed information that cannot be overridden by the user of other entity, etc.)—as discussed with respect to blocks 9005 and 9010, at least some of the determined types of information may be obtained by operations performed with respect to those blocks. In block 9020, the routine then retrieves analyzed and/or predicted information of the types determined in block 9015, whether by accessing previously generated and stored information, interacting with one or more other modules 342-348 to cause the modules to dynamically generate and/or provide such information, etc.

After block 9020, the routine continues to block 9022, where it determines promotional information, if any, to include for the current information view, such as based on the information in the current information view and other current conditions matching the circumstances specified by one or more advertisers or other external entities for such promotional information to be provided. As discussed in greater detail elsewhere, in some embodiments and situations, multiple advertisers may bid on or otherwise request a particular circumstance, and if so the determining of the promotional information may include selecting one or more of those multiple advertisers whose bid or other request is to be used for a particular occurrence of that circumstance. After block 9022, the routine continues to block 9023 to determine defined user journey(s), if any, that are applicable to the current information view, such as if the current information view and optionally one or more preceding information views of the user match the initial inter-related categories of one or more defined user journeys. If so, and if the matching one or more defined user journeys satisfy any other defined criteria for using such matching user journeys as predictions of next possible selections by the current user (e.g., based on user preferences, a minimum number of matching current and prior information views, etc.), the routine may in some embodiments use information about the next category in one or more such matching user journeys as a prediction of a possible next selection that the current may make. In such embodiments and situations, the routine may provide information to the current user as part of the current information view related to such possible next category selections in one or more manners, as discussed in greater detail elsewhere.

After block 9023, the routine continues to block 9025, where it then prepares the retrieved information for display or other providing, such as to determine and generate information for particular visual aspects to be included for display to the user, to determine and generate tags or other structured data to be included in information being programmatically provided to another automated system, etc. The routine then continues to block 9030 to determine user-selectable and user-manipulatable controls, if any, to include in a display of the current information view, such as in a manner based on previous configuration and/or preferences of the user or other entity, based on predefined defaults or fixed controls, based on the current information view, etc. In block 9035, the routine then displays or otherwise provides the information to the user or other entity, such as by sending the information to a client device of the user or other entity for display using a browser or other client-side application executing on the client device. As discussed in greater detail elsewhere, a variety of visual aspects and selected factors may be used as part of the display. As one illustrative non-limiting example, the information displayed may be a category-level view that includes information about a particular category and about particular comment groups within that category, by displaying information for each of the comment groups based on that comment group's constituent member content items for a current time period and a next future time period, and with the visual aspects and the corresponding selected factors that are used as follows: 5 visual aspects that include size, horizontal location, vertical location, color, and an associated halo; and 5 selected factors for those 5 visual aspects of current total quantity of constituent member content items, current aggregate sentiment, current rate of change in total quantity, current rate of change in total quantity, and predicted total quantity of constituent member content items for the future time period, respectively (i.e., size represents current total quantity, horizontal location represents aggregate sentiment, vertical location and color each represent current rate of change in total quantity, and halo represents predicted total quantity). As another illustrative non-limiting example, the information displayed may be a classification-level view that includes information about one or more classifications and about particular categories within each such classification (and optionally about particular comments groups within one or more such categories), by displaying information for each of the categories (and possibly comment groups) based on that category's (and possibly comment group's) constituent member content items for a current time period and a next future time period, and with the visual aspects and the corresponding selected factors that are used as follows: 5 visual aspects that include size, horizontal location, vertical location, color, and an associated halo; and 5 selected factors for those 5 visual aspects of current total quantity of constituent member content items, current aggregate sentiment, current rate of change in total quantity, current rate of change in total quantity, and predicted total quantity of constituent member content items for the future time period, respectively (i.e., size represents current total quantity, horizontal location represents aggregate sentiment, vertical location and color each represent current rate of change in total quantity, and halo represents predicted total quantity).

In the illustrated embodiment, the routine then waits in block 9040 until a user instruction or other indication is received, and then continues to block 9050 to determine whether the instruction or indication results in the display of new information, and if so returns to block 9015 to initiate that display. For example, a user instruction may be received that selects a particular information view, classification, category, comment group and/or content item for which additional information is to be retrieved or displayed, or alternatively a user instruction may be received that modifies information being currently displayed in one or more other manners (e.g., to indicate a new selected factor for which visual aspects are to be provided, to indicate to advance to a previous or next page, etc.). Alternatively, the indication received in block 9040 may be initiated in other manners, such as an indication that new analyzed and/or predicted information corresponding to the current display is available for display, an indication that a timer has expired (e.g., if the display is updated periodically, such as every time period, every 5 minutes, every minute, every second, etc.), an indication from the GDAP system or service (e.g., from another module of the GDAP system) to update the display, etc.

If it is instead determined in block 9050 that the instruction or indication received in block 9040 does not result in the display of new information, the routine continues instead to block 9090 to optionally perform one or more other indicated operations as appropriate, and to then continue to block 9095. For example, if a user or other entity indicates that the current information display session is complete (e.g., based on a user logout, inactivity for a predetermined amount of time, etc.), the routine may continue to block 9095 and then to block 9099. Alternatively, the user or other entity may provide information to be stored for later use, indicate a change in a current user or other entity, etc.

After block 9090, the routine continues to block 9095 to determine whether to continue, such as until an explicit indication to terminate is received. If it is determined to continue, the routine returns to block 9005, such as to wait until a next request or other indication is received. If it is instead determined in block 9095 not to continue, the routine instead continues to block 9099 and returns, such as to return to block 475 of FIG. 4B.

As discussed in greater detail elsewhere, in at least some such embodiments, the information display or other providing of routine 9000 may occur in a real-time or near-real-time manner with respect to corresponding events or activities to which the information corresponds (e.g., within seconds, minutes or hours of such events or activities), such as the receipt of constituent member content items on based the displayed information is based at least in part. A display of information may, for example, indicate multiple categories, and visually indicate information about relative or absolute values for respective categories based on each of multiple selected factors, such as based on use of one or more of the following information for a displayed representation of a category: size, horizontal location, vertical location, color, an associated halo, horizontal movement, vertical movement, displayed tags or other visual indicators, etc.

—as one example, such information may be provided for a current time period and/or next future time period and for selected factors that include total quantity of constituent member content items, rate of change in total quantity, and aggregate sentiment. A display of information may, for example, indicate multiple comment groups that each represents an associated topic or other attribute of constituent member content items in the comment group (whether instead of or in addition to one or more category indicators), and visually indicate information about relative or absolute values for respective comment groups based on each of multiple selected factors, such as based on use of one or more of the following information for a displayed representation of a category: size, horizontal location, vertical location, color, an associated halo, horizontal movement, vertical movement, displayed tags or other visual indicators, etc.

—as one example, such information may be provided for a current time period and/or next future time period and for selected factors that include total quantity of constituent member content items, rate of change in total quantity, and aggregate sentiment. Additional details related to such display of information about analyzed aspects of distributed group discussions and/or about further predicted aspects of the discussions is included herein, including with respect to FIGS. 2L-2AH.

Figure 10A:
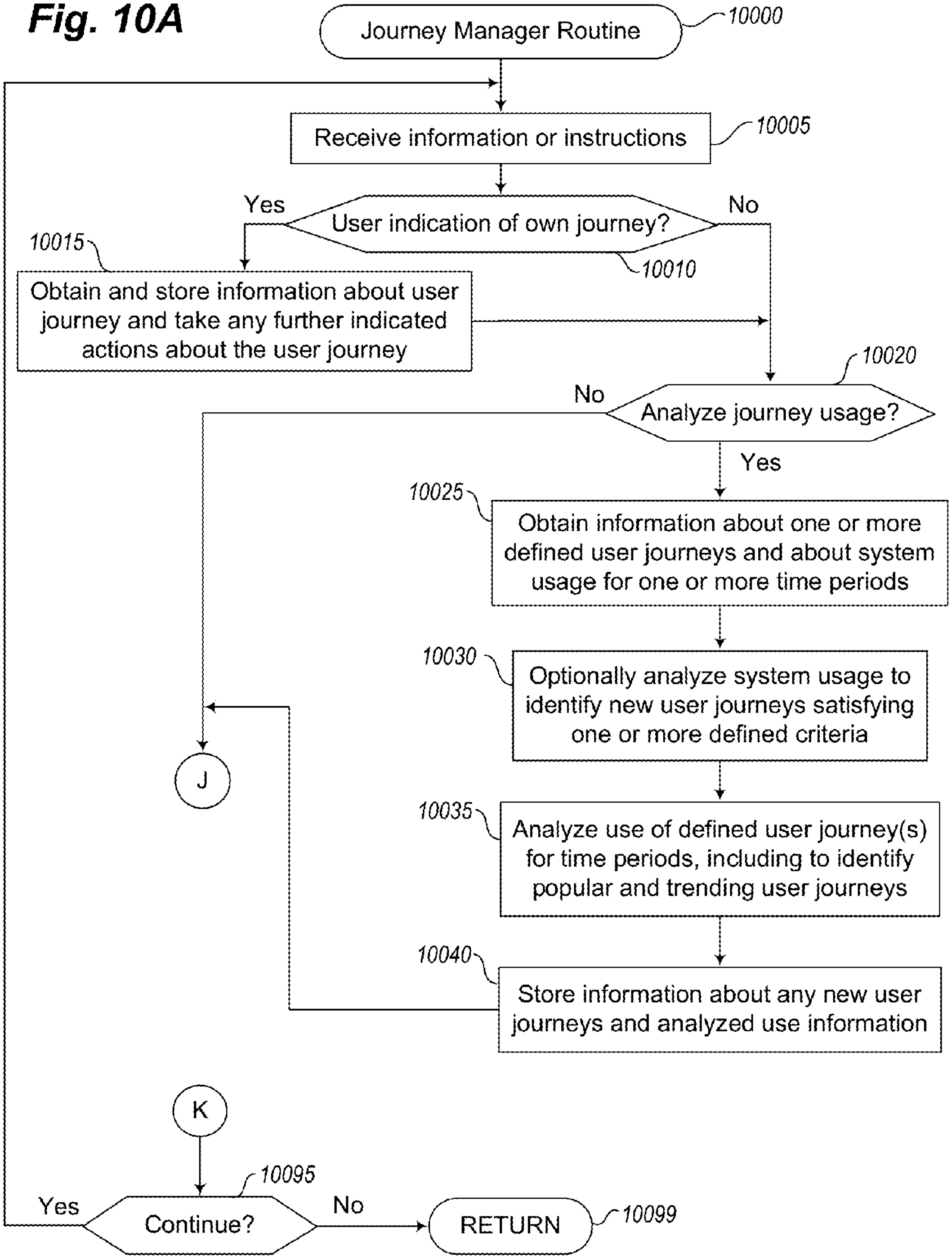
FIGS. 10A-10B are an example flow diagram of an illustrated embodiment of a Journey Manager routine.
Figure 10B:
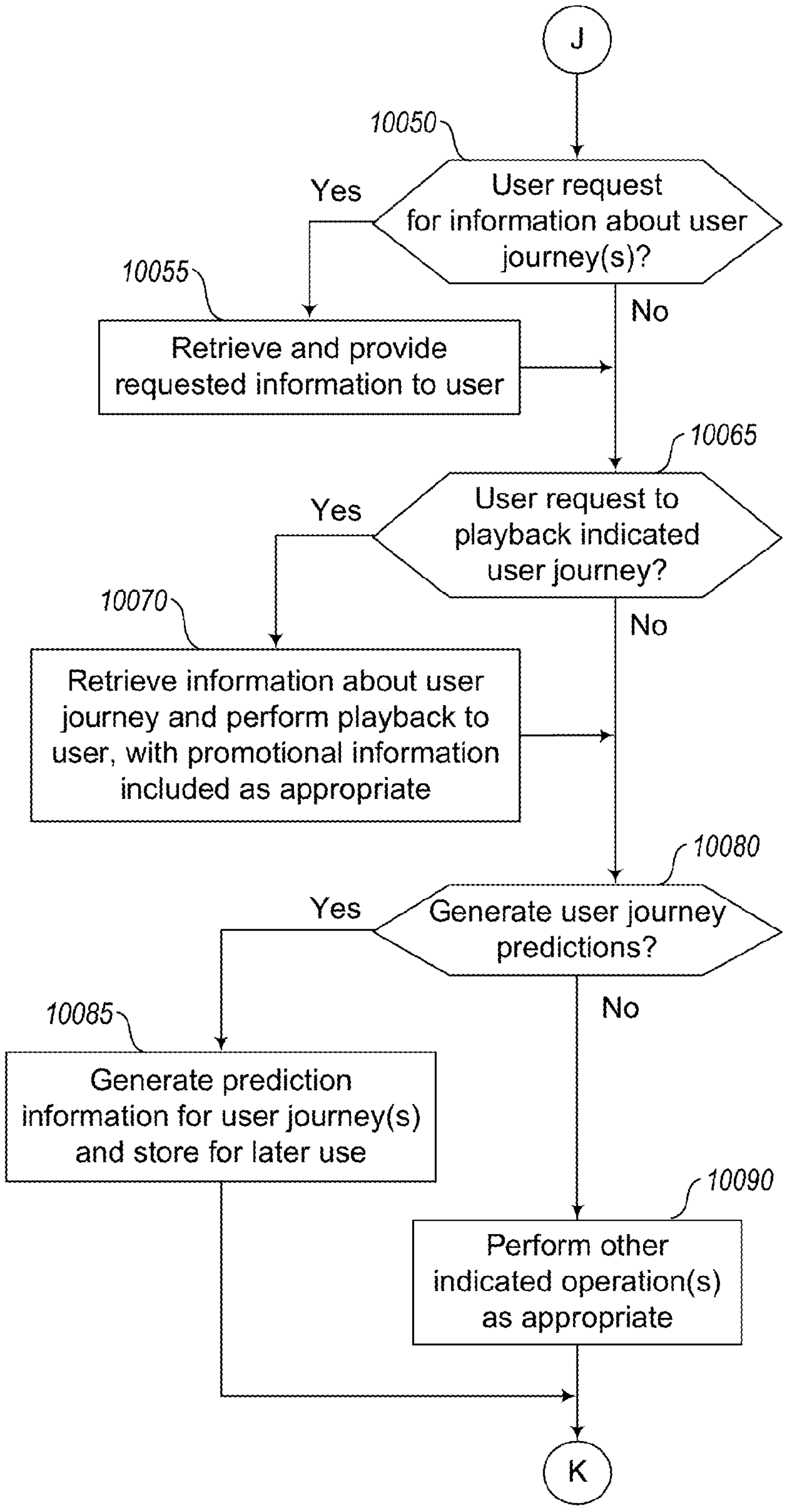

FIGS. 10A-10B are an example flow diagram of an illustrated embodiment of a Journey Manager routine 10000. The routine may be performed by, for example, execution of the Journey Manager module 343 of FIG. 3, the group discussion prediction service discussed with respect to FIGS. 2A-2AH and/or the Group Discussion Prediction Service 150 of FIG. 1, such as to provide various types of journey-related functionality. The routine may be invoked in various manners in various embodiments and situations, including with respect to block 467 of FIG. 4B. In addition, while the illustrated embodiment of the routine discusses displaying information of specific types in specific manners, such as to playback a defined user journey to a user in certain situations, it will be appreciated that other types of information may be displayed in other manners in other embodiments. As one non-exclusive example, in some embodiments, the routine may receive requests for information about defined user journeys that satisfy one or more specified criteria (e.g., information about popular journeys, about trending journeys, about journeys that match a defined hashtag or that were performed by an indicated user or that include an indicated category or that otherwise satisfy indicated search criteria, etc.), and may display or otherwise provide corresponding information to one or more users—in other embodiments, such information display or providing may instead be performed by other portions of the GDAP service, such as described in greater detail with respect to FIGS. 9A-9B.

The illustrated embodiment of the routine begins at block 10005, where information or instructions are received. The routine then continues to block 10010 to determine whether instructions are received in block 10005 that relate to a user indication of a defined journey performed by that user. If so, the routine continues to block 10015 to obtain and store information about the indicated user journey, and to take any further indicated actions with respect to that user journey. For example, a user may indicate to save the user journey for later use by that user and/or may indicate to make information about the user journey available to one or more other users in various manners (e.g., by assigning one or more hashtags to the user journey, by posting information about the user journey to a wall or other area associated with the current user, by indicating one or more other specific users to whom to send information about the user journey, etc.). As discussed in greater detail elsewhere, a user may indicate a new user journey to be defined in various manners in various embodiments. In addition, in some embodiments, a user may take some or all such actions described with respect to block 10015 for user journeys that the user did not define (e.g., were defined by another user, were automatically defined by the GDAP service, etc.), and optionally may take additional types of journey-related actions (e.g., to rate, comment on, vote on or otherwise provide information about the journey).

After block 10015, or if it is otherwise determined in block 10010 that the information or instructions received in block 10005 are not a user indication of a journey by that user, the routine continues instead to block 10020 to determine whether the information or instructions received in block 10005 include an indication to analyze journey usage by one or more users of the GDAP service. Such an indication may be initiated based on, for example, a periodic analysis performed by the GDAP system, an analysis performed by the GDAP system automatically when specified criteria are satisfied, based on an instruction from a human operator of the GDAP service, etc. If so, the routine continues to block 10025 to obtain information about one or more defined user journeys and about GDAP system usage for those journeys for one or more time periods. The routine then continues to block 10030 to optionally analyze the usage data by users of the GUI of the GDAP service in order to identify any new user journeys that satisfy one or more defined criteria, such as based on a minimum number of users of the GDAP service engaging in the same sequence of inter-related category views, or otherwise performing activities related to the same user journeys. In other embodiments, such an automated analysis of system usage data to identify new user journeys may not be performed, such as if user journeys are defined in such embodiments based only on user indications of their own user journeys that they have performed and/or of user journeys performed by other users. After block 10030, the routine continues to block 10035 to analyze use of one or more user journeys for the one or more time periods, such as for some or all previously defined user journeys and/or for any new user journeys identified in block 10030. The analysis of the use of the defined user journeys may include, for example, quantifying a number of users who have performed a playback or otherwise viewed each such journey, identifying groups or types of user journeys of interest (e.g., popular journeys, trending journeys, etc.), etc. After block 10035, the routine continues to block 10040 to store information about any new user journeys identified in block 10030 and about any analyzed use information from block 10035.

After block 10040, or if it is instead determined in block 10020 that the information or instructions received in block 10005 are not to analyze journey usage data, the routine continues instead to block 10050 to determine whether the information or instructions received in block 10005 include a user request for information about one or more user journeys, such as a request for information about user journeys sent directly to the current user, information about popular and/or trending user journeys, information about user journeys associated with a particular other indicated user, etc. If so, the routine continues to block 10055 to retrieve the requested information and to provide the information to the user, such as by displaying the information to the user via the GUI of the GDAP service.

After block 10055, or if it is otherwise determined in block 10050 that the information or instructions received in block 10005 are not a user request for information about one or more user journeys, the routine continues instead to block 10065 to determine whether the information or instructions received in block 10005 include a user request to playback or otherwise view information about an indicated user journey, such as based on a selection by the current user of information provided to the user with respect to block 10055, or as otherwise indicated by the current user. If so, the routine continues to block 10070 to retrieve information about the indicated user journey and to initiate performance of a playback of the user journey to the user, or to otherwise provide information to the user for display about the indicated user journey. As discussed in greater detail elsewhere, the playback or other viewing of information about a user journey may be performed in various manners in various embodiments, including to optionally provide promotional information to the user throughout the journey (e.g., during some or all category-level views of the journey) if appropriate circumstances are satisfied for those pieces of promotional information.

After block 10070, or if it is otherwise determined in block 10065 that the information or instructions received in block 10005 are not to playback an indicated user journey, the routine continues instead to block 10080 to determine whether the information or instructions received in block 10005 include a request to generate predictions with respect to one or more indicated user journeys. If so, the routine continues to block 10085 to generate corresponding prediction information about future expected playbacks or other use of each such indicated user journey, and to store such prediction information for further use, as well as to optionally provide such prediction information to a requester as appropriate. As discussed in greater detail elsewhere, including with respect to FIGS. 7A-7C, the prediction of such future playback or other use of user journeys may be performed in various manners in various embodiments, and the predicted information may be used in various manners in various embodiments.

If it is instead determined in block 10080 that the information or instructions received in block 10005 are not to generate predictions with respect to one or more indicated user journeys, the routine continues instead to block 10090 to optionally perform any other indicated operations as appropriate. Such other indicated operations may include, for example, periodic updates to lists or other information about user journeys (e.g., popular journeys, trending journeys, etc.), allowing users to vote on or otherwise provide comments with respect to particular user journeys, allowing users to share information about user journeys other than journeys that they have created (e.g., such as based on playback or other viewing by that user of a user journey created by another user), etc. While not illustrated in the example embodiment, the routine may further take actions in particular situations to share information about journeys or other types of information with other external services and other external entities as appropriate, including to allow other services external to the GDAP service to receive such information and to analyze it for their own uses and/or to provide such information to users of those other external services.

In the illustrated embodiment after blocks 10085 or 10090 the routine continues to block 10095 to determine whether to continue, such as until an explicit indication to terminate is received. If it is determined to continue, the routine returns to block 10005, and otherwise continues to block 10099 and returns, such as to return to block 467 of FIG. 4B if the current instance of the routine was invoked from there.

Figure 11A:
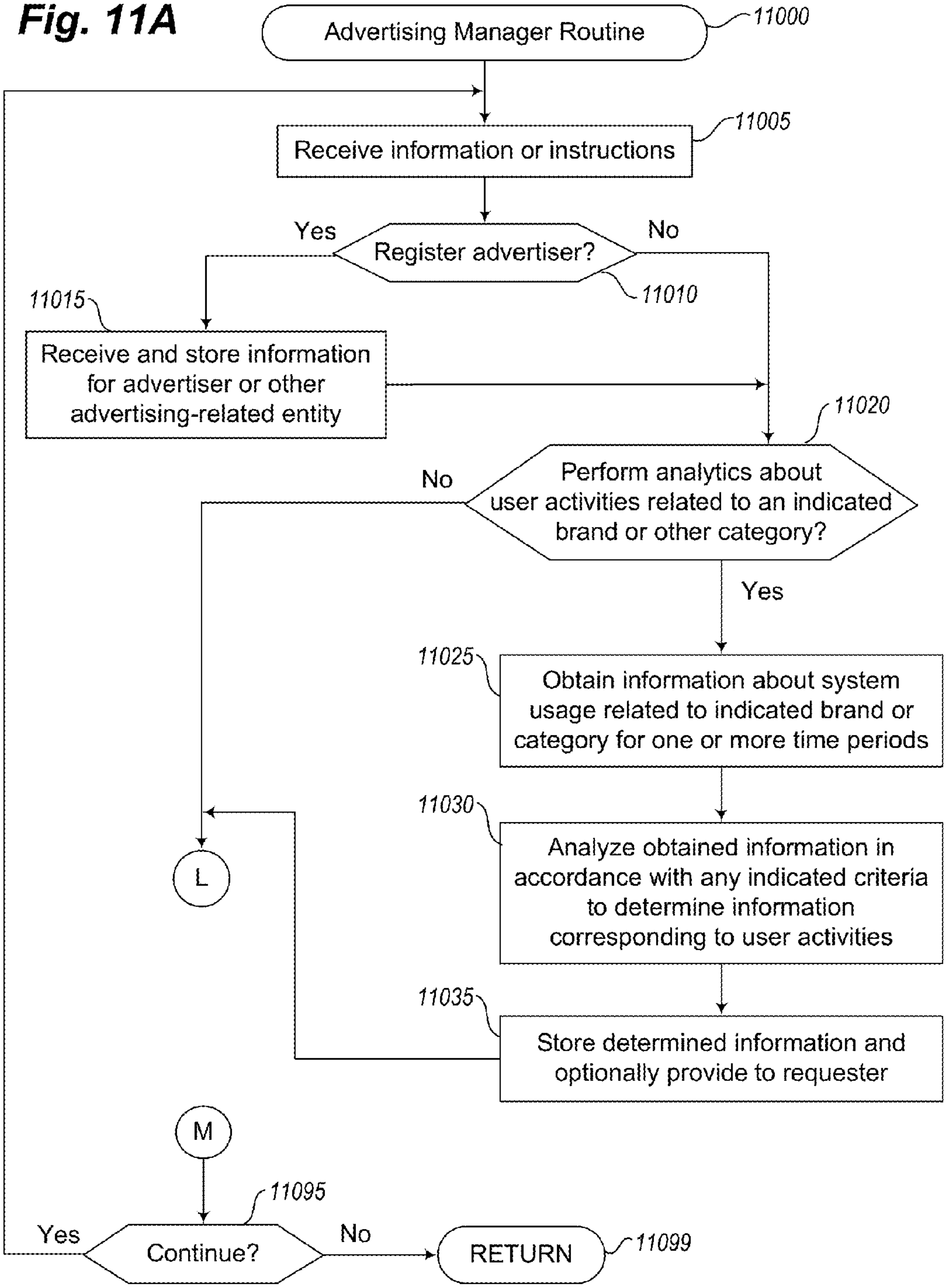
FIGS. 11A-11B are an example flow diagram of an illustrated embodiment of an Advertising Manager routine.
Figure 11B:
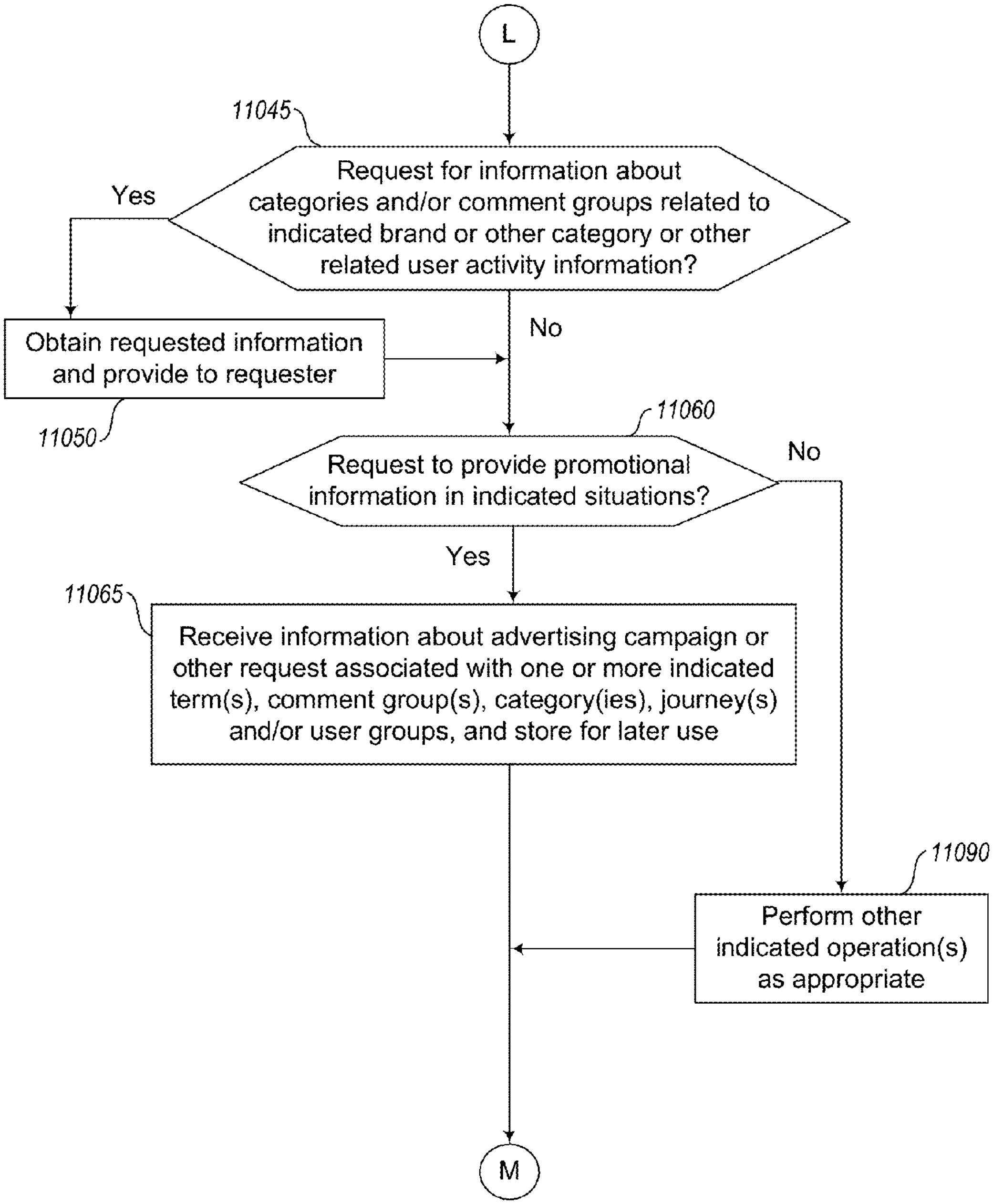

FIGS. 11A-11B are an example flow diagram of an illustrated embodiment of an Advertising Manager routine 11000. The routine may be performed by, for example, execution of the Advertising Manager module 345 of FIG. 3, the group discussion prediction service discussed with respect to FIGS. 2A-2AH and/or the Group Discussion Prediction Service 150 of FIG. 1, such as to provide functionality related to advertising activities performed within the GDAP service. The routine may be invoked in various manners in various embodiments, including with respect to block 469 of FIG. 4B. In addition, while the illustrated embodiment of the routine discusses interactions with particular types of entities external to the GDAP service who are acting as advertisers, such as by paying fees to the GDAP service to enable particular types of promotional information to be displayed or otherwise provided to users of the GDAP service, it will be appreciated that other types of external entities may perform other types of interactions with the GDAP service in other embodiments.

The illustrated embodiment of the routine begins in block 11005, where information or instructions are received. The routine then continues to block 11010 to determine whether the information or instructions received in block 11005 include a request to register a new advertiser entity, such as to enable the advertiser to perform further advertising-related interactions with the GDAP service. If so, the routine continues to block 11015, where it receives and stores information for the advertiser or other advertising-related entity, such as contact information, payment information, and optionally information about one or more advertising campaigns that the advertiser desires to establish. As discussed in greater detail elsewhere, an advertising campaign may include various details specifying one or more circumstances in which one or more pieces of promotional information are to be provided to users, including with respect to other types of information being displayed, particular types of users, particular times, particular portions of the GUI of the GDAP service, etc.

After block 11015, or if it was otherwise determined in block 11010 that the information or instructions received in block 11005 was not to register a new advertiser, the routine continues instead to block 11020 to determine whether the information or instructions received in block 11005 include a request to perform analytics about user activities related to an indicated brand or other category. If so, the routine continues to block 11025 to obtain information about system usage via the GUI of the GDAP service related to the indicated brand or other category for one or more time periods. The routine then continues to block 11030 to analyze the obtained information as part of a brand analysis, in accordance with any indicated criteria, to determine information corresponding to user activities of interest with respect to the indicated brand or other category. As discussed in greater detail elsewhere, such criteria may be used to identify other categories that are related to the indicated brand or other category in a structural manner, such as based on a recent automated discovery process and/or other statistical analysis (e.g., based on a statistical analysis of the inclusion of user comments and/or related user comment groups corresponding to the brand in such other categories, optionally with such categories being grouped based on similarity or structural inter-relationships or other criteria), to identify other categories that are related to the indicated brand or other category based on user activities involving the indicated brand or category and other identified categories (e.g., user journeys that include both the indicated brand or other category and the other identified categories, based on users otherwise accessing information about the other identified categories in relation to the indicated brand or other indicated category, etc.), etc. After block 11030, the routine continues to block 11035 to store the determined information and to optionally provide it to the requester, such as if an advertiser had requested information about an indicated brand of the advertiser. In other embodiments, the analysis with respect to particular brands or other indicated categories may be performed periodically or otherwise based on identified criteria being satisfied, and may be stored for later use by the advertiser and/or by others.

After block 11035, or if it is otherwise determined with respect to block 11020 that the information or instructions received with respect to block 11005 is not a request or information to initiate analytics about user activities related to an indicated brand or other category, the routine continues instead to block 11045 to determine whether the information or instructions received with respect to block 11005 include a request for information about brand-related information (e.g., about categories and/or comment groups that are related to an indicated brand or other category, a request for information about other related user activity information, etc.), such as based on analysis previously performed with respect to block 11030 or that is otherwise accessible to the routine 11000. If so, the routine continues to block 11050 to obtain the requested information and to provide it to the requester, including in some embodiments to dynamically generate some or all of the requested information as appropriate. For example, in some embodiments, an advertiser or other client of the GDAP service may request one-time or periodic reports of indicated types, such as related to an indicated brand, and if so, the routine 11000 may generate and provide such information with respect to block 11050.

After block 11050, or if it is otherwise determined with respect to block 11045 that the information or instructions received with respect to block 11005 is not a request for information related to an indicated brand or other category, the routine continues instead to block 11060 to determine whether the information or instructions received with respect to block 11005 include a request to provide promotional information to users of the GDAP service in one or more indicated situations, such as in accordance with a new advertising campaign being specified or as part of a previously specified advertising campaign. If so, the routine continues to block 11065 to receive information about the advertising campaign or other advertising request, such as to identify information for use in identifying particular situations in which the promotional information is to be used (e.g., information about one or more indicated terms, comment groups, categories, journeys, user groups or other types of users, etc., as well as other related types of factors), and to store the information related to the advertising campaign or other advertising request for later use. In addition, in some embodiments, the promotional information to later be provided to users is also supplied and stored with respect to block 11065, while in other embodiments the promotional information to be used may be specified in other manners (e.g., may be stored by the advertiser or other external entity and identified as part of the request being handled with respect to blocks 11060 and 11065, such that the promotional information is later retrieved from the external entity at a later time, such as a time of planned use).

If it is instead determined in block 11060 that the information or instructions received with respect to block 11005 is not a request to provide promotional information to users in indicated situations, the routine continues instead to block 11090 to optionally perform one or more other indicated operations as appropriate. Such other indicated operations may include, for example, making changes to previously specified advertising campaigns or other advertising requests by particular advertisers, having advertisers retrieve and obtain information about the use of their promotional information within the GDAP service (e.g., metrics with respect to use of the promotional information, effectiveness of the promotional information based on click through rate or other selection of promotional information by users, etc.), etc.

After blocks 11065 or 11090, the routine continues to block 11095 to determine whether to continue, such as until an explicit indication to terminate is received. If it is determined to continue, the routine returns to block 11005, and otherwise continues to block 11099 to return, such as to return to block 469 of FIG. 4B if the current instance of the routine was invoked from there.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by any specified claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

obtaining, by one or more configured computing systems of a group discussion analysis service, information about a distributed group discussion that involves a plurality of users submitting a plurality of textual comments on a plurality of topics for the distributed group discussion;

analyzing, by the one or more configured computing systems, the plurality of textual comments to identify the plurality of topics;

generating, by the one or more configured computing systems, a plurality of comment groups based on the identified plurality of topics, wherein each of the generated comment groups is associated with one of the identified topics and includes one or more of the plurality of textual comments that have contents mentioning the associated identified topic;

identifying, by the one or more configured computing systems and for each of a plurality of specified content categories, a distinct subset of the plurality of textual comments that are associated with the specified content category based on contents of the textual comments of the identified subset, the textual comments of the identified subset being included in multiple of the generated comment groups;

determining, by the one or more configured computing systems and for each of the plurality of specified content categories, a distinct subset of the multiple generated comment groups that correspond to the specified content category for the specified prior time period;

determining, by the one or more configured computing systems, multiple terms of interest that are distinct from the plurality of topics, and assigning each of the multiple terms to one of multiple graph axes;

determining, by the one or more configured computing systems, and for each of at least some of the plurality of topics, a relevance of the topic to the multiple terms based at least in part on the textual comments included in one of the generated comment groups that is associated with the topic; and providing, by the one or more configured computing systems, information to initiate display of a multi-dimensional graph that includes the multiple graph axes and that includes visual indicators for multiple of the at least some topics on the multi-dimensional graph, wherein a position of each of the multiple topics on the displayed multi-dimensional graph is based on the determined relevance of the topic to the multiple terms and is based on the assignment of the multiple terms to the multiple graph axes, to enable a visual determination from the displayed multi-dimensional graph of relative relevance of the multiple topics to the multiple terms.

2. The method of claim 1 wherein the providing of the information to initiate the display of the multi-dimensional graph includes providing the information to a client device of a user of the group discussion analysis service, and wherein display of the multi-dimensional graph occurs on the client device for the user.

3. The method of claim 2 wherein the visual indicators for the multiple topics that are included on the displayed multi-dimensional graph are each selectable by the user, and wherein the method further comprises:

receiving, by the one or more configured computing systems, an indication of one of the multiple topics selected by the user via an interaction with the visual indicator for the selected one topic; and providing, by the one or more configured computing systems and in response to the received indication of the selected one topic, additional information for display to the user regarding the selected one topic, wherein the additional information includes at least one of information about the textual comments associated with the selected one topic, information about one or more attributes determined to be relevant to the selected one topic based at least in part on an analysis of the textual comments associated with the selected one topic, or information about one or more interrelationships determined between the selected one topic and one or more other topics of the plurality based at least in part on an analysis of information about the selected one topic and about the one or more other topics.

4. The method of claim 2 wherein the determining of the multiple terms of interest includes receiving, by the one or more configured computing systems, selections from the user of the multiple terms.

5. The method of claim 2 wherein the assigning of each of the multiple terms to one of multiple graph axes includes receiving, by the one or more configured computing systems, indications from the user of a type of multi-dimensional graph and of, for each of the multiple terms, one of the multiple graph axes to which the term is to be assigned.

6. The method of claim 2 further comprising, before the providing of the information:

receiving, by the one or more configured computing systems, one or more criteria from the user for use in selecting a subset of the at least some topics to display on the multi-dimensional graph; and selecting, by the one or more configured computing systems, the multiple topics based at least in part on the one or more criteria, wherein the multiple topics are a subset of the at least some topics.

7. The method of claim 2 further comprising, after the providing of the information:

receiving, by the one or more configured computing systems, one or more additional terms of interest from the user;

determining, by the one or more configured computing systems, and for each of the multiple topics, a relevance of the topic to the one or more additional terms; and providing, by the one or more configured computing systems, additional information to initiate an updated display of the multi-dimensional graph in which the one or more additional terms are each assigned to one of the multiple graph axes and in which the positions of the visual indicators for the multiple topics are updated to reflect the determined relevances of the multiple topics to the one or more additional terms.

8. The method of claim 2 further comprising, under control of the client device, receiving the provided information, and displaying the multi-dimensional graph to the user on one or more display screens associated with the client device.

9. The method of claim 1 wherein each of the multiple graph axes has a single assigned term and includes a plurality of positions that each corresponds to a distinct degree of relevance with respect to the single assigned term, wherein the determining of the relevance of each of the at least some topics to the multiple terms includes, for each of the at least some topics and each of the multiple terms, determining a relevance score of the topic to the term that reflects a degree of relevance of the term to the topic, and wherein, for each of the multiple topics, the position of the visual indicator for the topic is selected for each of the multiple graph axes to correspond to the degree of relevance for the topic to the single assigned term for the graph axis.

10. The method of claim 1 wherein one of the multiple graph axes is assigned at least two of the multiple terms and includes a plurality of positions that each corresponds to a distinct degree of relevance with respect to a combination of the assigned at least two terms, wherein the determining of the relevance of each of the at least some topics to the multiple terms includes, for each of the at least some topics and the assigned at least two terms, determining degree of relevance of the topic to a combination of the assigned at least two terms, and wherein, for each of the multiple topics, the position of the visual indicator for the topic is selected for the one graph axis to correspond to the degree of relevance for the topic to the combination of the assigned at least two terms.

11. The method of claim 1 wherein one of the multiple graph axes is assigned to one or more attributes distinct from the multiple terms and includes a plurality of positions that each corresponds to a distinct degree of relevance with respect to the assigned one or more attributes, wherein the determining of the relevance of each of the at least some topics to the multiple terms further includes, for each of the at least some topics, determining a degree of relevance of the topic to the assigned one or more attributes, and wherein, for each of the multiple topics, the position of the visual indicator for the topic is selected for the one graph axis to correspond to the degree of relevance for the topic to the assigned one or more attributes.

12. The method of claim 1 wherein the plurality of textual comments are supplied by the plurality of users during a specified prior time period and wherein the visual indicators for the multiple topics correspond to multiple comment groups that are a subset of the plurality of comment groups.

13. The method of claim 12 wherein the multiple comment groups are assigned to multiple content categories of the plurality of specified content categories, wherein the plurality of content categories are specified by a client of the group discussion analysis service, and wherein the providing of the information is performed in response to a request from the client, to further enable a visual determination by the client from the displayed multi-dimensional graph of relative relevance of the multiple comment groups from the multiple content categories.

14. A non-transitory computer-readable medium having stored contents that configure a computing system to perform a method, the method comprising:

analyzing, by the configured computing system, a plurality of textual comments being supplied by human users during a prior time period and being related to a plurality of topics that are each mentioned in contents of one or more of the plurality of textual comments and that are identified from the analyzing;

generating, by the configured computing system, a plurality of comment groups based on the identified topics, each of the generated comment groups being associated with one of the identified topics and including one or more of the plurality of textual comments that have contents mentioning the associated identified topic;

determining, by the configured computing system, multiple terms of interest that are distinct from the plurality of topics, and assigning each of the multiple terms to one of multiple graph axes;

determining, by the configured computing system, and for each of at least some of the plurality of topics, a relevance of one of the generated comment groups associated with the topic to the multiple terms based at least in part on the textual comments included in the one generated comment group;

providing, by the configured computing system, information to initiate display of a multi-dimensional graph that includes the multiple graph axes and that includes visual indicators for multiple of the at least some topics on the multi-dimensional graph, wherein a position of each of the multiple topics on the displayed multi-dimensional graph is based on the determined relevance of the one generated comment group associated with the topic to the multiple terms and is based on the assignment of the multiple terms to the multiple graph axes, to enable a visual determination from the displayed multi-dimensional graph of relative relevance of the multiple topics to the multiple terms;

identifying, by the configured computing system, a subset of the plurality of textual comments that are associated with a specified content category based on contents of the textual comments of the identified subset, the textual comments of the identified subset being included in multiple of the generated comment groups;

determining, by the configured computing system, a subset of the multiple generated comment groups that correspond to the specified content category for the prior time period;

discovering, by the configured computing system, additional content categories that are related to the specified content category, wherein each of the additional content categories corresponds to the topic of at least one of the determined subset of comment groups; and providing, by the configured computing system, indications of the determined additional content categories that are related to the specified content category.

15. The non-transitory computer-readable medium of claim 14 wherein the method further comprises providing, by the configured computing system, indications of multiple topics determined to correspond to the specified content category for the prior time period, the multiple topics including, for each of the generated comment groups in the determined subset, the associated identified topic for the generated comment group.

16. The non-transitory computer-readable medium of claim 14 wherein the determining of the subset includes at least one of excluding at least one first comment group whose included textual comments appear in the identified subset less than a determined minimum threshold or of excluding at least one second comment group whose included textual comments appear in the identified subset more than a determined maximum threshold.

17. The non-transitory computer-readable medium of claim 14 wherein the method further comprises:

determining, by the configured computing system, and for each of the comment groups of the determined subset, a quantity of the textual comments included in the comment group;

predicting, by the configured computing system, and for each of the comment groups of the determined subset, an expected quantity of future textual comments associated with the identified topic for the comment group that will be supplied by human users during a future time period, the predicting being based in part on the determined quantity for the comment group; and providing, by the configured computing system, an indication of the predicted expected quantity of future textual comments for one or more of the comment groups of the determined subset.

18. The non-transitory computer-readable medium of claim 14 wherein the method further comprises:

determining, by the configured computing system, and for each of the comment groups of the determined subset, a quantity of the textual comments included in the comment group;

predicting, by the configured computing system, an expected quantity of future textual comments associated with the specified content category that will be supplied by human users during a future time period, the predicting being based in part on a combination of the determined quantities for the comment groups of the determined subset; and providing, by the configured computing system, an indication of the predicted expected quantity of future textual comments for the specified content category.

19. The non-transitory computer-readable medium of claim 14 wherein the plurality of textual comments are supplied by a plurality of human users at multiple geographical locations, and wherein the method further comprises:

determining, by the configured computing system, and for one of the comment groups of the determined subset, distinct subsets of the textual comments included in the one comment group that are associated with each of the multiple geographical locations;

determining, by the configured computing system, and for each of the multiple geographical locations, a quantity of the textual comments included in the subset associated with the geographical location; and providing, by the configured computing system, information about the determined quantity for each of one or more of the multiple geographical locations.

20. The non-transitory computer-readable medium of claim 14 wherein the plurality of textual comments are posts supplied by a plurality of human users to one or more social networking services, and wherein the method further comprises:

determining, by the configured computing system, and for one of the comment groups of the determined subset, distinct subsets of the textual comments included in the one comment group that are associated with each of the plurality of human users;

determining, by the configured computing system, and for each of the plurality of human users, a quantity of the textual comments included in the subset associated with the human user; and providing, by the configured computing system, information about the determined quantity for each of one or more of the plurality of human users.

21. The non-transitory computer-readable medium of claim 14 wherein the plurality of textual comments are supplied by the human users to a plurality of information sources, and wherein the method further comprises:

determining, by the configured computing system, and for one of the comment groups of the determined subset, distinct subsets of the textual comments included in the one comment group that are associated with each of the plurality of information sources;

determining, by the configured computing system, and for each of the plurality of information sources, a quantity of the textual comments included in the subset associated with the information source; and providing, by the configured computing system, information about the determined quantity for each of one or more of the plurality of information sources.

22. The non-transitory computer-readable medium of claim 14 wherein the method further comprises:

determining, by the configured computing system, and for one of the comment groups of the determined subset, a quantity of the textual comments included in the one comment group;

determining, by the configured computing system and based at least in part on the determined quantity, one or more types of information to make available corresponding to at least one of the specified content category and the identified topic associated with the one comment group; and supplying, by the configured computing system, one or more additional textual comments that are available to the human users and that have contents corresponding to the determined one or more types of information.

23. The non-transitory computer-readable medium of claim 22 wherein the plurality of textual comments are part of user posts to one or more social networking services by the human users, and wherein the supplying of the one or more additional textual comments includes supplying the additional textual comments to at least one of the social networking services as additional posts.

24. The non-transitory computer-readable medium of claim 14 wherein the method further comprises:

determining, for each of one or more additional prior time periods, a plurality of comment groups that have corresponding topics for the specified content category for the additional prior time period and that, wherein the corresponding topics for the determined plurality of comment groups of at least some of the additional prior time periods are distinct from the plurality of topics determined to correspond to the specified content category for the prior time period; and providing indications of one or more topic changes for the specified content category between the prior time period and one or more of the additional prior time periods.

25. The non-transitory computer-readable medium of claim 14 wherein the method further comprises:

receiving, by the configured computing system, information about a succession of multiple content categories that one or more users select; and providing, by the configured computing system, information to initiate display of information to at least one user about the succession of the multiple content categories.

26. The non-transitory computer-readable medium of claim 25 wherein the receiving of the information about the succession of the multiple content categories includes:

tracking, by the configured computing system, interactions of a plurality of users with a plurality of content categories; and analyzing, by the configured computing system, the tracked interactions to identify the succession of multiple content categories, wherein the multiple content categories are a subset of the plurality of content categories, and wherein the one or more users include at least some of the plurality of users.

27. The non-transitory computer-readable medium of claim 14 wherein the method further comprises:

receiving, by the configured computing system, information about a succession of multiple comment groups that one or more users select; and providing, by the configured computing system, information to initiate display of information to at least one user about the succession of the multiple comment groups.

28. The non-transitory computer-readable medium of claim 14 wherein the method further comprises:

receiving, by the configured computing system, a request from a user to display selected information that relates to at least one of one or more comment groups or one or more content categories;

determining, by the configured computing system, one or more pieces of promotional content that are not included in the selected information and that are relevant for the selected information; and providing, by the configured computing system, information to initiate display to the user of the selected information and of at least one of the one or more pieces of promotional content.

29. The non-transitory computer-readable medium of claim 14 wherein the method further comprises:

analyzing, by the configured computing system and for each of the plurality of comment groups, the one or more textual comments included in the comment group to determine one or more relevant attributes for the comment group that are distinct from the associated topic for the comment group; and providing, by the configured computing system, information about the determined one or more relevant attributes for one or more of the plurality of comment groups.

30. The non-transitory computer-readable medium of claim 29 wherein the method further comprises determining, by the configured computing system, one or more inter-relationships that are each between two or more comment groups associated with two or more content categories, wherein the determining of each of the inter-relationships is based at least in part on the determined one or more relevant attributes for each of the two or more comment groups of the inter-relationship, and wherein the providing of the information about the determined one or more relevant attributes includes providing information about at least one of the determined inter-relationships.

31. The non-transitory computer-readable medium of claim 30 wherein at least some of the determined relevant attributes for at least some of the plurality of comment groups are terms included in contents of the plurality of textual comments, and wherein the method further comprises displaying, by the configured computing system, information about at least one of the determined inter-relationships to at least one user.

32. The non-transitory computer-readable medium of claim 29 wherein the providing of the information about the determined one or more relevant attributes includes displaying, by the configured computing system, information to at least one user about the determined one or more relevant attributes for the one or more comment groups.

33. The non-transitory computer-readable medium of claim 14 wherein the method further comprises:

analyzing, by the configured computing system and for one or more of the content categories, information about the textual comments included in the subset of multiple generated comment groups corresponding to the one content category to determine one or more relevant attributes for the one content category that are distinct from any definition terms for the one content category; and providing, by the configured computing system, information about the determined one or more relevant attributes for the one content category.

34. The non-transitory computer-readable medium of claim 33 wherein at least one of the determined relevant attributes for the one content category is a term included in contents of the textual comments included in the subset of multiple generated comment groups corresponding to the one content category, and wherein the method further comprises:

analyzing, by the configured computing system and for one or more of the plurality of comment groups that are not in the subset of multiple generated comment groups corresponding to the one content category, the one or more textual comments included in the comment group to determine one or more relevant attributes for the comment group that are distinct from the associated topic for the comment group; and determining, by the configured computing system, one or more inter-relationships that are each between the one content category and at least one of the one or more comment groups that are not in the subset of multiple generated comment groups corresponding to the one content category, wherein the determining of each of the inter-relationships is based at least in part on the determined relevant attributes for the one content category and on the determined one or more relevant attributes for the at least one comment group of the inter-relationship, and wherein the providing of the information about the determined one or more relevant attributes for the one content category includes displaying, by the configured computing system, information to at least one user about at least one of the determined one or more relevant attributes for the one content category or of the determined one or more inter-relationships.

35. The non-transitory computer-readable medium of claim 14 wherein the configured computing system is part of a group discussion analysis and prediction service, wherein the specified content category is indicated by a client of the group discussion analysis and prediction service, and wherein the providing of the indications of the determined additional content categories includes providing information to the client in accordance with criteria specified by the client.

36. The non-transitory computer-readable medium of claim 14 wherein the identified plurality of topics are each at least one of a term, of a phrase, or of a hashtag, wherein the computer-readable medium is a memory of the configured computing system, and wherein the stored contents are instructions that, when executed, program the configured computing system to perform the method.

37. The non-transitory computer-readable medium of claim 14 wherein the configured computing system is part of a group discussion analysis and prediction service, and wherein the providing of the information includes sending information over one or more computer networks from the group discussion analysis and prediction service to a client device of an end user of the group discussion analysis and prediction service for display on an application from the group discussion analysis and prediction service that is executing on the client device.

38. The non-transitory computer-readable medium of claim 14 wherein the configured computing system is part of a group discussion analysis and prediction service, wherein the stored contents further configure the computing system to provide additional information from the group discussion analysis and prediction service to one or more advertisers that includes at least one of discovered additional content categories or determined attributes for two or more of the generated comment groups or information about determined terms of interest, and wherein the providing of the information includes providing promotional information from at least one advertiser in response to instructions from the at least one advertiser based on the provided additional information.

39. A system, comprising:
- one or more processors of one or more computer systems; and
- one or more memories including instructions that, when executed by at least one of the one or more processors, configure the at least one processor to determine relevant information for a distributed group discussion that involves a plurality of users submitting a plurality of textual comments on a plurality of topics for the distributed group discussion, the determining of the relevant information including:
- analyzing the plurality of textual comments to identify the plurality of topics, wherein each topic of the plurality is mentioned in contents of one or more of the plurality of textual comments;
- generating a plurality of comment groups based on the identified topics, each of the generated comment groups being associated with one of the identified topics and including one or more of the plurality of textual comments that have contents mentioning the associated identified topic;
- determining multiple terms of interest that are distinct from the plurality of topics, and assigning each of the multiple terms to one of multiple graph axes;
- determining, for each of at least some of the plurality of topics, a relevance of one of the generated comment groups associated with the topic to the multiple terms based at least in part on the textual comments included in the one generated comment group;
- analyzing, for each of the plurality of comment groups, the one or more textual comments included in the comment group to determine one or more relevant attributes for the comment group that are distinct from the associated topic for the comment group;
- determining one or more inter-relationships that are each between two or more of the plurality of comment groups based at least in part on the determined one or more relevant attributes for each of the two or more comment groups of the inter-relationship; and
- providing information to a user about at least one of the determined one or more inter-relationships and to initiate display of a multi-dimensional graph that includes the multiple graph axes and that includes visual indicators for multiple of the at least some topics on the multi-dimensional graph, wherein a position of each of the multiple topics on the displayed multi-dimensional graph is based on the determined relevance to the multiple terms of the one generated comment group associated with the topic and is based on the assignment of the multiple terms to the multiple graph axes, to enable a visual determination from the displayed multi-dimensional graph of relative relevance of the multiple topics to the multiple terms.

40. The system of claim 39 wherein at least some of the determined relevant attributes for at least some of the plurality of comment groups are terms included in contents of the plurality of textual comments, and wherein the instructions further configure the at least one processor to display information to at least one user about one or more determined relevant attributes for one or more of the plurality of comment groups.

41. The system of claim 39 wherein the determining of the relevant information further includes:
- determining, for each of multiple content categories, multiple comment groups that are a subset of the plurality of generated comment groups and that correspond to one or more definition terms for the content category;
- analyzing, for each of the multiple content categories, the textual comments included in the multiple comment groups corresponding to the content category to determine one or more relevant attributes for the content category that are distinct from the definition terms for the content category; and
- providing information about at least one of the determined relevant attributes for at least one of the multiple content categories.

42. The system of claim 41 wherein at least some of the determined relevant attributes for at least some of the multiple content categories are terms included in contents of the plurality of textual comments, and wherein the at least one determined inter-relationship is between two or more comment groups associated with two or more of the multiple content categories.

43. The system of claim 39 wherein the one or more computer systems are part of a group discussion analysis and prediction service and the user is an end-user of the group discussion analysis and prediction service, and wherein the providing of the information to the user includes sending information over one or more computer networks from the group discussion analysis and prediction service to a client device of the user for display on an application from the group discussion analysis and prediction service that is executing on the client device.

44. The system of claim 39 wherein the one or more computer systems are part of a group discussion analysis and prediction service, wherein the instructions further configure the at least one processor to provide, by the group discussion analysis and prediction service, additional information to one or more advertisers from the determining of the relevant information, the provided additional information including at least one of determined relevant attributes for two or more of the comment groups or information about at least one determined inter-relationship between two or more of the plurality of comment groups, and wherein the providing of the information to the user includes providing promotional information from at least one advertiser in response to instructions from the at least one advertiser based on the provided additional information.

* * * * *